(12) United States Patent
Cirik et al.

(10) Patent No.: US 12,133,198 B2
(45) Date of Patent: Oct. 29, 2024

(54) BEAM CONTROL FOR REPETITIONS

(71) Applicant: Comcast Cable Communications, LLC, Philadelphia, PA (US)

(72) Inventors: Ali Cagatay Cirik, Herndon, VA (US); Yunjung Yi, Vienna, VA (US); Esmael Hejazi Dinan, Herndon, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 437 days.

(21) Appl. No.: 17/570,837

(22) Filed: Jan. 7, 2022

(65) Prior Publication Data
US 2022/0225285 A1     Jul. 14, 2022

Related U.S. Application Data

(60) Provisional application No. 63/135,318, filed on Jan. 8, 2021, provisional application No. 63/135,329, filed on Jan. 8, 2021.

(51) Int. Cl.
*H04W 72/02*     (2009.01)
*H04L 5/00*     (2006.01)
(Continued)

(52) U.S. Cl.
CPC .......... *H04W 72/02* (2013.01); *H04L 5/0051* (2013.01); *H04W 72/0446* (2013.01);
(Continued)

(58) Field of Classification Search
CPC ... H04W 72/02; H04W 72/542; H04W 72/23; H04W 72/0446; H04W 72/046; H04L 5/0051
See application file for complete search history.

(56) References Cited

U.S. PATENT DOCUMENTS 9,473,289 B2 * 10/2016 Yao ...................... H04L 1/1812
10,893,431 B2    1/2021 Liou et al.
(Continued)

FOREIGN PATENT DOCUMENTS

EP           4106467 A1    12/2022
KR    1020200015961        2/2021
(Continued)

OTHER PUBLICATIONS

R1-2009761 3GPP TSG-RAN WG1 Meeting #103-e, e-Meeting, Oct. 26-Nov. 13, 2020, Source: Moderator (Qualcomm), Title: Summary #2 of email discussions [103-e-NR-feMIMO-02] for mTRP PDCCH enhancements.
(Continued)

*Primary Examiner* — Jael M Ulysse
(74) *Attorney, Agent, or Firm* — Banner & Witcoff, Ltd.

(57) ABSTRACT

Transmission repetition may be used in wireless communications. Control channel repetition may be used for scheduling communications between a base station and a wireless device. A time period between the control channel and the scheduled communications may be less than a threshold time period. The wireless device may determine, for communicating with the base station, a wireless resource corresponding to a default resource pool, a resource pool used for at least one repetition of the control channel, and/or based on a resource pool indicated via the control channel.

14 Claims, 30 Drawing Sheets

(51) Int. Cl.
*H04W 72/044* (2023.01)
*H04W 72/0446* (2023.01)
*H04W 72/23* (2023.01)
*H04W 72/542* (2023.01)

(52) U.S. Cl.
CPC ......... *H04W 72/046* (2013.01); *H04W 72/23* (2023.01); *H04W 72/542* (2023.01)

(56) References Cited

U.S. PATENT DOCUMENTS

| | | | |
|---|---|---|---|
| 11,991,621 B2* | 5/2024 | Park | H04W 48/16 |
| 2019/0082431 A1* | 3/2019 | Yi | H04L 5/0055 |
| 2019/0190582 A1* | 6/2019 | Guo | H04L 27/2607 |
| 2020/0077395 A1 | 3/2020 | Guo | |
| 2021/0195600 A1* | 6/2021 | Khoshnevisan | H04W 72/53 |
| 2021/0321442 A1* | 10/2021 | Jung | H04B 7/0617 |
| 2021/0378004 A1* | 12/2021 | Cirik | H04W 72/23 |
| 2022/0116971 A1* | 4/2022 | Saber | H04L 5/0055 |
| 2022/0132543 A1* | 4/2022 | Bai | H04W 72/044 |
| 2022/0159705 A1* | 5/2022 | Cirik | H04L 5/005 |
| 2022/0210818 A1* | 6/2022 | Cirik | H04W 72/12 |
| 2022/0210862 A1* | 6/2022 | Cirik | H04W 72/21 |
| 2022/0264537 A1* | 8/2022 | Shi | H04L 5/001 |
| 2023/0041109 A1* | 2/2023 | Ling | H04L 5/0023 |
| 2023/0155753 A1* | 5/2023 | Zhou | H04L 5/0048 370/329 |
| 2023/0171611 A1* | 6/2023 | Matsumura | H04L 1/08 370/329 |
| 2023/0208598 A1* | 6/2023 | Khoshnevisan | H04L 5/0053 370/329 |
| 2023/0239114 A1* | 7/2023 | Kim | H04W 16/28 370/329 |
| 2023/0345260 A1 | 10/2023 | Li | |
| 2023/0379951 A1* | 11/2023 | Khoshnevisan | H04W 72/0453 |
| 2023/0388081 A1* | 11/2023 | Kim | H04L 5/0092 |
| 2024/0014965 A1 | 1/2024 | Khoshnevisan et al. | |
| 2024/0015740 A1* | 1/2024 | Xiao | H04W 72/1273 |

FOREIGN PATENT DOCUMENTS

| | | |
|---|---|---|
| KR | 1020200035942 | 2/2021 |
| KR | 1020200089205 | 8/2021 |
| WO | 2021224283 A1 | 11/2021 |

OTHER PUBLICATIONS

R1-2009683 3GPP TSG-RAN WG1 Meeting #103-e, e-Meeting, Oct. 26-Nov. 13, 2020, Source: Moderator (Qualcomm), Title: Summary of email discussions [103-e-NR-feMIMO-02] for mTRP PDCCH enhancements.

R1-2009480 3GPP TSG RAN WG1 Meeting #103, e-Meeting, Oct. 26-Nov. 13, 2020, Source: Moderator (Nokia, Nokia Shanghai Bell), Title: Summary of Multi-TRP URLLC for PUCCH and PUSCH.

R1-2009251 3GPP TSG-RAN WG1 Meeting #103-e, e-Meeting, Oct. 26-Nov. 13, 2020, Source: Qualcomm Incorporated, Title: Enhancements on Multi-TRP for PDCCH, PUCCH and PUSCH.

R1-2009223 3GPP TSG-RAN WG1 Meeting #103, eMeeting, Oct. 26-Nov. 13, 2020, Source: Ericsson, Title: On PDCCH, PUCCH and PUSCH enhancements with multiple TRPs.

R1-2009175 3GPP TSG RAN WG1 Meeting #103-e, e-Meeting, Oct. 26-Nov. 13, 2020, Source: NTT Docomo, Inc, Title: Discussion on MTRP for reliability.

R1-2009159 3GPP TSG-RAN WG1#103-e, e-Meeting, Oct. 26-Nov. 13, 2020, Source: Convida Wireless, Title: Multi-TRP Enhancements for PDCCH, PUCCH and PUSCH.

R1-2009142 3GPP TSG RAN WG1 #103-e, e-Meeting, Oct. 26-Nov. 13, 2020, Source: Spreadtrum Communications, Title: Discussion on enhancements on Multi-TRP for PDCCH, PUCCH and PUSCH.

R1-2009130 3GPP TSG RAN WG1 #103-e, e-Meeting, Oct. 26-Nov. 13, 2020, Source: Sharp, Title: Enhancements on multi-TRP for PUSCH.

R1-2009054 3GPP TSG-RAN WG1 #103-e, e-Meeting, Oct. 26-Nov. 13, 2020, Source: Asia Pacific Telecom, Title: Discussion on enhancements on multi-TRP for uplink channels.

R1-2009028 3GPP TSG RAN WG1 #103-e, e-Meeting, Oct. 26-Nov. 13, 2020, Source: Xiaomi, Title: Enhancements on Multi-TRP for PDCCH, PUCCH and PUSCH.

R1-2008978 3GPP TSG RAN WG1 #103-e, e-Meeting, Oct. 26-Nov. 13, 2020, Source: Intel Corporation, Title: Multi-TRP enhancements for PDCCH, PUCCH and PUSCH.

R1-2008958 3GPP TSG RAN WG1 #103-e, e-Meeting, Oct. 26-Nov. 13, 2020, Source: MediaTek Inc., Title: Enhancements on Multi-TRP for PDCCH, PUSCH and PUCCH.

R1-2008944 3GPP TSG RAN WG1 #103-e, e-Meeting, Oct. 26-Nov. 13, 2020, Source: NEC, Title: Discussion on multi-TRP for PDCCH, PUCCH and PUSCH.

R1-2008911 3GPP TSG RAN WG1 #103-e, e-Meeting, Oct. 26-Nov. 13, 2020, Source: Lenovo, Motorola Mobility, Title: Enhancements on Multi-TRP for PDCCH, PUCCH and PUSCH.

R1-2008904 3GPP TSG RAN WG1 #103 Meeting, e-Meeting, Oct. 26-Nov. 13, 2020, Source: Nokia, Nokia Shanghai Bell, Title: Enhancements for Multi-TRP URLLC schemes.

R1-2008898 3GPP TSG RAN WG1 #103-e, E-meeting, Nov. 2-13, 2020, Source: Fraunhofer IIS, Fraunhofer HHI, Title: On multi-TRP enhancements for PDCCH and PUSCH.

R1-2008574 3GPP TSG RAN WG1 #103-e, e-Meeting, Oct. 26-Nov. 13, 2020, Source: LG Electronics, Title: Enhancements on Multi-TRP for PDCCH, PUCCH and PUSCH.

R1-2008439 3GPP TSG-RAN WG1 #103-e, e-Meeting, Oct. 26-Nov. 13, 2020, Source: Apple Inc., Title: On Multi-TRP Reliability Enhancement.

R1-2008347 3GPP TSG RAN WG1 #103-e, e-Meeting, Oct. 28, 2020, Source: Sony, Title: Considerations on Multi-TRP for PDCCH, PUCCH, PUSCH.

R1-2008218 3GPP TSG RAN WG1 #103-e, e-Meeting, Oct. 26-Nov. 13, 2020, Source: OPPO, Title: Enhancements on multi-TRP for PDCCH, PUCCH and PUSCH.

R1-2008149 3GPP TSG RAN WG1 #103-e, e-Meeting, Oct. 26-Nov. 13, 2020, Source: Samsung, Title: Enhancements on Multi-TRP for PDCCH, PUCCH and PUSCH.

R1-2008001 3GPP TSG RAN WG1 #103-e, e-Meeting, Oct. 26-Nov. 13, 2020, Source: CMCC, Title: Enhancements on Multi-TRP for PDCCH, PUCCH and PUSCH.

R1-2007825 3GPP TSG RAN WG1 Meeting #103-e, e-Meeting, Oct. 26-Nov. 13, 2020, Source: CATT, Title: Discussion on enhancements on multi-TRP/panel for PDCCH, PUCCH and PUSCH.

R1-2007793 3GPP TSG RAN WG1 Meeting #103-e, E-meeting, Oct. 26-Nov. 13, 2020, Source: TCL communication, Title: Enhancements on Multi-TRP for PDCCH, PUCCH and PUSCH.

R1-2007783 3GPP TSG RAN WG1 #103-e, e-Meeting, Oct. 26-Nov. 13, 2020, Source: Fujitsu, Title: Enhancements on Multi-TRP for PDCCH, PUCCH and PUSCH.

R1-2007764 3GPP TSG RAN WG1 Meeting #103-e, e-Meeting, Oct. 26-Nov. 13, 2020, Source: ZTE, Title: Multi-TRP enhancements for PDCCH, PUCCH and PUSCH.

R1-2007645 3GPP TSG RAN WG1 #103-e, e-Meeting, Oct. 26-Nov. 13, 2020, Source: vivo, Title: Further discussion on enhancement of MTRP operation.

R1-2007627 3GPP TSG RAN WG1 #103-e, e-Meeting, Oct. 26-Nov. 13, 2020, Source: InterDigital, Inc., Title: Reliability Enhancements for PDCCH, PUCCH, and PUSCH.

R1-2007587 3GPP TSG RAN WG1 Meeting #103-e, E-meeting, Oct. 26-Nov. 13, 2020, Source: Huawei, HiSilicon, Title: Enhancements on multi-TRP for reliability and robustness in Rel-17.

R1-2007540 3GPP TSG RAN WG1 #103-e, e-Meeting, Oct. 26-Nov. 13, 2020, Source: FUTUREWEI, Title: Multi-TRP/panel for non-PDSCH.

R1-200nnnn 3GPP TSG RAN WG1 Meeting #103-e, e-Meeting, Oct. 26-Nov. 13, 2020, Source: Moderator (CATT), Title: Summary on beam management for simultaneous multi-TRP transmission with multiple Rx panels.

(56) References Cited

OTHER PUBLICATIONS

3GPP TS 38.331 V16.2.0 (Sep. 2020) 3rd Generation Partnership Project; Technical Specification Group Radio Access Network; NR; Radio Resource Control (RRC) protocol specification (Release 16).
3GPP TS 38.321 V16.2.1 (Sep. 2020) 3rd Generation Partnership Project; Technical Specification Group Radio Access Network; NR; Medium Access Control (MAC) protocol specification (Release 16).
3GPP TS 38.300 V16.3.0 (Sep. 2020) 3rd Generation Partnership Project; Technical Specification Group Radio Access Network; NR; NR and NG-RAN Overall Description; Stage 2 (Release 16).
3GPP TS 38.214 V16.3.0 (Sep. 2020) 3rd Generation Partnership Project; Technical Specification Group Radio Access Network; NR; Physical layer procedures for data (Release 16).
3GPP TS 38.213 V16.3.0 (Sep. 2020) 3rd Generation Partnership Project; Technical Specification Group Radio Access Network; NR; Physical layer procedures for control (Release 16).
3GPP TS 38.212 V16.3.0 (Sep. 2020) 3rd Generation Partnership Project; Technical Specification Group Radio Access Network; NR; Multiplexing and channel coding (Release 16).
3GPP TS 38.211 V16.3.0 (Sep. 2020), Technical Specification, 3rd Generation Partnership Project; Technical Specification Group Radio Access Network; NR; Physical channels and modulation (Release 16).
3GPP TS 38.133 V16.5.0 (Sep. 2020), Forward—Section 13.
R1-1908191 3GPP TSG RAN WG1 #98 Prague, ZA Aug. 26-30, 2019 ZTE Enhancements on Multi-TRP and Multi-Panel Transmission, pp. 1-21, XP051764810, Retrieved from the Internet: URL:http://www.3gpp.org/ftp/tsg_ran/WG1_RL1/TSGR1_98/Docs/RI-1908191.zip [retrieved on Aug. 17, 2019].
R1-1909201 3GPP TSG RAN WG1 #98 Prague, CZ Aug. 26-30, 2019, "Enhancements on multi-TRP/panel transmission", pp. 1-36, XP051765806, Retrieved from the Internet: URL:http://www.3gpp.org/ftp/tsg_ran/WG1_RL1/TSGR1_98/Docs/RI-1909201.zip.
May 24, 2022—EP Search Report—EP App. No. 22150587.8.
Jul. 24, 2024—European Office Action—EP App. No. 22150587.8.

* cited by examiner

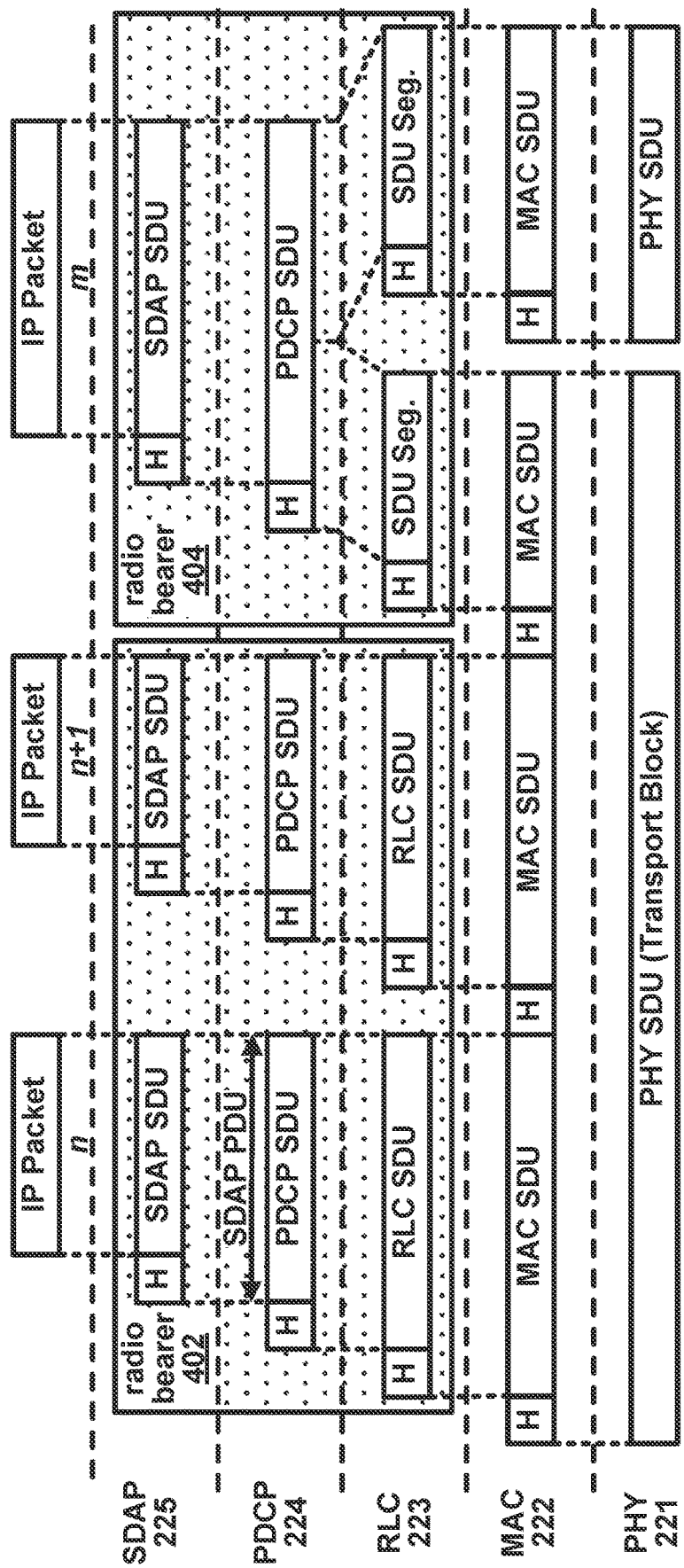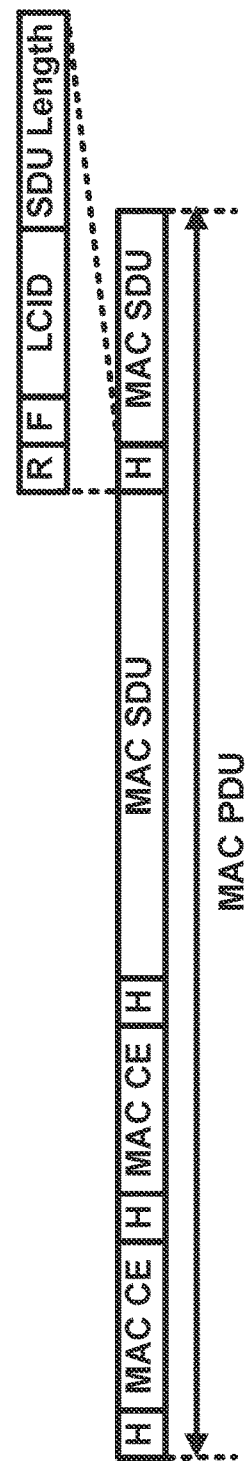
FIG. 4A
FIG. 4B

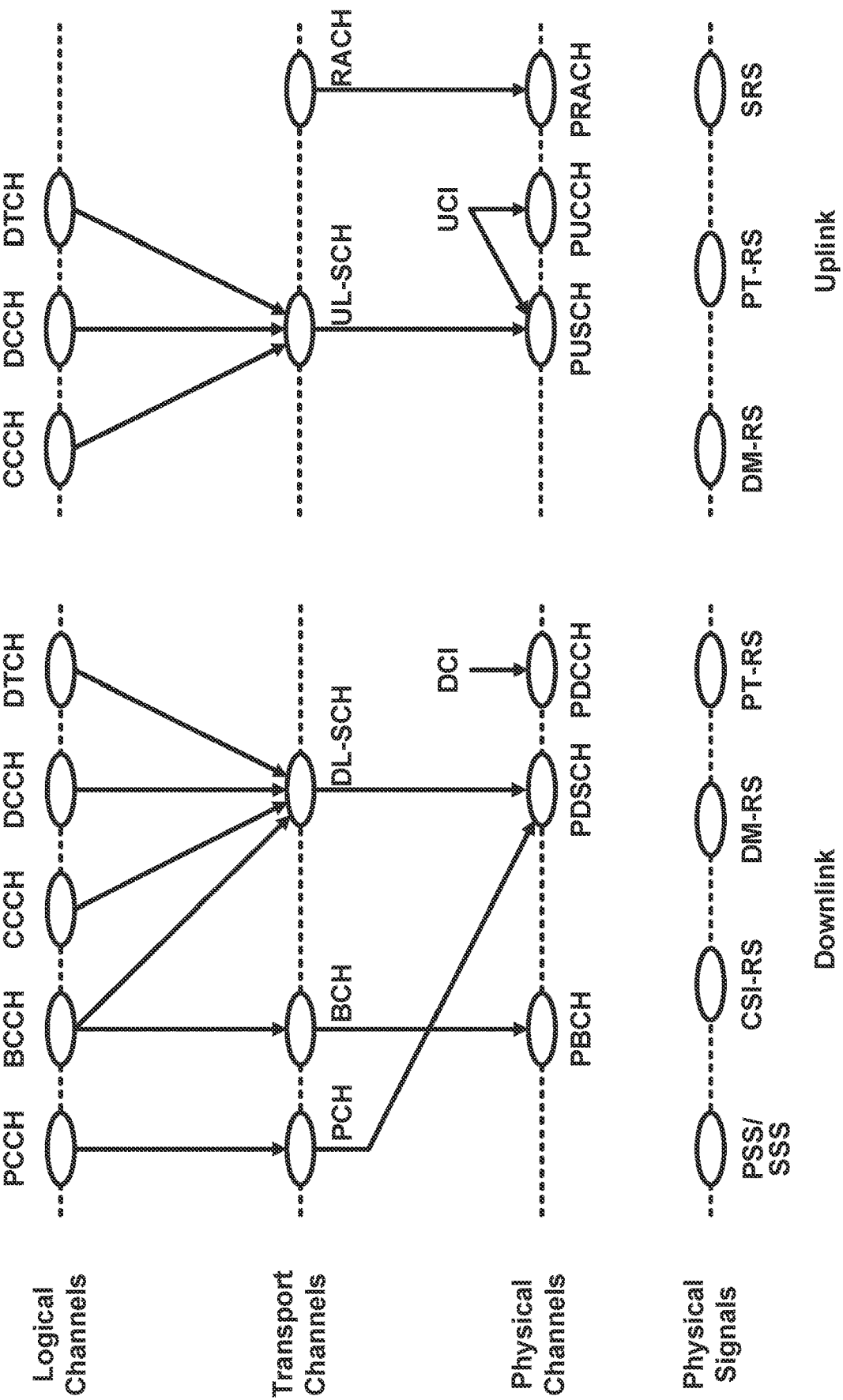

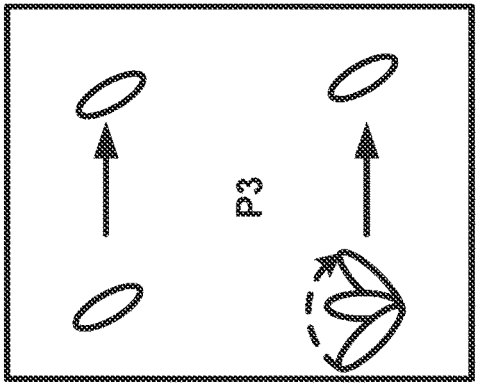
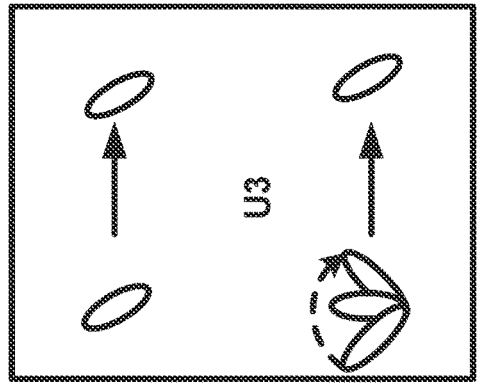
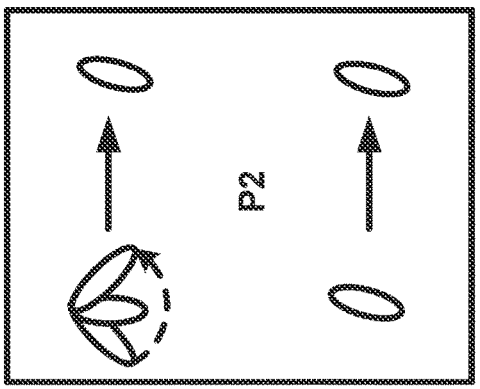
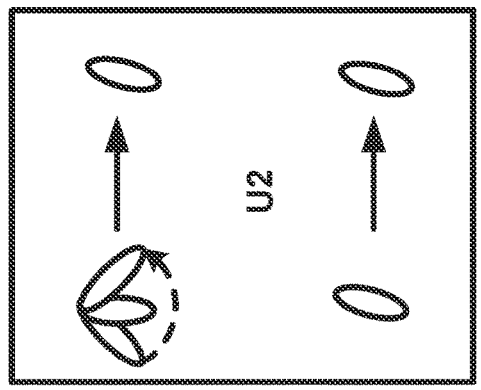
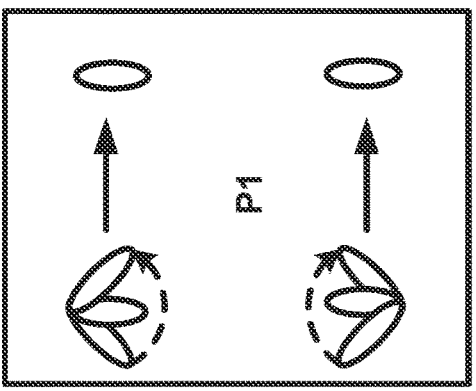
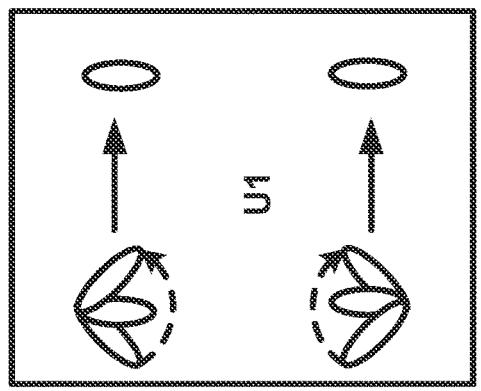
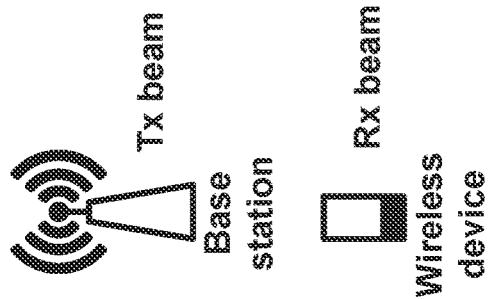
FIG. 12A
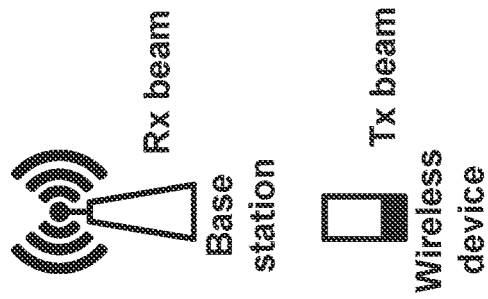
FIG. 12B

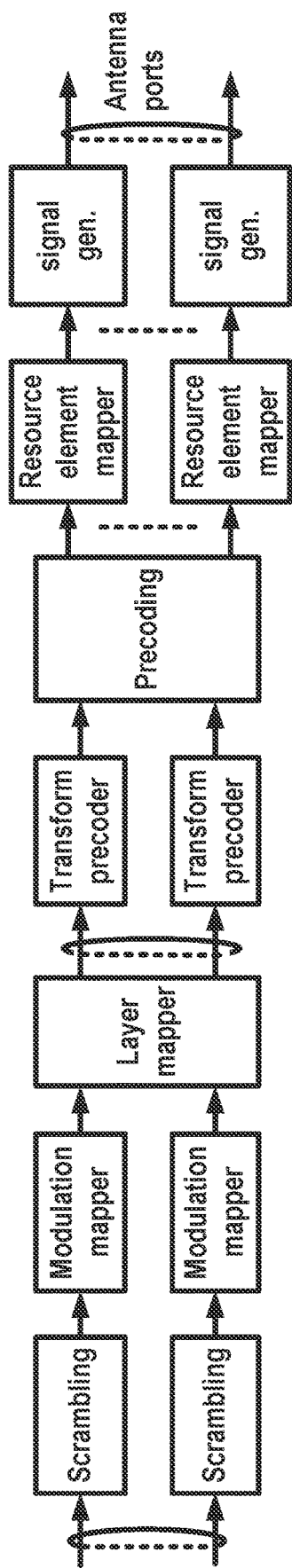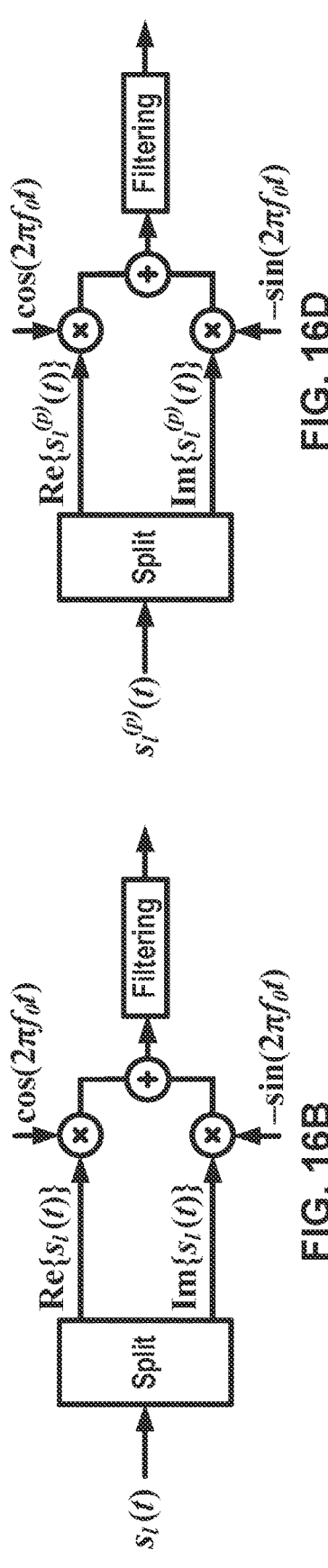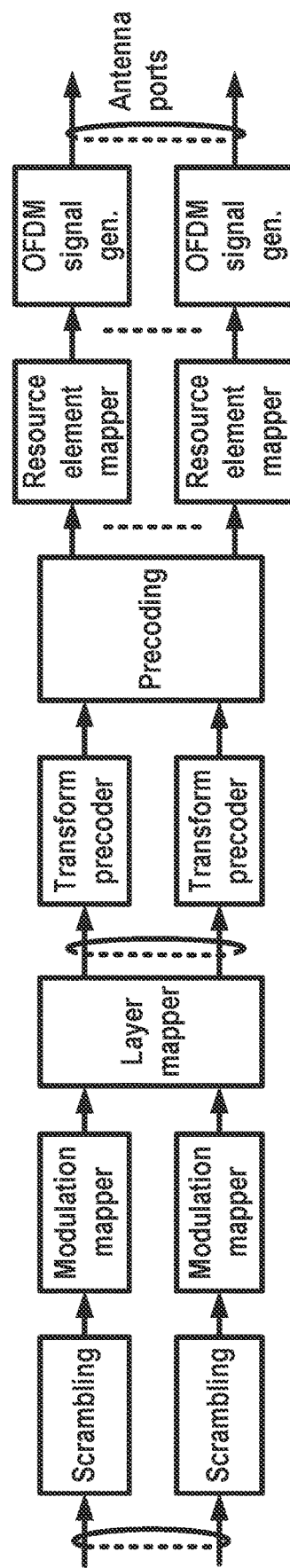
FIG. 16A
FIG. 16B
FIG. 16C
FIG. 16D

```
ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType CHOICE {
        interleaved             SEQUENCE {
            reg-BundleSize          ENUMERATED {n2, n3, n6},
            interleaverSize         ENUMERATED {n2, n3, n6},
            shiftIndex              INTEGER(0..maxNrofPhysicalResourceBlocks-1)
                                                                            },
        nonInterleaved          NULL
    },
    precoderGranularity             ENUMERATED {sameAsREG-
bundle,allContiguousRBs},
    tci-StatesPDCCH-ToAddList       SEQUENCE(SIZE (1..maxNrofTCI-StatesPDCCH))
OF TCI-StateId
    tci-StatesPDCCH-ToReleaseList   SEQUENCE(SIZE (1..maxNrofTCI-StatesPDCCH))
OF TCI-StateId
    tci-PresentInDCI                ENUMERATED {enabled}
    pdcch-DMRS-ScramblingID         INTEGER (0..65535)

...,
[[
    rb-Offset-r16                   INTEGER (0..5)
    tci-PresentInDCI-Format1-2-r16  INTEGER (1..3)
    coresetPoolIndex-r16            INTEGER (0..1)
    controlResourceSetId-v16xy      ControlResourceSetId-v16xy]]
```

FIG. 18

BEAM CONTROL FOR REPETITIONS

CROSS-REFERENCE TO RELATED APPLICATIONS

This application claims the benefit of U.S. Provisional Application No. 63/135,318, filed on Jan. 8, 2021, and U.S. Provisional Application No. 63/135,329, filed on Jan. 8, 2021. Each of the above-referenced applications is hereby incorporated by reference in its entirety.

BACKGROUND

In wireless communications, repetitions of a message are used to increase reliability. These repetitions are often sent via a plurality of wireless resources.

SUMMARY

The following summary presents a simplified summary of certain features. The summary is not an extensive overview and is not intended to identify key or critical elements.

Wireless communication between devices may be based on control signaling. For example, one or more wireless resource(s) (e.g., a transmission and/or reception beam(s)) for a signal may be indicated in a message (e.g., a control message) and/or may be based on a resource pool via which the message is sent. The message may be repeated which may provide advantages such as improved reliability. Repetitions of the control message may be sent via different resource pools. The wireless resource for transmitting and/or receiving the signal may be determined based on a configured default resource pool, a resource pool used for a last repetition of the control message, and/or a resource pool indicated in the control message, which may reduce the possibility of beam misalignment between a transmitting device and a receiving device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A shows an example downlink data flow for a user plane configuration.

FIG. 4B shows an example format of a Medium Access Control (MAC) subheader in a MAC Protocol Data Unit (PDU).

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 18 shows example configuration parameters for a CORESET.

DETAILED DESCRIPTION

Figure 1A:
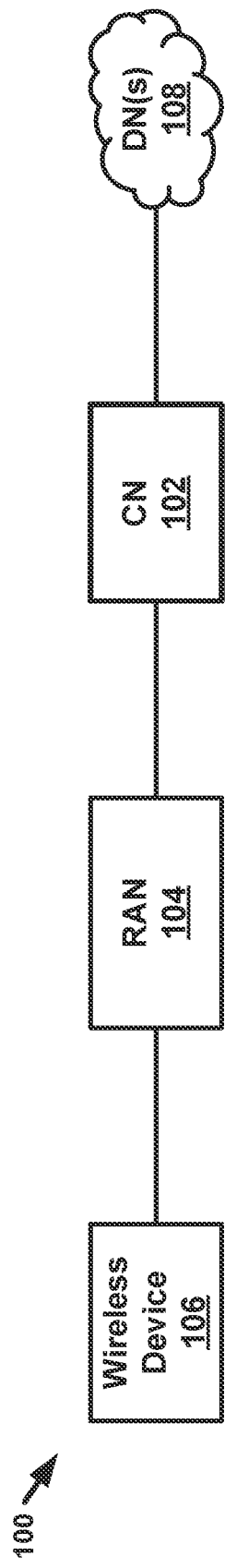
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to transmission and/or reception configuration and signaling for wireless communication.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN)

104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
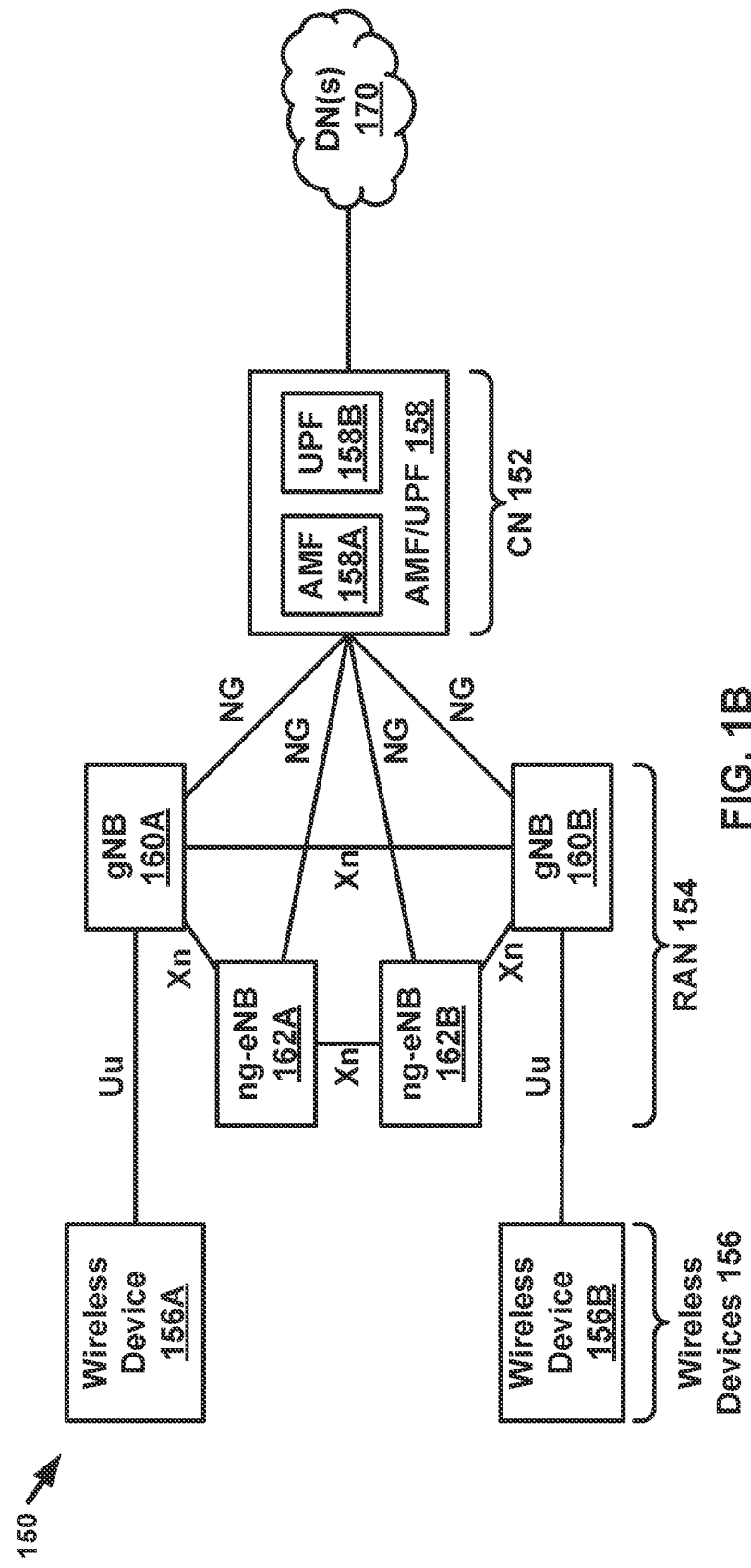

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/ perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/ device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/ or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
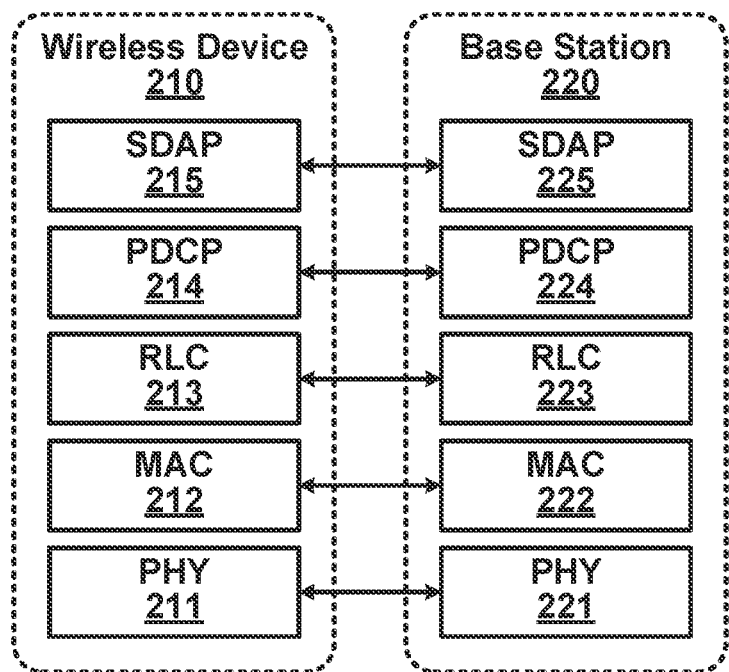
FIG. 2A shows an example user plane.
Figure 2B:
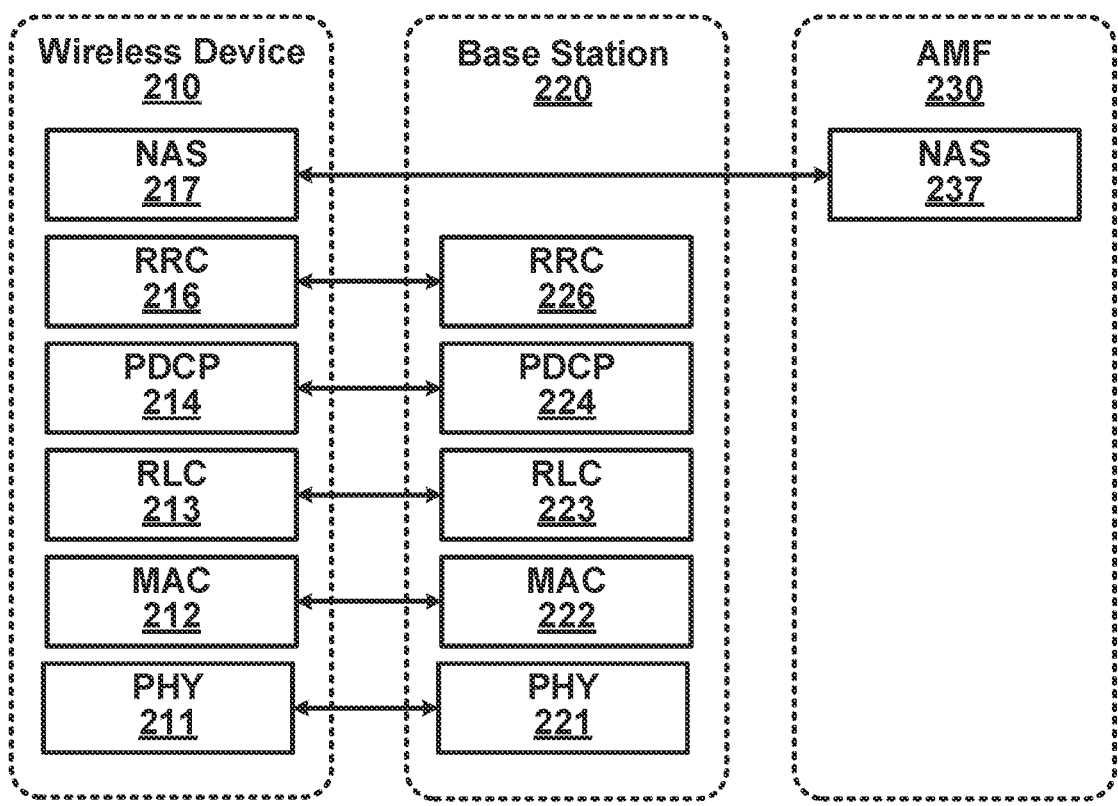
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
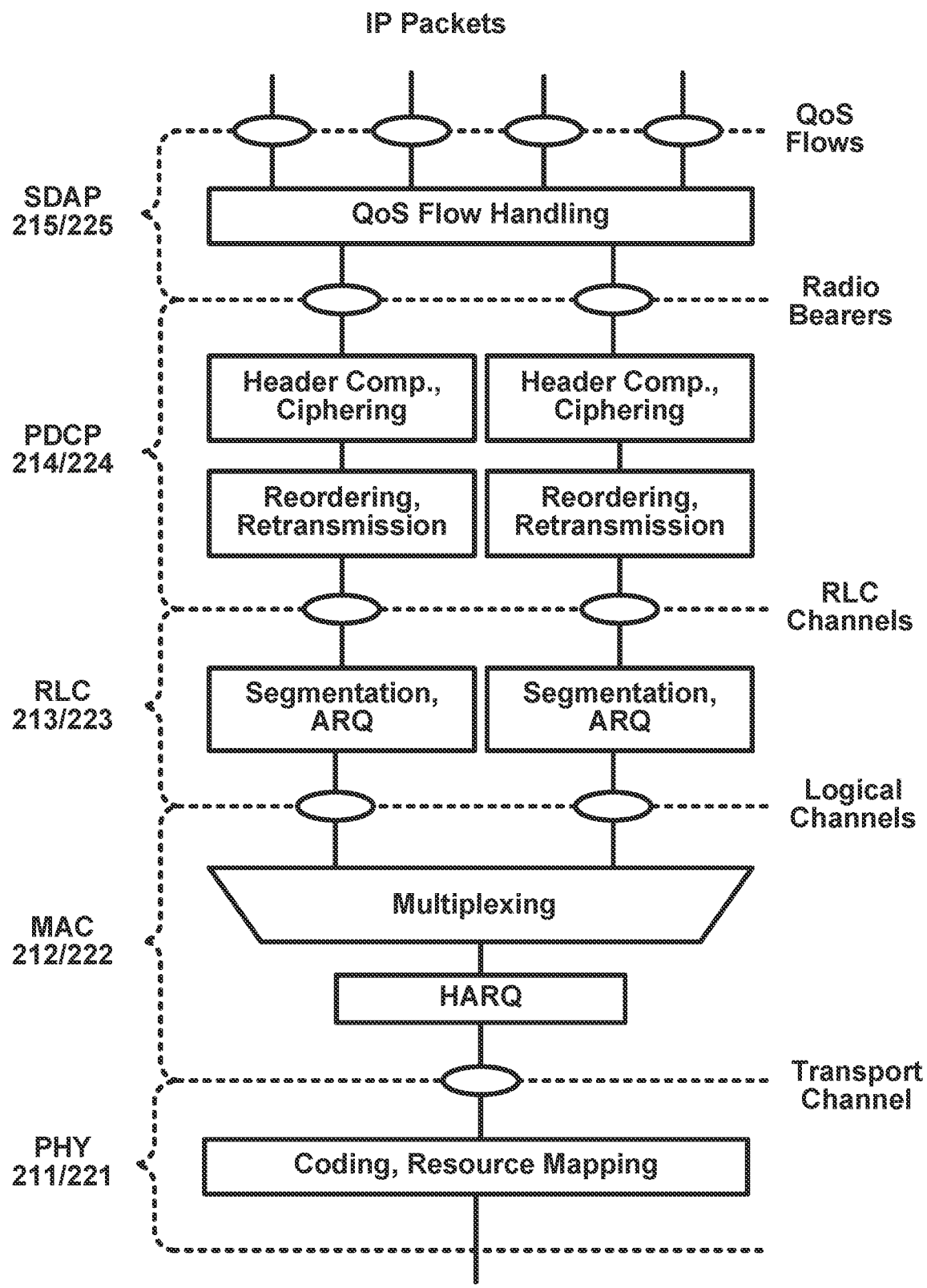
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
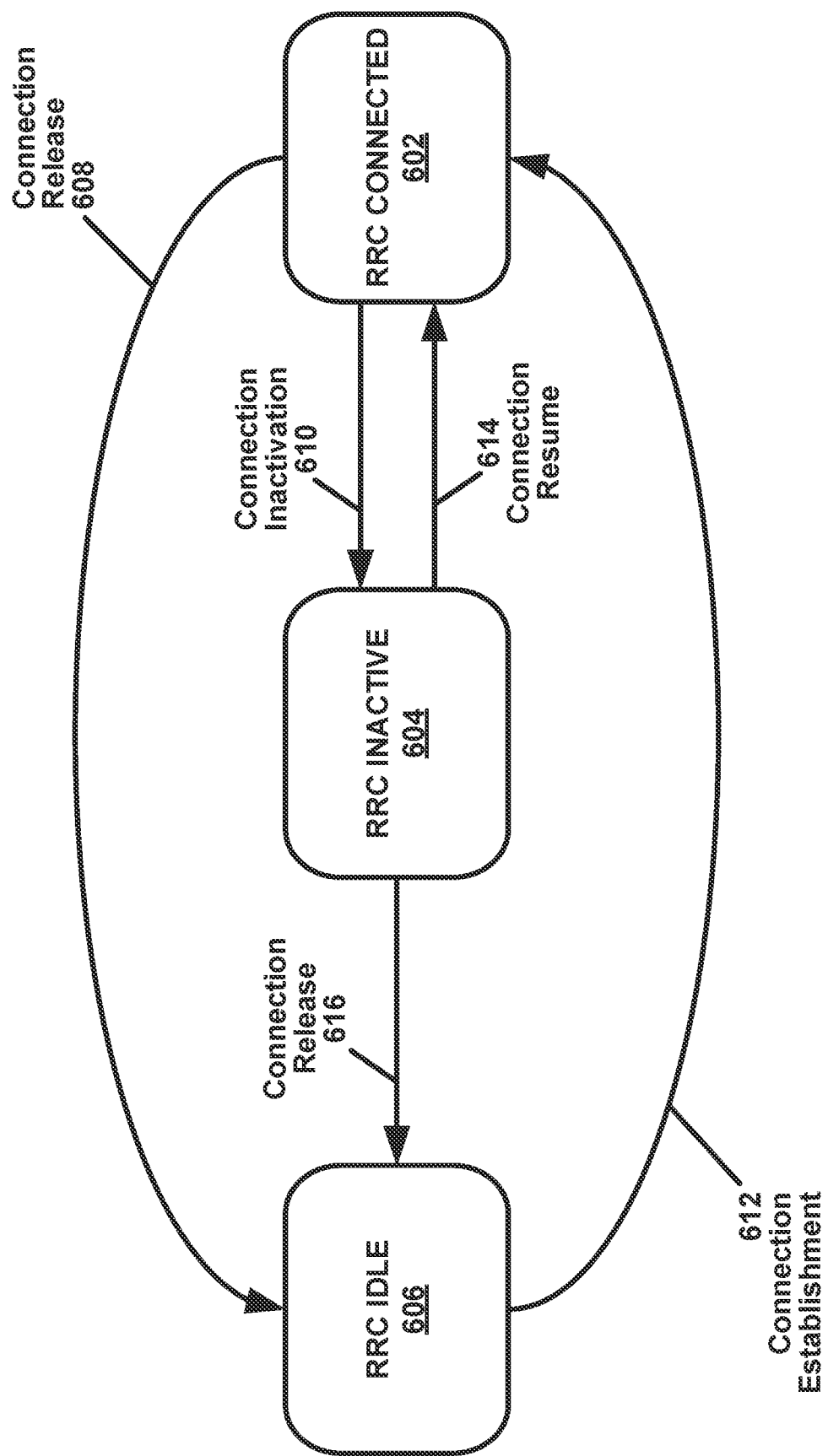
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
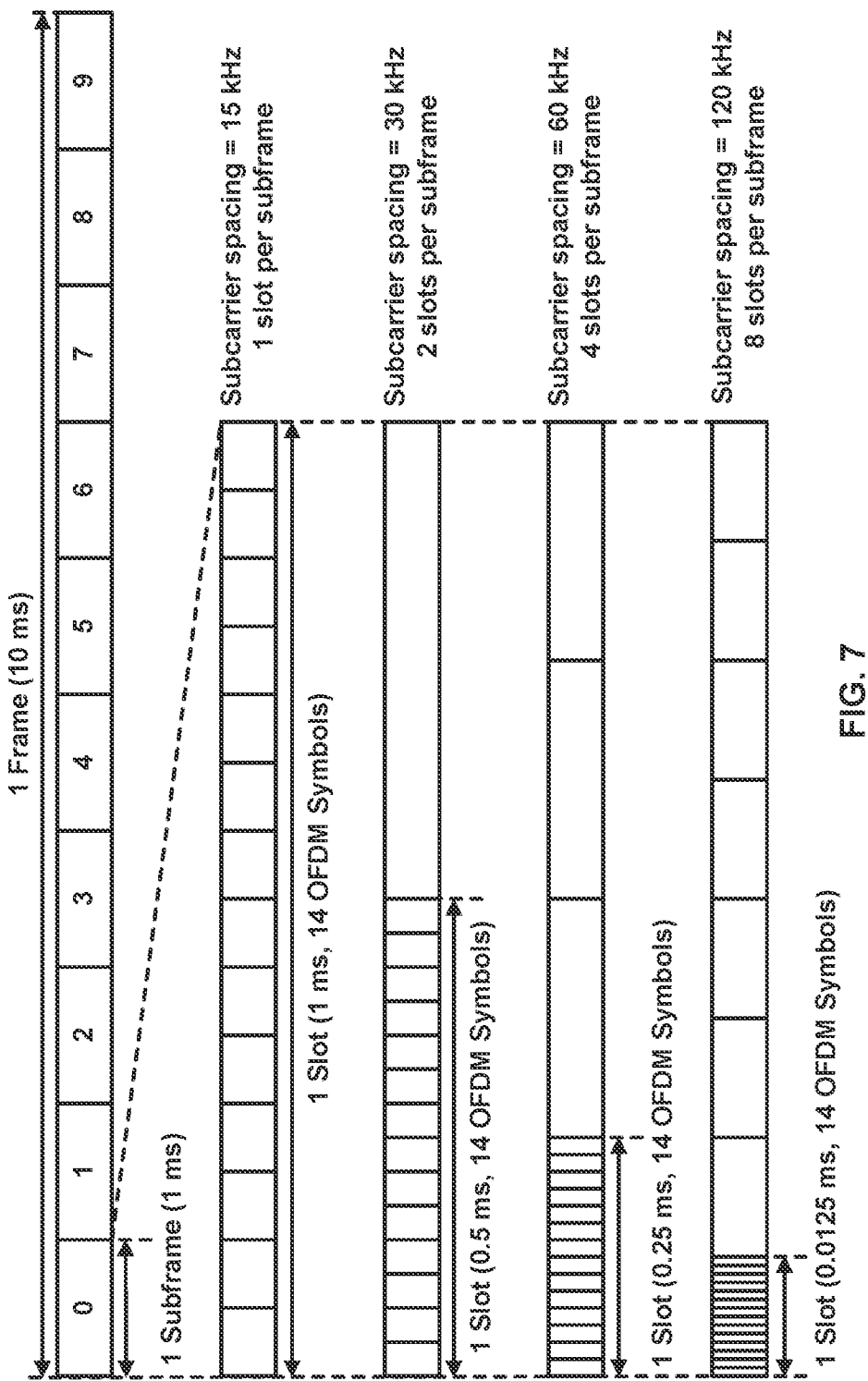
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
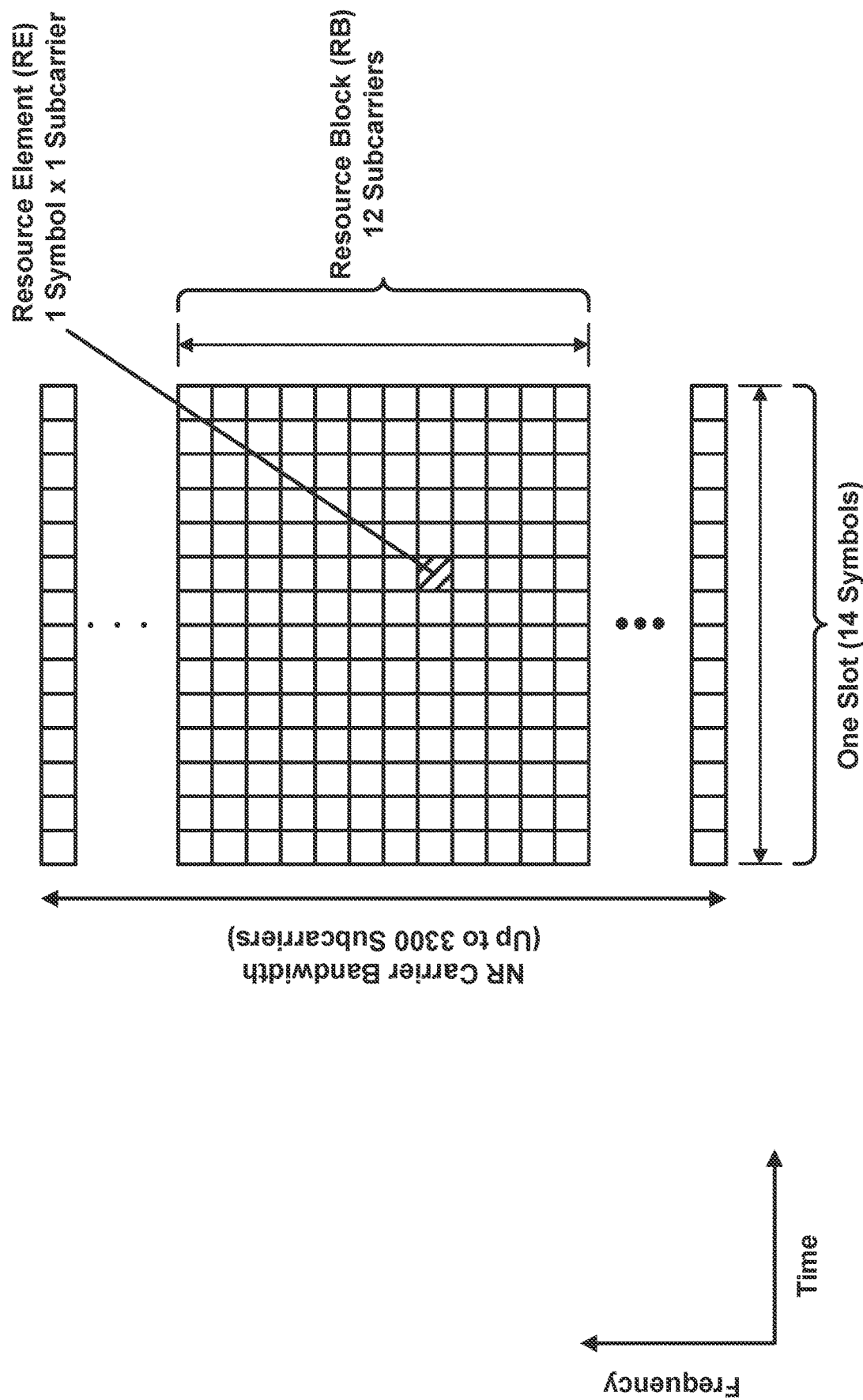
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
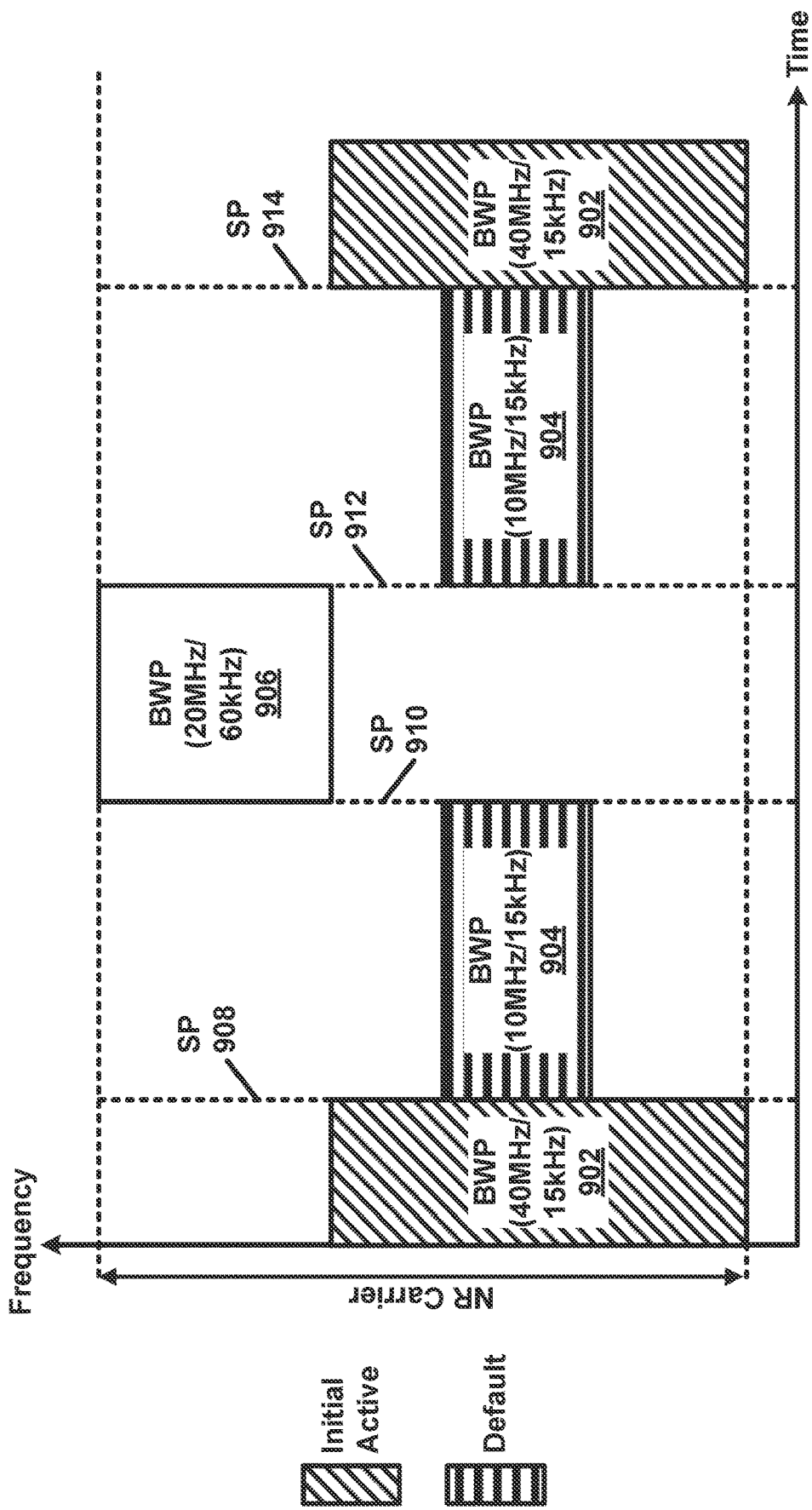
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
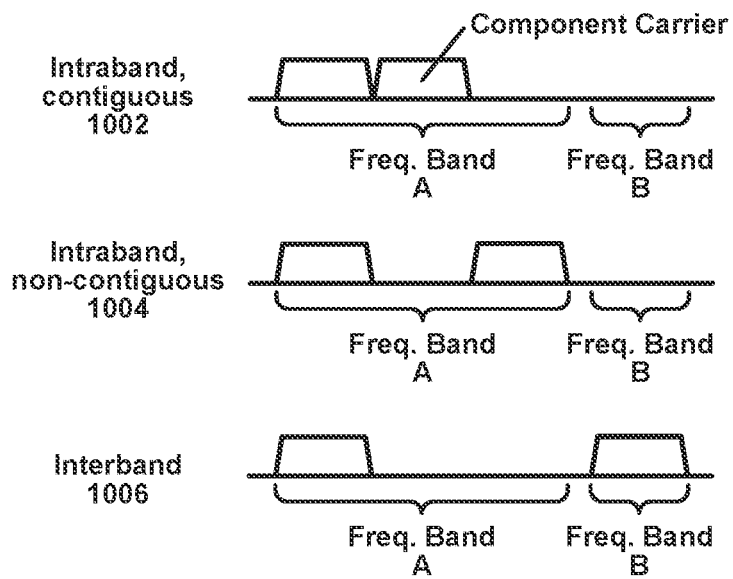
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
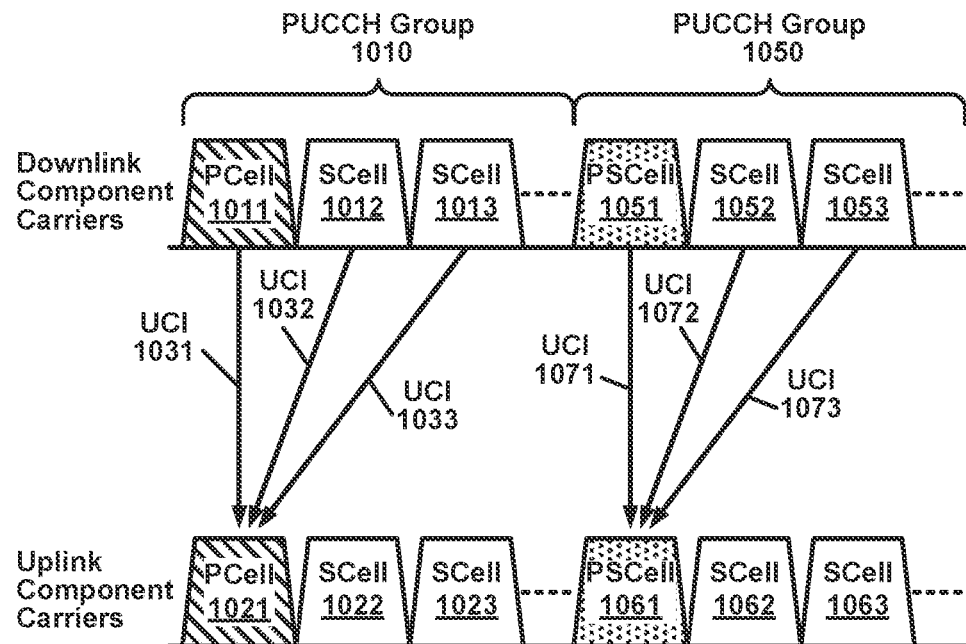
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
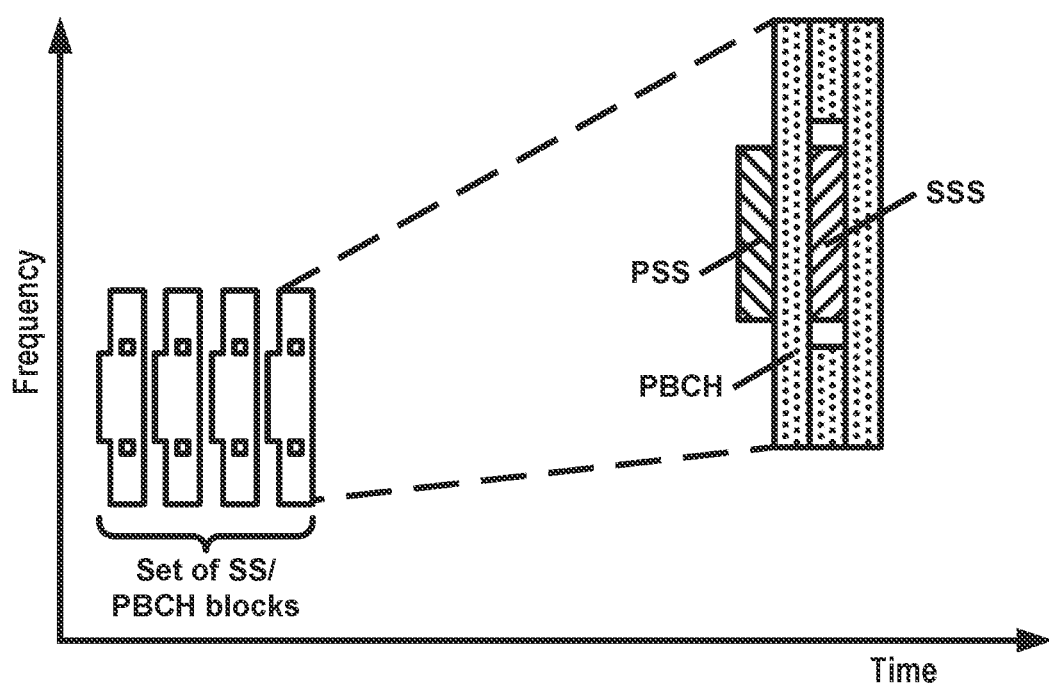
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
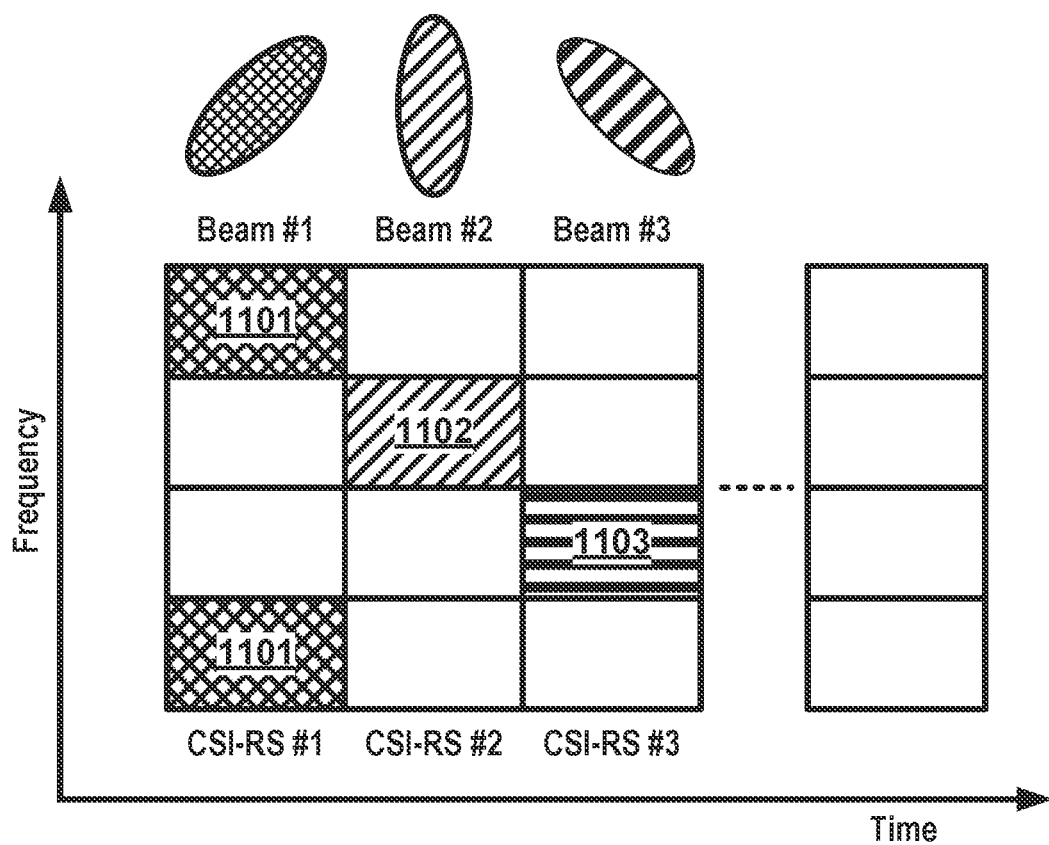
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
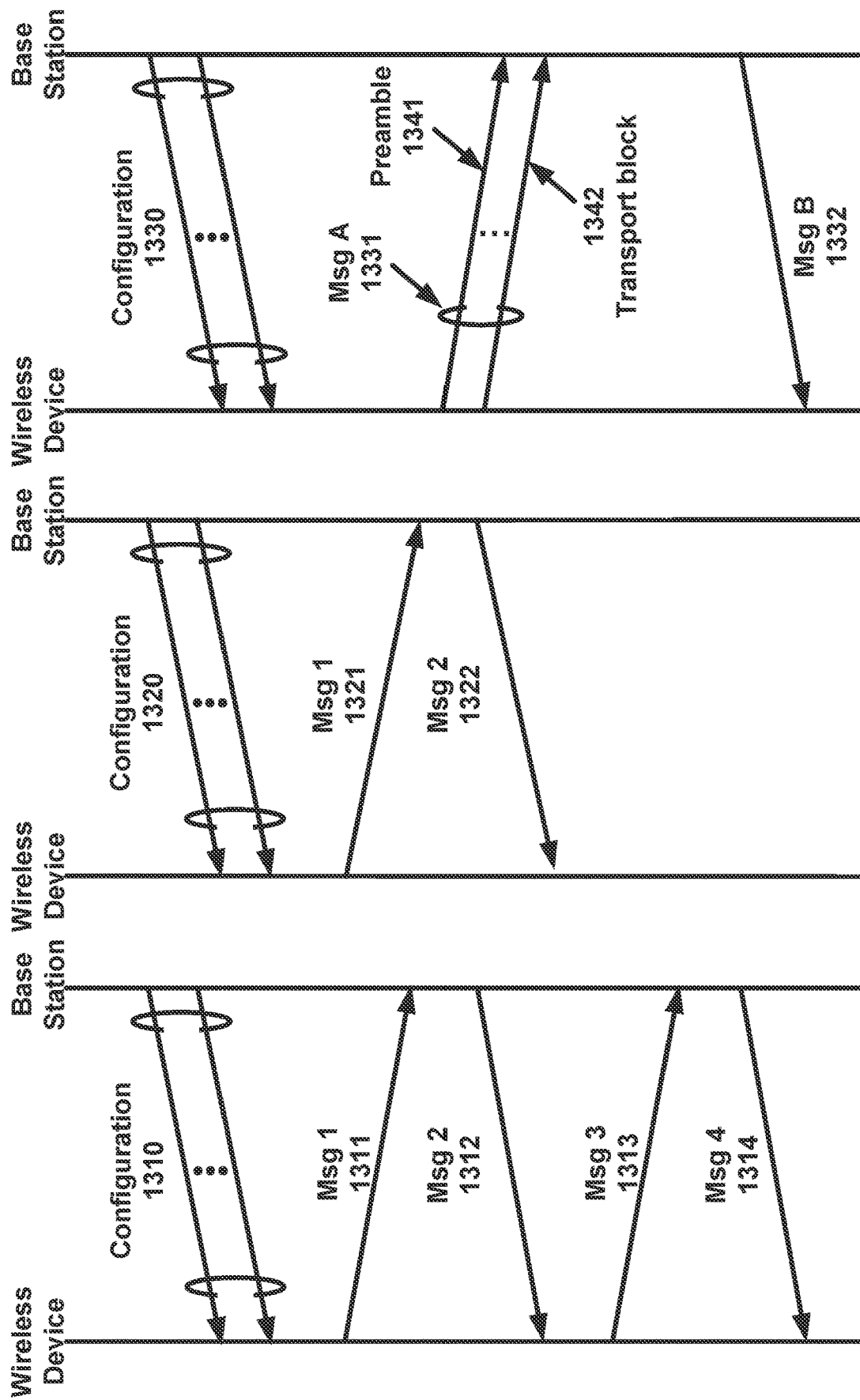
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type 1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCI messages may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCI messages with one or more DCI formats, for example, depending on the purpose and/or content of the DCI messages. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
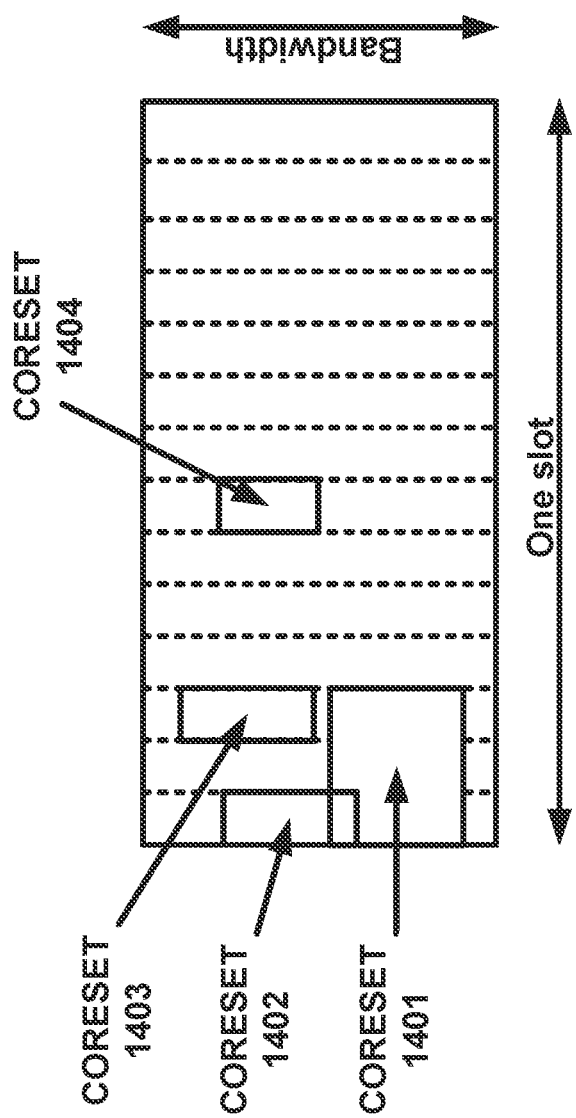
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
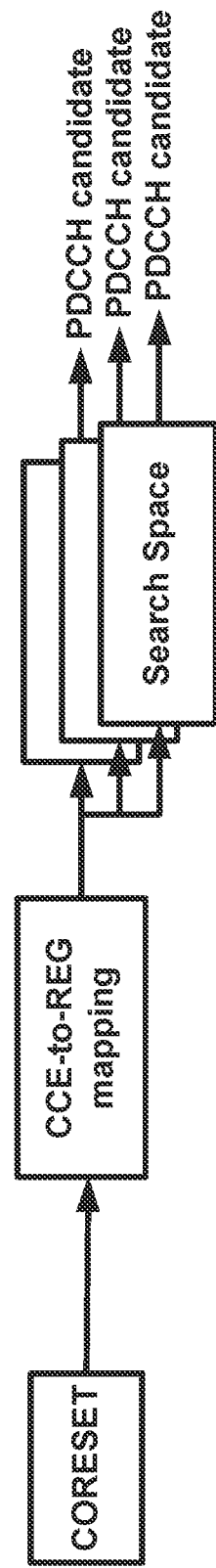
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCI messages. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
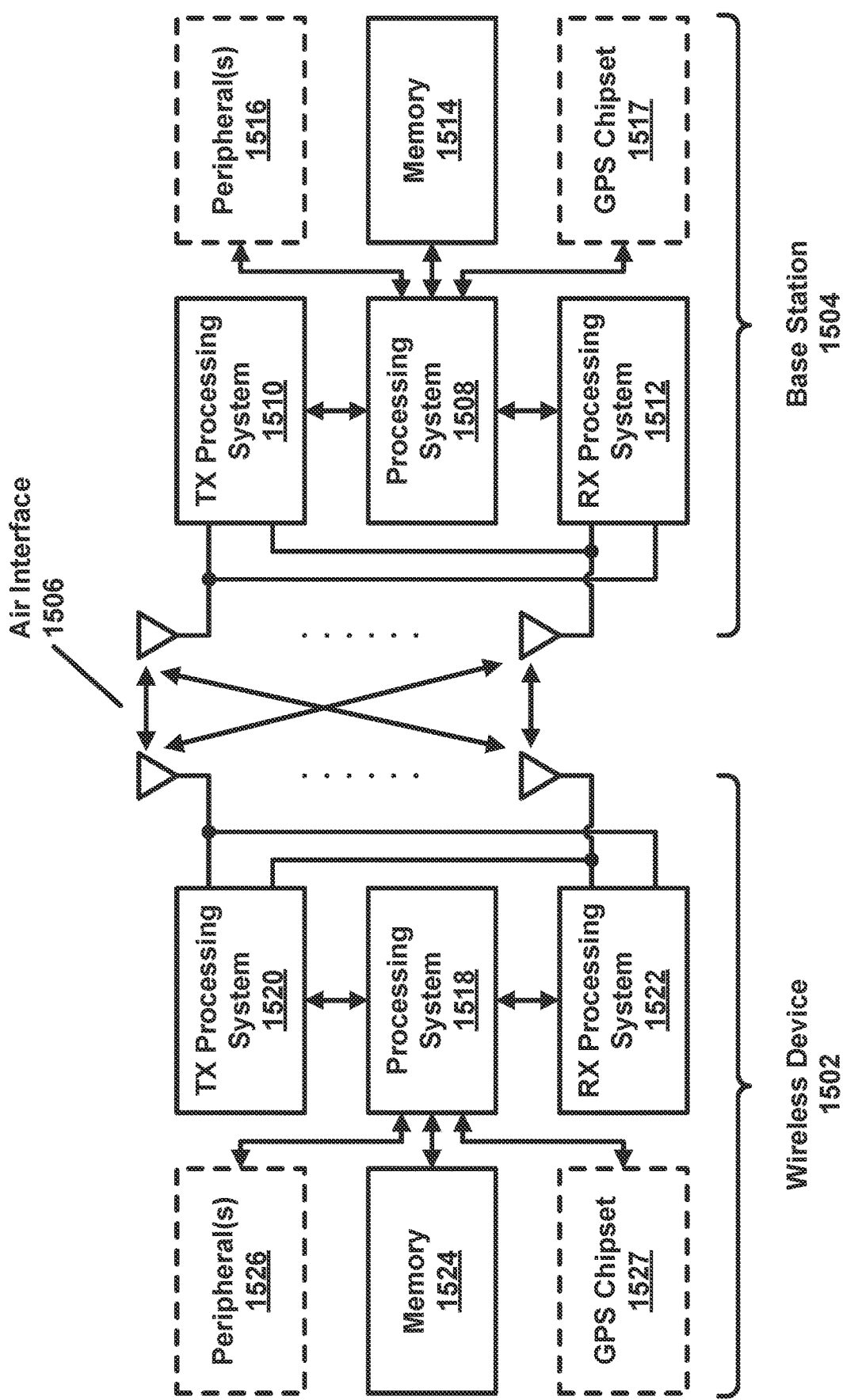
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
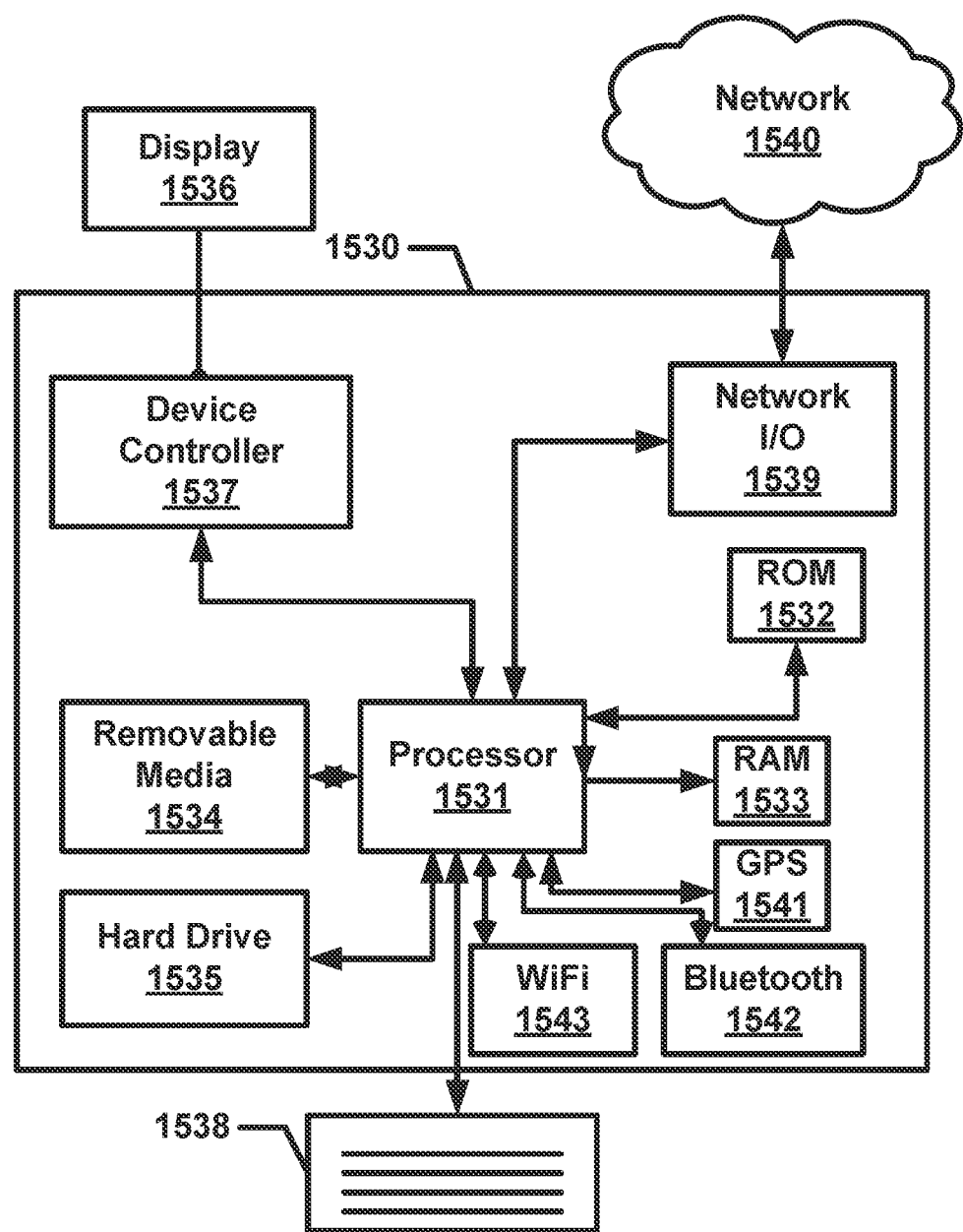
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may receive (e.g., from a base station) one or more messages. The one or more messages may comprise/indicate one or more configuration parameters. The one or more configuration parameters may indicate one or more resources (e.g., CORESETs) for a cell. The one or more configuration parameters may indicate one or more CORESET indicators/indexes for the one or more CORESETs. Each CORESET of the one or more CORESETs may be indicated/identified by a respective CORESET index of the one or more CORESET indexes. Each CORESET of the one or more CORESETs may correspond to a same CORESET pool. The wireless device may receive, via a first CORESET of the one or more CORESETs, DCI. The DCI may schedule a downlink signal (e.g., a transport block, a PDSCH transmission). The one or more configuration parameters may indicate a CORESET pool indicator/index (e.g., 0, 1) for the first CORESET. A time offset between the DCI and the downlink signal may be less than a threshold. The wireless device may receive the downlink signal based on a TCI state (e.g., a receiving beam) of a second CORESET in the CORESET pool, for example, if the time offset is less than the threshold. A CORESET index of the second CORESET may be a lowest CORESET index among the one or more CORESET indexes of the one or more CORESETs in the CORESET pool. The one or more configuration parameters may indicate, for the second CORESET, a lowest CORESET index among the one or more CORESET indexes of the one or more CORESETs. The one or more configuration parameters may indicate, for the second CORESET, the same CORESET pool index as the first CORESET. The first CORESET and the second CORESET may or may not be the same.

Control information, sent to a wireless device, may be repeated (e.g., for improved transmission reliability) across multiple resources. For example, control information may be repeated and sent via multiple TRPs (e.g., using PDCCH multi-TRP repetition for DCI). The control information repetition may be in time-domain, frequency-domain, and/or spatial/code domain. The wireless device, to receive the repeated control information, may monitor two (or more) linked resources (e.g., CORESETs) in a plurality of monitoring/repetition/transmission occasions. For example, the wireless device may monitor a first repetition of control information (e.g., DCI sent by a first TRP via a first CORESET) in a first monitoring occasion, and may monitors a second repetition of the control information (e.g., the repeated DCI sent by the second TRP via a second CORESET) in a second monitoring occasion.

While the above examples relate to repetition for transmission and/or reception of downlink control information (e.g., DCI via PDCCH), similar techniques may be applied for repetitions of any other type of information (e.g., data, transport blocks, etc.). For example, data may be repeated, for example, in one or more PDSCH repetitions and/or in one or more PUSCH repetitions (e.g., which may be scheduled by one or more messages via PDCCH, such as DCI). Control information may be repeated, for example, in one or more PUCCH repetitions.

The wireless device may be served by (e.g., communicate with, or transmit signals to/receive signals from) a plurality of TRPs. The plurality of TRPs may comprise the first TRP and the second TRP. The one or more configuration parameters may indicate a linkage (e.g., an association or a mapping) between a first CORESET of the one or more CORESETs and a second CORESET of the one or more CORESETs. The wireless device may monitor the first CORESET and the second CORESET for repetition of DCI. The first TRP may transmit the DCI via the first CORESET and the second TRP may transmit the (same) DCI via the second CORESET. Repeated transmission of the DCI may increase the reliability of transmission of the DCI. For example, the wireless device may receive the DCI transmitted from the second TRP, for example, even if transmission from the first TRP are blocked (e.g., by trees, buildings, other structures, etc.).

The first CORESET may correspond to a first CORESET pool. The second CORESET may correspond to a second CORESET pool. The one or more configuration parameters may indicate a first CORESET pool indicator/index for the first CORESET. The one or more configuration parameters may indicate a second CORESET pool indicator/index for the second CORESET. The first CORESET pool index and the second CORESET pool index may be different or may be same. The first CORESET pool index may correspond to a first CORESET pool comprising a first plurality of CORESETs (e.g., including the first CORESET). The second CORESET pool index may correspond to a second CORESET pool comprising a second plurality of CORESETs (e.g., including the second CORESET).

Repetition of control information (e.g., DCI) via multiple CORESETs, corresponding to different CORESETs pools, may lead to many issues. The wireless device may receive, via the first CORESET with a first CORESET pool index, a first repetition of DCI scheduling a downlink signal. The wireless device may receive, via the second CORESET with a second CORESET pool index, a second repetition of the DCI scheduling the downlink signal. A time offset between the DCI and the downlink signal may be less than a threshold. The wireless device may be unable to determine which CORESET to use, for receiving the downlink signal, among the first plurality of CORESETs (e.g., corresponding to the first CORESET pool) and the second plurality of CORESETs (e.g., corresponding to the second CORESET pool). The wireless device may be unable to determine, for receiving the downlink signal, whether to use a TCI state of a CORESET with a lowest CORESET index among the first plurality of CORESETs configured with the first CORESET pool index, or a TCI state of a CORESET with a lowest CORESET index among the second plurality of CORESETs configured with the second CORESET pool index.

The wireless device may receive, via at least one of the first CORESET and the second CORESET, DCI. The DCI may schedule at least one transport block (e.g., a PDSCH transmission). The wireless device may receive the DCI in/via the first CORESET and the second CORESET. A time offset between the DCI (e.g., a last repetition of the DCI) and the transport block may be less than a threshold. The wireless device may receive, based on the time offset being less than the threshold, a transport block (e.g., of the at least one transport block) based on a TCI state of a CORESET with a lowest CORESET index and with a CORESET pool index that is same as a CORESET via which the wireless device receives the DCI. The wireless device receiving the DCI via both the first CORESET with the first CORESET pool index and the second CORESET with the second CORESET pool index (e.g., that is different from the first CORESET pool index) may result in the wireless device receiving the transport block based on TCI states of CORESETs corresponding to both the first CORESET pool index and the second CORESET pool index. For example, the wireless device may receive the transport block based on a first TCI state of a CORESET with a lowest CORESET index and with the first CORESET pool index, and based on a second TCI state of a CORESET with a lowest CORESET index and with the second CORESET pool index. Receiving the transport block based on multiple TCI states may increase the complexity at the wireless device and/or power consumption.

The wireless device may be unable to receive all repetitions of DCI. For example, the wireless device may receive, via the first CORESET with the first CORESET pool index, a first repetition of DCI scheduling a downlink signal. The wireless device may or may not receive, via the second CORESET with the second CORESET pool index, a second repetition of the DCI. The base station may not be aware which of the repetition(s) of the DCI have been successfully received/detected by the wireless device The base station may be unable to determine which TCI state the wireless device may use for receiving the downlink signal. The base station being unable to determine which TCI state the wireless device may use for receiving the downlink signal may result in a misalignment (e.g., beam misalignment) between the wireless device and the base station for transmission/reception of the downlink signal. The misalignment may lead to increased error rates and/or retransmission of the downlink signal.

For example, the wireless device may receive the DCI in/via the first CORESET and may not receive the DCI in/via the second CORESET. A time offset between the DCI and the transport block may be less than a threshold. The wireless device may receive, based on the time offset being less than the threshold, the transport block based on a TCI state of a CORESET with a lowest CORESET index and with a CORESET pool index that is same as the first CORESET via which the wireless device receives the DCI. The base station may not be aware of the CORESET(s) via which the wireless device has successfully received the DCI.

The wireless device may receive/attempt to receive the transport block based on a TCI state of a CORESET with a lowest CORESET index and with the first CORESET pool index. The wireless device may attempt to receive the transport block based on a TCI state of a CORESET with a lowest CORESET index and with the first CORESET pool index, for example, based on receiving the DCI in/via the first CORESET with the first CORESET pool index. The base station may send/transmit the transport block based on an assumption that the wireless device will receive the transport block based on a TCI state of a CORESET with a lowest CORESET index and with the second CORESET pool index. Use of different TCI states at the wireless device and the base station may result in misaligned beams at the wireless device and the base station. For example, the wireless device may use a first beam direction (e.g., corresponding to the TCI state of the CORESET with a lowest CORESET index and with the first CORESET pool index) that is directed to the first TRP and the base station may send the transport block using a second beam direction (e.g., corresponding to the TCI state of the CORESET with a lowest CORESET index and with the second CORESET pool index) via the second TRP. Misaligned beams may result in unsuccessful reception/decoding of the transport block. Unsuccessful reception/decoding of the transport block may result in increased retransmission(s) of the transport block, increased latency of a successful communication, and/or increased power consumption at the base station and/or the wireless device.

Examples herein may enhance/improve beam alignment between a wireless device and a base station. Various examples herein enable improved beam alignment via enhanced TCI state determination. The enhanced TCI state determination may be used in scenarios where the wireless device monitors multiple (e.g., two or more) CORESETs (e.g., corresponding to different CORESET pools, and/or with different CORESET pool indicators/indexes) for control information (e.g., DCI, PDCCH transmission) repetition. The enhanced TCI state determination may be used if a time offset between the control information and downlink signal (e.g., transport block, PDCCH transmission), as scheduled by the control information, is less than a threshold. The wireless device may receive the transport block based on a TCI state of a CORESET in a default CORESET pool (e.g., corresponding to a default CORESET pool index). The CORESET may have a lowest/highest CORESET indicator/index and a default CORESET pool indicator/index. The CORESET may have a lowest/highest CORESET index among CORESETs in a default CORESET pool (e.g., corresponding to the default CORESET pool indicator/index).

The default CORESET pool index may be a lowest CORESET pool index among a plurality of CORESET pool indexes (e.g., the first CORESET pool index and the second CORESET pool index). The plurality of CORESET pool indexes may correspond to a plurality of CORESET pools (e.g., the first CORESET pool comprising the first CORESET, and the second CORESET pool comprising the second CORESET) that the wireless device monitors for DCI.

The default CORESET pool index may be equal to a predetermined/preset/preconfigured value (e.g., 0, 1, or any other value). The one or more configuration parameters may indicate the default CORESET pool index.

The default CORESET pool index may correspond to a CORESET pool index of a default CORESET (e.g., among the first CORESET and the second CORESET that are monitored for repetition of the DCI). The default CORESET may have lowest/highest CORESET index among a first CORESET index of the first CORESET and a second CORESET index of the second CORESET. The default CORESET may correspond to a CORESET that the wireless device, monitors in a first (e.g., starting/earliest) or a last (e.g., ending/latest) repetition of the DCI. The second TRP may not send/transmit the transport block, for example, if the default CORESET pool index is equal to the first CORESET pool index.

The DCI may indicate the default CORESET pool index. The DCI may comprise a TCI field. The TCI field may indicate the default CORESET pool index. The wireless device may receive the transport block based on a TCI state of a CORESET with a lowest CORESET index and with the first CORESET pool index, for example, if the TCI field (or a value of the TCI field) indicates (or is equal to) the first CORESET pool index. The wireless device may receive the transport block based on a TCI state of a CORESET with a lowest CORESET index and with the second CORESET pool index, for example, if the TCI field (or a value of the TCI field) indicates (or is equal to) the second CORESET pool index.

Examples described herein may reduce misaligned beams at the wireless device and the base station. Reduced misaligned beams may result in improved data reception/decoding performance at a receiving device. The improved reception/decoding performance may result in reduced retransmission(s), reduced latency of a successful communication, and/or reduced power consumption at the base station and/or the wireless device.

A PDCCH transmission may comprise scheduling assignments and other control information in the form of DCI messages. The information carried by the PDCCH transmission may be referred to as DCI. A base station may transmit, to a wireless device, a plurality of PDCCH transmissions within a control region. The wireless device may monitor a plurality of PDCCHs for receiving PDCCH transmissions. A PDCCH may include an aggregate of one or more CCEs. Monitoring may comprise performing blind decoding for a plurality of candidate PDCCHs. The blind decoding may comprise performing CRC de-masking for each of the plurality of candidate PDCCHs using an RNTI. The blind decoding may be used for detection of a PDCCH transmission. The wireless device may determine that a PDCCH comprises control information, for example, if no CRC error is detected.

Figure 17:
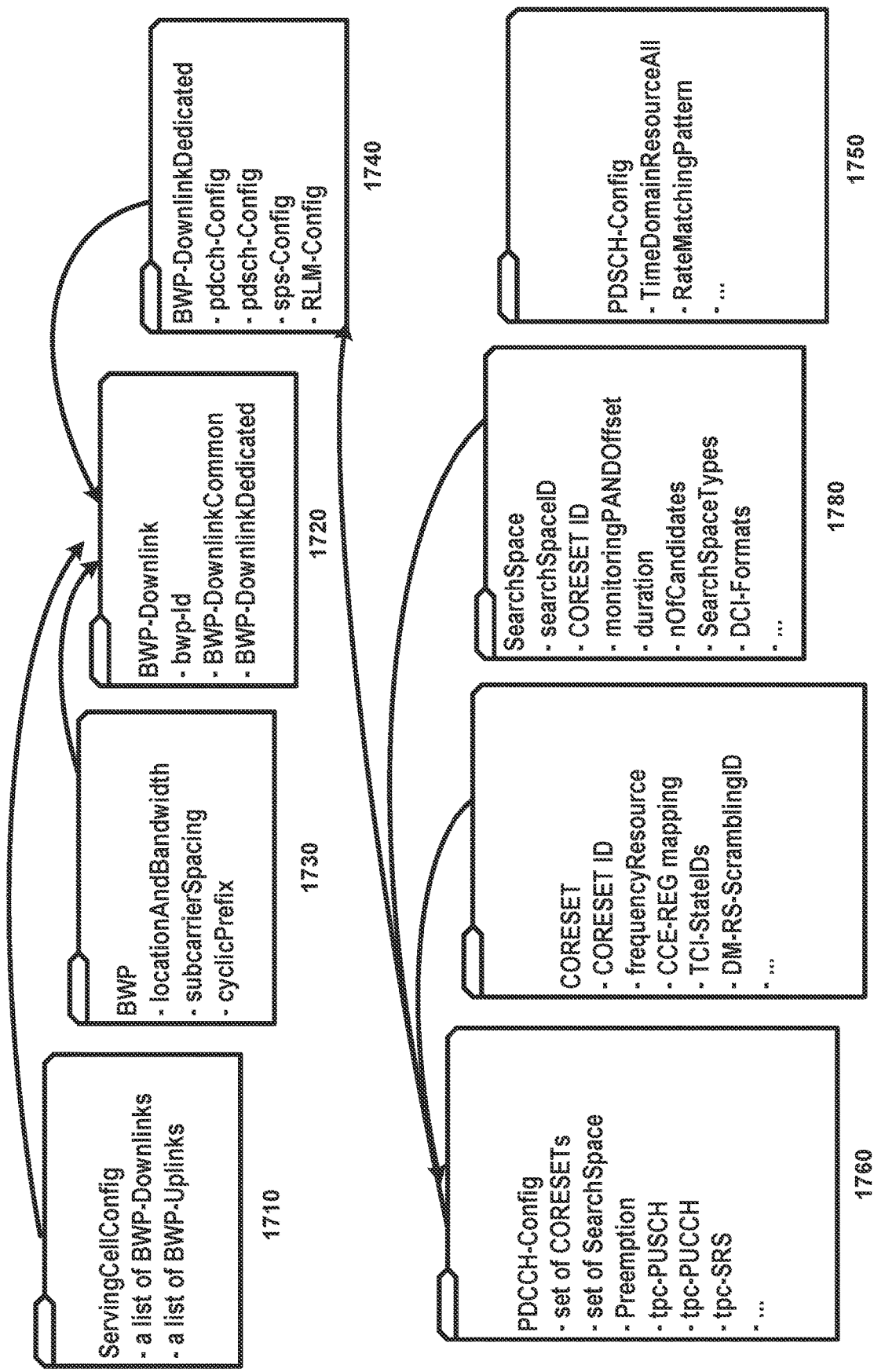
FIG. 17 shows example configuration parameters for wireless communications between a wireless device and a base station.

FIG. 17 shows example configuration parameters for a wireless device to receive control and/or data from a base station. A wireless device may receive one or more radio resource control (RRC) messages comprising configuration parameters of a cell. The configuration parameters may indicate/comprise one or more parameters of a serving cell configuration 1710 (e.g., ServingCellConfig). The one or more parameters of the serving cell configuration 1710 may comprise one or more downlink bandwidth parts (e.g., a list of BWP-Downlinks). The one or more parameters of the serving cell configuration 1710 may comprise one or more uplink bandwidth parts (e.g., a list of BWP-Uplinks). A downlink bandwidth part configuration 1720 (e.g., BWP-Downlink) and/or an uplink bandwidth part (e.g., BWP-Uplink) may comprise a bandwidth part index (e.g., bwp-Id), configuration parameters of a cell-common downlink bandwidth part (e.g., BWP-DownlinkCommon), and/or a wireless device-specific downlink bandwidth part (e.g., BWP-DownlinkDedicated). For example, the bandwidth part index (bwp-Id) may indicate a bandwidth part configuration, wherein an index of the bandwidth part is the bandwidth part index. The bandwidth part configuration 1730 may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration 1730 may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and/or 960 kHz. For example, the cyclic prefix may be one of a normal cyclic prefix and/or an extended cyclic prefix.

Configuration parameters of the cell-specific downlink bandwidth (e.g., BWP-DownlinkCommon) may comprise genericParameters, pdcch-ConfigCommon, and/or pdsch-ConfigCommon. For example, pdcch-ConfigCommon may comprise cell-specific parameters for receiving downlink control information (DCI) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the wireless device-specific downlink bandwidth part 1740 (e.g., BWP-DownlinkDedicated) may comprise pdcch-Config, pdsch-Config, sps-Config, and/or radioLink-MonitoringConfig (e.g., RLM-Config). The configuration parameters may indicate/comprise sps-ConfigList and/or beamFailureRecoverySCellConfig. For example, beamFailureRecoverySCellConfig may comprise reference signal parameters for beam failure recovery for secondary cells. For example, pdcch-Config may comprise parameters for receiving DCI messages for the wireless device-specific downlink bandwidth part. For example, pdsch-Config 1750 may comprise parameters for receiving PDSCHs of TBs for the wireless device-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config 1760 may comprise at least one of a set of CORESETs 1770, a set of search spaces 1780, a downlink preemption (e.g., downlinkPreemption), a transmission power control (TPC) for PUSCH (e.g. tpc-PUSCH), a TPC for PUCCH and/or a TPC for SRS. The configuration parameters may indicate/comprise a list of search space switching groups (e.g., searchSpaceSwitchingGroup), a search space switching timer (e.g., searchSpaceSwitchingTimer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) CORESETs for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS, respectively. The uplink cancellation may indicate to monitor uplink cancellation for the cell.

Configuration parameters of pdcch-ConfigCommon may comprise a control resource set zero (e.g., controlResource-SetZero), a common control resource set (e.g., commonControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first CORESET with an index value zero. The CORESET zero may be configured for an initial bandwidth part of the cell. The wireless device may use the control resource set zero in a BWP of the cell, wherein the BWP is not the initial BWP of the cell based on one or more conditions. For example, a numerology of the BWP may be the same as the numerology of the initial BWP. For example, the BWP may comprise the initial BWP. For example, the BWP may comprise the control resource set zero. The common control resource set may be an additional common CORESET that may be used for a common search space (CSS) or a UE-specific search space (USS). The base station may configure a bandwidth of the common control resource set is smaller than or equal to a bandwidth of the control resource set zero. The base station may configure the common control resource set such that it is contained within the control resource set zero (e.g., CORESET #0). The list of common search space may comprise one or more CSSs. The list of common search space might not comprise a search space with index zero (e.g., SS #0). The first PDCCH monitoring occasion may indicate a monitoring occasion for a paging occasion. The base station may configure a search space for monitoring DCI messages for paging (e.g., pagingSearchSpace), for RAR monitoring (e.g., ra-SearchSpace), for SIB1 (e.g., searchSpaceSIB1) and/or for other SIBs than SIB1 (e.g., searchSpaceOtherSystemInformation). The search space with index zero (e.g., searchSpaceZero, SS #0) may be configured for the initial BWP of the cell. Similar to the corset #0, the SS #0 may be used in the BWP of the cell based on the one or more conditions.

FIG. 18 shows example configuration parameters of a CORESET. A ControlResourceSet (CORESET) may comprise a CORESET index (e.g., ControlResourceSetId), frequency domain resources (e.g., frequencyDomainResources), a duration of the CORESET (e.g., a number/quantity of OFDM symbols between [1, maxCoReSetDuration], where, for example, maxCoReSetDuration=3) and a CCE to REG mapping type (e.g., between interleaved and nonInterleaved). The base station may also configure a bundle size of REG (e.g., reg-BundleSize) and an interleaver size (e.g., interleaverSize), for example, if the CCE-REG mapping type is configured as interleaved. The CORESET may also comprise a precoder granularity (e.g., between same as REG bundle (e.g., sameAsREG-bundle) and across all contiguous RBs (e.g., allContiguousRBs)). The wireless device may assume that a same precoder is used across REGs in a bundle, for example, if the precoder granularity is configured as 'same as REG bundle.' The wireless device may assume that a same precoder is used across RBs in contiguous RBs of the CORESET, for example, if the precoder granularity is configured as 'across all contiguous RBs.' The CORESET may comprise a list of TCI states, wherein the CORESET is not a CORESET #0. The CORESET may comprise a parameter of a TCI presence in DCI. The wireless device may expect that a DCI format comprises a TCI indication in DCI based on the DCI format (e.g., a DCI format 1_1 and/or a DCI format 0_1) scheduled via a search space associated with the CORESET, for example, if the DCI indicates/comprises the TCI field for the CORESET. The CORESET may optionally comprise one or more of a DMRS scrambling identity, a CORESET pool index, an enhanced CORESET index (e.g., ControlResourceSetId-v16xy), a TCI present in DCI for a DCI format 1_2, and an RB offset. The wireless device may ignore the CORESET index, for example, if the enhanced CORESET index is present in the CORESET configuration. The enhanced CORESET index may indicate a value between [0, . . . , 15] whereas the CORESET index may indicate a value between [0, . . . , 11].

A CORESET may be associated with a search space, and the wireless device may determine search space candidates and/or monitoring occasions of the search space based on configuration of the search space and the CORESET. A search space may be associated with a CORESET, and the wireless device may determine search space candidates and/or monitoring occasions of the search space based on configuration of the search space and the CORESET. Parameters of the search space may comprise an index of the CORESET, for example, if the search space is associated with the CORESET or the CORESET is associated with the search space.

A search space may comprise an index of the search space (e.g., searchSpaceId), an index for the associated CORESET (e.g., controlResourceSetId), a monitoring periodicity and offset (e.g., periodicity in terms of a number/quantity of slots and an offset in terms of a number/quantity of slots, between [1, 2560] slots for periodicity, an offset between [0, . . . , P−1] where the P is the periodicity). The search space may comprise a duration, wherein the wireless device may monitor the search space in consecutive slots starting from the monitoring occasion based on the duration. The base station might not configure the duration for a search space scheduling a DCI format 2_0. A maximum duration value may be the periodicity −1 (e.g., repeated in each slot within an interval/periodicity). The search space may comprise monitoring symbols within a slot (e.g., a bitmap of size of OFDM symbols in a slot (e.g., 12 for extended cyclic prefix (CP), 14 for normal CP)). The search space may comprise a set of a number/quantity of candidates of each aggregation level (e.g., a first candidate number/quantity for an aggregation level L=1, a second candidate number/quantity of an aggregation level L=2, and so on). The search space may comprise a search space type (e.g., between CSS and USS). Each CSS or USS may comprise one or more DCI formats monitored in the search space. For example, for CSS, one or more of a DCI format 0_0/1_0, a DCI format 2_0, a DCI format 2_1, a DCI format 2_2 and a DCI format 2_3 may be configured. For USS, the base station may configure a list of search space group index (if configured). For USS, the base station may configure a frequency monitoring occasion/location for a wideband operation of unlicensed spectrum or licensed spectrum. In the specification, DCI format 0_0/1_0 may be interchangeably used with DCI format 0-0/1-0 or fallback DCI format. DCI format 0_1/1_1 may be interchangeably used with DCI format 0-1/1-1 or non-fallback DCI format. DCI format 0_2/1_2 may be interchangeably used with DCI format 0-2/1-2 or non-fallback DCI format.

Configuration parameters of the pdsch-Config may comprise parameters for receiving transport blocks. For example, the configuration parameters may indicate/comprise a data scrambling identify for PDSCH, a DM-RS mapping type (e.g., between mapping type A and mapping type B), a list of transmission configuration indicator (TCI) states, a parameter of (virtual RB) VRB-to-(physical RB) PRB interleaver, a resource allocation type (e.g., resource allocation type 0, resource allocation type 1 or a dynamic switch between two), a list of time domain allocation, a aggregation factor, a list of rate matching patterns, an RBG (resource block group) size, an MCS table (e.g., between QAM 256 and a QAM64LowSE, between high MCSs or low MCSs), a maximum codeword (e.g., 1 or 2), parameter(s) related to a PRB bundling, maximum MIMO layer, a minimum scheduling offset related to a power saving technique, and/or one or more parameters related to a DCI format 1_2 (e.g., a compact DCI or small sized DCI format).

A base station may configure a CORESET with a plurality of TCI states. The base station may indicate a TCI of the plurality of TCI states for the CORESET as an active TCI state via a MAC CE command or a DCI command. A serving cell index (e.g., Serving Cell ID 1910) may indicate an index of a serving cell, where the MAC CE is used. A CORESET index (e.g., CORESET ID 1920) may indicate a CORESET index where the MAC CE is used. A TCI state index (e.g., TCI State ID 1940) may indicate a TCI state identified by TCI-StateId. The TCI state ID 1940 may indicate one TCI state of first 64 TCI states configured for pdsch-Config of a BWP of the serving cell, for example, if the CORESET is CORESET #0. The BWP of the serving cell may be an active BWP of the cell. The TCI state ID 1940 may indicate a TCI state of the plurality of TCI states configured for the CORESET in pdcch-Config, for example, if the CORESET is not the CORESET #0 (e.g., CORESET ID is not zero).

A physical downlink control channel (PDCCH) may comprise one or more CCEs. For example, the PDCCH may comprise one CCE that may correspond to an aggregation level (AL)=1. For example, the PDCCH may comprise two CCEs that may correspond to an AL of two (AL=2). For example, the PDCCH may comprise four CCEs that may correspond to an AL of four (AL=4). For example, the PDCCH may comprise eight CCEs that may correspond to an AL of eight (AL=8). For example, the PDCCH may comprise sixteen CCEs that may correspond to an AL of sixteen (AL=16).

A PDCCH may be carried over one or more control resource sets (CORESETs). A CORESET may comprise $N\_rb\_CORESET$ resource blocks (RBs) in the frequency domain and $N\_symbol\_CORESET$ symbols in the time domain. For example, the $N\_rb\_CORESET$ may be a multiple of 6 RBs (e.g., 6, 12, 18, etc.). For example, $N\_symbol\_CORESET$ may be 1, 2 or 3. A CCE may comprise M (e.g., M=6) resource-element groups (REGs). For example, one REG may comprise one RB during one OFDM symbol. REGs within the CORESET may be ordered/numbered in increasing order in a time-first manner, starting with 0 for a first OFDM symbol and a lowest number (e.g., a lowest frequency) RB in the CORESET. The wireless device may increase the numbering in the first OFDM symbol by increasing a frequency location or an RB index. The wireless device may move to a next symbol, for example, based on (e.g., after or in response to) all RBs of the first symbol having been indexed. The wireless device may map one or more REG indices for one or more 6 RBs of $N\_rb\_CORESET$ RBs within $N\_symbol\_CORESET$ OFDM symbols of the CORESET.

A wireless device may receive configuration parameters from a base station. The configuration parameters may indicate/comprise a plurality of CORESETs. One CORESET may be associated with one CCE-to-REG mapping. For example, a single CORESET may have a single CCE mapping to physical RB s/resources of the single CORESET. For example, a CCE-to-REG of a CORESET may be interleaved or non-interleaved. For example, a REG bundle may comprise L consecutive REGs (e.g., iL, iL+1, ..., iL+L−1). For example, L may be a REG bundle size (e.g., L=2 or 6 for $N\_symbol\_CORESET=1$ and L=$N\_symbol\_CORESET$ or 6, for example, if $N\_symbol\_CORESET$ is 2 or 3). An index of a REG bundle (e.g., i), may be in a range of [0, 1, ... $N\_reg\_CORESET/L−1$]. For example, $N\_reg\_CORESET$ may be defined as $N\_rb\_CORESET*N\_symbol\_CORESET$ (e.g., a total number/quantity of REGs in the single CORESET). For example, a j-th indexed CCE may comprise one or more REG bundles of $\{f(6j/L), f(6j/L+1), ..., f(6j/L+6/L−1)\}$. For example, f(x) may be an interleaver function. The function f(x) may be x (e.g., j-th CCE may comprise 6j/L, 6j/L+1, ..., and 6j/L+6/L−1), for example, if the CCE-to-REG mapping is non-interleaved. When the CCE-to-REG mapping may be interleaved, L may be defined as one of $\{2, 6\}$ when $N\_symbol\_CORESET$ is 1, or L may be defined as one of $\{N\_symbol\_CORESET, 6\}$ when $N\_symbol\_CORESET$ is 2 or 3. When the CCE-to-REG mapping may be interleaved, the function f(x) may be defined as (rC+c+n_shift) mod ($N\_reg\_CORESET/L$), wherein x=cR+r, r=0, 1, ..., R−1, c=0, 1, ..., C−1, C=$N\_reg\_CORESET/(L*R)$, and R is one of $\{2, 3, 6\}$.

For example, the configuration parameters may indicate/comprise a frequencyDomainResources that may define $N\_rb\_CORESET$. The configuration parameters may indicate/comprise duration that may define $N\_symbol\_CORESET$. The configuration parameters may indicate/comprise cce-REG-MappingType that may be selected between interleaved or non-interleaved mapping. The configuration parameters may indicate/comprise reg-BundleSize that may define a value for L for the interleaved mapping. For the non-interleaved mapping, L=6 may be predetermined. The configuration parameters may indicate/comprise shiftIndex that may determine n_shift as one of $\{0, 1, ..., 274\}$. The wireless device may determine/assume a same precoding for REGs within a REG bundle, for example, if precorder granularity (e.g., a precoderGranularity indicated/configured by the configuration parameters) is configured as sameAsREG-bundle. The wireless device may determine/assume a same precoding for all REGs within a set of contiguous RBs of a CORESET, for example, if the precoderGranularity is configured as allContiguousRBs. A first CORESET (e.g., CORESET #0) may be defined/configured with L=6, R=2, n_shift=cell ID, and precoderGranularity=sameAsREG-bundle.

A base station may send (e.g., transmit) one or more messages comprising configuration parameters. The configuration parameters may indicate/comprise a plurality of serving cells for a wireless device. The configuration parameters may indicate/comprise parameter(s) to enable control channel repetition. For example, the control channel repetition may be sent (e.g., transmitted) via one or more serving cells. The control channel repetition may schedule one or more resources for a transport block. The transport block may be sent (e.g., transmitted) via one or more PDSCHs or one or more PUSCHs. For example, the control channel repetition may be sent (e.g., transmitted) via a single cell, where the single cell may operate with a single transmission and reception point (TRP) or a plurality of TRPs. The base station may send (e.g., transmit) one or more control channels for control channel repetition via one or more resources in different frequency resources (e.g., repetition in a frequency domain or in a plurality of carriers/cells). The one or more resources may overlap in time domain. The base station may send (e.g., transmit) one or more second control channels for control channel repetition via one or more second resources in different time resources (e.g., repetition in a time domain or in a plurality of slots). The one or more second resources may overlap in frequency domain. For example, the base station may send (e.g., transmit) the repetitions of the control channel repetition via a plurality of CORESETs of the single cell. For example, the base station may send (e.g., transmit) the control channel repetition via a plurality of search spaces of the single cell.

The control channel repetition may be sent (e.g., transmitted) via a plurality of PDCCHs. For example, a PDCCH may indicate a physical control channel sent (e.g., transmitted) in one search space candidate. A search space candidate may comprise one or more CCEs based on an aggregation level. The plurality of PDCCHs may be sent (e.g., transmitted) via a plurality of CORESETs of a plurality of cells. For example, a CORESET of a cell of the plurality of cells may send (e.g., transmit) a PDCCH of the plurality of the PDCCHs. The plurality of PDCCHs may be sent (e.g., transmitted) via a plurality of CORESETs of a cell. For example, a CORESET of the plurality of CORESETs may send (e.g., transmit) a PDCCH of the plurality of the PDCCHs. The plurality of PDCCHs may be sent (e.g., transmitted) via a plurality of search spaces, where a PDCCH of the plurality of PDCCHs may be sent (e.g., transmitted) via a search space of the plurality of search spaces. The plurality of PDCCHs may be sent (e.g., transmitted) via a plurality of search space candidates where each PDCCH of the plurality of PDCCHs may be sent (e.g., transmitted) via a search space candidate of the plurality of search space candidates. The plurality of search space candidates may belong to a single search space or a plurality of search spaces. A search space may comprise a set of search space candidates associated with monitoring occasions. Monitoring occasions of the search space may refer to timing occasions during which the wireless device may monitor a search space candidate for receiving DCI message/PDCCH transmission.

A PDCCH of the plurality of PDCCHs for the control channel repetition may send (e.g., convey/transmit) DCI based on a DCI format. For example, first DCI of a first PDCCH of the plurality of PDCCHs may be the same as second DCI of a second PDCCH of the plurality of PDCCHs. For example, content of the first DCI message/PDCCH transmission may be the same as content of the second DCI message/PDCCH transmission. Based on the same content of the plurality of PDCCHs, the wireless device may aggregate the plurality of DCI messages/PDCCH transmissions, for example, before decoding DCI message/PDCCH transmission. For example, the wireless device may need to determine a reference frequency domain resource, a reference time domain resource, a reference CCE index, and/or a reference REG index, for example, if the control channel repetition is sent (e.g., transmitted) via equal content DCI messages/PDCCH transmissions. For example, the wireless device may determine an aggregated DCI message/PDCCH transmission by aggregating the plurality of DCI messages/PDCCH transmissions. The wireless device may decode the aggregated DCI message/PDCCH transmission. For example, the reference frequency domain resource of the plurality of DCI messages/PDCCH transmissions may be determined based on an earliest PDCCH (or a latest PDCCH) among the plurality of PDCCHs. The first PDCCH may determine the reference frequency domain resource, for example, if a first PDCCH of the plurality of PDCCHs is sent (e.g., transmitted) in a slot n and a second PDCCH of the plurality of PDCCHs is sent (e.g., transmitted) in a slot n+1. Similarly, the reference time domain resource and/or the reference CCE index and/or the reference REG may be determined based on the earliest PDCCH or the latest PDCCH. The reference frequency domain resource of the plurality of DCI messages/PDCCH transmissions may be determined based on a CORESET index of a plurality of CORESETs where the plurality of DCI messages/PDCCH transmissions are sent (e.g., transmitted). For example, a smallest (or a largest) index of the plurality of CORESETs may be used for the determining.

The reference frequency domain resource of the plurality of DCI messages/PDCCH transmissions may be determined based on a search space index of one or more search spaces where the plurality of DCI messages/PDCCH transmissions are sent (e.g., transmitted). For example, a smallest (or a largest) index of the one or more search spaces may be used for the determining. The reference frequency domain resource of the plurality of DCI messages/PDCCH transmissions may be determined based on a cell index of one or more cells where the plurality of DCI messages/PDCCH transmissions are sent (e.g., transmitted). For example, a smallest (or a largest) index of the one or more cells may be used for the determining. Similarly, the reference time domain resource and/or the reference CCE index and/or the reference REG may be determined based on the CORESET index, the search space index and/or the cell index. Combinations of transmission time, a CORESET index, a search space, and/or a cell index may be used. For example, the reference frequency domain resource may be determined based on the transmission time of DCI message/PDCCH transmission. The wireless device may use the CORESET index, the search space index, and/or the cell index to further identify a reference DCI message/PDCCH transmission, for example, if there are multiple DCI messages/PDCCH transmissions sent (e.g., transmitted) at the same time. The wireless device may determine the reference DCI message/PDCCH transmission for determining the reference frequency domain resource, the reference time domain resource, the reference CCE index, and/or the reference REG index.

The base station may configure a maximum repetition number/quantity K for the control channel repetition. The base station may send (e.g., transmit) a number/quantity of repetitions M that is smaller than the K. The wireless device may determine the reference DCI message/PDCCH transmission, for example, based on a candidate DCI message/PDCCH transmission in the K-th repetition regardless whether the K-th repetition has been actually sent (e.g., transmitted) or not, and/or, for example, based on the M being smaller than K. The wireless device may determine the reference DCI message/PDCCH transmission based on first DCI message/PDCCH transmission, which may be a first repetition. The wireless device may determine the reference DCI message/PDCCH transmission based on a last DCI message/PDCCH transmission which has been actually sent (e.g., transmitted) (e.g., M-th repetition). This type of control channel repetition (e.g., same content is repeated over a plurality of DCI messages/PDCCH transmissions) may be called/referred to as a first control channel repetition mode (e.g., mode 1, repetition mode 1, first repetition mode). A base station may configure a list of time domain resource allocation entries. A time domain resource allocation entry may comprise a number/quantity of repetitions of a control channel, a scheduling offset between the control channel and a PDSCH, and/or a number/quantity of PDSCH repetitions. For example, the number/quantity of repetitions of the control channel may represent the number/quantity of repetitions K. Based on the number/quantity of repetitions, the wireless device may determine a reference DCI message/PDCCH transmission timing based on the K-th DCI message/PDCCH transmission repetition. The repeated DCI messages/PDCCH transmissions may indicate an entry of the list of time domain resource allocation entries.

First DCI message/PDCCH transmission of the plurality of DCI messages/PDCCH transmissions may be different from second DCI message/PDCCH transmission of the plurality of DCI messages/PDCCH transmissions. For example, a wireless device might not aggregate the first DCI message/PDCCH transmission and the second DCI as contents of the first DCI message/PDCCH transmission may be different. The wireless device may attempt to decode the first DCI message/PDCCH transmission separately from the second DCI message/PDCCH transmission. For example, the wireless device may complete the decoding of the control channel repetition, for example, if the wireless device has received at least one DCI message/PDCCH transmission of the plurality of DCI messages/PDCCH transmissions. The wireless device may be able to receive or send (e.g., transmit) a TB scheduled by the plurality of DCI messages/PDCCH transmissions, for example, if the wireless device has received at least one DCI message/PDCCH transmission of the plurality of DCI messages/PDCCH transmissions. This type of control channel repetition (e.g., potentially different contents are sent (e.g., transmitted) via a plurality of DCI messages/PDCCH transmissions, and DCI message/PDCCH transmission of the plurality of DCI messages/PDCCH transmissions may schedule one or more resources of a transport block) may be called/referred to as a second control channel repetition mode (e.g., mode 2, repetition mode 2, second repetition mode). For example, a reference DCI message/PDCCH transmission of the plurality of DCI messages/PDCCH transmissions based on the second control channel repetition mode may be each DCI message/PDCCH transmission received by the wireless device.

Figure 19:
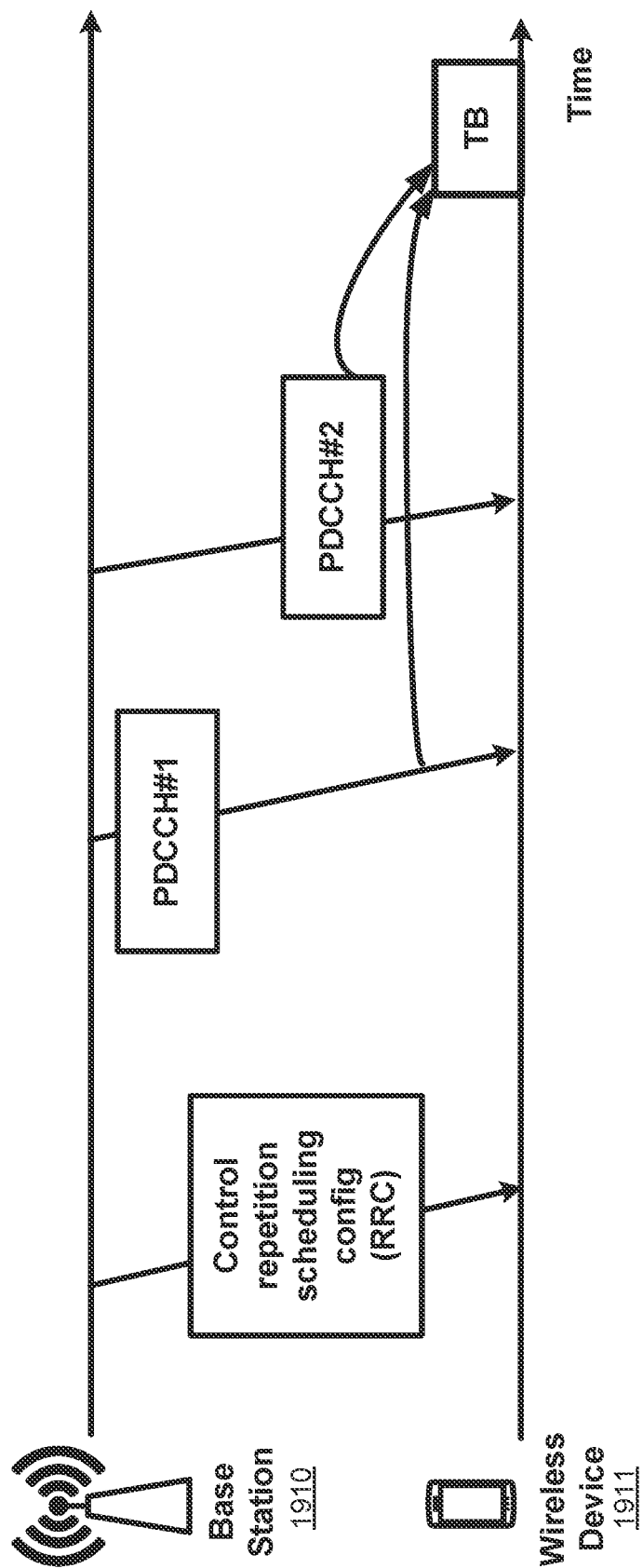
FIG. 19 shows an example of a repetition.

FIG. 19 shows an example of a repetition. The repetition may comprise PDCCH repetition. A base station 1910 may send/transmit one or more RRC messages comprising one or more configuration parameters. The configuration parameter(s) may comprise one or more parameters for a control channel repetition. The one or more parameters may comprise one or more scheduling carriers/cells for transmitting/sending one or more PDCCH transmissions/DCI messages of repeated control channels (and/or of the control channel repetition). The one or more parameters may comprise one or more search spaces for the control channel repetition. Control channel repetition may be enabled via a first search space (e.g., SS #1) of a first carrier/cell (e.g., DL carrier #0). The one or more parameters may indicate one or more indexes of the one or more search spaces of the first carrier and/or a carrier/cell index of the first carrier. The base station 1910 may send/transmit a first PDCCH transmission (e.g., PDCCH #1), scheduling at least one TB via the first carrier, via the first search space of the first carrier. The base station 1910 may send/transmit a second PDCCH transmission (e.g., PDCCH #2), scheduling the at least one TB via the first carrier, via the first search space of the first carrier. The first PDCCH transmission and the second PDCCH transmission may be transmitted/sent via a plurality of monitoring occasions of the first search space. The wireless device 1911 may aggregate the first PDCCH and the second PDCCH, for example, based on the first control channel repetition mode. The wireless device 1911 may attempt to receive/decode each PDCCH transmission independently, for example, based on the second control channel repetition mode. The wireless device 1911 may send/transmit and or receive the at least one TB, for example, based on the first PDCCH and/or the second PDCCH.

The base station 1910 may send/transmit one or more RRC messages. The one or more RRC messages may indicate a control channel repetition enabled for a first carrier/cell. The wireless device 1911 may determine one or more first search spaces of the first carrier/cell, for example, based on the indication of the control channel repetition. The wireless device 1911 may determine the one or more first search spaces for the control channel repetition, for example, based on the active BWP of the first carrier/cell. The one or more first search spaces may be configured with at least one of: a non-fallback DCI format, a DCI format 1_1, a DCI format 1_2, a DCI format 0_1, and/or a DCI format 0_2. The one or more RRC messages may indicate one or more search space indexes of the one or more first search spaces for the control channel repetition. The one or more RRC messages may indicate one or more DCI formats, that the wireless device 1911 may apply/use for the control channel repetition. The wireless device 1911 may determine the one or more first search spaces of the first carrier/cell, for example, based on the one or more DCI formats of the control channel repetition.

A base station may send (e.g., transmit) a plurality of DCI messages/PDCCH transmissions, scheduling resource(s) for a transport block of a cell, via a plurality of TRPs or via a plurality of CORESET pools or via a plurality of CORESET groups. For example, a base station may configure a first TRP (or a first CORESET pool) for a first cell via one or more RRC messages. The one or more RRC messages may comprise configuration parameters. The configuration parameters may indicate/comprise the first CORESET pool of the first cell. The configuration parameters may indicate/comprise a second CORESET pool of the first cell. For example, the second CORESET pool may correspond to a second TRP of the first cell. The base station may send (e.g., transmit) first DCI message/PDCCH transmission via a first search space of a first CORESET of the first CORESET pool. The base station may send (e.g., transmit) second DCI message/PDCCH transmission via a second search space of a second CORESET of the second CORESET pool. The first DCI message/PDCCH transmission and the second DCI message/PDCCH transmission may schedule resource(s) of a transport block. The first/PDCCH and the second DCI message/PDCCH transmission may be repeated transmission of a control information. The transport block may be sent (e.g., transmitted) via the first TRP and the second TRP. The transport block may be sent (e.g., transmitted) based on a plurality of TCI states. The transport block may be sent (e.g., transmitted) based on a TCI state, where the TCI state is associated with a plurality of TCI states. The transport block may be sent (e.g., transmitted) via the first TRP or the second TRP.

The configuration parameters may indicate control channel repetition enabled/configured for the first cell. For example, a parameter of a control channel repetition mode may be configured. The control channel repetition mode may be the first control channel repetition mode or the second control channel repetition mode. The configuration parameters may indicate/comprise a first CORESET associated with (e.g., configured with or of) the first CORESET pool. The configuration parameters may indicate/comprise a second CORESET associated with (e.g., configured with or of) the second CORESET pool. The wireless device may determine a pair of the first CORESET and the second CORESET, where repeated DCI message/PDCCH transmissions may be sent (e.g., transmitted), based on a rule. For example, the wireless device may determine the first CORESET of the first CORESET pool based on a search space associated with the first CORESET, where the wireless device may monitor a DCI format via the search space. For example, the DCI format may be a DCI format 1_1, a DCI format 0_1, a DCI format 1_2, a DCI format 0_2, a DCI format 3_0, or a DCI format 3_1. The wireless device may determine the plurality of first CORESETs of the first CORESET pool, for example, if there is a plurality of first search spaces, of the first CORESET pool, configured with the DCI format. Similarly, the wireless device may determine the second CORESET of the second CORESET pool based on a search space associated with the second CORESET, where the wireless device may monitor the DCI format via the search space. The wireless device may determine the plurality of second search spaces, for example, if there is a plurality of second search spaces, of the second CORESET pool, configured with the DCI format. The wireless device may be configured with at most one search space for a DCI format in each CORESET pool.

The wireless device may determine the second CORESET of the second CORESET pool based on a first CORESET index of the first CORESET of the first CORESET pool. For example, a second index of the second CORESET may be the first CORESET index+GAP. For example, the GAP may be a determined/predetermined value (e.g., 0, 12). For example, the configuration parameters may indicate/comprise a parameter indicating a value of the GAP. The wireless device may determine the second CORESET based on a second search space, associated with the second CORESET, and the first search space. For example, an index of the second search space may be a first index of the first search space+SS-GAP. For example, SS-GAP may be a predetermined value (e.g., 20, 0). For example, the wireless device may determine the second CORESET and/or the second search space based on an association configured by the configuration parameters. For example, the configuration parameters may indicate the association between each of a CORESET/search space associated with the first CORESET pool and each of a CORESET/search space associated with the second CORESET pool. The configuration parameters may indicate/comprise a first CORESET and/or a first search space of the first CORESET pool. The wireless device may monitor first DCI message/PDCCH transmission via the first search space of the first CORESET pool. The configuration parameters may indicate/comprise a parameter indicating control channel repetition across a multi-TRP or a multi-CORESET pool for the first CORESET or the first search space. Based on the parameter, the wireless device may determine a second CORESET or a second search space of the second CORESET pool. For example, the wireless device may determine the second CORESET based on one or more parameters of the first CORESET. For example, a same set of resource blocks configured for the first CORESET may be used for the second CORESET. For example, monitoring occasions of the first search space may be used for determining monitoring occasions of the second search space.

A base station may indicate control channel repetition based on a CORESET. For example, the base station may send (e.g., transmit) a plurality of DCI messages/PDCCH transmissions via the CORESET. The base station may send (e.g., transmit) the plurality of DCI messages/PDCCH transmissions over a plurality of TRPs. The base station may send (e.g., transmit) one or more RRC messages and/or MAC CEs indicating a plurality of TCI states are activated for the CORESET. For example, the plurality of TCI states may comprise a first TCI state, corresponding to a first TRP of the plurality of TRPs, and a second TCI state, corresponding to a second TRP of the plurality of TRPs. The base station may send (e.g., transmit) one or more second RRC messages comprising configuration parameters for the CORESET. For example, the configuration parameters may indicate control channel repetition based on the CORESET. The configuration parameters may indicate the control channel repetition across a plurality of TRPs. The configuration parameters may indicate repetition pattern across the plurality of TRPs. For example, the repetition pattern (e.g., TRP switching pattern) may be [0, . . . , 0, 1, . . . , 1] where 0 may represent a first TRP of the plurality of TRPs and 1 may represent a second TRP of the plurality of TRPs. The base station may indicate a bitmap indicating a number/quantity of control channel repetitions. Each bit of the bitmap may represent which TRP may send (e.g., transmit) i-th repetition. The repetition pattern may be [0, 1, 0, 1, . . . , 0, 1]. The repetition pattern may be [0, 0, . . . , 0, 1, 1, . . . 0, 0, . . . , 0, 1, 1, . . . , 1]. Various repetition patterns may be considered. Based on the repetition pattern, the wireless device may receive a control channel repetition based on a TCI state of the plurality of TCI states. The wireless device may receive the control channel repetition based on the first TCI state, for example, if the repetition pattern indicates the first TRP. The wireless device may receive the control channel repetition based on the second TCI state, for example, if the repetition indicates the second TRP.

Figure 20:
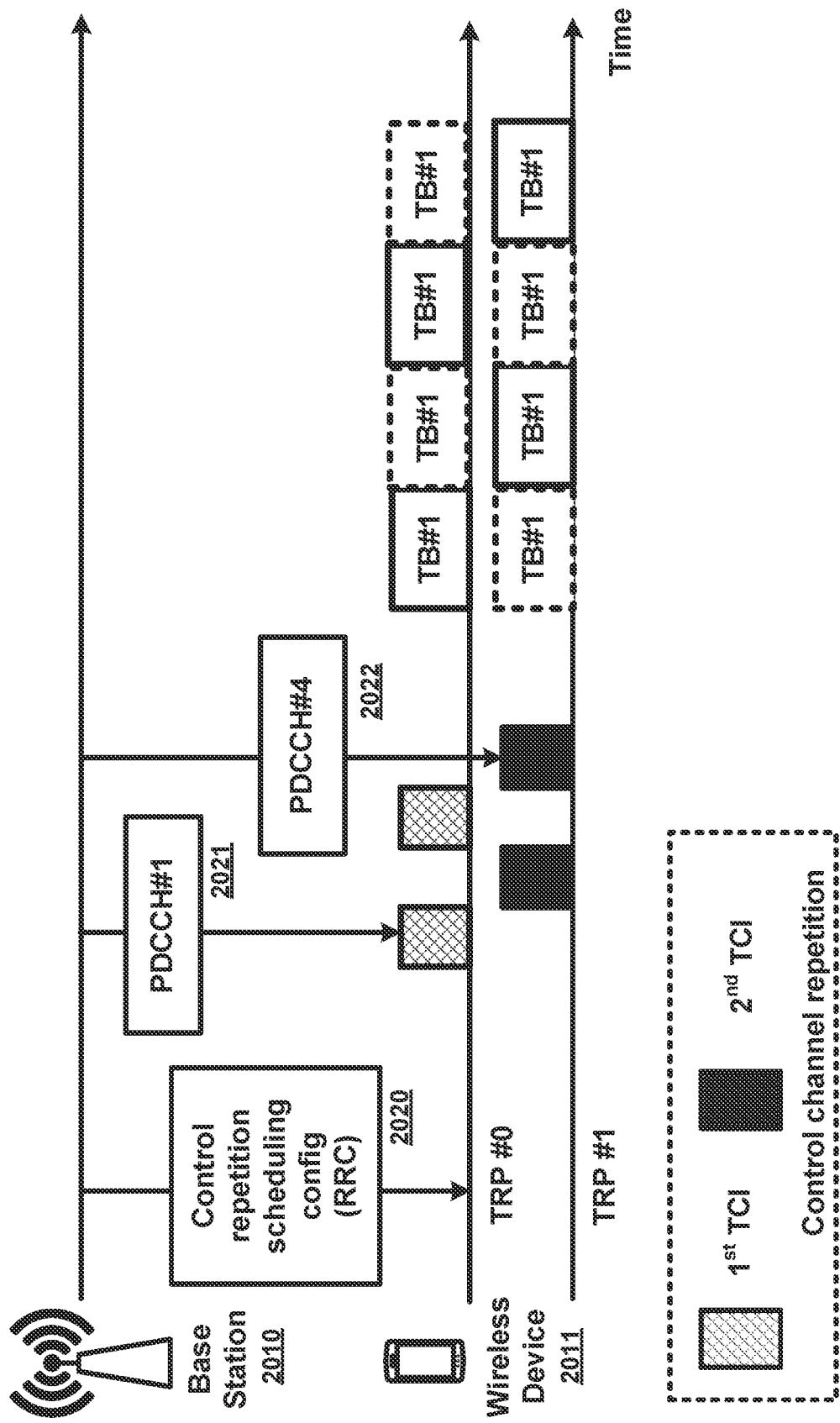
FIG. 20 shows an example of a repetition.

FIG. 20 shows an example of control channel repetition across a plurality of TRPs (or a plurality of CORESET pools). The base station 2010 may send (e.g., transmit) one or more RRC messages 2020 comprising configuration parameters. The configuration parameters may indicate/comprise a first TRP (TRP #0) and a second TRP (TRP #1) associated with a cell. The configuration parameters may comprise/indicate control channel repetition across a multi-TRP (e.g., via the first TRP and the second TRP). The base station 2010 may send (e.g., transmit) first DCI message/PDCCH transmission (e.g., PDCCH #1 2021) via the first TRP or a first CORESET pool. The first DCI message/PDCCH transmission may comprise/indicate resources scheduling a TB via the multi-TRP. The base station 2010 may send (e.g., transmit) second DCI message/PDCCH transmission (e.g., PDCCH #2) via the second TRP or a second CORESET pool. The second DCI message/PDCCH transmission may comprise/indicate the resources scheduling the TB via the multi-TRP. The first DCI message/PDCCH transmission and the second DCI message/PDCCH transmission may indicate a same HARQ process index (e.g., HARQ-K) scheduling the TB. The base station 2010 may send (e.g., transmit) a third DCI message/PDCCH transmission via the first TRP. The base station 2010 may send (e.g., transmit) a fourth DCI message/PDCCH transmission (e.g., PDCCH #4 2022) via the second TRP. A control information scheduling the TB may be repeated four times via a plurality of TRPs. A wireless device 2011 may monitor the first DCI message/PDCCH transmission 2021 and the third DCI message/PDCCH transmission based on a first TCI state, associated with the first TRP or the first CORESET pool. The wireless device 2011 may monitor the second DCI message/PDCCH transmission and the fourth DCI message/PDCCH transmission 2022 based on a second TCI state, associated with the second TRP or the second CORESET pool.

The base station 2010 may repeat the TB via four repetitions of the first TRP and via four repetitions of the second TRP. The wireless device 2011 may repeat the TB simultaneously via the first TRP and the second TRP, for example, if the wireless device 2011 supports simultaneous reception via the first TRP and the second TRP. The base station 2010 may send (e.g., transmit) the repeated transmission of the TB via the first TRP and the second TRP based on a time-domain division multiplexing, for example, if the wireless device 2011 does not support simultaneous reception via the first TRP and the second TRP. For example, the base station 2010 may send (e.g., transmit) a first repetition of the repeated transmission via the first TRP. The base station 2010 may send (e.g., transmit) a second repetition of the repeated transmission via the second TRP. A switching pattern between the first TRP and the second TRP may be configured by the base station 2010 based on RRC/MAC-CE/DCI signaling. The first DCI and the second DCI may schedule the repeated transmissions of the TB. Control channel repetition via a plurality of TRPs may enhance reliability and lead to better QoS experience.

A base station 2010 may send (e.g., transmit) one or more RRC messages 2020 comprising configuration parameters. The configuration parameters may indicate control channel repetition enabled for a cell. The base station 2010 may send (e.g., transmit) a plurality of DCI messages/PDCCH transmissions scheduling a transport block via a plurality of CORESETs of the cell. For example, the configuration parameters may configure a first CORESET and a second CORESET for the control channel repetition. The configuration parameters may comprise/indicate a first search space associated with the first CORESET. The configuration parameters may comprise/indicate a second search space associated with the second CORESET. The configuration parameters may comprise/indicate a first TCI state associated with the first CORESET. The configuration parameters may comprise/indicate a second TCI state associated with the second CORESET. The first TCI state may be the same as or different from the second TCI state. The configuration parameters may comprise/indicate a set of first TCI states associated with the first CORESET. One or more MAC CEs may indicate the first TCI state of the set of the first TCI states for the first CORESET. For example, the configuration parameters may comprise/indicate a set of second TCI states associated with the second CORESET. One or more second MAC CEs may indicate the second TCI state of the set of the second TCI states for the second CORESET. The configuration parameters may indicate the first CORESET and the second CORESET are associated to schedule repeated DCI messages/PDCCH transmissions for a transport block.

The configuration parameters may indicate/comprise a search space associated with the first CORESET and the second CORESET. The configuration parameters may indicate/comprise a plurality of CORESET indexes. The configuration parameters may comprise a CORESET index, of the plurality of CORESET indexes, indicating the first CORESET. The configuration parameters may indicate/comprise one or more indexes, of the plurality of CORESET indexes, of repeated/additional CORESETs (e.g., CORESETs used for control channel repetition in addition to the first CORESET, the second CORESET). For example, an index of the one or more indexes may indicate the second CORESET. First parameters of the first CORESET and second parameters of the second CORESET may have restriction in terms of configuration, for example, if the first CORESET and the second CORESET are associated for control channel repetition. For example, a set of resource blocks (RB) in frequency domain of the first CORESET may be the same as (or a subset of or a superset of) a set of resource block(s) in frequency domain of the second CORESET. The wireless device 2011 may determine a set of RBs belonging to the first CORESET and the second CORESET for the control channel repetition. For example, a first duration of the first CORESET may be the same as a second duration of the second CORESET. For example, a number/quantity of REGs of the first CORESET may be the same as a number/quantity of REGs. For example, a number/quantity of CCEs of the first CORESET may be the same as (or less than or larger than) a number/quantity of CCEs of the second CORESET. The wireless device 2011 may determine a number/quantity of REGs based on the determined set of RBs or based on the set of RBs of the first CORESET. For example, a first CCE-to-REG mapping type of the first CORESET (e.g., between interleaved or non-interleaved) may be the same as a second CCE-to-REG mapping type of the second CORESET. For example, a precoder granularity of the first CORESET may configured as same to a precoder granularity of the second CORESET. For example, a first tci-PresenceInDCI of the first CORESET may same as a second tci-PresenceInDCI of the second CORESET. For example, a first rb-Offset of the first CORESET may be the same as a second rb-Offset of the second CORESET.

The first CORESET and the second CORESET may have potentially different configurations for one or more parameters. For example, the one or more parameters may comprise one or more TCI states. For example, the one or more parameters may comprise DM-RS scrambling identity (e.g., pdcch-DMRS-ScramblingID). For example, the one or more parameters may comprise a CORESET pool index (e.g., CoresetPoolIndex). For example, the one or more parameters may comprise a CORESET index.

The wireless device 2011 may determine whether a first number/quantity of CCEs of the first CORESET is less than or equal to (or greater than or equal to) a second number/quantity of CCEs of the second CORESET, for example, if the wireless device 2011 receives first configuration parameters of the first CORESET and second configuration parameters of the second CORESET. Based on the determining, the wireless device 2011 may consider the first CORESET and the second CORESET may be used for control channel repetition. Otherwise, the wireless device 2011 may determine the first CORESET, and the second CORESET might not be used for the control channel repetition. Alternatively, the wireless device 2011 may determine a smallest number/quantity of CCEs (e.g., M) among one or more of CCEs of a plurality of CORESETs (e.g., determine a CORESET of the plurality of CORESETs with a smallest number/quantity of CCEs). For example, the plurality of CORESETs may be configured/indicated/used for control channel repetition. The wireless device 2011 may determine/assume/consider that first M candidates of each CORESET of the plurality of CORESETs are used for the control channel repetition.

A wireless device 2011 may determine a number/quantity of REGs of a first CORESET of a plurality of CORESETs configured for control channel repetition. The wireless device 2011 may determine a second number of REGs of a second CORESET of the plurality of CORESETs. The wireless device 2011 may determine whether the number of REGs is equal to the second number of REGs. The wireless device 2011 may consider that the control channel repetition is configured via the first CORESET and the second CORESET, for example, based on (e.g., after or in response to) the determination that the number/quantity of REGs is equal to the second number/quantity of REGs. Otherwise, the wireless device 2011 may consider the configuration as an error case and might not activate the control channel repetition via the first CORESET and the second CORESET. The wireless device 2011 may determine a smallest number/quantity of REGs of the plurality of CORESETs (e.g., determine a CORESET with a smallest number/quantity of REGs). The wireless device 2011 may assume that the smallest number/quantity of REGs used for the control channel repetition.

The configuration parameters of the search space, associated with the first CORESET and the second CORESET, may comprise/indicate a switching pattern or mapping pattern of the first CORESET and the second CORESET. For example, the wireless device may determine a search space monitoring occasion based on the configuration parameters of the search space. The wireless device may determine the search space monitoring occasion based on the first CORESET. The wireless device may determine a second search space monitoring occasion or an extended monitoring occasion based on a rule. For example, the wireless device may determine the second search space monitoring occasion as a next slot of the first monitoring occasion. The wireless device may determine the second search space monitoring occasion based on the second search space. The configuration parameters may indicate a bitmap of a number/quantity of OFDM symbols in a slot (or of a number/quantity of slots, for example, a multiple slots). The bitmap may indicate 0 for the first CORESET or 1 for the second CORESET for each corresponding OFDM symbol or a slot. The wireless device may monitor a search space monitoring occasion based on the first CORESET, for example, if 0 is indicated for an OFDM symbol. The wireless device may monitor a second search space monitoring occasion based on a second CORESET, for example, if 1 is indicated for a second OFDM symbol.

A wireless device may receive one or more RRC messages comprising configuration parameters. The configuration parameters may indicate/comprise a CORESET of a bandwidth part of a cell. The configuration parameters may comprise parameters of a search space associated with the CORESET. The parameters of the search space may indicate a first monitoring periodicity in a unit of a first time duration. For example, the first time duration may be a slot or a few slots. The parameters of the search space may indicate a second monitoring periodicity in a unit of a second time duration. For example, the second time duration may be an OFDM symbol or a few OFDM symbols or a slot. For example, the second time duration may be smaller than the first time duration. The wireless device may monitor one or more repeated DCI messages/PDCCH transmissions via one or more monitoring occasions determined based on the second monitoring periodicity within the first monitoring periodicity. For example, the configuration parameters may indicate the one ore monitoring occasions within the first monitoring periodicity.

For example, the wireless device may receive/monitor first DCI message/PDCCH transmission of the one or more repeated DCI messages/PDCCH transmissions via a first monitoring occasion of the one or more monitoring occasions. The wireless device may receive/monitor second DCI message/PDCCH transmission of the one or more repeated DCI messages/PDCCH transmissions via a second monitoring occasion of the one or more monitoring occasions. The first DCI message/PDCCH transmission may be the same as the second DCI message/PDCCH transmission. The first DCI message/PDCCH transmission and the second DCI message/PDCCH transmission may indicate the same resource(s) for a transport block. The wireless device may receive/monitor DCI via the one or more monitoring occasions, where a search space candidate for the DCI may comprise one or more candidates of the one or more monitoring occasions. For example, the search space candidate may comprise a first candidate of the first monitoring occasion and a second candidate of the second monitoring occasion. For example, a first starting CCE index of the first candidate of the first monitoring occasion may be the same as a second starting CCE index of the second candidate of the second monitoring occasion.

The wireless device may receive/monitor the DCI message/PDCCH transmission via the one or more monitoring occasions, where the search space candidate for the DCI message/PDCCH transmission may comprise one or more CCEs from the one or more monitoring occasions. For example, the CORESET may be associated with a plurality of TCI states as active TCI states. For example, the plurality of TCI states may be activated via one or more RRC messages or MAC CEs or DCIs. The wireless device may monitor the first monitoring occasion based on a first TCI of the plurality of TCI states. The wireless device may monitor the second monitoring occasion based on a second TCI of the plurality of TCI states.

Figure 21:
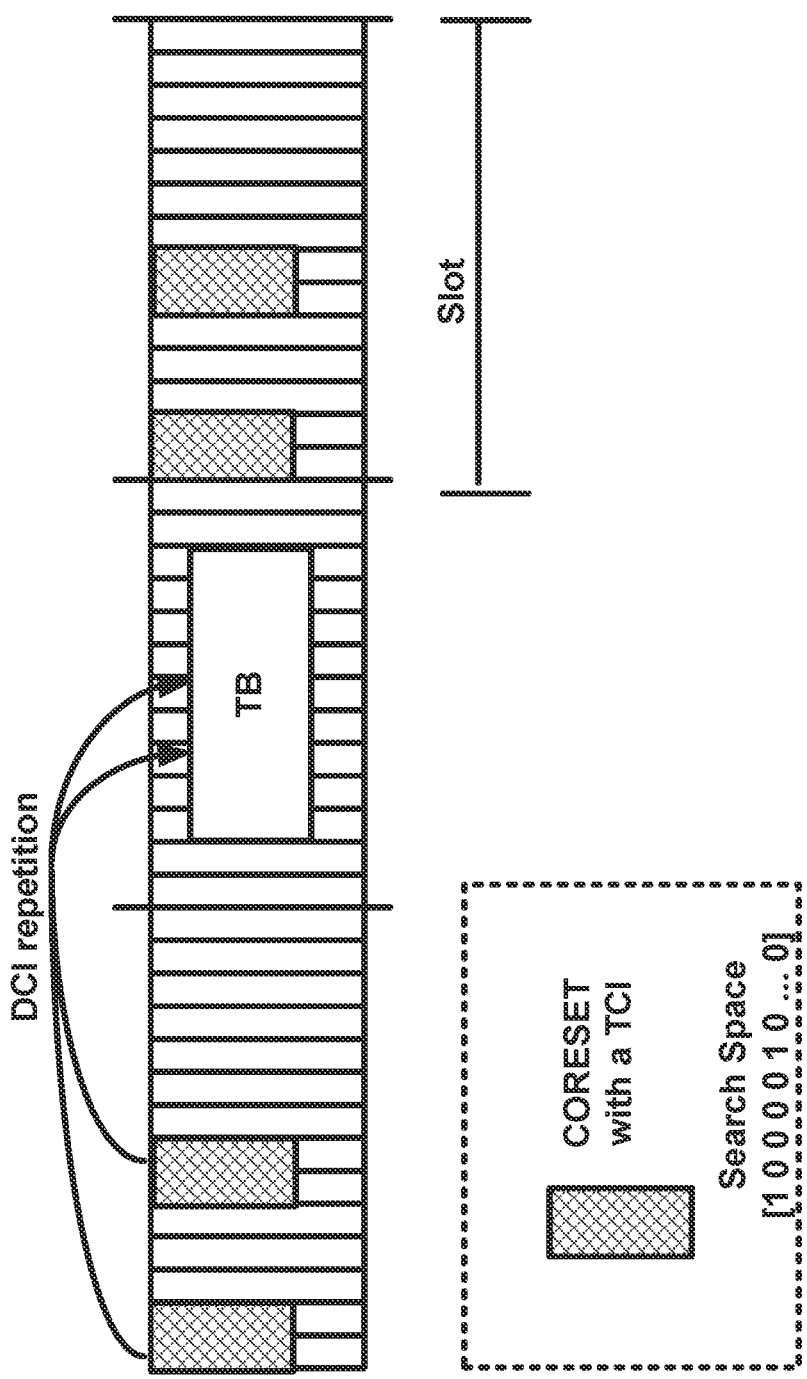
FIG. 21 shows an example of repetition of downlink control information.

FIG. 21 shows an example of repetition. The repetition may comprise repetitions using a plurality of transmission and reception points (TRPs) and/or a plurality of CORESETs. A base station may send/transmit, to a wireless device that may receive, one or more RRC messages comprising configuration parameters. The configuration parameters may comprise/indicate a CORESET associated with an active TCI state. The base station may activate the active TCI state via the one or more RRC messages, one or more MAC CEs, or one or more DCI messages. The configuration parameters may comprise/indicate a bitmap indicating one or more monitoring occasions for a control channel repetition. A bitmap size may be 14 (e.g., the bitmap corresponds to a slot where each bit maps to each OFDM symbol), such as shown in FIG. 21, and/or any other quantity of bits (e.g., less than 14, greater than 14, etc.). The bitmap may indicate monitoring occasions of a 1st OFDM symbol and a 6th OFDM symbol of a slot (or any other symbol of a slot). The configuration parameters may indicate/comprise a first monitoring periodicity as two slots (e.g., monitor in every two slots), or any other quantity of slots. The wireless device may determine one or more monitoring occasions, for example, in each monitoring periodicity, based on the bitmap. The wireless device may determine a monitoring occasion starting at a first OFDM symbol of a slot (or any other symbol of a slot), for example, if the bitmap is not present. The wireless device may determine a first monitoring occasion and/or a second monitoring occasion, for example, based on the bitmap in each monitoring periodicity. The wireless device may determine any quantity of monitoring occasions. The wireless device may monitor the first monitoring occasion and/or the second monitoring occasion for receiving one or more DCI messages/PDCCH transmissions scheduling at least one transport block.

The configuration parameters may indicate (e.g., for a search space) one or more monitoring occasions within a monitoring periodicity. For example, a periodicity value (e.g., monitoringSlotPeriodicityAndOffset) may determine the monitoring periodicity. The wireless device may determine the monitoring periodicity, for example, based on a gap between each monitoring occasion within the slot based on one or more parameters (e.g., the monitoringSymbolWithinSlot, if parameters may comprise a monitoringSymbolWithinSlot). The wireless device may expect/determine an equal interval between monitoring occasions within the slot. Additionally or alternatively, the parameters may not comprise the one or more parameters (e.g., the monitoringSymbolsWithinSlot), for example, if the search space is used for a control channel repetition. The one or more parameters (e.g., monitoringSymbolsWithinSlot) may be used to indicate the one or more monitoring occasions within a monitoring periodicity determined. The one or more parameters may be used to indicate the one or more monitoring occasions within a monitoring periodicity determined based on a periodicity and/or offset parameter (e.g., the monitoringSlotPeriodicityAndOffset), for example, if a control channel repetition is enabled. A parameter to indicate enabling of the control channel repetition may be configured for the search space and/or for a CORESET associated with the search space and/or a DCI format monitored via the search space. A duration of the search space may be used to determine the one or more monitoring occasions within the monitoring periodicity. The wireless device may determine the one or more monitoring occasions based on the monitoring periodicity and the duration, for example, if the monitoring periodicity is larger than a slot. The wireless device may determine a first monitoring occasion of the one or more monitoring occasions based on a parameter (e.g., the monitoringSlotPeriodicityAndOffset), for example, if the monitoring periodicity is P slots and the duration is D. The wireless device may determine a second monitoring occasion of the one or more monitoring occasions as a next slot of the first monitoring occasion. The wireless device may determine D number of monitoring occasions starting from the first monitoring occasions in consecutive slots. The search space may comprise a plurality of control resource set IDs (e.g., a controlResourceSetID and/or a second controlResourceSetID), for example, if a search space is configured/associated with a plurality of CORESETs.

A base station may send/transmit a first DCI message/PDCCH transmission via a first monitoring occasion of the one or more monitoring occasions. The base station may send/transmit a second DCI message/PDCCH transmission via a second monitoring occasion of the one or more monitoring occasions. The first DCI message/PDCCH transmission and the second DCI message/PDCCH transmission may indicate same resource(s) for a transport block. A first content of the first DCI message/PDCCH transmission may be the same as or different from a second content of the second DCI message/PDCCH transmission. The wireless device may determine/attempt to decode the first DCI message/PDCCH transmission independently from the second DCI message/PDCCH transmission. The wireless device may not assume/determine that the base station may send/transmit the first DCI message/PDCCH transmission and the second DCI message/PDCCH transmission. The base station may send/transmit one or more DCI messages/PDCCH transmissions via/in/over the one or more monitoring occasions. The base station may send/transmit a single DCI message/PDCCH transmission via/in/over the one or more monitoring occasions. The base station may send/transmit DCI message/PDCCH transmission via/in/over each monitoring occasion. The base station may send/transmit any number of repeated DCI messages/PDCCH transmissions via/in/over the one or more monitoring occasions.

The base station may indicate that the first control channel repetition mode is used for the one or more monitoring occasions. The wireless device may determine a number/quantity of the one or more monitoring occasions 0 in a monitoring periodicity, for example, based on the first control channel repetition mode. A monitoring occasion of the one or more monitoring occasions is indexed from 0, . . . , O−1, for example, based on a time-first manner. The wireless device may attempt to decode one or more search space candidates aggregating candidates from the monitoring occasion from 0 to i (e.g., i=0, . . . , O−1 or i=0, 1, 3, 7, . . . ). The wireless device may attempt to decode a first candidate aggregating a candidate from a first monitoring occasion of the one or more monitoring occasions, for example, if O is 4. The wireless device may attempt to decode a second candidate aggregating the candidate and another candidate from a second monitoring occasion of the one or more monitoring occasions. The wireless device may attempt to decode a fourth candidate aggregating each candidate of each monitoring occasion of the one or more monitoring occasions. The wireless device may aggregate candidates from the one or more monitoring occasions where a starting CCE index of a candidate of the candidates is the same. The wireless device may determine candidates, for example, based on a rule. The wireless device may determine candidates of same frequency resources in each monitoring occasion. The wireless device may determine candidates of same REGs (or same REG indexes) in each monitoring occasion.

A wireless device may determine each list of candidates. The wireless device may determine each list of candidates via each monitoring occasion of one or more monitoring occasions. The one or more monitoring occasions may be within a monitoring periodicity of a search space. The wireless device may determine a list of candidates across the one or more monitoring occasions, for example, based on each list of candidates. The list of candidates may comprise one or more candidates of an aggregation level. The wireless device may determine a first list of candidates of a first aggregation level 2*L, for example, based on two candidates over two monitoring occasions of aggregation level L or four candidates over four monitoring occasions of aggregation level L/2.

A base station may indicate four monitoring occasions in a monitoring periodicity indexed from first to fourth monitoring occasions, for example, for determination of one or more search space candidates of an aggregation level across one or more monitoring occasions. A set of candidates for an aggregation level may be assumed to be consistent across the four monitoring occasions. A first candidate of an aggregation level 2 may start in a third CCE and a second candidate of the aggregation level 2 may start in a fifth CCE. A first candidate of an aggregation level 4 may start in N_CCE (e.g., a number/quantity of CCEs)—8th CCE and a second candidate of the aggregation level 4 may start in N_CCE—fourth CCE. The wireless device may determine a list of candidates with an aggregation level 8, for example, by combining/aggregating four candidates (one candidate from one monitoring occasion each) of the aggregation level 2 and/or by combining/aggregating two candidates (one candidate from one monitoring occasion each) of the aggregation level 4. A first box in the left and a second small box in the right show AL=8 candidates. The wireless device may determine more candidates, for example, by aggregating/combining second candidates of AL=2 and/or second candidates of AL=4. The wireless device may determine a candidate of aggregation level (AL)=16, for example, by combining/aggregating four candidates of AL=4. The wireless device may determine two AL=16.

The wireless device may not aggregate candidates wherein the candidates may not comprise a candidate from the first monitoring occasion (or 1st monitoring occasion, an earliest monitoring occasion in a monitoring periodicity). The wireless device may determine possible aggregation levels and/or candidates by aggregating candidates from a 1st monitoring occasion, 1st+2nd monitoring occasions, 1st+2nd+3rd+4th monitoring occasions, 1st+2nd+3rd+4th+5th−6th+7th+8th, . . . , and so on.

The wireless device may determine a list of candidates for an aggregation level, for example, based on a hashing function applied/used in each slot. Same candidates may be determined, for example, if a first monitoring occasion and a second monitoring occasion reside in a same slot. Different candidates may be determined, for example, if a first monitoring occasion and a second monitoring occasion do not reside in a same slot. A base station may send/transmit DCI over a candidate of the across the one or more monitoring occasions.

The base station may send/transmit one or more messages comprising configuration parameters. The configuration parameters may comprise/indicate a search space group for a control channel repetition. The search space group may comprise one or more search spaces. The search group may comprise a first search space of a first carrier and a second search space of a second carrier. The search space group may comprise a first search space of a first BWP of a cell and a second search space of a second BWP of the cell. The search space group may comprise a first search space of first BWP of a first cell and a second search space of a second BWP of a second cell. The configuration parameters may indicate one or more search space groups, for example, for a BWP of a cell. A search space group of the one or more search space groups may be associated/configured with one or more DCI formats. A wireless device may determine a search space group, for example, based on one or more search spaces configured/associated with the BWP of the cell. Each search space of the one or more search spaces may be configured to monitor a DCI format of the one or more DCI formats. The one or more DCI formats may comprise a DCI format 1_1 and a DCI format 0_1. The one or more DCI formats may comprise a DCI format 0_0 and a DCI format 1_0. The one or more DCI formats may comprise a DCI format 1_2 and a DCI format 0_2. The one or more DCI formats may comprise a DCI format 3_0 and a DCI format 3_1. The one or more DCI formats may comprise downlink/uplink DCI messages of non-fallback DCI messages. The one or more DCI formats may comprise downlink/uplink DCI messages of fallback DCI messages. The one or more DCI formats may comprise DCI format(s) of sidelink DCI messages.

The wireless device may determine a search space candidate. The wireless device may determine the search space candidate from/over the one or more search space of the search space group in a similar manner addressed for a control repetition, for example, based on a plurality of CORESETs. The wireless device may determine one or more monitoring occasions in a slot, for example, based on the one or more search spaces. The wireless device may determine one or more first monitoring occasions, for example, in a slot n, based on a first search space of the one or more search spaces. The wireless device may determine, in the slot n, one or more second monitoring occasions, for example, based on a second search space of the one or more search spaces. The wireless device may monitor the one or more first monitoring occasions and the one or more second monitoring occasions in the slot n. The wireless device may not expect to have overlap between a monitoring occasion of a search space of the one or more search spaces and a second monitoring occasion of a second search space of the one or more search spaces in a time domain. The wireless device may monitor one or more repeated DCI messages, for example, based on the DCI format via the one or more monitoring occasions in the slot.

The one or more repeated DCI messages may be transmitted/sent, by the base station, via one or more PDCCHs. Each PDCCH may carry/transmit each DCI. Each DCI of the one or more repeated DCI messages may have same content or different content. The wireless device may aggregate the one or more repeated DCI messages if each DCI may have same content. The one or more repeated DCI messages may be transmitted/sent via a PDCCH. The PDCCH may be transmitted/sent over one or more search space candidates of the one or more search spaces. DCI may be transmitted/sent repeatedly via one or more PDCCHs. Each PDCCH may carrier/transmit the DCI repeatedly.

Figure 22:
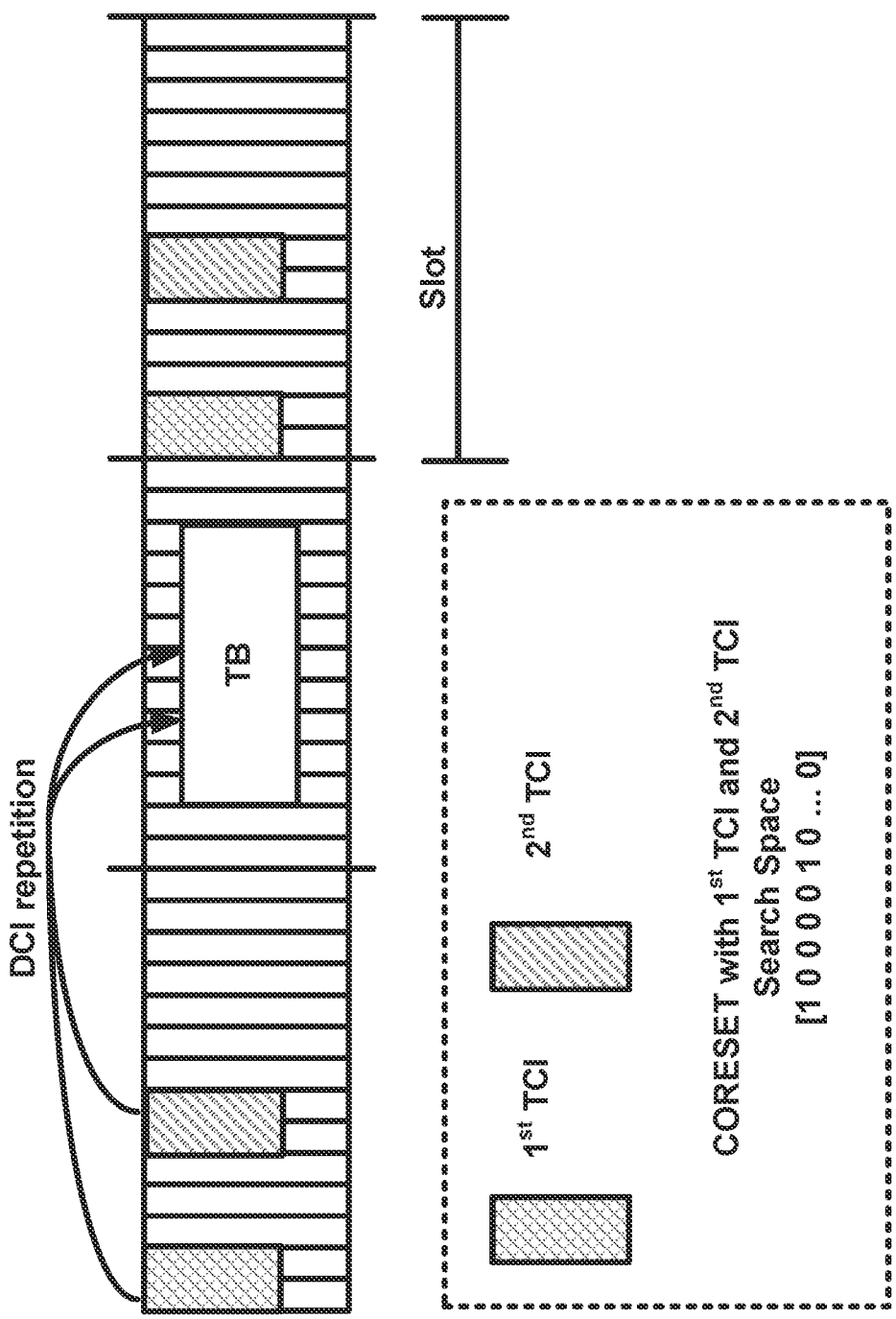
FIG. 22 shows an example of repetition of downlink control information.

FIG. 22 shows an example of repetition of downlink control information. The repetition may use one or more CORESETs. A CORESET may be associated with one or more TCI states as active TCI states. The base station may associate a plurality of TCI states with a CORESET as the active TCI states. The base station may indicate a plurality of monitoring occasions within a slot or in a monitoring periodicity for a control channel repetition. A wireless device may monitor a first monitoring occasion, for example, based on a first TCI state of the plurality of TCI states. The wireless device may monitor a second monitoring occasion, for example, based on a second TCI state of the plurality of TCI states. The base station may indicate a pattern to switch between the plurality of TCI states. Configuration parameters of a search space associated with the CORESET may comprise/indicate enabling a control channel repetition. The configuration parameters may comprise/indicate enabling a TCI switching or enabling the control channel repetition via a plurality of TCI states. The configuration parameters may comprise/indicate a switching pattern. The switching pattern may be an alternating between a first TCI state of the plurality of TCI states and a second TCI state of the plurality of TCI states in each monitoring occasion of one or more monitoring occasions within a monitoring periodicity or a slot or within a few slots (e.g., between a monitoring periodicity configured by monitoringSlotPeriodicityAndOffset parameter of the search space). The switching pattern may be a half-half between the first TCI state and the second TCI state. A number/quantity of the one or more monitoring occasions may be equal to K. The wireless device may monitor first (floor (K/2)) monitoring occasion(s), for example, based on the first TCI state. The wireless device may monitor remaining monitoring occasion(s), for example, based on the second TCI state within the monitoring periodicity. The switching pattern may be a bitmap to indicate a TCI state in each monitoring occasion of the one or more monitoring occasions.

Figure 23:
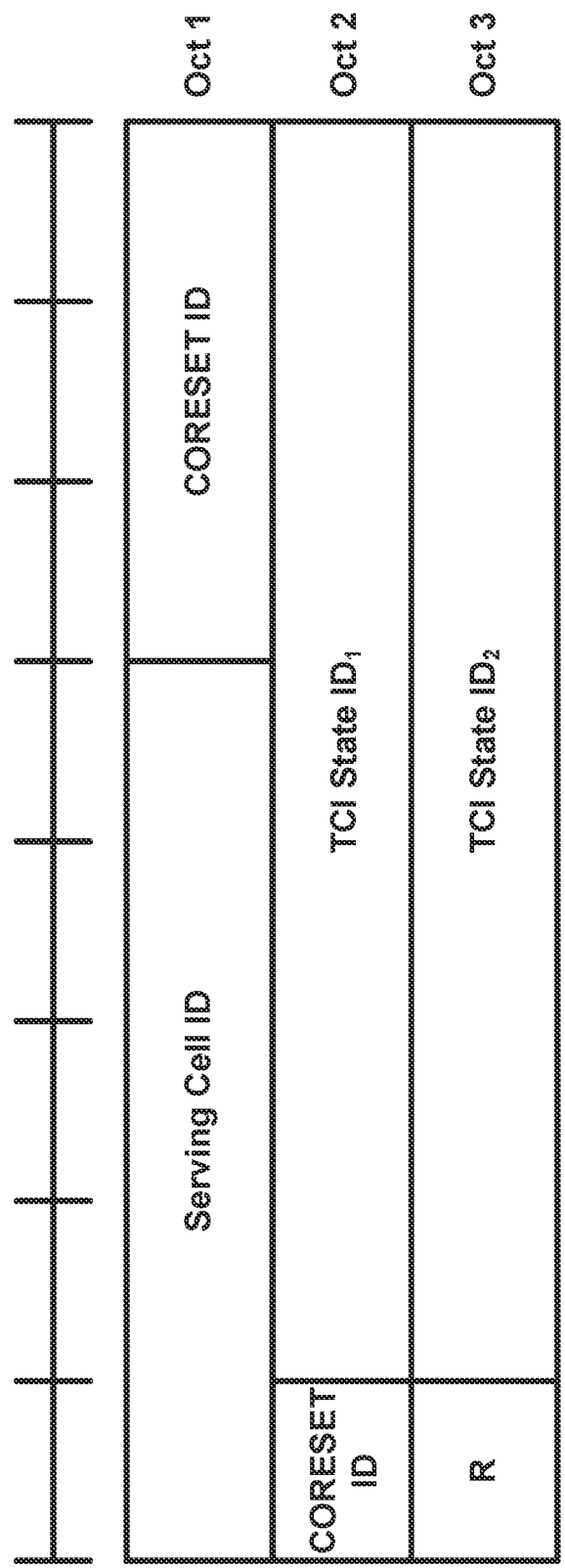
FIG. 23 shows an example format of a MAC CE.

FIG. 23 shows an example format of a MAC CE. The MAC CE may correspond to a TCI state indication for wireless device-specific PDCCH MAC CE, enhanced TCI state indication for wireless device-specific PDCCH MAC CE, etc. The MAC CE may indicate (e.g., activate/update/select) one or more TCI states (e.g., TCI state 1 and TCI state 2) for a CORESET of a serving cell. The base station may indicate, in the MAC CE, one or more TCI state indicators/indexes (e.g., TCI state indicator (ID) 1 and TCI state ID 2) of the one or more TCI states. The base station may indicate, in the MAC CE, the one or more TCI states indexes to activate the one or more TCI states for the CORESET. The CORESET may be indicated by a CORESET indicator (ID) in the MAC CE. The one or more TCI state indexes may indicate/identify the one or more TCI states. Each TCI state index of the one or more TCI state indexes may indicate/identify a respective TCI state of the one or more TCI states.

The MAC CE may comprise one or more fields. A first field of the one or more fields may indicate/comprise a serving cell indicator/index (e.g., serving cell ID provided by a higher layer parameter ServCellIndex or indicated by one or more configuration parameters). The serving cell indicator/index may identify/indicate the serving cell. A second field of the one or more fields may indicate/comprise a CORESET indicator/index (e.g., CORESET ID). The CORESET indicator/index may identify/indicate the CORE- SET of the serving cell. A third field of the one or more fields may indicate/comprise a first TCI state index (e.g., TCI state ID 1) of/identifying/indicating a first TCI state. The one or more TCI states may comprise the first TCI state. A fourth field (e.g., R) of the one or more fields may be a reserved field. A fifth field of the one or more fields may indicate/comprise a second TCI state index (e.g., TCI state ID 2) of/identifying/indicating a second TCI state. The one or more fields of the MAC CE may comprise the second TCI state index, for example, based on a value of the fourth field (e.g., R). The MAC CE may not comprise the second TCI state index (e.g., the fifth field may be a reserved field), for example, if the value of the fourth field is equal to zero (e.g., or any other predetermined/preset value). The MAC CE format may comprise the second TCI state index, for example, if the value of the fourth field is equal to one (e.g., or any other second predetermined/preset value). The one or more TCI states may comprise the second TCI state. The MAC CE may be an activation command. The MAC CE may be an activation command for parameters indicated by the configuration parameters. The configuration parameters may indicate the first TCI state index for the first TCI state. The configuration parameters may indicate the second TCI state index for the second TCI state. The configuration parameters may indicate the CORESET index for the CORESET. The configuration parameters may indicate the serving cell index for the serving cell. The configuration parameters may indicate the one or more TCI state indexes for the one or more TCI states. The one or more TCI states may comprise the first TCI state and the second TCI state. The one or more TCI state indexes may comprise the first TCI state index and the second TCI state index.

Figure 24:
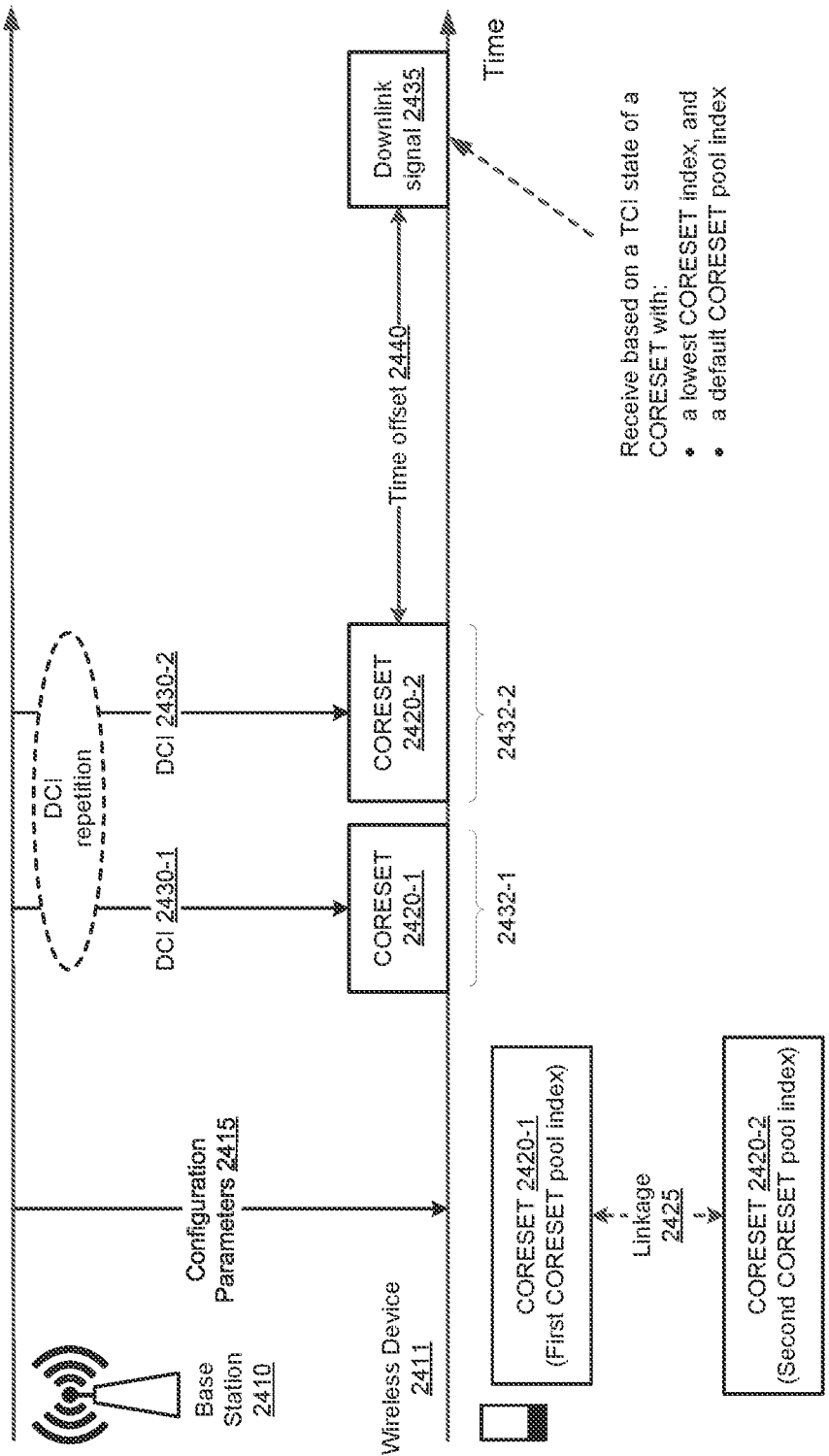
FIG. 24 shows an example of channel repetition for transmission and/or reception.

FIG. 24 shows an example of channel repetition for transmission and/or reception. The channel repetition may correspond to control channel repetition. The control channel repetition may be used for sending, by a base station 2410, repetitions of control information (e.g., DCI). The control information may schedule a transmission (e.g., a downlink transmission) to the wireless device 2411. The base station 2410 and/or the wireless device 2411 may determine a beam (e.g., TCI state) to be used for the transmission based on a CORESET pool corresponding to a default CORESET pool index. While FIG. 24 relates to the specific example of downlink control channel repetition (e.g., for transmission of DCI), the base station 2410 and/or the wireless device 2411 may similarly transmit (and/or receive) repetitions of any message (e.g., control messages and/or data, for example, via PUCCH, PUCCH, PDSCH) via channel repetition, and in accordance with the procedures described herein.

The wireless device 2411 may receive one or more messages. The wireless device 2411 may receive the one or more messages from the base station 2411. The one or more messages may comprise one or more configuration parameters 2415. The one or more configuration parameters 2415 may be RRC configuration parameter(s) and/or RRC reconfiguration parameter(s).

The one or more configuration parameters 2415 may be for a cell. At least one configuration parameter of the one or more configuration parameters 2415 may be for a cell. The cell may be a primary cell (PCell). The cell may be a secondary cell (SCell). The cell may be a secondary cell configured with PUCCH (e.g., PUCCH SCell). The cell may be an unlicensed cell (e.g., operating in an unlicensed band). The cell may be a licensed cell (e.g., operating in a licensed band). The cell may operate in a first frequency range (e.g., FR1). The FR1 may, for example, comprise frequency bands below 6 GHz. The cell may operate in a second frequency range (e.g., FR2). The FR2 may, for example, comprise frequency bands from 24 GHz to 52.6 GHz. The cell may operate in any frequency range (e.g., comprising any frequency band(s)).

The wireless device 2411 may perform uplink transmissions (e.g., PUSCH, PUCCH, SRS) via the cell in/during a first time period and in/using a first frequency. The wireless device 2411 may perform downlink receptions (e.g., PDCCH, PDSCH) via the cell in/during a second time period and in/using a second frequency. The cell may operate in a time-division duplex (TDD) mode. The first frequency and the second frequency may be the same, for example, in the TDD mode. The first time and the second time may be different, for example, in the TDD mode. The cell may operate in a frequency-division duplex (FDD) mode. The first frequency and the second frequency may be different, for example, in the FDD mode. The first time and the second time may be the same, for example, in the FDD mode.

The wireless device 2411 may be in an RRC connected mode, an RRC idle mode, and/or an RRC inactive mode. The cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be in one of an active state and an inactive state. The wireless device 2411 may monitor a downlink channel/signal (e.g., PDCCH, DCI, CSI-RS, PDSCH) on/for/via the downlink BWP, for example, in the active state of a downlink BWP of the one or more downlink BWPs. The wireless device 2411 may receive a PDSCH transmission on/via/for the downlink BWP, for example, in the active state of a downlink BWP of the one or more downlink BWPs. The wireless device 2411 may not monitor a downlink channel/signal (e.g., PDCCH, DCI, CSI-RS, PDSCH) on/via/for the downlink BWP, for example, in the inactive state of a downlink BWP of the one or more downlink BWPs. The wireless device 2411 may stop monitoring (or receiving) a downlink channel/signal (e.g., PDCCH, DCI, CSI-RS, PDSCH) on/via/for the downlink BWP, for example, in the inactive state of a downlink BWP of the one or more downlink BWPs. The wireless device 2411 may not receive a PDSCH transmission on/via/for the downlink BWP, for example, in the inactive state of a downlink BWP of the one or more downlink BWPs. The wireless device 2411 may stop receiving a PDSCH transmission on/via/for the downlink BWP, for example, in the inactive state of a downlink BWP of the one or more downlink BWPs.

The wireless device 2411 may send/transmit an uplink signal/channel (e.g., PUCCH, preamble, PUSCH, PRACH, SRS, etc.) on/via the uplink BWP, for example, in the active state of an uplink BWP of the one or more uplink BWPs. The wireless device 2411 may not send/transmit an uplink signal/channel (e.g., PUCCH, preamble, PUSCH, PRACH, SRS, etc.) on/via the uplink BWP, for example, in the inactive state of an uplink BWP of the one or more uplink BWPs.

The wireless device 2411 may activate the downlink BWP of the one or more downlink BWPs of the cell. The activating the downlink BWP may comprise that the wireless device 2411 sets (or switches to) the downlink BWP as an active downlink BWP of the cell. The activating the downlink BWP may comprise that the wireless device sets the downlink BWP in the active state. The activating the downlink BWP may comprise switching the downlink BWP from the inactive state to the active state.

The wireless device 2411 may activate the uplink BWP of the one or more uplink BWPs of the cell. The activating the uplink BWP may comprise that the wireless device sets (or switches to) the uplink BWP as an active uplink BWP of the cell. The activating the uplink BWP may comprise that the wireless device 2411 sets the uplink BWP in the active state. The activating the uplink BWP may comprise switching the uplink BWP from the inactive state to the active state.

The one or more configuration parameters 2415 may be for the (active) downlink BWP of the cell. At least one configuration parameter of the one or more configuration parameters 2415 may be for the downlink BWP of the cell. The one or more configuration parameters 2415 may be for the (active) uplink BWP of the cell. At least one configuration parameter of the one or more configuration parameters 2415 may be for the uplink BWP of the cell.

The one or more configuration parameters 2415 may indicate a plurality of CORESETs (e.g., CORESET 2420-1 and CORESET 2420-2). The one or more configuration parameters 2415 may indicate the plurality of CORESETs for the (active) downlink BWP of the cell. The (active) downlink BWP of the cell may comprise the plurality of CORESETs. The plurality of CORESETs may comprise a first CORESET (e.g., CORESET 2420-1). The plurality of CORESETs may comprise a second CORESET (e.g., CORESET 2420-2).

The one or more configuration parameters 2415 may indicate a plurality of CORESET indicators/indexes (e.g., provided by a higher layer parameter ControlResourceSetId) for the plurality of CORESETs. Each CORESET of the plurality of CORESETs may be identified/indicated by a respective CORESET indicator/index of the plurality of CORESET indicators/indexes. The first CORESET of the plurality of CORESETs may be identified by a first CORESET index of the plurality of CORESET indexes. The second CORESET of the plurality of CORESETs may be identified/indicated by a second CORESET index of the plurality of CORESET indexes. A CORESET index may be a CORESET identifier/indicator.

The first CORESET and the second CORESET may be the same. The first CORESET index and the second CORESET index may be the same. The plurality of CORESETs may comprise one or more CORESETs. The first CORESET and the second CORESET may be different. The first CORESET index and the second CORESET index may be different.

The one or more configuration parameters 2415 may indicate a plurality of search space sets, e.g., for the downlink BWP of the cell (e.g., by a higher layer parameter SearchSpace). The one or more configuration parameters 2415 may indicate a plurality of search space sets, e.g., for the cell (e.g., by a higher layer parameter SearchSpace).

The one or more configuration parameters 2415 may indicate search space set indexes/identifiers (e.g., provided by a higher layer parameter searchSpaceId) for the plurality of search space sets. Each search space set of the plurality of search space sets may be identified/indicated by a respective search space set index of the search space set indexes. A first search space set of the plurality of search space sets may be identified/indicated by a first search space set index of the search space set indexes. A second search space set of the plurality of search space sets may be identified/indicated by a second search space set index of the search space set indexes.

The one or more configuration parameters 2415 may indicate PDCCH monitoring periodicities (e.g., parameter monitoringSlotPeriodicityAndOffset) for the plurality of search space sets. The one or more configuration parameters 2415 may indicate a respective PDCCH monitoring periodicity of the PDCCH monitoring periodicities (e.g., monitoringSlotPeriodicityAndOffset) for each search space set of the plurality of search space sets. The one or more configuration parameters 2415 may indicate a first PDCCH monitoring periodicity (e.g., 2 slots, or any other first quantity of slots) of the PDCCH monitoring periodicities for a first search space set of the plurality of search space sets. The one or more configuration parameters 2415 may indicate a second PDCCH monitoring periodicity (e.g., 10 slots, or any other second quantity of slots) of the PDCCH monitoring periodicities for a second search space set of the plurality of search space sets.

The one or more configuration parameters 2415 may indicate PDCCH candidates (e.g., parameter nrofCandidates) for the plurality of search space sets. The one or more configuration parameters 2415 may indicate respective PDCCH candidate(s) of the PDCCH candidates for each search space set of the plurality of search space sets. The one or more configuration parameters 2415 may indicate first PDCCH candidate(s) (e.g., AL=1, AL=4, or any other AL) of the PDCCH candidates for a first search space set of the plurality of search space sets. The one or more configuration parameters may indicate second PDCCH candidate(s) (e.g., AL=8. AL=16, or any other AL) of the PDCCH candidates for a second search space set of the plurality of search space sets.

A search space set of the plurality of search space sets may be associated with (or linked to) a CORESET of the plurality of CORESETs. The one or more configuration parameters 2415 may indicate the CORESET (or a CORESET index of the CORESET) for the search space set (e.g., provided by a higher layer parameter controlResourceSetId in the higher layer parameter SearchSpace). The association (or the linkage) may be one-to-one. The association being one-to-one may comprise the search space set associated with (or linked to) the CORESET not being associated (or linked to) a second CORESET that is different from the CORESET. The plurality of CORESETs may comprise the second CORESET.

The wireless device 2411 may monitor, for a downlink control signal/channel (e.g., DCI, PDCCH, RS, GC-PDCCH, DMRS, etc.), PDCCH in the CORESET. The monitoring, for the downlink control signal/channel, the PDCCH in the CORESET may comprise monitoring, for the downlink control signal, PDCCH candidate(s) in PDCCH monitoring occasion(s) for/of the search space set associated with (or linked to) the CORESET. The wireless device 2411 may monitor, for DCI, PDCCH candidate(s) in PDCCH monitoring occasion(s) for/of the search space set in the CORESET associated with (or linked to) the search space set, for example, based on the search space set being associated with (or linked to) the CORESET. The wireless device 2411 may monitor, for DCI, PDCCH for the search space set in the CORESET associated with (or linked to) the search space set, for example, based on the search space set being associated with (or linked to) the CORESET.

The wireless device 2411 may monitor, for DCI, downlink control channels in the CORESET. The monitoring, for the DCI, the downlink control channels in the CORESET may comprise monitoring, for the DCI, one or more PDCCH candidates in one or more PDCCH monitoring occasions for/of one or more search space sets associated with the CORESET. The plurality of search space sets may comprise the one or more search space sets. The plurality of PDCCH candidates may comprise the one or more PDCCH candidates. The one or more configuration parameters 2415 may indicate, for the one or more search space sets, the one or more PDCCH candidates. The wireless device 2411 may determine the one or more PDCCH monitoring occasions of the one or more search space sets based on one or more search space set configuration parameters (e.g., IE SearchSpace) of the one or more configuration parameters 2415. The one or more search space set configuration parameters may indicate one or more PDCCH monitoring periodicities (e.g., monitoringSlotPeriodicityAndOffset) for the one or more search space sets. The one or more search space set configuration parameters may indicate a respective PDCCH monitoring periodicity of the one or more PDCCH monitoring periodicities for each search space set of the one or more search space sets. The wireless device 2411 may determine the one or more PDCCH monitoring occasions, for example, based on the one or more PDCCH monitoring periodicities. The one or more search space set configuration parameters may indicate PDCCH monitoring symbols (e.g., monitoringSymbolsWithinSlot) for the one or more search space sets. The one or more search space set configuration parameters may indicate respective PDCCH monitoring symbol(s) of the PDCCH monitoring symbols (e.g., monitoringSymbolsWithinSlot) for each search space set of the one or more search space sets. The wireless device 2411 may determine the one or more PDCCH monitoring occasions, for example, based on the PDCCH monitoring symbols.

The one or more configuration parameters 2415 may indicate the plurality of CORESET indexes for the plurality of search space sets (e.g., provided by a higher layer parameter controlResourceSetId in the higher layer parameter SearchSpace). Each search space set of the plurality of search space sets may be associated with (or linked to) a respective CORESET, of the plurality of CORESETs, identified by a respective CORESET index of the plurality of CORESET indexes. The one or more configuration parameters 2415 may indicate the first CORESET index of the first CORESET for the first search space set. The one or more configuration parameters 2415 may indicate the first CORESET index of the first CORESET in a first CORESET index field (e.g., provided by a higher layer parameter controlResourceSetId in the higher layer parameter SearchSpace) of the first search space set. The first search space set may be associated with (or linked to) the first CORESET, for example, based on the one or more configuration parameters 2415 indicating the first CORESET index of the first CORESET for the first search space set. The one or more configuration parameters 2415 may indicate the first CORESET index of the first CORESET for the second search space set. The one or more configuration parameters 2415 may indicate the first CORESET index of the first CORESET in a second CORESET index field (e.g., provided by a higher layer parameter controlResourceSetId in the higher layer parameter SearchSpace) of the second search space set. The second search space set may be associated with (or linked to) the first CORESET, for example, based on the one or more configuration parameters indicating the first CORESET index of the first CORESET for the second search space set. The one or more configuration parameters 2415 may indicate the second CORESET index of the second CORESET for the first search space set. The first search space set may be associated with (or linked to) the second CORESET, for example, based on the one or more configuration parameters indicating the second CORESET index of the second CORESET for the first search space set. The one or more configuration parameters 2415 may indicate the second CORESET index of the second CORESET for the second search space set. The second search space set may be associated with (or linked to) the second CORESET, for example, based on the one or more configuration parameters indicating the second CORESET index of the second CORESET for the second search space set.

One or more first search space sets, of the plurality of search space sets, may be associated with (or linked to) the first CORESET. The one or more configuration parameters 2415 may indicate the first CORESET (or the first CORESET index of the first CORESET) for the one or more first search space sets. The one or more configuration parameters 2415 may indicate, for the first CORESET, the one or more first search space sets. One or more second search space sets of the plurality of search space sets may be associated with (or linked to) the second CORESET. The one or more configuration parameters 2415 may indicate the second CORESET (or the second CORESET index of the second CORESET) for the one or more second search space sets. The one or more configuration parameters 2415 may indicate, for the second CORESET, the one or more second search space sets.

The wireless device 2411 may monitor, for DCI, the PDCCH candidates in the plurality of CORESETs. The wireless device 2411 may monitor, for the DCI, the PDCCH candidates in PDCCH monitoring occasions for/of the plurality of search space sets associated with the plurality of CORESETs. The wireless device 2411 may monitor, for DCI, one or more first PDCCH candidates in the first CORESET. The wireless device 2411 may monitor, for the DCI, the one or more first PDCCH candidates in one or more first PDCCH monitoring occasions. The one or more first PDCCH monitoring occasions may be for/of the one or more first search space sets associated with the first CORESET. The one or more configuration parameters 2415 may indicate, for the one or more first search space sets, the one or more first PDCCH candidates. The PDCCH candidates may comprise the one or more first PDCCH candidates. The wireless device may monitor, for DCI, one or more second PDCCH candidates in the second CORESET. The wireless device may monitor, for the DCI, the one or more second PDCCH candidates in one or more second PDCCH monitoring occasions. The one or more second PDCCH monitoring occasions may be for/of the one or more second search space sets associated with the second CORESET. The one or more configuration parameters 2415 may indicate, for the one or more second search space sets, the one or more second PDCCH candidates. The PDCCH candidates may comprise the one or more second PDCCH candidates.

The one or more configuration parameters 2415 may indicate a control channel repetition (e.g., PDCCH repetition/aggregation). The one or more configuration parameters 2415 may comprise a control channel repetition enabling parameter that enables (or activates, indicates, configures) the control channel repetition. The control channel repetition may comprise a repetition of a downlink control signal/channel (e.g., PDCCH, DCI).

The one or more configuration parameters 2415 may indicate a number/quantity of repetitions for the control channel repetition. The one or more configuration parameters 2415 may indicate the quantity of repetitions of the control channel repetition for the plurality of CORESETs. The one or more configuration parameters 2415 may indicate the quantity of repetitions of the control channel repetition for each CORESET of the plurality of CORESETs.

The one or more configuration parameters 2415 may indicate, for the control channel repetition, a respective quantity of repetitions for each CORESET of the plurality of CORESETs.

The one or more configuration parameters 2415 may indicate the quantity of repetitions of the control channel repetition for the plurality of search space sets of the plurality of CORESETs. The one or more configuration parameters 2415 may indicate the quantity of repetitions of the control channel repetition for respective search space set(s) of each CORESET of the plurality of CORESETs. The one or more configuration parameters 2415 may indicate the quantity of repetitions of the control channel repetition for at least one search space set of the plurality of search space sets. The one or more configuration parameters 2415 may indicate, for the control channel repetition, a respective quantity of repetitions for each search space set of the plurality of search space sets.

The one or more configuration parameters 2415 may indicate the quantity of repetitions of the control channel repetition for the PDCCH candidates. The one or more configuration parameters 2415 may indicate the quantity of repetitions of the control channel repetition for respective PDCCH candidate(s) of each search space set of the plurality of search space sets. The one or more configuration parameters 2415 may indicate the quantity of repetitions of the control channel repetition for at least one PDCCH candidate of the PDCCH candidates. The one or more configuration parameters 2415 may indicate, for the control channel repetition, a respective quantity of repetitions for each PDCCH candidate of the PDCCH candidates.

The one or more configuration parameters 2415 may indicate the plurality of CORESETs for the control channel repetition. The one or more configuration parameters 2415 may link/map/associate the plurality of CORESETs for the control channel repetition. The one or more configuration parameters 2415 may indicate, for the control channel repetition, the first CORESET and the second CORESET. The one or more configuration parameters 2415 may link/map/associate, for the control channel repetition, the first CORESET and the second CORESET (e.g., linkage 2425). The first CORESET may be mapped/linked to (or associated with) the second CORESET for the control channel repetition. The wireless device 2411 may monitor, for the control channel repetition (e.g., DCI repetition), PDCCH in the first CORESET and the second CORESET.

The one or more configuration parameters 2415 may indicate the plurality of search space sets for the control channel repetition. The one or more configuration parameters 2415 may link/map/associate the plurality of search space sets for the control channel repetition. A first search space set of the plurality of search space sets (or of the first CORESET) may be mapped/linked to (or associated with) a second search space set of the plurality of search space sets (or of the second CORESET) for the control channel repetition. The one or more first search space sets of (or associated with, or linked to) the first CORESET may comprise the first search space set. The one or more second search space sets of (or associated with or linked to) the second CORESET may comprise the second search space set. The one or more configuration parameters 2415 may indicate, for the control channel repetition, the first search space set and the second search space set. The one or more configuration parameters 2415 may link/map/associate, for the control channel repetition, the first search space set and the second search space set. The wireless device 2411 may monitor, for the control channel repetition (e.g., DCI repetition), PDCCH in the first search space set and the second search space set. The wireless device 2411 may monitor, for the control channel repetition (e.g., DCI repetition), PDCCH candidates in/of/for the first search space set and in/of/for the second search space set.

The one or more configuration parameters 2415 may indicate the PDCCH candidates for the control channel repetition. The one or more configuration parameters 2415 may link/map/associate the PDCCH candidates for the control channel repetition. A first PDCCH candidate of the PDCCH candidates may be mapped/linked to (or associated with), for the control channel repetition, a second PDCCH candidate of the PDCCH candidates. The one or more first PDCCH candidates of the first CORESET (or of/associated with the one or more first search space sets of the first CORESET) may comprise the first PDCCH candidate. A first search space set of the one or more first search space sets of the first CORESET may be associated with the first PDCCH candidate. The one or more configuration parameters 2415 may indicate, for the first search space set, the first PDCCH candidate. The wireless device 2411 may monitor, for DCI, the first PDCCH candidate of/for the first search space set in the first CORESET. First PDCCH candidate(s) of the first search space set may comprise the first PDCCH candidate. The one or more first PDCCH candidates may comprise the first PDCCH candidate(s) of the first search space set. The one or more second PDCCH candidates of the second CORESET (or of/associated with the one or more second search space sets of the second CORESET) may comprise the second PDCCH candidate. A second search space set of the one or more second search space sets of the second CORESET may be associated with the second PDCCH candidate. The one or more configuration parameters 2415 may indicate, for the second search space set, the second PDCCH candidate. The wireless device 2411 may monitor, for DCI, the second PDCCH candidate of/for the second search space set in the second CORESET. Second PDCCH candidate(s) of the second search space set may comprise the second PDCCH candidate. The one or more second PDCCH candidates may comprise the second PDCCH candidate(s) of the second search space set. The wireless device 2411 may monitor, for the control channel repetition (e.g., DCI repetition), the first PDCCH candidate and the second PDCCH candidate. The wireless device 2411 may monitor the first PDCCH candidate in at least one first PDCCH monitoring occasion. The one or more first PDCCH monitoring occasions may comprise the at least one first PDCCH monitoring occasion. The wireless device 2411 may monitor the second PDCCH candidate in at least one second PDCCH monitoring occasion. The one or more second PDCCH monitoring occasions may comprise the at least one second PDCCH monitoring occasion.

The one or more configuration parameters 2415 may indicate, for the control channel repetition, the first PDCCH candidate and the second PDCCH candidate. The one or more configuration parameters 2415 may link/map/associate, for the control channel repetition, the first PDCCH candidate and the second PDCCH candidate.

The wireless device 2411 may determine, for the control channel repetition, the first PDCCH candidate and the second PDCCH candidate. The wireless device 2411 may determine, for the control channel repetition, the first PDCCH candidate and the second PDCCH candidate, for example, based on a first PDCCH candidate indicator/index of the first PDCCH candidate and a second PDCCH candidate indicator/index of the second PDCCH candidate being the same. The one or more configuration parameters 2415 may indicate, for the first PDCCH candidate, the first PDCCH candidate indicator/index. The one or more configuration parameters 2415 may indicate, for the second PDCCH candidate, the second PDCCH candidate indicator/index. The wireless device 2411 may determine, for the control channel repetition, the first PDCCH candidate and the second PDCCH candidate, for example, based on a first CCE starting indicator/index of the first PDCCH candidate and a second CCE starting indicator/index of the second PDCCH candidate being the same. The one or more configuration parameters 2415 may indicate, for the first PDCCH candidate, the first CCE starting indicator/index. The one or more configuration parameters 2415 may indicate, for the second PDCCH candidate, the second CCE starting indicator/index.

The wireless device 2411 may receive a message indicating a quantity/number of repetitions for the control channel repetition. For example, the wireless device 2411 may receive DCI indicating a quantity of repetitions for the control channel repetition. The DCI may comprise a field (e.g., DCI subframe/slot repetition number field) indicating the quantity of repetitions.

The base station 2410 may send/transmit a plurality of DCI messages/PDCCH transmissions (e.g., DCI 2430-1 and DCI 2430-2) for the repetition of a downlink control signal/channel (e.g., a PDCCH transmission, a DCI message via a PDCCH). The plurality of DCI messages/PDCCH transmissions may comprise the repetitions of the downlink control signal/channel. The wireless device 2411 may monitor, for the plurality of DCI messages/PDCCH transmissions (or for the repetition of the downlink control signal/channel), the PDCCH candidates in the plurality of CORESETs.

The quantity/number of repetitions may be a quantity/number of repetitions of the downlink control signal/channel A quantity/number of the plurality of DCI messages/PDCCH transmissions may be equal to the quantity/number of repetitions. The quantity/number of repetitions may be equal to 2 as shown in FIG. 24. The quantity/number of repetitions may be equal to any other value. The plurality of DCI messages/PDCCH transmissions may comprise a first downlink control signal/channel (e.g., DCI 2430-1) and a second downlink control signal/channel (e.g., DCI 2430-2).

The wireless device 2411 may be served by/communicate with (e.g., receive signals from and/or transmit signals to) a plurality of TRPs (e.g., TRP 1 and TRP 2). Each downlink control signal/channel of the plurality of DCI messages/PDCCH transmissions may be sent/transmitted by a respective TRP of the plurality of TRPs. For example, in FIG. 24, a first TRP (e.g., TRP 1), of the plurality of TRPs, may send/transmit the first downlink control signal/channel (e.g., DCI 2430-1) and a second TRP (e.g., TRP 2) of the plurality of TRPs may transmit the second downlink control signal/channel (e.g., DCI 2430-2).

Each downlink control signal/channel of the plurality of DCI messages/PDCCH transmissions may be the same (or may have the same content). For example, each downlink control signal/channel may comprise the same DCI fields, the same DCI size, the same payload, same value for the DCI fields, etc. Each downlink control signal/channel of the plurality of DCI messages/PDCCH transmissions may be same as the downlink control signal/channel Each downlink control signal/channel of the plurality of DCI messages/PDCCH transmissions may be a repetition of the downlink control signal/channel. The plurality of DCI messages/PDCCH transmissions may be repetitions of the downlink control signal/channel. The base station 2410 may repeat transmission of the downlink control signal/channel by transmitting the plurality of DCI messages/PDCCH transmissions. For example, in FIG. 24, DCI 2430-1 and DCI 2430-2 may be the same (or equal). The contents of the DCI 2430-1 and DCI 2430-2 may be the same. The payload of the DCI 2430-1 and DCI 2430-2 may be the same. The DCI fields (or the values of the DCI fields) of the DCI 2430-1 and DCI 2430-2 may be the same.

The first downlink control signal/channel (e.g., DCI 2430-1) and the second downlink control signal/channel (e.g., DCI 2430-2) may be the same (e.g., may comprise same content, same DCI fields, the same DCI size, the same payload, same value for the DCI fields, etc.). The first downlink control signal/channel and the second downlink control signal/channel may be the same as the downlink control signal/channel. The first downlink control signal/channel may be the downlink control signal/channel. The second downlink control signal/channel may be the downlink control signal/channel. The first downlink control signal/channel and the second downlink control signal/channel may be repetitions of the downlink control signal/channel.

The base station 2410 may send/transmit, for the repetition of the downlink control signal/channel, the plurality of DCI messages/PDCCH transmissions via/in the plurality of CORESETs. The base station 2410 may send/transmit each downlink control signal/channel, of the plurality of DCI messages/PDCCH transmissions, via a respective CORESET of the plurality of CORESETs. The transmitting, for the repetition of the downlink control signal/channel, the plurality of DCI messages/PDCCH transmissions via/in the plurality of CORESETs may comprise transmitting (repetition of) the downlink control signal/channel via/in the plurality of CORESETs. The transmitting, for the repetition of the downlink control signal/channel, the plurality of DCI messages/PDCCH transmissions via/in the plurality of CORESETs may comprise repeating transmission of the downlink control signal/channel via/in the plurality of CORESETs.

The base station 2410 may send/transmit the first downlink control signal/channel (e.g., DCI 2430-1) via the first CORESET (e.g., CORESET 2420-1). The base station 2410 may send/transmit the second downlink control signal/channel (e.g., DCI 2430-2) via the second CORESET (e.g., CORESET 2420-1). The base station 2410 may send/transmit, for the repetition of the downlink control signal/channel, the plurality of DCI messages/PDCCH transmissions via/in the first CORESET and the second CORESET. The base station 2410 may send/transmit each downlink control signal/channel of the plurality of DCI messages/PDCCH transmissions via a respective CORESET of the first CORESET and the second CORESET. The transmitting, for the repetition of the downlink control signal/channel, the plurality of DCI messages/PDCCH transmissions via/in the first CORESET and the second CORESET may comprise transmitting the downlink control signal/channel via/in the first CORESET and the second CORESET. The transmitting, for the repetition of the downlink control signal/channel, the plurality of DCI messages/PDCCH transmissions via/in the first CORESET and the second CORESET may comprise repeating transmission of the downlink control signal/channel via/in the first CORESET and the second CORESET.

The base station 2410 may send/transmit, for the repetition of the downlink control signal/channel, the plurality of DCI messages/PDCCH transmissions via/in the plurality of search space sets associated with the plurality of CORESETs. The base station 2410 may send/transmit, for the repetition of the downlink control signal/channel, each downlink control signal/channel of the plurality of DCI messages/PDCCH transmissions via/in a respective search space set of the plurality of search space sets. The base station 2410 may transmit the first downlink control signal/channel (e.g., DCI 2430-1) via the one or more first search space sets associated with the first CORESET (e.g., CORESET 2420-1). The base station 2410 may transmit the second downlink control signal/channel (e.g., DCI 2430-2) via the one or more second search space sets associated with the second CORESET (e.g., CORESET 2420-2). The base station 2410 may transmit the first downlink control signal/channel via the first search space set associated with the first CORESET. The base station may transmit the second downlink control signal/channel via the second search space set associated with the second CORESET.

The base station 2410 may send/transmit, for the repetition of the downlink control signal/channel, each downlink control signal/channel of the plurality of DCI messages/PDCCH transmissions via/in a respective search space set of the plurality of search space sets. The base station 2410 may send/transmit, for the repetition of the downlink control signal/channel, the plurality of DCI messages/PDCCH transmissions, for example, via/in the one or more first search space sets associated with the first CORESET and via/in the one or more second search space sets associated with the second CORESET. The base station 2410 may send/transmit, for the repetition of the downlink control signal/channel, the plurality of DCI messages/PDCCH transmissions, for example, via/in the first search space set associated with the first CORESET and via/in the second search space set associated with the second CORESET.

The base station 2410 may send/transmit, for the repetition of the downlink control signal/channel, the plurality of DCI messages/PDCCH transmissions via/in the PDCCH candidates of (or associated with) the plurality of search space sets. The base station 2410 may send/transmit, for the repetition of the downlink control signal/channel, each downlink control signal/channel of the plurality of DCI messages/PDCCH transmissions via/in a respective PDCCH candidate of the PDCCH candidates. The base station 2410 may transmit the first downlink control signal/channel (e.g., DCI 2430-1) via/in the first PDCCH candidate(s) of the first search space set associated with the first CORESET (e.g., CORESET 2420-1). The base station 2410 may transmit the second downlink control signal/channel (e.g., DCI 2430-2) via the second PDCCH candidate(s) of the second search space set associated with the second CORESET (e.g., CORESET 2420-2). The base station 2410 may transmit the first downlink control signal/channel via/in the one or more first PDCCH candidates of (or associated with) the first CORESET. The base station 2410 may transmit the second downlink control signal/channel via the one or more second PDCCH candidates of (or associated with) the second CORESET. The base station 2410 may transmit the first downlink control signal/channel via/in the first PDCCH candidate of (or associated with) the first search space set. The base station 2410 may transmit the second downlink control signal/channel via the second PDCCH candidate of (or associated with) the second search space set.

The base station 2410 may send/transmit, for repetition of the downlink control signal/channel, each downlink control signal/channel of the plurality of DCI messages/PDCCH transmissions via/in a respective PDCCH candidate of the PDCCH candidates. The base station 2410 may transmit, for the repetition of the downlink control signal/channel, the plurality of DCI messages/PDCCH transmissions, for example, via/in the first PDCCH candidate associated with the first CORESET (or associated with the first search space set of the first CORESET) and via/in the second PDCCH candidate associated with the second CORESET (or associated with the second search space set of the second CORESET).

The base station 2410 may send/transmit the first downlink control signal/channel via the first CORESET. The base station may transmit the first downlink control signal/channel via the one or more first search space sets associated with the first CORESET. The base station 2410 may transmit the first downlink control signal/channel via the first search space set associated with the first CORESET. The base station 2410 may transmit the first downlink control signal/channel via the first PDCCH candidate associated with the first CORESET. The base station 2410 may transmit the second downlink control signal/channel via the second CORESET. The base station 2410 may transmit the second downlink control signal/channel via the one or more second search space sets associated with the second CORESET. The base station 2410 may transmit the second downlink control signal/channel via the second search space set associated with the second CORESET. The base station 2410 may transmit the second downlink control signal/channel via the second PDCCH candidate associated with the second CORESET.

The wireless device 2411 may monitor, for the plurality of DCI messages/PDCCH transmissions (or for the repetitions of the downlink control signal/channel), the plurality of CORESETs. The wireless device 2411 may monitor, for each downlink control signal/channel of the plurality of DCI messages/PDCCH transmissions, a respective CORESET of the plurality of CORESETs. The monitoring, for the plurality of DCI messages/PDCCH transmissions (or for the repetitions of the downlink control signal/channel), the plurality of CORESETs may comprise monitoring, for (repetitions of) the downlink control signal/channel, the plurality of CORESETs. The monitoring, for the plurality of DCI messages/PDCCH transmissions (or the repetitions of the downlink control signal/channel), the plurality of CORESETs may comprise monitoring, for repetition of the downlink control signal/channel, the plurality of CORESETs.

The wireless device 2411 may monitor, for the first downlink control signal/channel, the first CORESET. The wireless device 2411 may monitor, for the second downlink control signal/channel, the second CORESET. The wireless device 2411 may monitor, for the plurality of DCI messages/PDCCH transmissions (or for the repetition of the downlink control signal/channel), the first CORESET and the second CORESET. The wireless device 2411 may monitor, for each downlink control signal/channel of the plurality of DCI messages/PDCCH transmissions, a respective CORESET of the first CORESET and the second CORESET. The monitoring, for the plurality of DCI messages/PDCCH transmissions (or for the repetition of the downlink control signal/channel), the first CORESET and the second CORESET may comprise monitoring, for the downlink control signal/channel, the first CORESET and the second CORESET. The monitoring, for the plurality of DCI messages/PDCCH transmissions (or for the repetition of the downlink control signal/channel), the first CORESET and the second CORESET may comprise monitoring, for repetition (or repeated transmissions) of the downlink control signal/channel, the first CORESET and the second CORESET.

The wireless device 2411 may monitor, for the plurality of DCI messages/PDCCH transmissions (or the repetitions of the downlink control signal/channel), the plurality of search space sets associated with the plurality of CORESETs. The wireless device 2411 may monitor, for each downlink control signal/channel of the plurality of DCI messages/PDCCH transmissions, a respective search space set of the plurality of search space sets for the repetition of the downlink control signal/channel. The wireless device 2411 may monitor, for the first downlink control signal/channel (e.g., DCI 2430-1), the first CORESET (e.g., CORESET 2420-1). The wireless device 2411 may monitor, for the first downlink control signal/channel, the one or more first search space sets associated with the first CORESET. The wireless device 2411 may monitor, for the second downlink control signal/channel (e.g., DCI 2430-2), the second CORESET (e.g., CORESET 2420-2). The wireless device 2411 may monitor, for the second downlink control signal/channel, the one or more second search space sets associated with the second CORESET. The wireless device 2411 may monitor, for the first downlink control signal/channel, the first search space set associated with the first CORESET. The wireless device 2411 may monitor, for the second downlink control signal/channel, the second search space set associated with the second CORESET.

The wireless device 2411 may monitor, for each downlink control signal/channel of the plurality of DCI messages/PDCCH transmissions (or for the repetitions of the downlink control signal/channel), a respective search space set of the plurality of search space sets. The wireless device 2411 may monitor, for the plurality of DCI messages/PDCCH transmissions (or for the repetitions of the downlink control signal/channel), the one or more first search space sets associated with the first CORESET and the one or more second search space sets associated with the second CORESET. The wireless device 2411 may monitor, for the plurality of DCI messages/PDCCH transmissions (or for the repetitions of the downlink control signal/channel), the first search space set associated with the first CORESET and the second search space set associated with the second CORESET.

Monitoring for the plurality of DCI messages/PDCCH transmissions may comprise/be monitoring for repetitions of the downlink control signal/channel. The monitoring for the plurality of DCI messages/PDCCH transmissions may comprise/be monitoring for repetitions of the downlink control signal/channel, for example, based on each downlink control signal/channel of the plurality of DCI messages/PDCCH transmissions being the same.

The wireless device 2411 may monitor, for the plurality of DCI messages/PDCCH transmissions (or for the repetitions of the downlink control signal/channel), the PDCCH candidates of (or associated with) the plurality of search space sets. The wireless device 2411 may monitor, for each downlink control signal/channel of the plurality of DCI messages/PDCCH transmissions, a respective PDCCH candidate of the PDCCH candidates for the repetition of the downlink control signal/channel. The wireless device 2411 may monitor, for the first downlink control signal/channel (e.g., DCI 2430-1), the first PDCCH candidate(s) of the first search space set associated with the first CORESET (e.g., CORESET 2420-1). The wireless device 2411 may monitor, for the second downlink control signal/channel (e.g., DCI 2430-2), the second PDCCH candidate(s) of the second search space set associated with the second CORESET (e.g., CORESET 2420-2). The wireless device 2411 may monitor, for the first downlink control signal/channel, the one or more first PDCCH candidates of (or associated with) the first CORESET. The wireless device 2411 may monitor, for the second downlink control signal/channel, the one or more second PDCCH candidates of (or associated with) the second CORESET. The wireless device 2411 may monitor, for the first downlink control signal/channel, the first PDCCH candidate of (or associated with) the first search space set. The wireless device 2411 may monitor, for the second downlink control signal/channel, the second PDCCH candidate of (or associated with) the second search space set.

The wireless device 2411 may monitor, for each downlink control signal/channel of the plurality of DCI messages/PDCCH transmissions (or for repetitions of the downlink control signal/channel), a respective PDCCH candidate of the PDCCH candidates. The wireless device 2411 may monitor, for the plurality of DCI messages/PDCCH transmissions (or for the repetitions of the downlink control signal/channel), the first PDCCH candidate associated with the first CORESET (or associated with the first search space set of the first CORESET) and the second PDCCH candidate associated with the second CORESET (or associated with the second search space set of the second CORESET).

The wireless device 2411 may monitor, for the first downlink control signal/channel (e.g., DCI 2430-1), the first CORESET (e.g., CORESET 2420-1). The wireless device 2411 may monitor, for the first downlink control signal/channel, the one or more first search space sets associated with the first CORESET. The wireless device 2411 may monitor, for the first downlink control signal/channel, the first search space set associated with the first CORESET. The wireless device 2411 may monitor, for the first downlink control signal/channel, the first PDCCH candidate associated with the first CORESET. The wireless device 2411 may monitor, for the second downlink control signal/channel (e.g., DCI 2430-2), the second CORESET (e.g., CORESET 2420-2). The wireless device 2411 may monitor, for the second downlink control signal/channel, the one or more second search space sets associated with the second CORESET. The wireless device 2411 may monitor, for the second downlink control signal/channel, the second search space set associated with the second CORESET. The wireless device 2411 may monitor, for the second downlink control signal/channel, the second PDCCH candidate associated with the second CORESET.

The wireless device 2411 may determine a plurality of downlink control signal/channel transmission/repetition occasions (e.g., PDCCH transmission/repetition/monitoring occasions) for the control channel repetition. The wireless device 2411 may determine the plurality of downlink control signal/channel transmission/repetition occasions for the repetition of the downlink control signal/channel.

The base station 2410 may determine the plurality of downlink control signal/channel transmission/repetition occasions (e.g., PDCCH transmission/repetition/monitoring occasions) for the control channel repetition. The base station 2410 may determine the plurality of downlink control signal/channel transmission/repetition occasions for the repetition of the downlink control signal/channel.

The base station 2410 may send/transmit, via the plurality of CORESETs, the plurality of DCI messages/PDCCH transmissions (or the repetitions of the downlink control signal/channel or the downlink control signal/channel) across/over/on/in the plurality of downlink control signal/channel transmission/repetition occasions (e.g., PDCCH transmission/repetition/monitoring occasion 2432-1 and PDCCH transmission/repetition/monitoring occasion 2432-2). The base station 2410 may transmit, via the plurality of CORESETs, the downlink control signal/channel across/over/on/in the plurality of downlink control signal/channel transmission/repetition occasions. The base station 2410 may transmit, via each CORESET of the plurality of CORESETs, the downlink control signal/channel across/over/on/in respective downlink control signal/channel transmission/repetition occasion(s) of the plurality of downlink control signal/channel transmission/repetition occasions. The base station 2410 may transmit, via the first CORESET, the downlink control signal/channel across/over/on/in one or more first downlink control signal/channel transmission/repetition occasions of the plurality of downlink control signal/channel transmission/repetition occasions. The base station 2410 may transmit, via the second CORESET, the downlink control signal/channel across/over/on/in one or more second downlink control signal/channel transmission/repetition occasions of the plurality of downlink control signal/channel transmission/repetition occasions. The base station 2410 may repeat transmission of the downlink control signal/channel across/over/on/in the plurality of downlink control signal/channel transmission/repetition occasions. The plurality of downlink control signal/channel transmission/repetition occasions may comprise a first downlink control signal/channel transmission/repetition occasion (e.g., PDCCH transmission/repetition/monitoring occasion 2432-1) and a second downlink control signal/channel transmission/repetition occasion (e.g., PDCCH transmission/repetition/monitoring occasion 2432-2). The base station 2410 may transmit, via the first CORESET, the first downlink control signal/channel (e.g., a repetition of the downlink control signal/channel) in the first downlink control signal/channel transmission/repetition occasion. The base station 2410 may transmit, via the second CORESET, the second downlink control signal/channel (e.g., a repetition of the downlink control signal/channel) in the second downlink control signal/channel transmission/repetition occasion. The one or more first downlink control signal/channel transmission/repetition occasions may comprise the first downlink control signal/channel transmission/repetition occasion. The one or more second downlink control signal/channel transmission/repetition occasions may comprise the second downlink control signal/channel transmission/repetition occasion.

The base station may alternate between CORESETs, of the plurality of CORESETs, for sending/transmitting the plurality of DCI messages/PDCCH transmissions across/over/on/in the plurality of downlink control signal/channel transmission/repetition occasions. For example, the plurality of downlink control signal/channel transmission/repetition occasions may comprise a first downlink control signal/channel transmission/repetition occasion (e.g., PDCCH transmission/repetition/monitoring occasion 2432-1), a second downlink control signal/channel transmission/repetition occasion (e.g., PDCCH transmission/repetition/monitoring occasion 2432-2), and a third downlink control signal/channel transmission/repetition occasion (e.g., PDCCH transmission/repetition/monitoring occasion 3, not shown in FIG. 24). The base station 2410 may transmit, via the first CORESET, the first downlink control signal/channel (e.g., a repetition of the downlink control signal/channel) in the first downlink control signal/channel transmission/repetition occasion. The base station 2410 may transmit, via the second CORESET, the second downlink control signal/channel (e.g., a repetition of the downlink control signal/channel) in the second downlink control signal/channel transmission/repetition occasion. The base station 2410 may transmit, via the first CORESET, a third downlink control signal/channel (e.g., a repetition of the downlink control signal/channel) in the third downlink control signal/channel transmission/repetition occasion. The one or more first downlink control signal/channel transmission/repetition occasions may comprise the first downlink control signal/channel transmission/repetition occasion and the third downlink control signal/channel transmission/repetition occasion. The one or more second downlink control signal/channel transmission/repetition occasions may comprise the second downlink control signal/channel transmission/repetition occasion.

The plurality of downlink control signal/channel transmission/repetition occasions may comprise/be the at least one first PDCCH monitoring occasion and the at least one second PDCCH monitoring occasion. The sending/transmitting, via the plurality of CORESETs, the plurality of DCI messages/PDCCH transmissions (or the repetitions of the downlink control signal/channel) across/over/on/in the plurality of downlink control signal/channel transmission/repetition occasions may comprise sending/transmitting, via the plurality of search space sets associated with the plurality of CORESETs, the plurality of DCI messages/PDCCH transmissions (or the repetitions of the downlink control signal/channel) across/over/on/in the plurality of downlink control signal/channel transmission/repetition occasions. The base station 2410 may send/transmit, via each search space set of the plurality of search space sets, the downlink control signal/channel across/over/on/in respective downlink control signal/channel transmission/repetition occasion(s) of the plurality of downlink control signal/channel transmission/repetition occasions. The base station 2410 may send/transmit, via the first search space set, the first downlink control signal/channel in the first downlink control signal/channel transmission/repetition occasion. The base station 2410 may send/transmit, via the second search space set, the second downlink control signal/channel in the second downlink control signal/channel transmission/repetition occasion.

The sending/transmitting, via the plurality of CORESETs, the plurality of DCI messages/PDCCH transmissions (or the repetitions of the downlink control signal/channel) across/over/on/in the plurality of downlink control signal/channel transmission/repetition occasions may comprise sending/transmitting, via the PDCCH candidates associated with the plurality of CORESETs, the plurality of DCI messages/PDCCH transmissions (or the repetitions of the downlink control signal/channel) across/over/on/in the plurality of downlink control signal/channel transmission/repetition occasions. The base station 2410 may transmit, via each PDCCH candidate of the PDCCH candidates, the downlink control signal/channel across/over/on/in respective downlink control signal/channel transmission/repetition occasion(s) of the plurality of downlink control signal/channel transmission/repetition occasions. The base station 2410 may transmit, via the first PDCCH candidate, the first downlink control signal/channel in the first downlink control signal/channel transmission/repetition occasion. The base station 2410 may transmit, via the second PDCCH candidate, the second downlink control signal/channel in the second downlink control signal/channel transmission/repetition occasion.

The wireless device 2411 may monitor, for the plurality of DCI messages/PDCCH transmissions (or the repetition of the downlink control signal/channel), the plurality of CORESETs, across/over/on/in the plurality of downlink control signal/channel transmission/repetition occasions (e.g., PDCCH transmission/repetition/monitoring occasion 2432-1 and PDCCH transmission/repetition/monitoring occasion 2432-2). The wireless device 2411 may monitor, for the downlink control signal/channel, the plurality of CORESETs across/over/on/in the plurality of downlink control signal/channel transmission/repetition occasions. The wireless device 2411 may monitor, for the downlink control signal/channel, each CORESET of the plurality of CORESETs across/over/on/in respective downlink control signal/ channel transmission/repetition occasion(s) of the plurality of downlink control signal/channel transmission/repetition occasions. The wireless device 2411 may monitor, for the downlink control signal/channel, the first CORESET across/over/on/in the one or more first downlink control signal/channel transmission/repetition occasions of the plurality of downlink control signal/channel transmission/repetition occasions. The wireless device 2411 may monitor, for the downlink control signal/channel, the second CORESET across/over/on/in the one or more second downlink control signal/channel transmission/repetition occasions of the plurality of downlink control signal/channel transmission/repetition occasions. The wireless device 2411 may monitor, for repetition of the downlink control signal/channel, the plurality of CORESETs across/over/on/in the plurality of downlink control signal/channel transmission/repetition occasions. The plurality of downlink control signal/channel transmission/repetition occasions may comprise a first downlink control signal/channel transmission/repetition occasion (e.g., PDCCH transmission/repetition/monitoring occasion 2432-1) and a second downlink control signal/channel transmission/repetition occasion (e.g., PDCCH transmission/repetition/monitoring occasion 2432-2). The wireless device 2411 may monitor, for the first downlink control signal/channel (or repetition of the downlink control signal/channel), the first CORESET in the first downlink control signal/channel transmission/repetition occasion. The wireless device 2411 may monitor, for the second downlink control signal/channel (or repetition of the downlink control signal/channel), the second CORESET in the second downlink control signal/channel transmission/repetition occasion.

The monitoring, for the plurality of DCI messages/PDCCH transmissions (or the repetitions of the downlink control signal/channel), the plurality of CORESETs across/over/on/in the plurality of downlink control signal/channel transmission/repetition occasions may comprise monitoring, for the plurality of DCI messages/PDCCH transmissions (or the repetitions of the downlink control signal/channel), the plurality of search space sets associated with the plurality of CORESETs, across/over/on/in the plurality of downlink control signal/channel transmission/repetition occasions. The wireless device 2411 may monitor, for the downlink control signal/channel, each search space set of the plurality of search space sets across/over/on/in respective downlink control signal/channel transmission/repetition occasion(s) of the plurality of downlink control signal/channel transmission/repetition occasions. The wireless device 2411 may monitor, for the first downlink control signal/channel, the first search space set in the first downlink control signal/channel transmission/repetition occasion. The wireless device 2411 may monitor, for the second downlink control signal/channel, the second search space set in the second downlink control signal/channel transmission/repetition occasion.

The monitoring, for the plurality of DCI messages/PDCCH transmissions (or the repetitions of the downlink control signal/channel), the plurality of CORESETs across/over/on/in the plurality of downlink control signal/channel transmission/repetition occasions may comprise monitoring, for the plurality of DCI messages/PDCCH transmissions (or the repetitions of the downlink control signal/channel), the PDCCH candidates associated with the plurality of CORESETs across/over/on/in the plurality of downlink control signal/channel transmission/repetition occasions. The wireless device 2411 may monitor, for the downlink control signal/channel, each PDCCH candidate of the PDCCH candidates across/over/on/in respective downlink control signal/channel transmission/repetition occasion(s) of the plurality of downlink control signal/channel transmission/repetition occasions. The wireless device 2411 may monitor, for the first downlink control signal/channel, the first PDCCH candidate in the first downlink control signal/channel transmission/repetition occasion. The wireless device 2411 may monitor, for the second downlink control signal/channel, the second PDCCH candidate in the second downlink control signal/channel transmission/repetition occasion.

The plurality of downlink control signal/channel transmission/repetition occasions may be (or be associated with) a plurality of time slots. Each downlink control signal/channel transmission/repetition occasion of the plurality of downlink control signal/channel transmission/repetition occasions may be a respective time slot of the plurality of time slots. The plurality of time slots may comprise the plurality of downlink control signal/channel transmission/repetition occasions. Each downlink control signal/channel transmission/repetition occasion of the plurality of downlink control signal/channel transmission/repetition occasions may be/occur, for example, in a respective time slot of the plurality of time slots. The first downlink control signal/channel transmission/repetition occasion may be (or be associated with) a first time slot (e.g., slot 1). The wireless device 2411 may monitor, for the downlink control signal/channel (e.g., the first downlink control signal/channel), the first CORESET in the first time slot. The first time slot may comprise the first downlink control signal/channel transmission/repetition occasion. The second downlink control signal/channel transmission/repetition occasion may be a second time slot (e.g., slot 2). The wireless device 2411 may monitor, for the downlink control signal/channel (e.g., the second downlink control signal/channel), the second CORESET in the second time slot. The second time slot may comprise the second downlink control signal/channel transmission/repetition occasion. The plurality of time slots may comprise the first time slot and the second time slot.

The plurality of downlink control channel transmission/repetition occasions may be (or be associated with) a plurality of PDCCH monitoring occasions. Each downlink control signal/channel transmission/repetition occasion of the plurality of downlink control channel transmission/repetition occasions may be, for example, a respective PDCCH monitoring occasion of the plurality of PDCCH monitoring occasions. The first downlink control signal/channel transmission/repetition occasion may be (or be associated with) a first PDCCH monitoring occasion. The wireless device 2411 may monitor, for the downlink control signal/channel (or the first downlink control signal/channel), the first CORESET in the first PDCCH monitoring occasion. The second downlink control signal/channel transmission/repetition occasion may be a second PDCCH monitoring occasion. The wireless device 2411 may monitor, for the downlink control signal/channel (or the second downlink control signal/channel), the second CORESET in the second PDCCH monitoring occasion. The plurality of PDCCH monitoring occasions may comprise the first PDCCH monitoring occasion and the second PDCCH monitoring occasion.

The repetition of the downlink control signal/channel (or transmission of the plurality of DCI messages/PDCCH transmissions) may, for example, be/occur in time units (e.g. TDM-ed). The time units, for example, may or may not be consecutive. A number/quantity of the time units may be equal to the number/quantity of repetitions. The time units, for example, may be time slots. The time units may, for example, be mini-slots. The time units may, for example, be time symbols (e.g., OFDM symbols). The time units may, for example, be sub-frames. The time units, for example, may be monitoring occasions (e.g., PDCCH monitoring occasions) in time. A number/quantity of the plurality of downlink control signal/channel transmission occasions may be equal to the number of repetitions. The plurality of downlink control signal/channel transmission occasions may be/occur in the time units. For example, a first downlink control signal/channel transmission occasion of the plurality of downlink control signal/channel transmission occasions may be/occur in a first time unit of the time units. A second downlink control signal/channel transmission occasion of the plurality of downlink control signal/channel transmission occasions may be/occur in a second time unit of the time units, and so on.

The repetition of the downlink control signal/channel (or transmission of the plurality of DCI messages/PDCCH transmissions) may, for example, be/occur in frequency units (FDM-ed). A number/quantity of the frequency units may be equal to the number of repetitions. The frequency units, for example, may be frequency bands. The frequency units, for example, may be physical resource blocks (PRBs). The frequency units may, for example, be resource-element groups (REGs). The frequency units may, for example, be REG bundles. The frequency units may, for example, be control elements (CEs). The frequency units may, for example, be BWPs. The frequency units may, for example, be cells. A number/quantity of the plurality of downlink control signal/channel transmission occasions may be equal to the number of repetitions. The plurality of downlink control signal/channel transmission occasions may be/occur in the frequency units. For example, a first downlink control signal/channel transmission occasion of the plurality of downlink control signal/channel transmission occasions may be/occur in a first frequency unit of the frequency units. A second downlink control signal/channel transmission occasion of the plurality of downlink control signal/channel transmission occasions may be/occur in a second frequency unit of the frequency units, and so on.

The base station 2410 may send/transmit the plurality of DCI messages/PDCCH transmissions across/over/in the time units. The base station 2410 may send/transmit the plurality of DCI messages/PDCCH transmissions across/over/in the frequency units. The base station 2410 may repeat transmission of the downlink control signal/channel across/over/in the plurality of uplink signal/channel transmission occasions. The base station 2410 may send/transmit the downlink control signal/channel with the quantity/number of repetitions. The base station 2410 may send/transmit the quantity of repetitions of the downlink control signal/channel. The plurality of downlink control signal/channel transmission occasions may comprise a first downlink control signal/channel transmission occasion (first TX occasion) and a second downlink control signal/channel transmission occasion (second TX occasion). The first downlink control signal/channel transmission occasion may be/occur in a first time unit of the time units (e.g., first time slot, first symbol, first subframe, first PDCCH monitoring occasion). The second downlink control signal/channel transmission occasion may be/occur in a second time unit of the time units (e.g., second time slot, second symbol, second subframe, second PDCCH monitoring occasion). The first downlink control signal/channel transmission occasion may be/occur in a first frequency unit of the frequency units (e.g., first PRB, first cell, first frequency, first BWP, first subband, first REG bundle, first CE). The second downlink control signal/ channel transmission occasion may be/occur in a second frequency unit of the frequency units (e.g., second PRB, second cell, second frequency, second BWP, second subband, second REG bundle, second CE).

The one or more configuration parameters may indicate a repetition scheme (e.g., by a higher layer parameter RepetitionSchemeConfig, FDM-Scheme, TDM-Scheme, SDM-Scheme, CDM-Scheme) for the control channel repetition. The repetition scheme, for example, may be a time domain repetition scheme, a frequency domain repetition scheme, or a spatial/code domain repetition scheme. The wireless device 2411 may monitor, for the plurality of DCI messages/ PDCCH transmissions, the plurality of CORESETs across/ over/in the plurality of downlink control signal/channel transmission occasions based on the one or more configuration parameters indicating the repetition scheme.

The repetition scheme may be a time domain repetition scheme (e.g., TDM scheme, intra-slot repetition, inter-slot repetition, TDMSchemeA, TDMSchemeB, etc.). The plurality of downlink control signal/channel transmission occasions (e.g., first TX occasion and second TX occasion) may not overlap in time, for example, in the time domain repetition scheme. The plurality of downlink control signal/ channel transmission occasions may or may not overlap in frequency, for example, in the time domain repetition scheme. A downlink control signal/channel transmission occasion (e.g., each downlink control signal/channel transmission occasion) of the plurality of downlink control signal/channel transmission occasions may have a non-overlapping time domain resource allocation with respect to other signal/channel transmission occasion(s) of the plurality of downlink control signal/channel transmission occasions. For example, a first downlink control signal/channel transmission occasion of the plurality of downlink control signal/channel transmission occasions may not overlap, in time, with a second downlink control signal/channel transmission occasion of the plurality of downlink control signal/ channel transmission occasions. The first downlink control signal/channel transmission occasion and the second downlink control signal/channel transmission occasion may be different. The first downlink control signal/channel transmission occasion (first TX occasion) and the second downlink control signal/channel transmission occasion (second TX occasion) may not overlap in time, for example, in the time domain repetition scheme. The plurality of downlink control signal/channel transmission occasions may occur in different time units. For example, the first time unit and the second time unit, and the third time unit may not overlap in time. The first time unit, the second time unit, and the third time unit may be different. FIG. 24 is an example of a time domain repetition scheme. The communication shown in FIG. 24 may be applied to any other type of repetition (e.g., frequency domain repetition, spatial/code domain repetition, etc.).

The repetition scheme may comprise a frequency domain repetition scheme (e.g., FDM scheme, FDMSchemeA, FDMSchemeB, etc). The plurality of downlink control signal/channel transmission occasions may or may not overlap in time, for example, in the frequency domain repetition scheme. The plurality of downlink control signal/channel transmission occasions may not overlap in frequency, for example, in the frequency domain repetition scheme. Each downlink control signal/channel transmission occasion of the plurality of downlink control signal/channel transmission occasions may have a non-overlapping frequency domain resource allocation with respect to other signal/ channel transmission occasion(s) of the plurality of downlink control signal/channel transmission occasions. For example, a first downlink control signal/channel transmission occasion of the plurality of downlink control signal/channel transmission occasions may not overlap, in frequency, with a second downlink control signal/channel transmission occasion of the plurality of downlink control signal/channel transmission occasions. The first downlink control signal/channel transmission occasion and the second downlink control signal/channel transmission occasion may be different. The first downlink control signal/channel transmission occasion (first TX occasion) and the second downlink control signal/channel transmission occasion (second TX occasion) may not overlap in frequency, for example, in the frequency domain repetition scheme. The first downlink control signal/channel transmission occasion (first TX occasion) and the second downlink control signal/channel transmission occasion (second TX occasion) may overlap in time. The plurality of downlink control signal/channel transmission occasions may occur in different frequency units (e.g., frequencies, REGs, CEs, PRBs, frequency bands, bandwidth parts, cells). For example, a first frequency unit of the first downlink control signal/channel transmission occasion and a second frequency unit of the second downlink control signal/channel transmission occasion may not overlap in frequency. The first frequency unit and the second frequency unit may be different.

The repetition scheme may be a spatial/code domain repetition scheme (e.g., SDM scheme, CDM scheme, SDMScheme, CDMScheme, etc.). The plurality of downlink control signal/channel transmission occasions may overlap in time, for example, in the spatial/code domain repetition scheme. The plurality of downlink control signal/channel transmission occasions may overlap in frequency, for example, in the spatial/code domain repetition scheme. The plurality of downlink control signal/channel transmission occasions may be a single downlink control signal/channel transmission occasion, for example, in the spatial/code domain repetition scheme. Each downlink control signal/channel transmission occasion of the plurality of downlink control signal/channel transmission occasions may have an overlapping frequency domain resource allocation with respect to other downlink control signal/channel transmission occasion(s) of the plurality of downlink control signal/channel transmission occasions. Each downlink control signal/channel transmission occasion of the plurality of downlink control signal/channel transmission occasions may have an overlapping time domain resource allocation with respect to other downlink control signal/channel transmission occasion(s) of the plurality of downlink control signal/channel transmission occasions. Each downlink control signal/channel transmission occasion of the plurality of downlink control signal/channel transmission occasions may be the same. For example, a first downlink control signal/channel transmission occasion (e.g., first TX occasion) of the plurality of downlink control signal/channel transmission occasions may overlap, in time and/or frequency, with a second downlink control signal/channel transmission occasion (e.g., second TX occasion) of the plurality of downlink control signal/channel transmission occasions. The first downlink control signal/channel transmission occasion and the second downlink control signal/channel transmission occasion may be same. For example, in the spatial/code domain repetition scheme, the first downlink control signal/channel transmission occasion and the second downlink control signal/channel transmission occasion may overlap in frequency. The first downlink control signal/channel transmission occasion and the second downlink control signal/channel transmission occasion may overlap in time. The plurality of downlink control signal/channel transmission occasions may occur in same frequency units (e.g., frequencies, PRBs, frequency bands, bandwidth parts, subbands, cells, REGs, REG bundles, CEs). For example, a first frequency unit of the first downlink control signal/channel transmission occasion and a second frequency unit of the second downlink control signal/channel transmission occasion may overlap in frequency. The first frequency unit and the second frequency unit may be the same. The plurality of downlink control signal/channel transmission occasions may occur in the same time units (e.g., symbols, mini-slots, slots, sub-frames, PDCCH monitoring occasions etc). For example, a first time unit of the first downlink control signal/channel transmission occasion and a second time unit of the second downlink control signal/channel transmission occasion may overlap in time. The first time unit and the second time unit may be the same.

A downlink control signal/channel transmission occasion, of the plurality of downlink control signal/channel transmission occasions, may have non-overlapping time domain resource allocation with respect to another downlink control signal/channel transmission occasion of the plurality of downlink control signal/channel transmission occasions, for example, in the time domain repetition scheme. A downlink control signal/channel transmission occasion of the plurality of downlink control signal/channel transmission occasions may have non-overlapping frequency domain resource allocation with respect to another downlink control signal/channel transmission occasion of the plurality of downlink control signal/channel transmission occasions, for example, in the frequency domain repetition scheme. A downlink control signal/channel transmission occasion of the plurality of downlink control signal/channel transmission occasions may have overlapping time and frequency domain resource allocations with respect to another downlink control signal/channel transmission occasion of the plurality of downlink control signal/channel transmission occasions, for example, in the spatial/code domain repetition scheme.

The plurality of DCI messages/PDCCH transmissions may be associated with (or linked to) the plurality of downlink control signal/channel transmission occasions. Each downlink control signal/channel of the plurality of DCI messages/PDCCH transmissions may be associated with a respective downlink control signal/channel transmission occasion of the plurality of downlink control signal/channel transmission occasions. The base station 2410 may send/transmit each downlink control signal/channel of the plurality of DCI messages/PDCCH transmissions in/via a respective downlink control signal/channel transmission occasion of the plurality of downlink control signal/channel transmission occasions. The wireless device 2411 may monitor, for each downlink control signal/channel of the plurality of DCI messages/PDCCH transmissions, in/via a respective downlink control signal/channel transmission occasion of the plurality of downlink control signal/channel transmission occasions. The first downlink control signal/channel (e.g., DCI 2430-1) may be associated with the first downlink control signal/channel transmission/repetition occasion (e.g., PDCCH transmission/repetition/monitoring occasion 2432-1), for example, based on the first downlink control signal/channel being transmitted/sent by the base station 2410 or monitored by the wireless device 2411 in/via the first downlink control signal/channel transmission/repetition/monitoring occasion, as shown in FIG. 24. The second downlink control signal/channel (e.g., DCI 2430-2) may be associated with the second downlink control signal/ channel transmission/repetition occasion (e.g., PDCCH transmission/repetition/monitoring occasion 2432-2), for example, based on the second downlink control signal/channel being transmitted/sent by the base station 2410 or monitored by the wireless device 2411 in/via the second downlink control signal/channel transmission/repetition occasion.

The wireless device 2411 may receive/detect at least one downlink control signal/channel among the plurality of DCI messages/PDCCH transmissions (or among the repetitions of the downlink control signal/channel). The wireless device 2411 may detect/receive DCI 2430-1. The wireless device 2411 may or may not receive/detect DCI 2430-2. The at least one downlink control signal/channel may comprise DCI 2430-1. The wireless device 2411 may receive DCI 2430-1 in the first downlink control signal/channel transmission occasion of (or associated with) the first CORESET (e.g., CORESET 2420-1). The wireless device 2411 may or may not receive/detect DCI 2430-2 in the second downlink control signal/channel transmission occasion of (or associated with) the second CORESET (e.g., CORESET 2420-2). The wireless device 2411 may detect/receive DCI 2430-2. The wireless device may or may not receive/detect DCI 2430-1. The at least one downlink control signal/channel may comprise DCI 2430-2. The wireless device 2411 may or may not receive DCI 2430-1 in the first downlink control signal/channel transmission occasion of (or associated with) the first CORESET. The wireless device 2411 may receive/detect DCI 2430-2 in the second downlink control signal/channel transmission occasion of (or associated with) the second CORESET. The wireless device 2411 may detect/receive DCI 2430-1 and DCI 2430-2. The at least one downlink control signal/channel may comprise both DCI 1 and DCI 2. The wireless device 2411 may receive DCI 2430-1 in the first downlink control signal/channel transmission occasion of (or associated with) the first CORESET. The wireless device 2411 may receive/detect DCI 2430-2 in the second downlink control signal/channel transmission occasion of (or associated with) the second CORESET. Each downlink control signal/channel of the at least one downlink control signal/channel and the downlink control signal/channel may be the same.

The wireless device 2411 may receive the downlink control signal/channel in at least one downlink control signal/channel transmission/repetition occasion of the plurality of downlink control signal/channel transmission/repetition occasions. The wireless device 2411 may receive each downlink control signal/channel of the at least one downlink control signal/channel in a respective downlink control signal/channel transmission/repetition occasion of the at least one downlink control signal/channel transmission/repetition occasion. The at least one downlink control signal/channel transmission/repetition occasion may be the first downlink control signal/channel transmission occasion. For example, the wireless device 2411 may detect/receive DCI 2430-1 and not detect/receive DCI 2430-2. The at least one downlink control signal/channel transmission/repetition occasion may be the first downlink control signal/channel transmission occasion and/or the second downlink control signal/channel transmission occasion. For example, the wireless device 2411 may detect/receive DCI 2430-1 and detect/receive DCI 2430-2.

The wireless device 2411 may receive/detect the downlink control signal/channel, for example, based on the receiving/detecting the at least one downlink control signal/channel among the plurality of DCI messages/PDCCH transmissions. The receiving/detecting the at least one downlink control signal/channel may be/comprise receiving/detecting the downlink control signal/channel, for example, based on each downlink control signal/channel, of the at least one downlink control signal/channel, and the downlink control signal/channel being the same.

The at least one downlink control signal/channel (or the downlink control signal/channel) may indicate the quantity/number of repetitions. The at least one downlink control signal/channel may comprise the DCI indicating the number of repetitions.

The wireless device 2411 may receive the at least one downlink control signal/channel (or the downlink control signal/channel) via at least one CORESET of the plurality of CORESETs. The wireless device 2411 may receive each downlink control signal/channel, of the at least one downlink control signal/channel, via a respective CORESET of the at least one CORESET. The at least one CORESET may be the first CORESET (e.g., CORESET 2420-1), for example, based on the detecting/receiving DCI 2430-1 and not detecting/receiving DCI 2430-2. The at least one CORESET may be the first CORESET and the second CORESET (e.g., CORESET 2420-2), for example, based on the detecting/receiving DCI 2430-1 and detecting/receiving DCI 2420-2. The at least one CORESET may be the second CORESET, for example, based on detecting/receiving DCI 2430-2 and not detecting/receiving DCI 2430-1.

The wireless device 2411 may receive the at least one downlink control signal/channel at the same time (or substantially the same time). The wireless device 2411 may receive each downlink control signal/channel of the at least one downlink control signal/channel at the same time (or substantially the same time). The wireless device 2411 may receive each downlink control signal/channel of the at least one downlink control signal/channel at the same time (or substantially the same time), for example, based on the repetitions of the downlink control signal/channel being transmitted (e.g., by the base station 2410) using a frequency domain repetition scheme or a spatial/code domain repetition scheme.

The wireless device 2411 may receive the at least one downlink control signal/channel at different times. The wireless device 2411 may receive each downlink control signal/channel of the at least one downlink control signal/channel at a respective time. The wireless device 2411 may receive each downlink control signal/channel of the at least one downlink control signal/channel at different times, for example, based on the repetitions of the downlink control signal/channel being transmitted (e.g., by the base station 2410) using a time domain repetition scheme.

The wireless device 2411 may determine a reference/default downlink control signal/channel transmission/repetition occasion (or a reference time slot) of the plurality of downlink control channel transmission/repetition occasions (of a plurality of time slots). The wireless device 2411 may determine, for the control channel repetition, the reference/default downlink control signal/channel transmission/repetition occasion. The wireless device 2411 may determine the reference/default downlink control signal/channel transmission/repetition occasion, for example, based on the one or more configuration parameters 2415 indicating a time domain repetition. The wireless device 2411 may determine the reference/default downlink control signal/channel transmission/repetition occasion, for example, based on the one or more configuration parameters 2415 indicating a frequency domain repetition. The determining the reference downlink control signal/channel transmission/repetition occasion (or the reference time slot) may be based on one or more criteria. The reference downlink control signal/channel transmission/repetition occasion (or the reference time slot) may be a last (or latest or ending) downlink control signal/channel transmission/repetition occasion (or time slot) among the plurality of downlink control signal/channel transmission/repetition occasions (or the plurality of time slots). The reference downlink control signal/channel transmission/repetition occasion (or the reference time slot) may be a first (or earliest or starting) downlink control signal/channel transmission/repetition occasion (or time slot) among the plurality of downlink control signal/channel transmission/repetition occasions (or the plurality of time slots). The reference downlink control signal/channel transmission occasion (or the reference time slot) may be a last (or latest or ending) downlink control signal/channel transmission occasion among the plurality of downlink control signal/channel transmission occasions.

The wireless device 2411 may determine the reference downlink control signal/channel transmission occasion (or the reference time slot) based on the quantity/number of repetitions and a starting downlink control signal/channel transmission occasion (or a starting time slot) of the plurality of downlink control signal/channel transmission occasions. The one or more configuration parameters 2415 may indicate the starting downlink control signal/channel transmission occasion. The at least one downlink control signal/channel may indicate the starting downlink control signal/channel transmission occasion. The reference downlink control signal/channel transmission occasion may be the second downlink control signal/channel transmission occasion, for example, if the starting downlink control signal/channel transmission occasion is the first downlink control signal/channel transmission occasion and the quantity of repetitions is equal to two. The reference downlink control signal/channel transmission occasion may be a third downlink control signal/channel transmission occasion of the plurality of downlink control signal/channel transmission occasions, for example, if the starting downlink control signal/channel transmission occasion is the first downlink control signal/channel transmission occasion and the quantity of repetitions is equal to three. The reference downlink control signal/channel transmission occasion may be the third downlink control signal/channel transmission occasion, for example, if the starting downlink control signal/channel transmission occasion is the second downlink control signal/channel transmission occasion and the quantity of repetitions is equal to two.

The wireless device 2411 may monitor, for the downlink control signal/channel, the first CORESET in the first downlink control signal/channel transmission occasion at a first time unit (e.g., first time slot, first time symbol, first subframe, etc.). The wireless device 2411 may monitor, for the downlink control signal/channel, the second CORESET in the second downlink control signal/channel transmission occasion at a second time unit.

The last downlink control signal/channel transmission occasion, for example, may have the latest starting time among starting times of the plurality of downlink control signal/channel transmission occasions. The second time unit may start later in time than the first time unit. A first/starting symbol of the second time unit may occur after (or later) in time than a first/starting symbol of the second time unit. The second downlink control signal/channel transmission occasion may be the reference downlink control signal/channel transmission occasion based on the second time unit starting later in time than the first time unit.

The last downlink control signal/channel transmission occasion, for example, may have the latest ending time among ending times of the plurality of downlink control signal/channel transmission occasions. The second time unit may end later in time than the first time unit. A last symbol of the second time unit may occur after (or later) in time than a last symbol of the first time unit. The second downlink control signal/channel transmission occasion may be the reference downlink control signal/channel transmission occasion based on the second time unit ending later in time than the first time unit.

The last downlink control signal/channel transmission occasion may be associated with a last downlink control signal/channel (e.g., DCI 2430-2 in FIG. 24) among the plurality of DCI messages/PDCCH transmissions. The base station 2410 may send/transmit the last downlink control signal/channel in/via the last downlink control signal/channel transmission occasion. The wireless device 2411 may monitor, for the last downlink control signal/channel, in/via the last downlink control signal/channel transmission occasion. The last downlink control signal/channel may be the reference downlink control signal/channel. The base station 2410 may send/transmit a last repetition of the downlink control signal/channel in the last downlink control signal/channel transmission occasion. The wireless device 2411 may monitor, for the last repetition of the downlink control signal/channel, in the last downlink control signal/channel transmission occasion. The last repetition of the downlink control signal/channel may be the last downlink control signal/channel. For example, as shown in FIG. 24, the last downlink control signal/channel transmission occasion may be the second downlink control signal/channel transmission occasion. The reference downlink control signal/channel transmission occasion may be the second (or the last) downlink control signal/channel transmission occasion.

The reference downlink control signal/channel transmission occasion (or the reference time slot) may be the earliest (or a first, or a starting) downlink control signal/channel transmission occasion among the plurality of downlink control signal/channel transmission occasions. The earliest (or the first, or the starting) downlink control signal/channel transmission occasion, for example, may have the earliest starting time among starting times of the plurality of downlink control signal/channel transmission occasions. The first time unit may start earlier in time than the second time unit. A first/starting symbol of the first time unit may occur before (or earlier) in time than a first/starting symbol of the second time unit. The first downlink control signal/channel transmission occasion may be the reference downlink control signal/channel transmission occasion based on the first time unit starting earlier than the second time unit.

The earliest (or the first, or the starting) downlink control signal/channel transmission occasion, for example, may have the earliest ending time among ending times of the plurality of downlink control signal/channel transmission occasions. For example, the first time unit may end earlier in time than the second time unit. A last symbol of the first time unit may occur before (or earlier) in time than a last symbol of the second time unit. The first downlink control signal/channel transmission occasion may be the reference downlink control signal/channel transmission occasion based on the first time unit ending earlier than the second time unit.

The earliest (or the first, or the starting) downlink control signal/channel transmission occasion may be associated with a first/starting downlink control signal/channel (e.g., DCI 2430-1) among the plurality of DCI messages/PDCCH transmissions. The base station 2410 may send/transmit the first/starting downlink control signal/channel in/via the earliest downlink control signal/channel transmission occasion. The wireless device 2411 may monitor, for the first/starting downlink control signal/channel, in/via the earliest downlink control signal/channel transmission occasion. The first/starting downlink control signal/channel (e.g., DCI 2430-1) may be the reference downlink control signal/channel. The base station 2410 may send/transmit a first/starting repetition (e.g., DCI 2430-1) of the downlink control signal/channel in the earliest downlink control signal/channel transmission occasion. The wireless device may monitor, for the first/starting repetition of the downlink control signal/channel, in the earliest downlink control signal/channel transmission occasion. The first/starting repetition of the downlink control signal/channel may be the first/starting downlink control signal/channel. For example, as shown in FIG. 24, the earliest (or the first, or the starting) downlink control signal/channel transmission occasion may be the first downlink control signal/channel transmission occasion. The reference downlink control signal/channel transmission occasion may be the first (or the earliest/first/starting) downlink control signal/channel transmission occasion.

The reference downlink control signal/channel transmission occasion (or the reference time slot) may be associated with a CORESET of the plurality of CORESETs. The wireless device 2411 may monitor, for the downlink control signal/channel, the CORESET in the reference downlink control signal/channel transmission occasion. The wireless device 2411 may monitor, for DCI (or the downlink control signal/channel), the CORESET in the reference downlink control signal/channel transmission occasion. The one or more configuration parameters may indicate the reference downlink control signal/channel transmission occasion for the CORESET. The wireless device 2411 may determine the reference downlink control signal/channel transmission occasion based on the receiving the one or more configuration parameters 2415.

The CORESET may be identified/indicated by a CORESET indicator/index of the plurality of CORESET indicators/indexes. The CORESET index may be lowest (or highest) among the plurality of CORESET indexes. The CORESET may be identified/indicated by a CORESET index that is lowest (or highest) among the plurality of CORESET indexes of the one or more CORESETs.

The wireless device 2411 may determine/select/detect/indicate the CORESET with a CORESET index that is lowest (or highest) among the plurality of CORESET indexes of the plurality of CORESETs. The wireless device 2411 may monitor, for DCI, the CORESET, for example, in a downlink control signal/channel transmission occasion of the plurality of downlink control signal/channel transmission occasions. The downlink control signal/channel transmission occasion may be the reference downlink control signal/channel transmission occasion. The wireless device 2411 may monitor, for DCI, the CORESET, for example, in one or more downlink control signal/channel transmission occasions of the plurality of downlink control signal/channel transmission occasions. A last/latest (or earliest/first/starting) downlink control signal/channel transmission occasion, of the one or more downlink control signal/channel transmission occasions, may be the reference downlink control signal/channel transmission occasion. The wireless device 2411 may determine the reference downlink control signal/channel transmission occasion based on the CORESET.

The reference downlink control signal/channel transmission occasion may be associated with a reference downlink control signal/channel among the plurality of DCI messages/PDCCH transmissions. The base station 2410 may send/transmit the reference downlink control signal/channel in/via the reference downlink control signal/channel transmission occasion. The wireless device 2411 may monitor, for the reference downlink control signal/channel, in/via the reference downlink control signal/channel transmission occasion. The wireless device 2411 may monitor, for the reference downlink control signal/channel, the CORESET in the reference downlink control signal/channel transmission occasion.

The reference downlink control signal/channel transmission occasion may be associated with (or may comprise) a starting PRB. The starting PRB of the reference downlink control signal/channel transmission occasion may occur/be lowest (or highest) in frequency among starting PRBs of the plurality of downlink control signal/channel transmission occasions. The wireless device 2411 may determine the reference downlink control signal/channel transmission occasion, for example, based on the starting PRB of the reference downlink control signal/channel transmission occasion occurring/being lowest (or highest) among the starting PRBs.

A starting PRB of the second downlink control signal/channel transmission occasion may occur/be lower (or higher) in frequency than a starting PRB of the first downlink control signal/channel transmission occasion. The second downlink control signal/channel transmission occasion may be (e.g., may be selected/determined by the wireless device 2411 as) the reference downlink control signal/channel transmission occasion, for example, based on the starting PRB of the second downlink control signal/channel transmission occasion occurring/being lower (or higher) than the starting PRB of the first downlink control signal/channel transmission occasion. A starting PRB of the first downlink control signal/channel transmission occasion may occur/be lower (or higher) in frequency than a starting PRB of the second downlink control signal/channel transmission occasion. The first downlink control signal/channel transmission occasion may be (e.g., may be selected/determined by the wireless device 2411 as) the reference downlink control signal/channel transmission occasion, for example, based on the starting PRB of the first downlink control signal/channel transmission occasion occurring/being lower (or higher) than the starting PRB of the second downlink control signal/channel transmission occasion.

The reference downlink control signal/channel transmission occasion may be associated with (or may comprise) an ending PRB. The ending PRB of the reference downlink control signal/channel transmission occasion may occur/be lowest (or highest) in frequency among ending PRBs of the plurality of downlink control signal/channel transmission occasions. The wireless device 2411 may determine the reference downlink control signal/channel transmission occasion, for example, based on the ending PRB of the reference downlink control signal/channel transmission occasion occurring/being lowest (or highest) among the ending PRBs.

An ending PRB of the second downlink control signal/channel transmission occasion may occur/be lower (or higher) in frequency than an ending PRB of the first downlink control signal/channel transmission occasion. The second downlink control signal/channel transmission occasion may be (e.g., may be selected/determined by the wireless device 2411 as) the reference downlink control signal/channel transmission occasion, for example, based on the ending PRB of the second downlink control signal/channel transmission occasion occurring/being lower (or higher)

than the ending PRB of the first downlink control signal/channel transmission occasion. An ending PRB of the first downlink control signal/channel transmission occasion may occur/be lower (or higher) in frequency than an ending PRB of the second downlink control signal/channel transmission occasion. The first downlink control signal/channel transmission occasion may be (e.g., may be selected/determined by the wireless device 2411 as) the reference downlink control signal/channel transmission occasion, for example, based on the ending PRB of the first downlink control signal/channel transmission occasion occurring/being lower (or higher) than the ending PRB of the second downlink control signal/channel transmission occasion.

The wireless device 2411 may monitor, for the downlink control signal/channel, a search space set of the plurality of search space sets in the reference downlink control signal/channel transmission occasion (e.g., PDCCH monitoring occasion). The reference downlink control signal/channel transmission occasion (or the reference time slot) may be associated with the search space set. The wireless device 2411 may monitor, for DCI (or the downlink control signal/channel), the search space set in the reference downlink control signal/channel transmission occasion. The one or more configuration parameters may indicate the reference downlink control signal/channel transmission occasion for the search space set. The wireless device 2411 may determine the reference downlink control signal/channel transmission occasion based on the receiving the one or more configuration parameters.

The search space set may be identified/indicated by a search space set indicator/index of the search space set indicators/indexes. The search space set index may be lowest (or highest) among the search space set indexes. The search space set may be identified/indicated by a search space set index that is lowest (or highest) among the search space set indexes.

The wireless device 2411 may determine/select/detect/indicate the search space set with a search space set index that is lowest (or highest) among the search space set indexes of the plurality of search space sets. The wireless device 2411 may monitor, for DCI, the search space set, for example, in a downlink control signal/channel transmission occasion. The downlink control signal/channel transmission occasion may be the reference downlink control signal/channel transmission occasion. The wireless device may monitor, for DCI, the search space set, for example, in one or more downlink control signal/channel transmission occasions. A last/latest (or earliest/first/starting) downlink control signal/channel transmission occasion, of the one or more downlink control signal/channel transmission occasions, may be the reference downlink control signal/channel transmission occasion. The wireless device 2411 may determine the reference downlink control signal/channel transmission occasion based on the search space set.

The wireless device 2411 may monitor, for the downlink control signal/channel, a PDCCH candidate of the PDCCH candidates in the reference downlink control signal/channel transmission occasion (e.g., PDCCH monitoring occasion). The reference downlink control signal/channel transmission occasion (or the reference time slot) may be associated with the PDCCH candidate. The wireless device 2411 may monitor, for DCI (or the downlink control signal/channel), the PDCCH candidate in the reference downlink control signal/channel transmission occasion. The one or more configuration parameters 2415 may indicate the reference downlink control signal/channel transmission occasion for the PDCCH candidate. The wireless device 2411 may determine the reference downlink control signal/channel transmission occasion based on the receiving the one or more configuration parameters 2415.

The PDCCH candidate may be identified/indicated by a PDCCH candidate indicator/index of the PDCCH candidate indicators/indexes. The PDCCH candidate index may be lowest (or highest) among the PDCCH candidate indexes. The PDCCH candidate may be identified/indicated by a PDCCH candidate index that is lowest (or highest) among the PDCCH candidate indexes.

The wireless device 2411 may determine/select the PDCCH candidate with a PDCCH candidate index that is lowest (or highest) among the PDCCH candidate indexes of the PDCCH candidates. The wireless device may monitor, for DCI (e.g., DCI 2430-1 or DCI 2430-2), the PDCCH candidate in a downlink control signal/channel transmission occasion. The downlink control signal/channel transmission occasion may be the reference downlink control signal/channel transmission occasion. The wireless device 2411 may monitor, for DCI, the PDCCH candidate in one or more downlink control signal/channel transmission occasions. A last/latest (or earliest/first/starting) downlink control signal/channel transmission occasion, of the one or more downlink control signal/channel transmission occasions, may be the reference downlink control signal/channel transmission occasion. The wireless device 2411 may determine the reference downlink control signal/channel transmission occasion based on the PDCCH candidate.

The reference downlink control signal/channel transmission occasion may be associated with a reference downlink control signal/channel among the plurality of DCI messages/PDCCH transmissions. The base station 2410 may send/transmit the reference downlink control signal/channel in/via the reference downlink control signal/channel transmission occasion. The wireless device 2411 may monitor, for the reference downlink control signal/channel, in/via the reference downlink control signal/channel transmission occasion. The wireless device 2411 may monitor, for the reference downlink control signal/channel, the search space in the reference downlink control signal/channel transmission occasion.

The one or more configuration parameters 2415 may indicate one or more CORESET pool indictors/indexes (e.g., provided by a higher layer parameter CoresetPoolIndex) for the plurality of CORESETs. Each CORESET of the plurality of CORESETs may comprise (or be configured/indicated by the one or more configuration parameters 2415) by a respective CORESET pool indicator/index of the one or more CORESET pool indicators/indexes (e.g., 0, 1). The one or more configuration parameters 2415 may indicate, for each CORESET of the plurality of CORESETs, a respective CORESET pool index of the one or more CORESET pool indexes. The one or more configuration parameters 2415 may indicate, for the first CORESET (e.g., CORESET 2420-1), a first CORESET pool indicator/index. The one or more configuration parameters 2415 may indicate, for the second CORESET (e.g., CORESET 2420-2), a second CORESET pool indicator/index. The one or more CORESET pool indexes may comprise the first CORESET pool index and the second CORESET pool index.

A first CORESET pool may comprise one or more first CORESETs. The one or more first CORESETs may each have a CORESET pool index that is equal to the first CORESET pool index (e.g., CoresetPoolIndex=0). The one or more first CORESETs may comprise the first CORESET. The plurality of CORESETs may comprise the one or more first CORESETs. The one or more configuration parameters

2415 may indicate the first CORESET pool index for each CORESET of the one or more first CORESETs in the first CORESET pool.

A second CORESET pool may comprise one or more second CORESETs. The one or more second CORESETs may each have a CORESET pool index that is equal to the second CORESET pool index (e.g., CoresetPoolIndex=1). The one or more second CORESETs may comprise the second CORESET. The plurality of CORESETs may comprise the one or more second CORESETs. The one or more configuration parameters 2415 may indicate the second CORESET pool index for each CORESET of the one or more second CORESETs in the second CORESET pool.

The one or more configuration parameters 2415 may or may not indicate a CORESET pool index for a CORESET of the plurality of CORESETs. The wireless device 2411 may determine a default value for the CORESET pool index of the CORESET, for example, based on the one or more configuration parameters 2415 not indicating the CORESET pool index for the CORESET. The default value may be equal to zero (CoresetPoolIndex=0), or any other value. The default value may be equal to the first CORESET pool index (e.g., zero). The first CORESET pool may comprise the CORESET based on the default value for the CORESET pool index of the CORESET being equal to the first CORESET pool index. In an example, the default value may be equal to one (CoresetPoolIndex=1). The second CORESET pool may comprise the CORESET based on the default value for the CORESET pool index of the CORESET being equal to the second CORESET pool index.

The first CORESET pool index of the first CORESET and the second CORESET pool index of the second CORESET may be the same. The wireless device 2411 may group the first CORESET and the second CORESET in a same CORESET pool (e.g., corresponding to CoresetPoolIndex=0 or CoresetPoolIndex=1), for example, based on the first CORESET pool index of the first CORESET and the second CORESET pool index of the second CORESET being the same. The first CORESET pool comprising the first CORESET and the second CORESET pool comprising the second CORESET may be the same, for example, based on the first CORESET pool index of the first CORESET and the second CORESET pool index of the second CORESET being the same.

The first CORESET pool index of the first CORESET and the second CORESET pool index of the second CORESET may be different. The wireless device 2411 may group the first CORESET and the second CORESET in different CORESET pools, for example, based on the first CORESET pool index of the first CORESET and the second CORESET pool index of the second CORESET being different. The wireless device 2411 may group the first CORESET in a first CORESET pool (e.g., corresponding to CoresetPoolIndex=0). The wireless device 2411 may group the second CORESET in a second CORESET pool (e.g., corresponding to CoresetPoolIndex=1), that is different from the first CORESET pool, for example, based on the first CORESET pool index and the second CORESET pool index being different. The first CORESET pool and the second CORESET pool may be different, for example, based on the first CORESET pool index of the first CORESET and the second CORESET pool index of the second CORESET being different.

A plurality of TRPs may serve (e.g., communicate with, transmit signals to and/or receive signals from) the wireless device 2411. The plurality of TRPs may comprise a first TRP and a second TRP. The first TRP may send/transmit a downlink signal/channel (e.g., PDSCH transmission, PDCCH transmission, DCI, SS/PBCH block, CSI-RS) via a first CORESET. The first CORESET may have a first CORESET pool indicator/index that is equal to a first value (e.g., zero, or any other value). A first CORESET pool may comprise the first CORESET. The first TRP may not transmit a downlink signal/channel (e.g., PDSCH transmission, PDCCH transmission, DCI, SS/PBCH block, CSI-RS) via a second CORESET with a second CORESET pool index (e.g., one) that is different from the first value (e.g., zero). A second CORESET pool, different from the first CORESET pool, may comprise the second CORESET. The second TRP may send/transmit a downlink signal/channel (e.g., PDSCH transmission, PDCCH transmission, DCI, SS/PBCH block, CSI-RS) via a second CORESET with a second CORESET pool index that is equal to a second value (e.g., one, or any other value different from the first value). A second CORESET pool may comprise the second CORESET. The second TRP may not transmit a downlink signal/channel (e.g., PDSCH transmission, PDCCH transmission, DCI, SS/PBCH block, CSI-RS) via a first CORESET with a first CORESET pool index (e.g., zero) that is different from the second value (e.g., one). A first CORESET pool, different from the second CORESET pool, may comprise the first CORESET. The plurality of CORESETs may comprise the first CORESET and the second CORESET. The one or more CORESET pool indexes may comprise the first CORESET pool index and the second CORESET pool index.

A plurality of TRPs may serve (e.g., communicate with, transmit to or receive from) the wireless device 2411. The plurality of TRPs may comprise a first TRP and a second TRP. The first TRP may send/transmit a downlink signal/channel (e.g., PDSCH transmission, PDCCH transmission, DCI, SS/PBCH block, CSI-RS) via a first CORESET in a first CORESET pool. The first TRP may not send/transmit a downlink signal/channel (e.g., PDSCH, PDCCH, DCI, SS/PBCH block, CSI-RS) via a second CORESET in a second CORESET pool that is different from the first CORESET pool. The second TRP may send/transmit a downlink signal/channel (e.g., PDSCH transmission, PDCCH transmission, DCI, SS/PBCH block, CSI-RS) via a second CORESET in a second CORESET pool. The second TRP may not send/transmit a downlink signal/channel (e.g., PDSCH, PDCCH, DCI, SS/PBCH block, CSI-RS) via a first CORESET in a first CORESET pool that is different from the second CORESET pool. The plurality of CORESETs may comprise the first CORESET and the second CORESET.

The one or more configuration parameters 2415 may indicate at least two CORESET pool indicators/indexes (e.g., 0 and 1) for a higher layer parameter (e.g., CoresetPoolIndex). The one or more configuration parameters 2415 may comprise/indicate the higher layer parameter CoresetPoolIndex with (or set to) the at least two CORESET pool indexes. The at least two CORESET pool indexes may comprise a first CORESET pool index (e.g., 0, or any other first value), for one or more first CORESETs of the plurality of CORESETs. The at least two CORESET pool indexes may comprise a second CORESET pool index (e.g., 1, or any other second value), different from the first CORESET pool index, for one or more second CORESETs of the plurality of CORESETs. The one or more first CORESETs may comprise/indicate one or more third CORESETs, of the plurality of CORESETs, without a value for a higher layer parameter CoresetPoolIndex. The one or more configuration parameters 2415 may not comprise/indicate the higher layer parameter CoresetPoolIndex for the one or more third CORESETs.

The at least one downlink control signal/channel (or the downlink control signal/channel) may schedule/trigger reception of a downlink signal (or schedule a downlink signal). Each downlink control signal/channel of the at least one downlink control signal/channel may schedule/trigger reception of the downlink signal (e.g., downlink signal 2435). The at least one downlink control signal/channel scheduling/triggering the reception of the downlink signal 2435 may comprise the downlink control signal/channel scheduling/triggering the reception of the downlink signal 2435.

The downlink signal 2435 may be a TB. The downlink signal 2435 may be via a PDSCH. The downlink signal 2435 may be a PDSCH transmission. The downlink signal may be a CSI-RS. The CSI-RS may be at least one of an aperiodic CSI-RS, a semi-persistent CSI-RS, and/or a periodic CSI-RS.

A time offset 2440 between the reference downlink control signal/channel transmission occasion and the downlink signal 2435 may be less than a threshold. The threshold may be configured by/based on a higher layer parameter (e.g., timeDurationForQCL). The time offset 2440 between the reference downlink control signal/channel transmission occasion and the downlink signal 2435 may comprise a time offset between a last/latest/ending symbol of the reference downlink control signal/channel transmission occasion and a first/earliest/starting symbol of the downlink signal 2435. The time offset 2440 between the reference downlink control signal/channel transmission occasion and the downlink signal 2435 may comprise a time offset between a last/latest/ending symbol of the reference downlink control signal/channel transmission occasion and a first/earliest/starting symbol of a resource (e.g., a time/frequency resource or a PDSCH resource) of the downlink signal 2435. The resource may be a resource via which the downlink signal 2435 is sent/received. The at least one downlink control signal/channel (or the downlink control signal/channel) may indicate the resource to receive the downlink signal 2435. The time offset 2440 between the reference downlink control signal/channel transmission occasion and the downlink signal 2435 may comprise, for example, a time offset between a last/latest/ending symbol of a PDCCH carrying the downlink control signal/channel (e.g., that is transmitted by the base station 2410), in the reference downlink control signal/channel transmission occasion, and a first/earliest/starting symbol of the downlink signal 2435. The time offset 2440 between the reference downlink control signal/channel transmission occasion and the downlink signal 2435 may comprise, for example, a time offset between a last/latest/ending symbol of the reference downlink control signal/channel (e.g., that is transmitted by the base station 2410), in the reference downlink control signal/channel transmission occasion, and a first/earliest/starting symbol of the downlink signal 2435. The time offset 2440 between the reference downlink control signal/channel transmission occasion and the downlink signal 2435 may comprise, for example, a time offset between the reference downlink control signal/channel transmission occasion and a first/earliest/starting transmission occasion of the downlink signal 2435. The time offset 2440 between the reference downlink control signal/channel transmission occasion and the downlink signal 2435 may comprise, for example, a time offset between a last/latest/ending symbol of the reference downlink control signal/channel transmission occasion and a first/earliest/starting transmission occasion of the downlink signal 2435. The base station 2410 may send/transmit (or repeat transmission of) the downlink signal 2435 in a plurality of transmission occasions (e.g., PDSCH transmission occasions). The plurality of transmission occasions may comprise the first/earliest/starting transmission occasion. The first/earliest/starting transmission occasion may be a first/earliest/starting transmission occasion, among the plurality of transmission occasions, occurring in time. A starting time/symbol of the first/earliest/starting transmission occasion may be the first/earliest among starting times/symbols of the plurality of transmission occasions.

The base station 2410 may need (additional) wireless device radio access capability information of the wireless device 2411. The base station 2410 may initiate a procedure to request the wireless device radio access capability information from the wireless device 2411. The base station 2410 may send, to the wireless device 2411, a message (e.g., an information element UECapabilityEnquiry) to request the wireless device radio access capability information. The wireless device 2411 may send a response message (e.g., wireless device capability information message, UECapabilityInformation message) to indicate/transfer the wireless device radio access capability information as requested by the base station. The wireless device 2411 may provide/indicate the threshold (e.g., via a higher layer parameter timeDurationForQCL, or beamSwitchTiming) in a parameter set (e.g., FeatureSetDownlink) indicating a set of features that the wireless device 2411 supports. The wireless device 2411 may send/transmit, to the base station 2410, a wireless device capability information message indicating the threshold. The one or more configuration parameters 2415 may not comprise a higher layer parameter (e.g., trs-info) for a CSI-RS resource set (e.g., NZP-CSI-RS-ResourceSet) comprising the downlink signal 2435 (e.g., aperiodic CSI-RS or aperiodic CSI-RS resource).

A value of the threshold reported/indicated by the wireless device 2411 (in wireless device capability information message) may be at least one of: {14, 28, 48}. The one or more configuration parameters 2415 may not comprise a beam switch timing enabler (e.g., enableBeamSwitchTiming). The threshold may be equal to the value of the threshold reported by the wireless device if the value of the threshold reported by the wireless device is at least one of: {14, 28, 48}. The threshold may be equal to the value of the threshold reported by the wireless device if the one or more configuration parameters 2415 do not comprise the beam switch timing enabler.

A value of the threshold reported by the wireless device 2411 may be any other value. For example, a value of the threshold reported/indicated by the wireless device 2411 may be at least one of: {224, 336}. The threshold may be equal to 48 symbols when the value of the threshold reported/indicated by the wireless device 2411 is at least one of: {224, 336}.

A threshold (e.g., timeDurationForQCL) may comprise/indicate a minimum time required by the wireless device 2411 to perform a PDCCH reception comprising DCI, and to apply spatial QCL information (e.g., TCI-State) received in (or indicated by) the DCI for processing of a downlink signal scheduled by the DCI. The minimum time may correspond to a minimum quantity/number of OFDM symbols. The wireless device 2411 may require the minimum quantity/number of OFDM symbols between the PDCCH reception and the processing of the downlink signal to apply the spatial QCL information, indicated by the DCI, to the downlink signal. The threshold may comprise/indicate a minimum quantity/number of OFDM symbols between the DCI triggering of the downlink signal (e.g., aperiodic CSI-RS) and transmission of the downlink signal. The quantity/number of OFDM symbols may be measured from the last symbol of (or containing) the DCI to the first/starting symbol of the downlink signal.

The wireless device 2411 may determine a default TCI state (or a default antenna port quasi co-location property/assumption, or default beam). The wireless device 2411 may determine, for reception of the downlink signal 2435, the default TCI state. The wireless device 2411 may determine the default TCI state, for example, based on the time offset 2440 between the reference downlink control signal/channel transmission occasion and the downlink signal 2435 being less than the threshold. The wireless device 2411 may determine the default TCI state, for example, based on receiving, via the at least one CORESET of the plurality of CORESETs, the at least one downlink control signal/channel (or the downlink control signal/channel) scheduling/triggering the downlink signal 2435. The wireless device 2411 may determine the default TCI state, for example, based on the first CORESET pool index and the second CORESET pool index being different.

The wireless device 2411 may receive the downlink signal 2435 based on the default TCI state. The wireless device 2411 may receive the downlink signal based on the default TCI state, for example, based on the time offset 2440 between the reference downlink control signal/channel transmission occasion and the downlink signal 2435 being less than the threshold.

The default TCI state may indicate a reference signal (e.g., CSI-RS, SS/PBCH block, DM-RS, TRS, etc.). The one or more configuration parameters 2415 may indicate, the reference signal, for the default TCI state. The default TCI state may comprise a reference signal indicator/index (e.g., provided by a higher layer parameter referenceSignal, ssb-index, csi-RS-Index, NZP-CSI-RS-ResourceId) identifying (or indicating or of) the reference signal. The one or more configuration parameters 2415 may indicate the reference signal indicator/index for the reference signal.

The default TCI state may indicate a quasi co-location type (e.g., QCL TypeA, QCL TypeB, QCL TypeC, QCL TypeD, etc.). The one or more configuration parameters 2415 may indicate, the quasi co-location type, for the default TCI state.

The receiving the downlink signal 2435 based on the default TCI state (or the antenna port quasi co-location property/assumption) may comprise at least one DM-RS antenna port of the downlink signal 2435 being quasi co-located (QCL-ed) with the reference signal indicated by (or in) the default TCI state. The at least one DM-RS antenna port of the downlink signal 2435 may be QCL-ed with the reference signal with respect to at least one of: Doppler shift, Doppler spread, average delay, delay spread, and spatial receiving (RX) parameters. The at least one DM-RS antenna port of the downlink signal 2435 may be QCL-ed with the reference signal with respect to at least one of: Doppler shift, Doppler spread, average delay, delay spread, spatial RX parameters when applicable. The at least one DM-RS antenna port of the downlink signal 2435 may be QCL-ed with the reference signal with respect to Doppler shift, Doppler spread, average delay, delay spread, and spatial RX parameters when applicable. The at least one DM-RS antenna port of the downlink signal 2435 may be QCL-ed with the reference signal with respect to the quasi co-location type indicated by (or in) the default TCI state. The least one DM-RS antenna port of the downlink signal 2435 being QCL-ed with the reference signal indicated by (or in) the default TCI state may comprise that the wireless device 2411 may use a same beam, for receiving the downlink signal 2435, as used for transmitting or receiving the reference signal.

The receiving the downlink signal 2435 based on the default TCI state may comprise applying the default TCI state (or the antenna port quasi co-location property/assumption) for a reception (or to receive) the downlink signal 2435. The wireless device 2411 may measure the downlink signal 2435 (e.g., aperiodic CSI-RS) based on the default TCI state. The wireless device 2411 may measure/determine a radio link quality (e.g., L1-RSRP, L-RSRP, SINR, SNR, BLER) of the downlink signal 2435 based on the default TCI state. The wireless device 2411 may measure a radio link quality (e.g., L1-RSRP, L-RSRP, SINR, SNR, BLER) of the reference signal to determine the radio link quality of the downlink signal 2435. The wireless device 2411 may send/transmit an uplink report indicating the radio link quality of the downlink signal 2435. The uplink report may be a CSI report. The uplink report may be an aperiodic CSI report.

The wireless device 2411 may determine the default TCI state based on a TCI state (or an antenna port quasi co-location property/assumption) of a CORESET. The default TCI state may be same as the TCI state of the CORESET. The default TCI state may be the TCI state of the CORESET. The wireless device 2411 may set/determine the TCI state of the CORESET as the default TCI state. The plurality of CORESETs may, for example, comprise the CORESET. The plurality of CORESETs may, for example, not comprise the CORESET. The active downlink BWP of the cell may comprise the CORESET.

The one or more configuration parameters 2415 may indicate, for the CORESET, the TCI state. The wireless device 2411 may receive an activation command (e.g., MAC-CE, DCI) indicating/activating/updating the TCI state for the CORESET.

The wireless device 2411 may monitor, for DCI and based on the TCI state, PDCCH in the CORESET. The monitoring the PDCCH in the CORESET based on the TCI state may comprise at least one DMRS port of the PDCCH being quasi co-located with the reference signal (e.g., CSI-RS, SS/PBCH block) indicated by the TCI state (or by the default TCI state). The monitoring the PDCCH in the CORESET based on the TCI state may comprise at least one DMRS port of the PDCCH with the DCI being quasi co-located with the reference signal (e.g., CSI-RS, SS/PBCH block) indicated by the TCI state. The monitoring the PDCCH in the CORESET based on the TCI state may comprise at least one DMRS port of a PDCCH transmission/reception in the CORESET being quasi co-located with the reference signal (e.g., CSI-RS, SS/PBCH block) indicated by the TCI state. The monitoring the PDCCH in the CORESET based on the TCI state may comprise at least one DMRS port of the PDCCH being quasi co-located with the reference signal (e.g., CSI-RS, SS/PBCH block) indicated by the TCI state with respect to the quasi co-location type (e.g., QCL-TypeA, QCL-Type B, QCL-TypeD, etc.) indicated by the TCI state (or the default TCI state). The monitoring the PDCCH in the CORESET based on the TCI state may comprise at least one DMRS port of a PDCCH transmission/reception in the CORESET being quasi co-located with the reference signal (e.g., CSI-RS, SS/PBCH block) indicated by the TCI state with respect to the quasi-co-location type (e.g., QCL-TypeA, QCL-Type B, QCL-TypeD, etc.) indicated by the TCI state.

The wireless device 2411 may monitor PDCCH in the CORESET in a last/latest time slot. The wireless device 2411 may monitor PDCCH in the CORESET in a last/latest PDCCH monitoring occasion. The wireless device 2411 may monitor PDCCH in the CORESET in the last/latest PDCCH monitoring occasion that occurs (or is prior to) a first/starting/earliest downlink control signal/channel transmission occasion of the plurality of downlink control signal/channel transmission occasions. The wireless device 2411 may monitor PDCCH in the CORESET in the last/latest PDCCH monitoring occasion that occurs (or is prior to) the reference downlink control signal/channel transmission occasion.

The wireless device 2411 may determine, for reception of the downlink signal 2435, the CORESET, for example, based on the first CORESET pool indicator/index and the second CORESET pool indicator/index being different. The CORESET may be identified/indicated by a CORESET indicator/index. The plurality of CORESET indexes may, for example, comprise the CORESET index. The CORESET index may be lowest (or highest) among the plurality of CORESET indexes. The CORESET may be identified/indicated by a CORESET index that is lowest (or highest) among the plurality of CORESET indexes. The wireless device 2411 may determine/select the CORESET with the CORESET index that is lowest (or highest) among the plurality of CORESET indexes of the plurality of CORESETs. The wireless device 2411 may determine the TCI state of the CORESET as the default TCI state, for example, based on the CORESET being identified/indicated by the CORESET index that is lowest (or highest) among the plurality of CORESET indexes of the plurality of CORESETs. The wireless device 2411 may determine the TCI state of the CORESET as the default TCI state, for example, based on the CORESET being identified/indicated by the CORESET index that is lowest (or highest) among the plurality of CORESET indexes of the plurality of CORESETs. The wireless device 2411 may determine, for reception of the downlink signal 2435, the CORESET among the plurality of CORESETs, for example, based on the CORESET being identified/indicated by the CORESET index that is lowest (or highest) among the plurality of CORESET indexes of the plurality of CORESETs.

The CORESET may be identified/indicated by a CORESET index. The plurality of CORESET indexes may not, for example, comprise the CORESET index. The CORESET index may be lowest (or highest) among CORESET indexes of CORESETs in the active downlink BWP of the cell. The one or more configuration parameters 2415 may indicate, for the active downlink BWP of the cell, the CORESETs. The CORESETs may comprise the plurality of CORESETs. The CORESET indexes may comprise the plurality of CORESET indexes. The one or more configuration parameters 2415 may indicate, for the CORESETs, the CORESET indexes. The one or more configuration parameters 2415 may indicate, for each CORESET of the CORESETs, a respective CORESET index of the CORESET indexes. The CORESET may be identified/indicated by a CORESET index that is lowest (or highest) among the CORESET indexes. The wireless device 2411 may determine/select the CORESET with the CORESET index that is lowest (or highest) among the CORESET indexes of the CORESETs. The wireless device 2411 may determine the TCI state of the CORESET as the default TCI state, for example, based on the CORESET being identified/indicated by the CORESET index that is lowest (or highest) among the CORESET indexes of the CORESETs. The wireless device 2411 may determine the TCI state of the CORESET as the default TCI state, for example, based on the CORESET being identified/indicated by the CORESET index that is lowest (or highest) among the CORESET indexes of the CORESETs. The wireless device may determine, for reception of the downlink signal 2435, the CORESET among the CORESETs, for example, based on the CORESET being identified/indicated by the CORESET index that is lowest (or highest) among the CORESET indexes of the CORESETs.

The CORESET may be identified/indicated by a CORESET index. The active downlink BWP of the cell may comprise one or more first CORESETs. The one or more configuration parameters 2415 may indicate, for the active downlink BWP of the cell, the one or more first CORESETs. The CORESETs of the active downlink BWP of the cell may comprise the one or more first CORESETs. The one or more configuration parameters 2415 may indicate, for the one or more first CORESETs, one or more first CORESET indexes. The one or more configuration parameters 2415 may indicate, for each CORESET of the one or more first CORESETs, a respective CORESET index of the one or more first CORESET indexes. The CORESET indexes of the CORESETs may comprise the one or more first CORESET indexes. The one or more configuration parameters 2415 may indicate, for the one or more first CORESETs, the first CORESET pool index. The one or more configuration parameters 2415 may indicate, for each CORESET of the one or more first CORESETs, the first CORESET pool index. The one or more first CORESETs (e.g., with the first CORESET pool index or in/comprising the first CORESET pool) may comprise the CORESET. The one or more first CORESET indexes of the one or more first CORESETs may comprise the CORESET index. The CORESET index may be lowest (or highest) among the one or more first CORESET indexes of the one or more first CORESETs (e.g., with the first CORESET pool index or in the first CORESET pool). The CORESET may be identified/indicated by a CORESET index that is lowest (or highest) among the one or more first CORESET indexes. The wireless device 2411 may determine/select the CORESET with the CORESET index that is lowest (or highest) among the one or more first CORESET indexes of the one or more first CORESETs. The wireless device 2411 may determine the TCI state of the CORESET as the default TCI state. The wireless device 2411 may determine the TCI state of the CORESET as the default TCI state, for example, based on the CORESET being identified/indicated by the CORESET index that is lowest (or highest) among the one or more first CORESET indexes of the one or more first CORESETs. The wireless device 2411 may determine, for reception of the downlink signal 2435, the CORESET among the one or more first CORESETs, for example, based on the CORESET being identified/indicated by the CORESET index that is lowest (or highest) among the one or more first CORESET indexes of the one or more first CORESETs.

As further described herein, the wireless device 2411 may determine, for reception of the downlink signal 2435, the CORESET among the one or more first CORESETs of the first CORESET pool, based on determining to use the first CORESET pool. The wireless device 2411 may determine to use the first CORESET pool based on determining that the first CORESET pool index is equal to a default CORESET pool index. The wireless device 2411 may determine to use the first CORESET pool based on determining that the first CORESET pool comprises a reference/default CORESET. The wireless device 2411 may determine to use the first CORESET pool based on the downlink control signal/ channel (e.g., DCI 2430-1 or DCI 2430-2) indicating/comprising the first CORESET pool index.

The CORESET may be identified/indicated by a CORESET index. The active downlink BWP of the cell may comprise one or more second CORESETs. The one or more configuration parameters 2415 may indicate, for the active downlink BWP of the cell, the one or more second CORESETs. The CORESETs of the active downlink BWP of the cell may comprise the one or more second CORESETs. The one or more configuration parameters 2415 may indicate, for the one or more second CORESETs, one or more second CORESET indexes. The one or more configuration parameters 2415 may indicate, for each CORESET of the one or more second CORESETs, a respective CORESET index of the one or more second CORESET indexes. The CORESET indexes of the CORESETs may comprise the one or more second CORESET indexes. The one or more configuration parameters 2415 may indicate, for the one or more second CORESETs, the second CORESET pool index. The one or more configuration parameters 2415 may indicate, for each CORESET of the one or more second CORESETs, the second CORESET pool index. The one or more second CORESETs (e.g., with the second CORESET pool index or in the second pool) may comprise the CORESET. The one or more second CORESET indexes of the one or more second CORESETs may comprise the CORESET index. The CORESET index may be lowest (or highest) among the one or more second CORESET indexes of the one or more second CORESETs (e.g., with the second CORESET pool index or in the second pool). The CORESET may be identified/indicated by a CORESET index that is lowest (or highest) among the one or more second CORESET indexes. The wireless device 2411 may determine/select the CORESET with the CORESET index that is lowest (or highest) among the one or more second CORESET indexes of the one or more second CORESETs. The wireless device 2411 may determine the TCI state of the CORESET as the default TCI state. The wireless device 2411 may determine the TCI state of the CORESET as the default TCI, for example, based on the CORESET being identified/indicated by the CORESET index that is lowest (or highest) among the one or more second CORESET indexes of the one or more second CORESETs. The wireless device 2411 may determine, for reception of the downlink signal 2435, the CORESET among the one or more second CORESETs, for example, based on the CORESET being identified/indicated by the CORESET index that is lowest (or highest) among the one or more second CORESET indexes of the one or more second CORESETs.

As further described herein, the wireless device 2411 may determine, for reception of the downlink signal 2435, the CORESET among the one or more second CORESETs of the second CORESET pool, based on determining to use the second CORESET pool. The wireless device 2411 may determine to use the second CORESET pool based on determining that the second CORESET pool index is equal to a default CORESET pool index. The wireless device 2411 may determine to use the second CORESET pool based on determining that the second CORESET pool comprises a reference/default CORESET. The wireless device 2411 may determine to use the second CORESET pool based on the downlink control signal/channel (e.g., DCI 2430-1 or DCI 2430-2) indicating/comprising the second CORESET pool index.

The one or more configuration parameters 2415 may indicate a CORESET pool indicator/index (e.g., 0, 1, or any other value) for the CORESET. The CORESET pool index may be equal to, for example, the first CORESET pool index (e.g., CoresetPoolIndex=0). The CORESET pool index may be equal to, for example, the second CORESET pool index (e.g., CoresetPoolIndex=1).

The one or more CORESET pool indexes may comprise the CORESET pool index. One or more CORESET pool indexes of the CORESETs of the active downlink BWP of the cell may comprise the CORESET pool index. The one or more configuration parameters 2415 may indicate, for the CORESETs, the one or more CORESET pool indexes. The one or more configuration parameters 2415 may indicate, for each CORESET of the CORESETs, a respective CORESET pool index of the one or more CORESET pool indexes.

The CORESET pool index for the CORESET may be equal to a value. The value may be a default value. The value may be fixed/preconfigured/predefined/default. The value may be equal to 0 (or any other value). The one or more configuration parameters 2415 may indicate the value.

The CORESET pool index may be equal to a default CORESET pool index (e.g., 0, or any other default value). The default CORESET pool index may be fixed/preconfigured/predefined/default. The default CORESET pool index may be equal to 0 (or any other value). The one or more configuration parameters 2415 may indicate the default CORESET pool index.

The wireless device 2411 may determine the TCI state of the CORESET as the default TCI state, for example, based on the CORESET pool index of the CORESET being equal to the value (e.g., 0, a default value). The wireless device 2411 may determine the TCI state of the CORESET as the default TCI state, for example, based on the one or more configuration parameters 2415 indicating the CORESET pool index for the CORESET. The wireless device 2411 may determine the TCI state of the CORESET as the default TCI state, for example, based on the one or more configuration parameters 2415 indicating, for the CORESET pool index of the CORESET, the value. The CORESET pool index may be (equal to) the first CORESET pool index (e.g., CoresetPoolIndex=0), for example, if the value is equal to 0. The CORESET pool index may be (equal to) the second CORESET pool index (e.g., CoresetPoolIndex=1), for example, if the value is equal to 1. The CORESET pool index may be (equal to) 0 (e.g., CoresetPoolIndex=0), for example, if the value is equal to 0. The CORESET pool index may be (equal to) 1 (e.g., CoresetPoolIndex=1), for example, if the value is equal to 1. The wireless device may determine the TCI state of the CORESET as the default TCI state, for example, based on the CORESET pool index of the CORESET being equal to the default CORESET pool index (e.g., 0, 1, or any other default value).

The wireless device 2411 may determine, for reception of the downlink signal 2435, the CORESET, for example, based on the one or more configuration parameters 2415 indicating the CORESET pool index for the CORESET. The wireless device 2411 may determine, for reception of the downlink signal 2435, the CORESET, for example, based on the one or more configuration parameters 2415 indicating that the CORESET pool index of the CORESET is equal to the value. The wireless device 2411 may determine, for reception of the downlink signal 2435, the CORESET, for example, based on the CORESET pool index of the CORESET being equal to the value. The wireless device 2411 may determine, for reception of the downlink signal 2435, the CORESET, for example, based on the CORESET pool index of the CORESET being equal to the default CORESET pool index.

The wireless device 2411 may determine/select a CORESET pool index among the one or more CORESET pool indexes. The wireless device 2411 may determine/select the CORESET pool index, for example, among the one or more CORESET pool indexes of the plurality of CORESETs.

The wireless device 2411 may determine/select the CORESET pool index among the one or more CORESET pool indexes, for example, based on the one or more configuration parameters 2415 indicating the control channel repetition. The wireless device 2411 may determine/select the CORESET pool index among the one or more CORESET pool indexes, for example, based on the repetition scheme being the time domain repetition scheme (e.g., TDM). The wireless device 2411 may determine/select the CORESET pool index among the one or more CORESET pool indexes, for example, based on the repetition scheme being the frequency domain repetition scheme (e.g., FDM). The wireless device 2411 may determine/select the CORESET pool index among the one or more CORESET pool indexes, for example, based on the first CORESET pool index and the second CORESET pool index being different. The wireless device 2411 may determine/select the CORESET pool index among the one or more CORESET pool indexes, for example, based on the time offset 2440 between the reference downlink control signal/channel transmission occasion and the downlink signal 2435 being less than the threshold.

The wireless device may determine/select the CORESET pool index that is equal to a value. The value may be equal to 0, 1, or any other preconfigured/predefined/preset/default value. The one or more configuration parameters 2415 may indicate the value. The first CORESET pool index of the first CORESET may be equal to the value (e.g., 0). The second CORESET pool index of the second CORESET may be equal to a second value (e.g., 1) that is different from the value (e.g., 0). The wireless device 2411 may determine/select the first CORESET pool index as the (determined/selected) CORESET pool index based on the first CORESET pool index of the first CORESET being equal to the value. The first CORESET pool index of the first CORESET may be equal to a first value (e.g., 0) that is different from the value (e.g., 1). The second CORESET pool index of the second CORESET may be equal to the value (e.g., 1). The wireless device 2411 may determine/select the second CORESET pool index as the (determined/selected) CORESET pool index based on the second CORESET pool index of the second CORESET being equal to the value.

The wireless device 2411 may determine/select the CORESET pool index that is lowest/highest among the one or more CORESET pool indexes. The first CORESET pool index may be lower/higher than the second CORESET pool index. The (determined/selected) CORESET pool index may be the first CORESET pool index, for example, based on the first CORESET pool index being lower/higher than the second CORESET pool index. The second CORESET pool index may be lower/higher than the first CORESET pool index. The (determined/selected) CORESET pool index may be the second CORESET pool index, for example, based on the second CORESET pool index being lower/higher than the first CORESET pool index.

The wireless device 2411 may determine the TCI state of the CORESET as the default TCI state, for example, based on the CORESET pool index of the CORESET being equal to the (determined/selected) CORESET pool index. The wireless device 2411 may determine the TCI state of the CORESET as the default TCI state, for example, based on the CORESET pool index of the CORESET being equal to the (determined/selected) CORESET pool index. The wireless device 2411 may determine the TCI state of the CORESET as the default TCI state, for example, based on the one or more configuration parameters 2415 indicating, for the CORESET, the (determined/selected) CORESET pool index. The wireless device 2411 may determine the TCI state of the CORESET as the default TCI state, for example, based on the one or more configuration parameters 2415 indicating that the CORESET pool index, of the CORESET, is the same as the (determined/selected) CORESET pool index. The CORESET pool index of the CORESET may be (equal to) the first CORESET pool index (e.g., CoresetPoolIndex=0), for example, if the (determined/selected) CORESET pool index is equal to 0. The CORESET pool index of the CORESET may be (equal to) the second CORESET pool index (e.g., CoresetPoolIndex=1), for example, if the (determined/selected) CORESET pool index is equal to 1.

The wireless device 2411 may determine, for reception of the downlink signal 2435, the CORESET, for example, based on the one or more configuration parameters 2415 indicating, for the CORESET, the (determined/selected) CORESET pool index. The wireless device 2411 may determine, for reception of the downlink signal 2435, the CORESET, for example, based on the one or more configuration parameters 2415 indicating, as the CORESET pool index of the CORESET, the (determined/selected) CORESET pool index. The wireless device 2411 may determine, for reception of the downlink signal 2435, the CORESET, for example, based on the CORESET pool index of the CORESET being equal to the (determined/selected) CORESET pool index.

The wireless device 2411 may determine a reference/default CORESET. The wireless device 2411 may determine, for reception of the downlink signal 2435, the CORESET based on a CORESET pool index of the reference/default CORESET. The wireless device 2411 may determine the reference/default CORESET among the plurality of CORESETs. The one or more configuration parameters 2415 may indicate a CORESET pool index (e.g., 0, 1) for the reference/default CORESET. The one or more CORESET pool indexes of the plurality of CORESETs may comprise the CORESET pool index. The CORESET pool index of the CORESET may be equal to the CORESET pool index of the reference/default CORESET.

The wireless device 2411 may determine the TCI state of the CORESET as the default TCI state, for example, based on the CORESET pool index of the CORESET being equal to the CORESET pool index of the reference/default CORESET. The wireless device 2411 may determine the TCI state of the CORESET as the default TCI state, for example, based on the one or more configuration parameters 2415 indicating that the CORESET pool index of the CORESET is equal to the CORESET pool index of the reference/default CORESET. The CORESET pool index (of the CORESET) may be equal to the first CORESET pool index, for example, if the reference/default CORESET is the first CORESET. The CORESET may have a lowest (or highest) CORESET index, among CORESET indexes of the one or more first CORESETs with the first CORESET pool index, for example, if the reference/default CORESET is the first CORESET. The CORESET pool index (of the CORESET) may be equal to the second CORESET pool index, for example, if the reference/default CORESET is the second CORESET. The CORESET may have a lowest (or highest) CORESET index, among CORESET indexes of the one or more second CORESETs with the second CORESET pool index, for example, if the reference/default CORESET is the first CORESET.

The wireless device 2411 may determine, for reception of the downlink signal 2435, the CORESET, for example, based on the one or more configuration parameters 2415 indicating, for the CORESET, the CORESET pool index of the reference/default CORESET. The wireless device 2411 may determine, for reception of the downlink signal 2435, the CORESET, for example, based on the one or more configuration parameters 2415 indicating, for the CORESET pool index of the CORESET, the CORESET pool index of the reference/default CORESET. The wireless device 2411 may determine, for reception of the downlink signal 2435, the CORESET, for example, based on the CORESET pool index of the CORESET being equal to the CORESET pool index of the reference/default CORESET.

The wireless device 2411 may determine/select the reference/default CORESET among the plurality of CORESETs. The wireless device 2411 may determine the reference/default CORESET, for example, based on the receiving/detecting the at least one downlink control signal/channel. The wireless device 2411 may determine the reference/default CORESET, for example, based on the receiving/detecting the downlink control signal/channel. The wireless device 2411 may determine the reference/default CORESET, for example, based on the one or more configuration parameters 2415 indicating the control channel repetition. The wireless device 2411 may determine the reference/default CORESET, for example, based on the one or more configuration parameters 2415 indicating the control channel repetition. The wireless device 2411 may determine the reference/default CORESET, for example, based on the repetition scheme being the time domain repetition scheme (e.g., TDM). The wireless device 2411 may determine the reference/default CORESET, for example, based on the repetition scheme being the frequency domain repetition scheme (e.g., FDM). The wireless device 2411 may determine the reference/default CORESET, for example, based on the first CORESET pool index and the second CORESET pool index being different. The wireless device 2411 may determine the reference/default CORESET, for example, based on the time offset 2440 between the reference downlink control signal/channel transmission occasion and the downlink signal 2435 being less than the threshold.

The wireless device 2411 may receive/detect the at least one downlink control signal/channel during/in/via the at least one CORESET of the plurality CORESETs. The at least one CORESET may or may not comprise the reference/default CORESET. The wireless device 2411 may or may not receive the downlink control signal/channel in/via the reference/default CORESET. The at least one CORESET may be the first CORESET (e.g., CORESET 2420-1). The reference/default CORESET may be, for example, the second CORESET (e.g., CORESET 2420-2).

The determining the reference/default CORESET, among the plurality of CORESETs, may comprise determining a reference downlink control signal/channel among the plurality of DCI messages/PDCCH transmissions. The determining the reference downlink control signal/channel among the plurality of DCI messages/PDCCH transmissions may be based on the plurality of DCI messages/PDCCH transmissions being associated with the plurality of CORESETs. The first downlink control signal/channel (e.g., DCI 2420-1) may be the reference downlink control signal/channel, for example, if the first CORESET (e.g., CORESET 2420-1) is the reference/default CORESET. The second downlink control signal/channel (e.g., DCI 2420-2) may be the reference downlink control signal/channel, for example, if the second CORESET (e.g., CORESET 2420-2) is the reference/default CORESET.

The wireless device 2411 may determine the reference/default CORESET, for example, based on the quantity/number of repetitions and a starting downlink control signal/channel transmission occasion (or a starting time slot) of the plurality of downlink control signal/channel transmission occasions. The one or more configuration parameters 2415 may indicate the starting downlink control signal/channel transmission occasion. The at least one downlink control signal/channel may indicate the starting downlink control signal/channel transmission occasion. The reference/default CORESET may be the second CORESET comprising the second downlink control signal/channel transmission occasion, for example, if the starting downlink control signal/channel transmission occasion is the first downlink control signal/channel transmission occasion and the quantity of repetitions is equal to two. The reference/default CORESET may be the first CORESET comprising a third downlink control signal/channel transmission occasion, of the plurality of downlink control signal/channel transmission occasions, for example, if the starting downlink control signal/channel transmission occasion is the first downlink control signal/channel transmission occasion and the quantity of repetitions is equal to three. The reference/default CORESET may be the first CORESET comprising the third downlink control signal/channel transmission occasion, for example, if the starting downlink control signal/channel transmission occasion is the second downlink control signal/channel transmission occasion and the quantity of repetitions is equal to two.

The reference/default CORESET may be associated with (or may comprise) a last (or latest or ending) downlink control signal/channel transmission occasion of the plurality of downlink control signal/channel transmission occasions. The wireless device 2411 may monitor, for the downlink control signal/channel, the reference/default CORESET in the last (or latest or ending) downlink control signal/channel transmission occasion. The wireless device 2411 may determine the reference/default CORESET, for example, based on the reference/default CORESET being associated with (or comprising) the last (or latest or ending) downlink control signal/channel transmission occasion. The wireless device 2411 may determine a CORESET that is associated with (or comprising) the last (or latest or ending) downlink control signal/channel transmission occasion as being the reference/default CORESET.

The wireless device 2411 may monitor, for the downlink control signal/channel, the first CORESET in the first downlink control signal/channel transmission occasion at/during/in a first time unit (e.g., first time slot, first time symbol, first subframe, etc.). The wireless device 2411 may monitor, for the downlink control signal/channel, the second CORESET in the second downlink control signal/channel transmission occasion at/during/in a second time unit (e.g., second time slot, second time symbol, second subframe, etc.).

The last downlink control signal/channel transmission occasion may have the latest starting time among starting times of the plurality of downlink control signal/channel transmission occasions. The second time unit may start later in time than the first time unit. A first/starting symbol of the second time unit may occur after (or later) in time than a first/starting symbol of the second time unit. The second CORESET may be the reference/default CORESET based on the second time unit starting later in time than the first time unit.

The last downlink control signal/channel transmission occasion may have the latest ending time among ending times of the plurality of downlink control signal/channel transmission occasions. The second time unit may end later in time than the first time unit. A last symbol of the second time unit may occur after (or later) in time than a last symbol of the first time unit. The second CORESET may be the reference/default CORESET based on the second time unit ending later in time than the first time unit.

The last downlink control signal/channel transmission occasion may be associated with a last downlink control signal/channel among the plurality of DCI messages/PDCCH transmissions. The base station 2410 may send/transmit the last downlink control signal/channel in/via the last downlink control signal/channel transmission occasion. The wireless device 2411 may monitor, for the last downlink control signal/channel, the reference/default CORESET in the last downlink control signal/channel transmission occasion. The last downlink control signal/channel may be the reference downlink control signal/channel. The base station 2410 may send/transmit a last repetition of the downlink control signal/channel in the last downlink control signal/channel transmission occasion. The wireless device 2411 may monitor, for the last repetition of the downlink control signal/channel, the last downlink control signal/channel transmission occasion. The last repetition of the downlink control signal/channel may be the last downlink control signal/channel.

With reference to FIG. 24, the last downlink control signal/channel transmission occasion may be the second downlink control signal/channel transmission occasion (e.g., PDCCH transmission/repetition/monitoring occasion 2432-2). The reference/default CORESET may be the second CORESET (e.g., CORESET 2420-2). The reference/default CORESET may be the second CORESET, for example, based on the second CORESET being associated with the last downlink control signal/channel transmission occasion.

The reference/default CORESET may be associated with (or may comprise) a last/ending/latest symbol. The last/ending/latest symbol of the reference/default CORESET may occur/be latest among last/ending/latest symbols of the plurality of CORESETs. The wireless device 2411 may determine the reference/default CORESET, for example, based on the reference/default CORESET being associated with (or comprising) the last/ending/latest symbol. The wireless device 2411 may determine a CORESET that is associated with (or comprising) the last/ending/latest symbol as being the reference/default CORESET.

A last/ending/latest symbol of the second CORESET may occur later in time (or after) than a last/ending/latest symbol of the first CORESET. The second CORESET may be determined to be the reference/default CORESET, for example, based on the last/ending/latest symbol of the second CORESET occurring later in time (or after) than the last/ending/latest symbol of the first CORESET.

The reference/default CORESET may be associated with (or comprise) the earliest (or a first or a starting) downlink control signal/channel transmission occasion among the plurality of downlink control signal/channel transmission occasions. The wireless device 2411 may monitor, for the downlink control signal/channel, the reference/default CORESET in the earliest (or the first or the starting) downlink control signal/channel transmission occasion. The wireless device 2411 may determine the reference/default CORESET, for example, based on the reference/default CORESET being associated with (or comprising) the earliest (or the first or the starting) downlink control signal/channel transmission occasion. The wireless device 2411 may determine a CORESET that is associated with (or comprising) the earliest (or the first or the starting) downlink control signal/channel transmission occasion as being the reference/default CORESET.

The earliest (or the first or the starting) downlink control signal/channel transmission occasion may have the earliest starting time among starting times of the plurality of downlink control signal/channel transmission occasions. The first time unit may start earlier in time than the second time unit. A first/starting symbol of the first time unit may occur before (or earlier) in time than a first/starting symbol of the second time unit. The first CORESET may be the reference/default CORESET based on the first time unit starting earlier than the second time unit.

The earliest (or the first or the starting) downlink control signal/channel transmission occasion may have the earliest ending time among ending times of the plurality of downlink control signal/channel transmission occasions. The first time unit may end earlier in time than the second time unit. A last symbol of the first time unit may occur before (or earlier) in time than a last symbol of the second time unit. The first CORESET may be the reference/default CORESET based on the first time unit ending earlier than the second time unit.

The earliest (or the first or the starting) downlink control signal/channel transmission occasion may be associated with a first/starting downlink control signal/channel among the plurality of DCI messages/PDCCH transmissions. The base station 2410 may send/transmit the first/starting downlink control signal/channel in/via the earliest downlink control signal/channel transmission occasion. The wireless device 2411 may monitor, for the first/starting downlink control signal/channel, in/via the earliest downlink control signal/channel transmission occasion. The first/starting downlink control signal/channel may be the reference downlink control signal/channel. The base station 2410 may send/transmit a first/starting repetition of the downlink control signal/channel in the earliest downlink control signal/channel transmission occasion. The wireless device 2411 may monitor, for the first/starting repetition of the downlink control signal/channel, in the earliest downlink control signal/channel transmission occasion. The first/starting repetition of the downlink control signal/channel may be the first/starting downlink control signal/channel.

With reference to FIG. 24, the earliest (or the first or the starting) downlink control signal/channel transmission occasion may be the first downlink control signal/channel transmission occasion (e.g., PDCCH transmission/repetition/monitoring occasion 2432-1). The reference/default CORESET may be the first CORESET (e.g., CORESET 2420-1). The reference/default CORESET may be the first CORESET, for example, based on the first CORESET being associated with earliest (or the first or the starting) downlink control signal/channel transmission occasion.

The reference/default CORESET may be associated with (or may comprise) a first/starting/earliest symbol. The first/starting/earliest symbol of the reference/default CORESET may occur/be earliest among first/starting/earliest symbols of the plurality of CORESETs. The wireless device 2411 may determine the reference/default CORESET, for example, based on the reference/default CORESET being associated with (or comprising) the first/starting/earliest symbol.

A first/starting/earliest of the first CORESET may occur earlier in time (or before) than a first/starting/earliest symbol of the second CORESET. The first CORESET may be the reference/default CORESET, for example, based on the first/starting/earliest symbol of the first CORESET occurring earlier in time (or before) than the first/starting/earliest symbol of the second CORESET.

The reference/default CORESET may be identified/indicated by a CORESET index of the plurality of CORESET indexes. The CORESET index may be lowest (or highest) among the plurality of CORESET indexes. The reference/default CORESET may be identified/indicated by a CORESET index that is lowest (or highest) among the plurality of CORESET indexes. The wireless device 2411 may determine/select the reference/default CORESET with a CORESET index that is lowest (or highest) among the plurality of CORESET indexes of the plurality of CORESETs. The wireless device 2411 may determine the reference/default CORESET, for example, based on the reference/default CORESET being identified/indicated by the CORESET index that is lowest (or highest) among the plurality of CORESET indexes of the plurality of CORESETs.

The wireless device 2411 may determine the reference/default CORESET, for example, based on the reference/default CORESET being associated with a reference downlink control signal/channel transmission occasion of the plurality of downlink control signal/channel transmission occasions. The wireless device 2411 may monitor, for the downlink control signal/channel, the reference/default CORESET in the reference downlink control signal/channel transmission occasion (e.g., last/ending/latest or first/starting/earliest downlink control signal/channel transmission occasion of the plurality of downlink control signal/channel transmission occasions).

The reference downlink control signal/channel transmission occasion may be associated with a reference downlink control signal/channel among the plurality of DCI messages/PDCCH transmissions. The base station 2410 may send/transmit the reference downlink control signal/channel in/via the reference downlink control signal/channel transmission occasion. The wireless device 2410 may monitor, for the reference downlink control signal/channel, the reference downlink control signal/channel transmission occasion. The wireless device 2410 may monitor, for the reference downlink control signal/channel, the CORESET in the reference downlink control signal/channel transmission occasion.

The reference/default CORESET may be associated with a search space set of the plurality of search space sets. The one or more configuration parameters 2415 may indicate the reference/default CORESET for the search space set. The wireless device 2411 may determine the reference/default CORESET, for example, based on the reference/default CORESET being associated with the search space set.

The search space set may be identified/indicated by a search space set indicator/index of the search space set indicators/indexes. The search space set index may be lowest (or highest) among the search space set indexes of the plurality of search space sets. The search space set may be identified/indicated by a search space set index that is lowest (or highest) among the search space set indexes. The first search space set index of the first search space set of the first CORESET may be lower (or higher) than the second search space set index of the second search space set of the second CORESET. The first CORESET may be the reference/default CORESET, for example, based on the first search space set index of the first search space set of the first CORESET being lower (or higher) than the second search space set index of the second search space set of the second CORESET. The second CORESET may be the reference/default CORESET, for example, based on the second search space set index of the second search space set of the second CORESET being lower (or higher) than the first search space set index of the first search space set of the first CORESET.

The reference/default CORESET may be associated with a PDCCH candidate of the plurality of PDCCH candidates. The one or more configuration parameters 2415 may indicate the reference/default CORESET for the PDCCH candidate. The wireless device 2411 may determine the reference/default CORESET, for example, based on the reference/default CORESET being associated with the PDCCH candidate.

The PDCCH candidate may be identified/indicated by a PDCCH candidate indicator/index of PDCCH candidate indicators/indexes of the PDCCH candidates. The one or more configuration parameters 2415 may indicate, for the PDCCH candidates, the PDCCH candidate indexes. In an example, the PDCCH candidate index may be lowest (or highest) among the PDCCH candidate indexes of the PDCCH candidates. The PDCCH candidate may be identified/indicated by a PDCCH candidate index that is lowest (or highest) among the PDCCH candidate indexes. The first PDCCH candidate index of the first PDCCH candidate associated with the first CORESET may be lower (or higher) than the second PDCCH candidate index of the second PDCCH candidate associated with the second CORESET. The first CORESET may be the reference/default CORESET, for example, based on the first PDCCH candidate index of the first PDCCH candidate being lower (or higher) than the second PDCCH candidate index of the second PDCCH candidate. The second CORESET may be the reference/default CORESET, for example, based on the second PDCCH candidate index of the second PDCCH candidate being lower (or higher) than the first PDCCH candidate index of the first PDCCH candidate of the first CORESET.

A CCE starting indicator/index of the PDCCH candidate may be lowest (or highest) among CCE starting indicators/indexes of the PDCCH candidates. The one or more configuration parameters 2415 may indicate, for the PDCCH candidates, the CCE starting indexes. The first CCE starting index of the first PDCCH candidate associated with the first CORESET may be lower (or higher) than the second CCE starting index of the second PDCCH candidate associated with the second CORESET. The first CORESET may be the reference/default CORESET, for example, based on the first CCE starting index of the first PDCCH candidate being lower (or higher) than the second CCE starting index of the second PDCCH candidate. The second CORESET may be the reference/default CORESET, for example, based on the second CCE starting index of the second PDCCH candidate being lower (or higher) than the first CCE starting index of the first PDCCH candidate of the first CORESET.

The reference/default CORESET may be associated with (or may comprise) a starting PRB. The starting PRB of the reference/default CORESET may occur/be lowest (or highest) in frequency among starting PRBs of the plurality of CORESETs. The wireless device 2411 may determine the reference/default CORESET, for example, based on the starting PRB of the reference/default CORESET occurring/being lowest (or highest) among the starting PRBs.

A starting PRB of the second CORESET may occur/be lower (or higher) in frequency than a starting PRB of the first CORESET. The second CORESET may be the reference/ default CORESET, for example, based on the starting PRB of the second CORESET occurring/being lower (or higher) than the starting PRB of the first CORESET. A starting PRB of the first CORESET may occur/be lower (or higher) in frequency than a starting PRB of the second CORESET. The first CORESET may be the reference/default CORESET based on the starting PRB of the first CORESET occurring/being lower (or higher) than the starting PRB of the second CORESET.

The reference/default CORESET may be associated with (or may comprise) an ending PRB. The ending PRB of the reference/default CORESET may occur/be lowest (or highest) in frequency among ending PRBs of the plurality of CORESETs. The wireless device 2411 may determine the reference/default CORESET, for example, based on the ending PRB of the reference/default CORESET occurring/being lowest (or highest) among the ending PRBs.

An ending PRB of the second CORESET may occur/be lower (or higher) in frequency than an ending PRB of the first CORESET. The second CORESET may be the reference/default CORESET, for example, based on the ending PRB of the second CORESET occurring/being lower (or higher) than the ending PRB of the first CORESET. An ending PRB of the first CORESET may occur/be lower (or higher) in frequency than an ending PRB of the second CORESET. The first CORESET may be the reference/default CORESET, for example, based on the ending PRB of the first CORESET occurring/being lower (or higher) than the ending PRB of the second CORESET.

The wireless device 2411 may determine the reference/default CORESET based on receiving, via the at least one CORESET of the plurality of CORESETs, the at least one downlink control signal/channel (or the downlink control signal/channel). The wireless device 2411 may determine the reference/default CORESET based on the repetition scheme being a first repetition scheme. The first repetition scheme, for example, may be a frequency domain repetition scheme (e.g., FDM), a time domain repetition scheme (e.g., TDM), or a spatial/code domain repetition domain repetition scheme (e.g., single-frequency network (SFN), SDM). The wireless device 2411 may determine the reference/default CORESET based on the repetition scheme not being a second repetition scheme. The second repetition scheme, for example, may be a spatial/code domain repetition domain repetition scheme (e.g., SFN, SDM), a time domain repetition scheme (e.g., TDM), or a frequency domain repetition scheme (e.g., FDM).

The downlink control signal/channel may be correspond to a DCI format. The DCI format may be a non-fallback DCI format, a DCI format 1-1, a DCI format 0-1, or a DCI format 1-2. The DCI format may be a DCI format 1-x, where x=1, 2, 3, .... The DCI format may be a DCI format 0-x, where x=1, 2, 3 ....

The at least one downlink control signal/channel (or the downlink control signal/channel) may indicate a CORESET pool index. Each downlink control signal/channel of the at least one downlink control signal/channel may indicate the CORESET pool index. The at least one downlink control signal/channel indicating the CORESET pool index may comprise the downlink control signal/channel indicating the CORESET pool index. The wireless device 2411 may determine, for reception of the downlink signal 2435, the CORESET based on the indicated CORESET pool index.

The at least one downlink control signal/channel (or the downlink control signal/channel) may comprise a TCI field (or a TCI codepoint field) indicating the CORESET pool index. Each downlink control signal/channel of the at least one downlink control signal/channel may comprise the TCI field indicating the CORESET pool index.

A value of the TCI field may indicate the CORESET pool index. The CORESET pool index indicated by the TCI field may be (equal to) the first CORESET pool index (e.g., CoresetPoolIndex=0), for example, based on the value of the TCI field being equal to a first value (e.g., 0). The first value of the TCI field may indicate the first CORESET pool index. The first value may be equal to the first CORESET pool index. The CORESET pool index indicated by the TCI field may be (equal to) the second CORESET pool index (e.g., CoresetPoolIndex=1), for example, if the value of the TCI field is equal to a second value (e.g., 1). The second value of the TCI field may indicate the second CORESET pool index. The second value may be equal to the second CORESET pool index.

A value of the TCI field may indicate the CORESET pool index. The CORESET pool index indicated by the TCI field may be (equal to) the first value (e.g., CoresetPoolIndex=0), for example, if the value of the TCI field is equal to a first value (e.g., 0). The CORESET pool index indicated by the TCI field may be (equal to) the second value (e.g., CoresetPoolIndex=1), for example, if the value of the TCI field is equal to a second value (e.g., 1).

The wireless device 2411 may determine the TCI state of the CORESET as the default TCI state, for example, based on the CORESET pool index of the CORESET being equal to the value of the TCI field. The wireless device 2411 may determine the TCI state of the CORESET as the default TCI state, for example, based on the CORESET pool index of the CORESET being equal to the value of the TCI field. The wireless device 2411 may determine the TCI state of the CORESET as the default TCI state, for example, based on the one or more configuration parameters 2415 indicating, as the CORESET pool index of the CORESET, the value of the TCI field.

The wireless device 2411 may determine, for reception of the downlink signal 2435, the CORESET, for example, based on the one or more configuration parameters 2415 indicating, as the CORESET pool index of the CORESET, the value indicated by the TCI field. The wireless device 2411 may determine, for reception of the downlink signal 2435, the CORESET, for example, based on the CORESET pool index of the CORESET being equal to the value of the TCI field.

The wireless device 2411 may determine the TCI state of the CORESET as the default TCI state, for example, based on the CORESET pool index of the CORESET being equal to the CORESET pool index indicated by the TCI field. The wireless device 2411 may determine the TCI state of the CORESET as the default TCI state, for example, based on the one or more configuration parameters 2415 indicating, for the CORESET, the CORESET pool index as may be indicated by the TCI field. The wireless device 2411 may determine the TCI state of the CORESET as the default TCI state, for example, based on the one or more configuration parameters 2415 indicating, as the CORESET pool index of the CORESET, the CORESET pool index indicated by the TCI field. The CORESET pool index of the CORESET may be (equal to) the first CORESET pool index (e.g., CoresetPoolIndex=0), for example, if the CORESET pool index indicated by the TCI field is equal to 0 (or any other first value). The CORESET pool index of the CORESET may be (equal to) the second CORESET pool index (e.g., CoresetPoolIndex=1), for example, if the CORESET pool index indicated by the TCI field is equal to 1 (or any other second value different from the first value).

The wireless device 2411 may determine, for reception of the downlink signal 2435, the CORESET, for example, based on the one or more configuration parameters 2415 indicating, for the CORESET, the CORESET pool index indicated by the TCI field. The wireless device 2411 may determine, for reception of the downlink signal 2435, the CORESET, for example, based on the one or more configuration parameters 2415 indicating, as the CORESET pool index of the CORESET, the CORESET pool index indicated by the TCI field. The wireless device 2411 may determine, for reception of the downlink signal 2435, the CORESET, for example, based on the CORESET pool index of the CORESET being equal to the CORESET pool index indicated by the TCI field.

The downlink control signal/channel may comprise one or more fields indicating the CORESET pool index. Each downlink control signal/channel of the at least one downlink control signal/channel may comprise the one or more fields indicating the CORESET pool index.

The one or more fields may be set to one or more predefined/preconfigured/default values. Each field of the one or more fields may be set to a respective predefined/preconfigured/default value of the one or more predefined/preconfigured/default values. The one or more fields of the downlink control signal/channel may indicate the CORESET pool index, for example, based on the one or more fields being set to the one or more predefined/preconfigured/default values. The base station 2410 may, for example, set the one or more predefined/preconfigured values for the one or more fields. The one or more fields may comprise one or more of a TCI field, a time domain resource allocation (TDRA) field, a frequency domain resource allocation (FDRA) field, a resource allocation field, a redundancy version (RV) field, a HARQ process field, a PUCCH resource indicator field, etc.

The CORESET pool index indicated by the one or more fields may be (equal to) the first CORESET pool index (e.g., CoresetPoolIndex=0), for example, if the one or more predefined/preconfigured/default values is equal (or is set) to one or more first predefined/preconfigured/default values. The one or more first predefined/preconfigured/default values may indicate the first CORESET pool index. The CORESET pool index indicated by the one or more fields may be (equal to) the second CORESET pool index (e.g., CoresetPoolIndex=1), for example, if the one or more predefined/preconfigured/default values is equal (or is set) to one or more second predefined/preconfigured/default values. The one or more second predefined/preconfigured/default values may indicate the second CORESET pool index. The wireless device 2411 may determine the TCI state of the CORESET as the default TCI state, for example, based on the CORESET pool index of the CORESET being indicated by the one or more predefined/preconfigured/default values.

The wireless device 2411 may determine, for reception of the downlink signal 2435, the CORESET, for example, based on the CORESET pool index of the CORESET being indicated by the one or more predefined/preconfigured/default values. The wireless device 2411 may determine the TCI state of the CORESET as the default TCI state, for example, based on the CORESET pool index of the CORESET being equal to the CORESET pool index indicated by the one or more predefined/preconfigured/default values. The wireless device 2411 may determine the TCI state of the CORESET as the default TCI state, for example, based on the CORESET pool index of the CORESET being equal to the CORESET pool index indicated by the one or more predefined/preconfigured/default values. The wireless device 2411 may determine the TCI state of the CORESET as the default TCI state, for example, based on the one or more configuration parameters 2415 indicating/configuring, for the CORESET, the CORESET pool index indicated by the one or more predefined/preconfigured/default values. The wireless device 2411 may determine the TCI state of the CORESET as the default TCI state, for example, based on the one or more configuration parameters 2415 indicating/configuring, as the CORESET pool index of the CORESET, the CORESET pool index indicated by the one or more predefined/preconfigured/default values. The CORESET pool index of the CORESET may be (equal to) the first CORESET pool index (e.g., CoresetPoolIndex=0), for example, if the CORESET pool index indicated by the one or more predefined/preconfigured/default values is equal to a first value (e.g., 0). The CORESET pool index of the CORESET may be (equal to) the second CORESET pool index (e.g., CoresetPoolIndex=1), for example, if the CORESET pool index indicated by the one or more predefined/preconfigured/default values is equal to a second value (e.g., 1).

The wireless device 2411 may determine, for reception of the downlink signal 2435, the CORESET, for example, based on the one or more configuration parameters 2415 indicating, for the CORESET, the CORESET pool index indicated by the one or more predefined/preconfigured/default values. The wireless device 2411 may determine, for reception of the downlink signal 2435, the CORESET, for example, based on the one or more configuration parameters 2415 indicating, as the CORESET pool index of the CORESET, the (same) CORESET pool index indicated by the one or more predefined/preconfigured/default values. The wireless device 2411 may determine, for reception of the downlink signal 2435, the CORESET, for example, based on the CORESET pool index of the CORESET being equal to the CORESET pool index indicated by the one or more predefined/preconfigured/default values.

The wireless device 2411 may determine the TCI state of the CORESET as the default TCI state, for example, based on the CORESET pool index of the CORESET being equal to the CORESET pool index indicated by the at least one downlink control signal/channel (or the downlink control signal/channel). The wireless device 2411 may determine the TCI state of the CORESET as the default TCI state, for example, based on the CORESET pool index of the CORESET being equal to the CORESET pool index indicated by the at least one downlink control signal/channel (or the downlink control signal/channel). The wireless device 2411 may determine the TCI state of the CORESET as the default TCI state, for example, based on the one or more configuration parameters 2415 indicating, for the CORESET, the CORESET pool index indicated by the at least one downlink control signal/channel (or the downlink control signal/channel). The wireless device 2411 may determine the TCI state of the CORESET as the default TCI state, for example, based on the one or more configuration parameters 2415 indicating, for the CORESET pool index of the CORESET, the CORESET pool index indicated by the at least one downlink control signal/channel (or the downlink control signal/channel). The CORESET pool index of the CORESET may be (equal to) the first CORESET pool index (e.g., CoresetPoolIndex=0), for example, if the CORESET pool index indicated by the at least one downlink control signal/channel (or the downlink control signal/channel) is equal to a first value (e.g., 0). The CORESET pool index of the CORESET may be (equal to) the second CORESET pool index (e.g., CoresetPoolIndex=1), for example, if the CORESET pool index indicated by the at least one downlink control signal/channel (or the downlink control signal/channel) is equal to a second value (e.g., 1).

The wireless device 2411 may determine the TCI state of the CORESET as the default TCI state, for example, based on the CORESET pool index of the CORESET being equal to the CORESET pool index indicated by the at least one downlink control signal/channel (or the downlink control signal/channel). The wireless device 2411 may determine the TCI state of the CORESET as the default TCI state, for example, based on the CORESET pool index of the CORESET being equal to the CORESET pool index indicated by the at least one downlink control signal/channel (or the downlink control signal/channel). The wireless device 2411 may determine the TCI state of the CORESET as the default TCI state, for example, based on the one or more configuration parameters 2415 indicating, for the CORESET, the CORESET pool index indicated by the at least one downlink control signal/channel (or the downlink control signal/channel). The wireless device 2415 may determine the TCI state of the CORESET as the default TCI state, for example, based on the one or more configuration parameters 2415 indicating, as the CORESET pool index of the CORESET, the (same) CORESET pool index indicated by the at least one downlink control signal/channel (or the downlink control signal/channel). The CORESET pool index of the CORESET may be (equal to) the first CORESET pool index (e.g., CoresetPoolIndex=0), for example, if the CORESET pool index indicated by the at least one downlink control signal/channel (or the downlink control signal/channel) is equal to a first value (e.g., 0). The CORESET pool index of the CORESET may be (equal to) the second CORESET pool index (e.g., CoresetPoolIndex=1), for example, if the CORESET pool index indicated by the at least one downlink control signal/channel (or the downlink control signal/channel) is equal to a second value (e.g., 1).

The wireless device 2411 may determine, for reception of the downlink signal 2435, the CORESET, for example, based on the one or more configuration parameters 2415 indicating, for the CORESET, the CORESET pool index indicated by the at least one downlink control signal/channel (or the downlink control signal/channel). The wireless device 2415 may determine, for reception of the downlink signal 2435, the CORESET, for example, based on the one or more configuration parameters 2415 indicating, as the CORESET pool index of the CORESET, the CORESET pool index indicated by the at least one downlink control signal/channel (or the downlink control signal/channel). The wireless device 2415 may determine, for reception of the downlink signal 2435, the CORESET, for example, based on the CORESET pool index of the CORESET being equal to the CORESET pool index indicated by the at least one downlink control signal/channel (or the downlink control signal/channel).

The wireless device 2411 may determine, for reception of the downlink signal 2435, the CORESET, for example, based on the one or more configuration parameters 2415 indicating, for the CORESET, the CORESET pool index that is same as the CORESET pool index indicated by the at least one downlink control signal/channel (or the downlink control signal/channel). The wireless device 2411 may determine, for reception of the downlink signal 2435, the CORESET, for example, based on the one or more configuration parameters 2415 indicating, as the CORESET pool index of the CORESET, the CORESET pool index indicated by the at least one downlink control signal/channel (or the downlink control signal/channel). The wireless device 2411 may determine, for reception of the downlink signal 2435, the CORESET, for example, based on the CORESET pool index of the CORESET being equal to the CORESET pool index indicated by the at least one downlink control signal/channel (or the downlink control signal/channel).

The one or more configuration parameters 2415 may not indicate a control channel repetition. The wireless device 2411 may receive/detect, in/via a reception CORESET of the plurality of CORESETs, DCI scheduling/triggering reception of a downlink signal 2435 (e.g., transport block, PDSCH, CSI-RS, aperiodic CSI-RS, and the like). The wireless device 2411 may receive, in a downlink control signal/channel transmission occasion (e.g., PDCCH monitoring occasion) of the reception CORESET, the DCI.

A time offset between the downlink control signal/channel transmission occasion and the downlink signal 2435 may be less than a threshold (e.g., timeDurationForQCL). A time offset between the reception CORESET and the downlink signal 2435 may be less than a threshold (e.g., timeDurationForQCL). A time offset between the DCI and the downlink signal 2435 may be less than a threshold (e.g., timeDurationForQCL).

The wireless device 2411 may determine a default TCI state (or a default antenna port quasi co-location property/assumption). The wireless device 2411 may determine, for reception of the downlink signal, the default TCI state. The wireless device 2411 may determine the default TCI state, for example, based on the time offset being less than the threshold.

The wireless device 2411 may receive the downlink signal 2435 based on the default TCI state. The receiving the downlink signal 2435 based on the default TCI state (or the antenna port quasi co-location property/assumption) may comprise at least one DM-RS antenna port of the downlink signal 2435 being quasi co-located (QCL-ed) with a reference signal indicated by (or in) the default TCI state. The receiving the downlink signal 2435 based on the default TCI state may comprise applying the default TCI state (or the antenna port quasi co-location property/assumption) for a reception (or to receive) the downlink signal 2435. The receiving the downlink signal 2435 based on the default TCI state may comprise measuring/assessing/determining a radio link quality (e.g., L1-RSRP, L-RSRP, SINR, SNR, BLER) of a reference signal indicated by (or in) the default TCI state.

The wireless device 2411 may determine the default TCI state based on a TCI state (or an antenna port quasi co-location property/assumption) of a CORESET. The default TCI state may be same as the TCI state of the CORESET. The default TCI state may be the TCI state of the CORESET.

The one or more configuration parameters 2415 may indicate, for the CORESET, the TCI state. The wireless device 2411 may receive an activation command (e.g., MAC-CE, DCI) indicating/activating/updating the TCI state for the CORESET. The wireless device 2411 may monitor, for DCI, PDCCH in the CORESET based on the TCI state.

The CORESET may be identified/indicated by a CORESET index. The plurality of CORESET indexes may comprise the CORESET index. The CORESET index may be lowest (or highest) among the plurality of CORESET indexes. The CORESET may be identified/indicated by a CORESET index that is lowest (or highest) among the plurality of CORESET indexes. The wireless device 2411 may determine/select the CORESET with the CORESET index that is lowest (or highest) among the plurality of CORESET indexes of the plurality of CORESETs. The wireless device 2411 may determine the TCI state of the CORESET as the default TCI state, for example, based on the CORESET being identified/indicated by the CORESET index that is lowest (or highest) among the plurality of CORESET indexes of the plurality of CORESETs. The wireless device 2411 may determine the TCI state of the CORESET as the default TCI state, for example, based on the CORESET being identified/indicated by the CORESET index that is lowest (or highest) among the plurality of CORESET indexes of the plurality of CORESETs. The wireless device 2411 may determine, for reception of the downlink signal 2435, the CORESET among the plurality of CORESETs, for example, based on the CORESET being identified/indicated by the CORESET index that is lowest (or highest) among the plurality of CORESET indexes of the plurality of CORESETs The one or more configuration parameters 2415 may indicate a first CORESET pool index (e.g., 0, 1, or any other value) for the reception CORESET. The one or more configuration parameters 2415 may indicate a second CORESET pool index (e.g., 0, 1, or any other value) for the CORESET. The first CORESET pool index of the reception CORESET and the second CORESET pool index of the CORESET may be the same (or equal). The first CORESET pool index of the reception CORESET and the second CORESET pool index of the CORESET may be different.

The wireless device 2411 may determine the TCI state of the CORESET as the default TCI state, for example, based on the first CORESET pool index of the reception CORESET and the second CORESET pool index of the CORESET being the same (or equal). The wireless device 2411 may determine, for reception of the downlink signal 2435, the CORESET, for example, based on the first CORESET pool index of the reception CORESET and the second CORESET pool index of the CORESET being the same (or equal). The wireless device 2411 may determine, for reception of the downlink signal 2435, the CORESET based on the first CORESET pool index of the reception CORESET via which the wireless device 2411 receives the DCI, for example, based on (e.g., in response to) the one or more configuration parameters 2415 not indicating the control channel repetition.

Figure 25A:
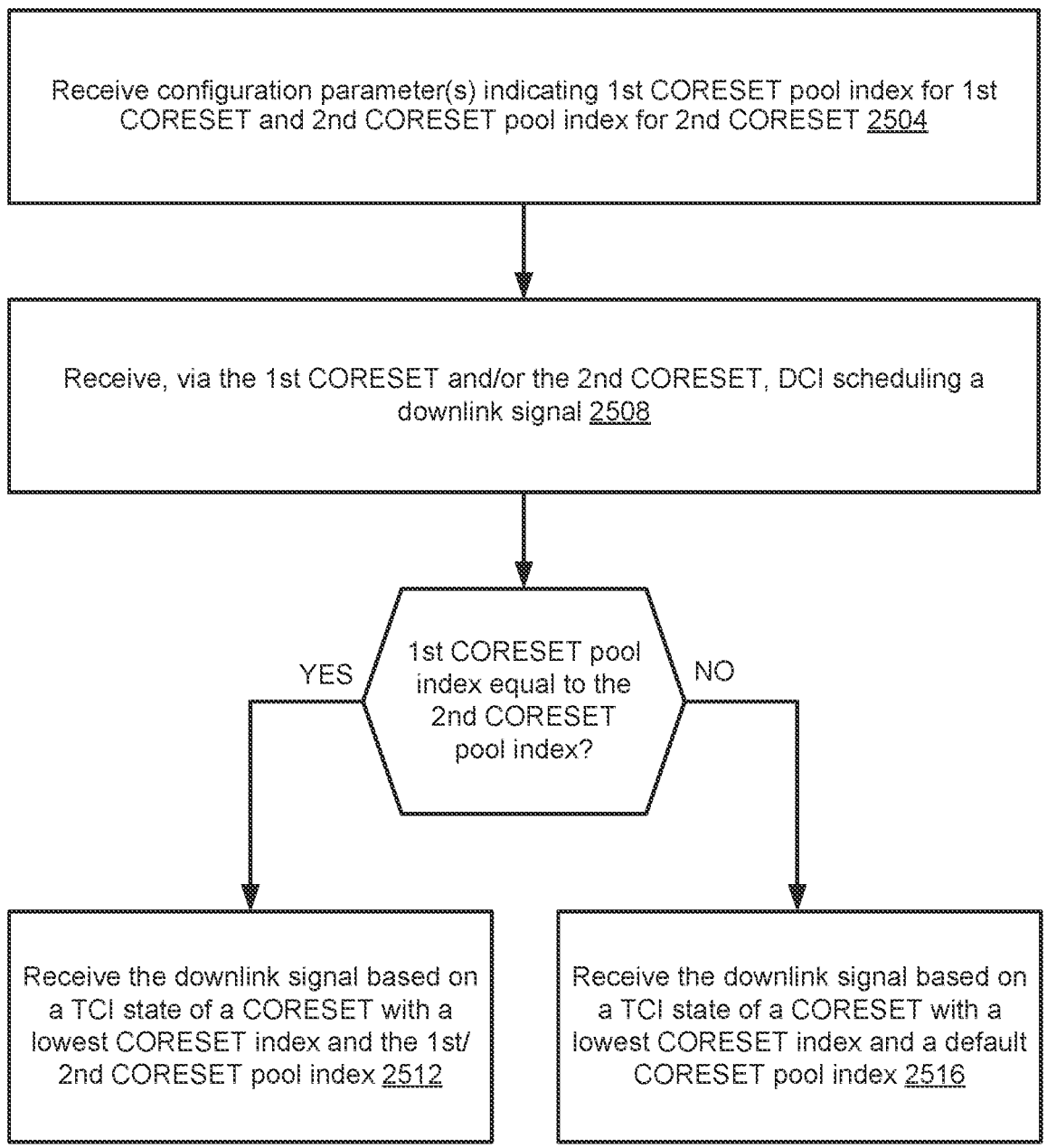
FIGS. 25A and 25B show example methods of channel repetition for transmission and/or reception.

FIG. 25A shows an example method of channel repetition for transmission and/or reception. The example method 2500 of FIG. 25A relates to control channel repetition for reception of control information (e.g., DCI) from a base station (e.g., the base station 2410). The example method 2500 may be performed at a wireless device (e.g., the wireless device 2411). At step 2504, the wireless device may receive configuration parameters. The configuration parameters may indicate a first CORESET pool index/indicator for a first CORESET and a second CORESET pool index/indicator for a second CORESET. The first CORESET and the second CORESET may be linked for repetition. The configuration parameters may indicate control channel repetition for transmission of DCI via the first CORESET and the second CORESET. The first CORESET pool index and the second CORESET pool index may be same or may be different.

At step 2508, the wireless device may receive, via the first CORESET and/or the second CORESET, DCI. The DCI may be sent by a base station and may be repeated in the first CORESET and the second CORESET. The repetitions may be sent, by the base station, via different TRPs. The DCI may schedule a downlink signal (e.g., a transport block, a PDSCH transmission). A time offset between the DCI and the downlink signal may be less than or equal to a threshold value.

At step 2512, the wireless device may receive the downlink signal based on a TCI state of a CORESET with a lowest CORESET index and the first/second CORESET pool index, for example, if the first CORESET pool index and the second CORESET pool index are the same (e.g., equal). At step 2516, the wireless device may receive the downlink signal based on a TCI state of a CORESET with a lowest CORESET index and a default CORESET pool index, for example, if the first CORESET pool index and the second CORESET pool index are different. The default CORESET pool index may be indicated in DCI (e.g., in a TCI field of the DCI). The default CORESET pool index may be preconfigured (e.g., via/indicated in the configuration parameters). The default CORESET pool index may correspond to a CORESET pool index of a reference/default CORESET.

Figure 25B:
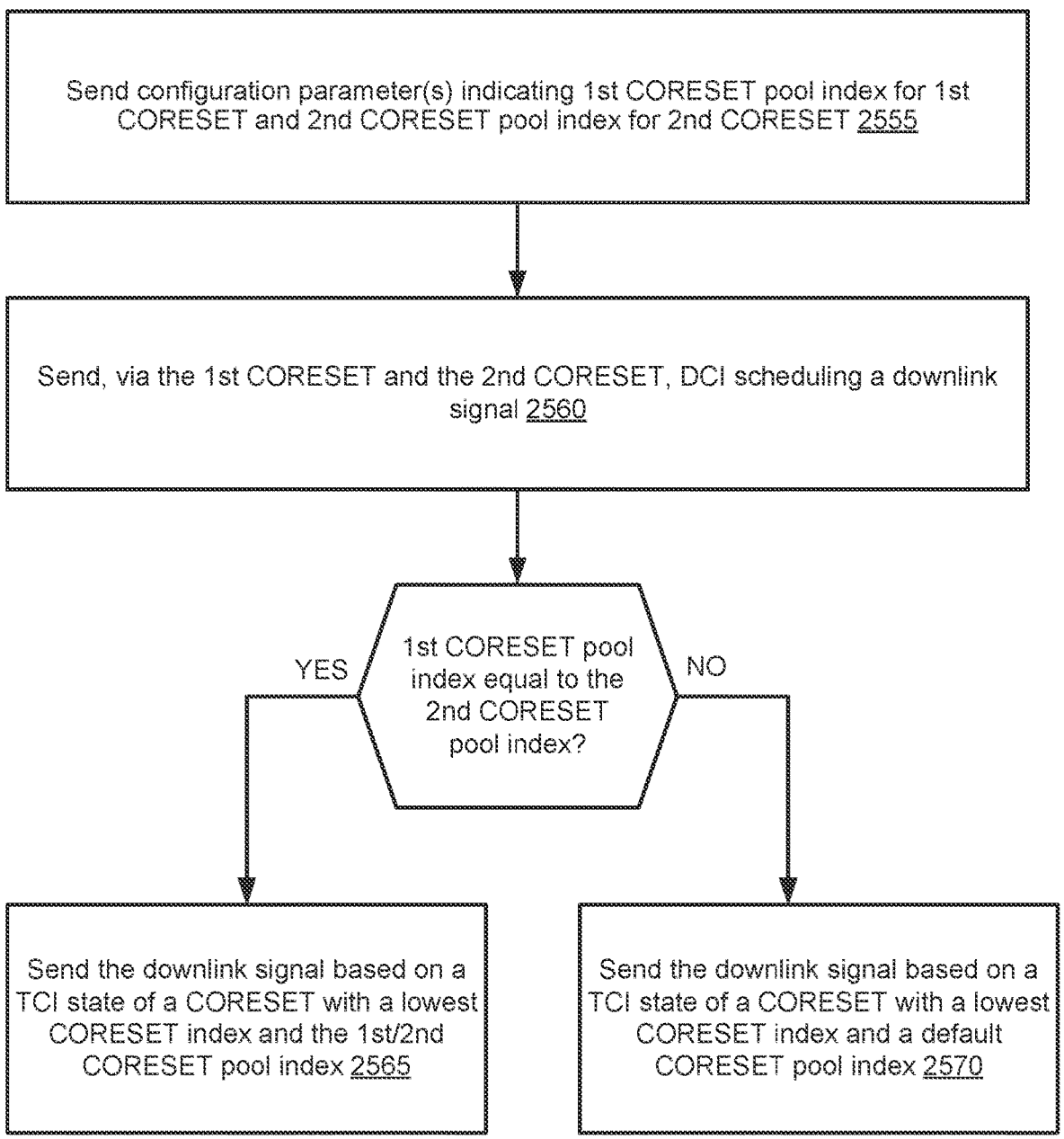

FIG. 25B shows an example method of channel repetition for transmission and/or reception. The example method 2550 relates to control channel transmission for transmission of control information (e.g., DCI) from a base station (e.g., the base station 2410). At step 2555, the base station may send configuration parameters. The configuration parameters may indicate a first CORESET pool index/indicator for a first CORESET and a second CORESET pool index/indicator for a second CORESET. The first CORESET and the second CORESET may be linked for repetition. The configuration parameters may indicate control channel repetition for transmission of DCI via the first CORESET and the second CORESET. The first CORESET pool index and the second CORESET pool index may be same or may be different.

At step 2560, the base station may send, via the first CORESET and the second CORESET, DCI. The DCI may be repeated in the first CORESET and the second CORESET. The DCI may schedule a downlink signal (e.g., a TB, a PDSCH transmission). A time offset between the DCI and the downlink signal may be less than or equal to a threshold value.

At step 2565, the base station may send the downlink signal based on a TCI state of a CORESET with a lowest CORESET index and the first/second CORESET pool index, for example, if the first CORESET pool index and the second CORESET pool index are the same (e.g., equal). At step 2570, the base station may send the downlink signal based on a TCI state of a CORESET with a lowest CORESET index and a CORESET pool index, for example, if the first CORESET pool index and the second CORESET pool index are different. The default CORESET pool index may be indicated in DCI (e.g., in a TCI field of the DCI). The default CORESET pool index may be preconfigured (e.g., via/indicated in the configuration parameters). The default CORESET pool index may correspond to a CORESET pool index of reference/default CORESET.

A wireless device may receive (e.g., from a base station) one or more messages comprising one or more configuration parameters for/of a cell. The one or more configuration parameters may indicate a first CORESET. The one or more configuration parameters may indicate a second CORESET. The first CORESET and the second CORESET may be mapped/linked/associated for control channel repetition (e.g., PDCCH repetition, DCI repetition, PDCCH/DCI aggregation, and the like). The one or more configuration parameters may indicate, for the control channel repetition, a mapping/linkage/association between the first CORESET and the second CORESET. The one or more configuration parameters may indicate, for the first CORESET, a first CORESET pool index. The one or more configuration parameters may indicate, for the second CORESET, a second CORESET pool index.

The first CORESET and the second CORESET being mapped/linked/associated for the control channel repetition may comprise a first search space set of the first CORESET and a second search space set of the second CORESET being mapped/linked/associated for the control channel repetition. The first CORESET and the second CORESET being mapped/linked/associated for the control channel repetition may comprise at least one first search space set of the first CORESET and at least one second search space set of the second CORESET being mapped/linked/associated for the control channel repetition. The first CORESET and the second CORESET being mapped/linked/associated for the control channel repetition may comprise a first PDCCH candidate of (or associated with) the first CORESET and a second PDCCH candidate of (or associated with) the second CORESET being mapped/linked/associated for the control channel repetition.

The wireless device may monitor, for a plurality of DCI messages/PDCCH transmissions (e.g., repetition of a downlink control signal/channel), the first CORESET and the second CORESET. Each downlink control signal/channel of the plurality of DCI messages/PDCCH transmissions may be same as the downlink control signal/channel Each downlink control signal/channel of the plurality of DCI messages/PDCCH transmissions may be same as the downlink control signal/channel, for example, based on the plurality of DCI messages/PDCCH transmissions being transmitted by the base station for repetition of the downlink control signal/channel Each downlink control signal/channel of the plurality of DCI messages/PDCCH transmissions may be same as the downlink control signal/channel, for example, based on monitoring, for the plurality of DCI messages/PDCCH transmissions, the first CORESET and the second CORESET for repetition of the downlink control signal/channel. The wireless device may monitor, for the plurality of DCI messages/PDCCH transmissions (e.g., the repetition of the downlink control signal/channel), the first CORESET and the second CORESET in a plurality of downlink control signal/channel transmission occasions.

The wireless device may receive/detect at least one downlink control signal/channel among/of the plurality of DCI messages/PDCCH transmissions. The receiving/detecting the at least one downlink control signal/channel among/of the plurality of DCI messages/PDCCH transmissions may comprise/be receiving/detecting the downlink control signal/channel. The wireless device may receive, via at least one of the first CORESET and the second CORESET, the at least one downlink control signal/channel (or the downlink control signal/channel). For example, the at least one downlink control signal/channel (or the downlink control signal/channel) may indicate schedule/trigger a reception of a downlink signal (e.g., PDSCH, CSI-RS, TB).

A time offset between a reference downlink control signal/channel transmission occasion of the plurality of downlink control signal/channel transmission occasions and the downlink signal may be less than a threshold (e.g., timeDurationForQCL). The wireless device may determine the reference downlink control signal/channel transmission occasion, for example, based on one or more criteria as described with respect to FIG. 24.

The wireless device may determine a default TCI state (or a default antenna port quasi co-location property/assumption). The wireless device may determine, for reception of the downlink signal, the default TCI state. The wireless device may determine the default TCI state based on the time offset being less than the threshold.

The wireless device may receive the downlink signal based on the default TCI state. The wireless device may determine the default TCI state based on a TCI state (or an antenna port quasi co-location property/assumption) of a CORESET. The default TCI state may be same as the TCI state of the CORESET. The default TCI state may be the TCI state of the CORESET. The wireless device may monitor, for DCI, PDCCH in the CORESET based on the TCI state.

A plurality of CORESETs in an active downlink BWP of the cell may comprise the CORESET. The plurality of CORESETs may comprise the CORESET.

The CORESET may be identified/indicated by a CORESET index. A plurality of CORESET indexes of the plurality of CORESETs may, for example, comprise the CORESET index. The CORESET index may be lowest (or highest) among the plurality of CORESET indexes. The CORESET may be identified/indicated by a CORESET index that is lowest (or highest) among the plurality of CORESET indexes. The wireless device may determine/select the CORESET with the CORESET index that is lowest (or highest) among the plurality of CORESET indexes of the plurality of CORESETs. The wireless device may determine the TCI state of the CORESET as the default TCI state, for example, based on the CORESET being identified/indicated by the CORESET index that is lowest (or highest) among the plurality of CORESET indexes of the plurality of CORESETs. The wireless device may determine, for reception of the downlink signal, the CORESET among the plurality of CORESETs, for example, based on the CORESET being identified/indicated by the CORESET index that is lowest (or highest) among the plurality of CORESET indexes of the plurality of CORESETs.

The one or more configuration parameters may indicate, for the CORESET, a CORESET pool index. The first CORESET pool index and the second CORESET pool index may be the same. The first CORESET pool index may be equal to zero and the second CORESET pool index may be equal to zero. The first CORESET pool index may be equal to one and the second CORESET pool index may be equal to one. The first CORESET pool index and the second CORESET pool index may be equal to a value. The one or more configuration parameters may indicate, for the CORESET, the CORESET pool index that is equal to the value. The CORESET pool index of the CORESET may be equal to the value. The CORESET pool index of the CORESET may be equal to the first CORESET pool index. The CORESET pool index of the CORESET may be equal to the second CORESET pool index. The wireless device may determine the TCI state of the CORESET as the default TCI state, for example, based on the one or more configuration parameters indicating, for the CORESET, the CORESET pool index that is equal to the value. The wireless device may determine, for reception of the downlink signal, the CORESET among the plurality of CORESETs, for example, based on the one or more configuration parameters indicating, for the CORESET, the CORESET pool index that is equal to the value.

The first CORESET pool index and the second CORESET pool index may be different. The first CORESET pool index may be equal to zero and the second CORESET pool index may be equal to one. The first CORESET pool index may be equal to one and the second CORESET pool index may be equal to zero. The wireless device may determine the TCI state of the CORESET as the default TCI state, for example, based on a CORESET pool.

The wireless device may determine the TCI state of the CORESET as the default TCI state, for example, based on the one or more configuration parameters indicating, for the CORESET, the CORESET pool index that is equal to a value. The wireless device may determine the TCI state of the CORESET as the default TCI state, for example, based on the CORESET pool index of the CORESET being equal to a value. The wireless device may determine, for reception of the downlink signal, the CORESET among the plurality of CORESETs, for example, based on the one or more configuration parameters indicating, for the CORESET, the CORESET pool index that is equal to a value. The wireless device may determine, for reception of the downlink signal, the CORESET among the plurality of CORESETs, for example, based on the CORESET pool index of the CORESET being equal to a value. The wireless device may determine the TCI state of the CORESET as the default TCI state, for example, based on the first CORESET pool index and the second CORESET pool index being different. The wireless device may determine, for reception of the downlink signal, the CORESET among the plurality of CORESETs, for example, based on the first CORESET pool index and the second CORESET pool index being different.

The value may be fixed/predefined/preconfigured/default. The value may be equal to zero (or any other value). The value may be indicated by the one or more configuration parameters.

The value may be equal to a lowest CORESET pool index among the first CORESET pool index and the second CORESET pool index. The first CORESET pool index may be equal to zero. The second CORESET pool index may be equal to one. The value (or the lowest CORESET pool index) may be equal to the first CORESET pool index that is equal to zero. The first CORESET pool index may be equal to one. The second CORESET pool index may be equal to zero. The value (or the lowest CORESET pool index) may be equal to the second CORESET pool index that is equal to zero.

The value may be equal to a highest CORESET pool index among the first CORESET pool index and the second CORESET pool index. The first CORESET pool index may be equal to one. The second CORESET pool index may be equal to zero. The value (or the highest CORESET pool index) may be equal to the first CORESET pool index that is equal to one. The first CORESET pool index may be equal to zero. The second CORESET pool index may be equal to one. The value (or the highest CORESET pool index) may be equal to the second CORESET pool index that is equal to one.

The wireless device may determine a reference/default CORESET among the plurality of CORESETs. The wireless device may determine the reference/default CORESET, for example, based on the first CORESET pool index and the second CORESET pool index being different. The wireless device may determine the reference/default CORESET, for example, based on one or more criteria discussed in FIG. 24. The one or more configuration parameters may indicate a CORESET pool index (e.g., 0, 1) for reference/default CORESET. The CORESET pool index of the reference/default CORESET may be equal to the value. The CORESET pool index of the reference/default CORESET may be equal to the value of the CORESET pool index of the CORESET. The CORESET pool index of the reference/default CORESET may be equal to the CORESET pool index of the CORESET.

The at least one downlink control signal/channel (or the downlink control signal/channel) may indicate the value.

The at least one downlink control signal/channel (or the downlink control signal/channel) may indicate the value of the CORESET pool index of the CORESET. The at least one downlink control signal/channel (or the downlink control signal/channel) may comprise a TCI field indicating the value. A value of the TCI field may be equal to the value. The value of the TCI field may indicate (or be equal to) the CORESET pool index of the CORESET. A first value (e.g., 0) of the TCI field may indicate (or be equal to) the first CORESET pool index. The CORESET pool index of the CORESET may be equal to the first CORESET pool index. The CORESET pool index of the CORESET may be equal to the first CORESET pool index, for example, based on the first value indicating (or being equal to) the first CORESET pool index. A second value (e.g., 1) of the TCI field may indicate (or be equal to) the second CORESET pool index. The CORESET pool index of the CORESET may be equal to the second CORESET pool index. The CORESET pool index of the CORESET may be equal to the second CORESET pool index, for example, based on the second value indicating (or being equal to) second first CORESET pool index. The first CORESET pool index of the first CORESET and the second CORESET pool index of the second CORESET may comprise the CORESET pool index of the CORESET.

A wireless device may receive (e.g., from a base station) one or more messages. The one or more messages may comprise/indicate one or more configuration parameters. The one or more configuration parameters may indicate one or more resources (e.g., CORESETs) for a cell. The one or more configuration parameters may indicate one or more CORESET pool indicators/indexes for the one or more CORESETs. Each CORESET of the one or more CORESETs may be indicated/identified by a respective CORESET pool index of the one or more CORESET indexes.

The wireless device may receive a first activation command (e.g., MAC-CE). The first activation command may indicate/activate one or more first TCI states. The first activation command may indicate a first CORESET pool index. The wireless device may receive a second activation command (e.g., MAC-CE). The second activation command may indicate/activate one or more second TCI states. The second activation command may indicate a second CORESET pool index.

The wireless device may receive, via a first CORESET of the one or more CORESETs, DCI. The DCI may schedule a downlink signal (e.g., a transport block, a PDSCH transmission). The one or more configuration parameters may indicate a CORESET pool indicator/index (e.g., 0, 1) for the first CORESET. The wireless device may receive the downlink signal based on a TCI state (e.g., a receiving beam) among one or more TCI states. The one or more TCI states may correspond to TCI states indicated/activated by an activation command that indicates the CORESET pool index of the first CORESET. The CORESET pool index may be equal to the first CORESET pool index. The CORESET pool index may be equal to the first CORESET pool index, for example, based on the first CORESET (e.g., via which the DCI is received) being indicated by the first CORESET pool index. The wireless device may receive the downlink signal based on a TCI state in/among the one or more first TCI states indicated/activated by the first activation command, for example, based on the CORESET pool index being equal to the first CORESET pool index. The CORESET pool index may be equal to the second CORESET pool index. The CORESET pool index may be equal to the second CORESET pool index, for example, based on the first CORESET (e.g., via which the DCI is received) being indicated by the second CORESET pool index. The wireless device may receive the downlink signal based on a TCI state in/among the one or more second TCI states indicated/activated by the second activation command, for example, based on the CORESET pool index being equal to the second CORESET pool index.

Control information, sent to a wireless device, may be repeated (e.g., for improved transmission reliability) across multiple resources. For example, control information may be repeated and sent via multiple TRPs (e.g., using PDCCH multi-TRP repetition for DCI). The control information repetition may be in time-domain, frequency-domain, and/or spatial/code domain. The wireless device, to receive the repeated control information, may monitor two (or more) linked resources (e.g., CORESETs) in a plurality of monitoring/repetition/transmission occasions. For example, the wireless device may monitor a first repetition of control information (e.g., DCI sent by a first TRP via a first CORESET) in a first monitoring occasion, and may monitors a second repetition of the control information (e.g., the repeated DCI sent by the second TRP via a second CORESET) in a second monitoring occasion.

While the above examples relate to repetition for transmission and/or reception of downlink control information (e.g., DCI via PDCCH), similar techniques may be applied for repetitions of any other type of information (e.g., data, transport blocks, etc.). For example, data may be repeated, for example, in one or more PDSCH repetitions and/or in one or more PUSCH repetitions (e.g., which may be scheduled by one or more messages via PDCCH, such as DCI). Control information from a wireless device may be repeated, for example, in one or more PUCCH repetitions.

The wireless device may be served by (e.g., communicate with, or transmit signals to/receive signals from) a plurality of TRPs. The plurality of TRPs may comprise the first TRP and the second TRP. The one or more configuration parameters may indicate a linkage (e.g., an association or a mapping) between a first CORESET of the one or more CORESETs and a second CORESET of the one or more CORESETs. The wireless device may monitor the first CORESET and the second CORESET for repetition of DCI. The first TRP may transmit the DCI via the first CORESET and the second TRP may transmit the (same) DCI via the second CORESET. Repeated transmission of the DCI may increase the reliability of transmission of the DCI. For example, the wireless device may receive the DCI transmitted from the second TRP, for example, even if transmission from the first TRP are blocked (e.g., by trees, buildings, other structures, etc.).

The first CORESET may correspond to a first CORESET pool. The second CORESET may correspond to a second CORESET pool. The one or more configuration parameters may indicate a first CORESET pool indicator/index for the first CORESET. The one or more configuration parameters may indicate a second CORESET pool indicator/index for the second CORESET. The first CORESET pool index and the second CORESET pool index may be different or may be same. The first CORESET pool index may correspond to a first CORESET pool comprising a first plurality of CORESETs (e.g., including the first CORESET). The second CORESET pool index may correspond to a second CORESET pool comprising a second plurality of CORESETs (e.g., including the second CORESET).

Repetition of control information (e.g., DCI) via multiple CORESETs, corresponding to different CORESETs pools, may lead to many issues. The wireless device may receive, via the first CORESET with a first CORESET pool index, a first repetition of DCI scheduling a downlink signal. The wireless device may receive, via the second CORESET with a second CORESET pool index, a second repetition of the DCI scheduling the downlink signal. Both repetitions of the DCI may comprise a TCI field (e.g., indicating a same value). The wireless device may be unable to determine which CORESET pool index, among the first CORESET pool index and the second CORESET pool index, to consider for determining a TCI state for downlink signal reception. The wireless device may be unable to determine whether to receive the downlink signal based on a TCI state among TCI state(s) activated for the first CORESET pool index or among TCI state(s) activated for the second CORESET pool index.

The wireless device may receive, via at least one of the first CORESET (e.g., with the first CORESET pool index) and the second CORESET (e.g., with the second CORESET pool index, DCI. The DCI may schedule a downlink signal (e.g., a transport block, a PDSCH transmission). The wireless device may receive the DCI in/via the first CORESET and receive the DCI in/via the second CORESET. The wireless device may receive the downlink signal based on a first TCI state among the one or more first TCI states indicated/activated by the first activation command that indicates the first CORESET pool index of the first CORESET, for example, based on receiving the DCI via the first CORESET. The wireless device may receive the downlink signal based on a second TCI state among the one or more second TCI states indicated/activated by the second activation command that indicates the second CORESET pool index of the second CORESET, for example, based on receiving the DCI via the second CORESET. The wireless device may receive the downlink signal via multiple TCI states (e.g., the first TCI state and the second TCI state), for example, if the second CORESET pool index is different from the first CORESET pool index. The receiving the transport block based on multiple TCI states may increase the complexity at the wireless device and/or power consumption.

The wireless device may be unable to receive all repetitions of DCI. For example, the wireless device may receive, via the first CORESET with the first CORESET pool index, a first repetition of DCI scheduling a downlink signal. The wireless device may or may not receive, via the second CORESET with the second CORESET pool index, a second repetition of the DCI. The base station may not be aware which of the repetition(s) of the DCI have been successfully received/detected by the wireless device. The base station may be unable to determine which TCI state (e.g., among the first TCI state and the second TCI state) the wireless device may use for receiving the downlink signal. The base station being unable to determine which TCI state the wireless device may use for receiving the downlink signal may result in a misalignment (e.g., beam misalignment) between the wireless device and the base station for transmission/reception of the downlink signal. The misalignment may lead to increased error rates and/or retransmission of the downlink signal.

For example, the wireless device may receive the DCI in/via the first CORESET and may not receive the DCI in/via the second CORESET. The wireless device may receive the downlink signal (e.g., a transport block) based on a first TCI state among the one or more first TCI states indicated/activated by the first activation command (e.g., that indicates the first CORESET pool index of the first CORESET). The base station may not have information on CORESET(s) via which the wireless device has successfully received the DCI. The base station may send the downlink signal based on both a first TCI state among the one or more first TCI states indicated/activated by the first activation command, and a second TCI state among the one or more second TCI states indicated/activated by the second activation command, thereby increasing power consumption and reducing wireless resource availability for other transmissions.

The wireless device may receive/attempt to receive the downlink signal, for example, based on a first TCI state among the one or more first TCI states indicated/activated by the first activation command that indicates the first CORESET pool index. The wireless device may attempt to receive the downlink signal based on a first TCI state among the one or more first TCI states, for example, based on receiving the DCI in/via the first CORESET with the first CORESET pool index. The base station may send/transmit the transport block based on an assumption that the wireless device will receive/attempt to receive the downlink signal based on a second TCI state among the one or more second TCI states indicated/activated by the second activation command that indicates the second CORESET pool index. Use of different TCI states at the wireless device and the base station may result in misaligned beams at the wireless device and the base station. For example, the wireless device may use a first beam direction (e.g., corresponding to the first TCI state) that is directed to the first TRP and the base station may send the downlink signal using a second beam direction (e.g., corresponding to the second TCI state) via the second TRP. Misaligned beams may result in unsuccessful reception/decoding of the transport block. Unsuccessful reception/decoding of the transport block may result in increased retransmission(s) of the transport block, increased latency of a successful communication, and/or increased power consumption at the base station and/or the wireless device.

Examples herein may enhance/improve beam alignment between a wireless device and a base station. Various examples herein enable improved beam alignment via enhanced TCI state determination for downlink signal reception. The enhanced TCI state determination may be used in scenarios where the wireless device monitors multiple (e.g., two or more) CORESETs (e.g., corresponding to different CORESET pools, and/or with different CORESET pool indicators/indexes) for control information (e.g., DCI) repetition. The wireless device may determine a default CORESET pool index, among the different CORESET pool indexes, for determining a TCI state for downlink signal reception. A CORESET pool corresponding to the default CORESET pool index may comprise/be activated with one or more TCI states. The wireless device may receive the downlink signal based on a TCI state among one or more TCI states. The wireless device may receive the downlink signal based on a TCI state among one or more TCI states indicated/activated by an activation command that indicates the default CORESET pool index. The wireless device may receive the downlink signal based on a first TCI state among the one or more first TCI states, for example, if the default CORESET pool index is the first CORESET pool index. The one or more first TCI states may be indicated/activated by the first activation command that indicates the first CORESET pool index. The wireless device may receive the downlink signal based on a second TCI state among the one or more second TCI states, for example, if the default CORESET pool index is the second CORESET pool index. The one or more second TCI states may be indicated/ activated by the second activation command that indicates the second CORESET pool index.

The default CORESET pool index may be a lowest CORESET pool index among a plurality of CORESET pool indexes (e.g., the first CORESET pool index and the second CORESET pool index). The plurality of CORESET pool indexes may correspond to a plurality of CORESET pools (e.g., the first CORESET pool comprising the first CORESET, and the second CORESET pool comprising the second CORESET) that the wireless device monitors for DCI.

The default CORESET pool index may be equal to a predetermined/preset/preconfigured value (e.g., 0, 1, or any other value). The one or more configuration parameters may indicate the default CORESET pool index.

The default CORESET pool index may correspond to a CORESET pool index of a default CORESET (e.g., among the first CORESET and the second CORESET that are monitored for repetition of the DCI). The default CORESET may have lowest/highest CORESET index among a first CORESET index of the first CORESET and a second CORESET index of the second CORESET. The default CORESET may correspond to a CORESET that the wireless device, monitors in a first (e.g., starting/earliest) or a last (e.g., ending/latest) repetition of the DCI. The second TRP may not send the transport block, for example, if the default CORESET pool index is equal to the first CORESET pool index.

The DCI may indicate the default CORESET pool index. The DCI may comprise a field (e.g., a HARQ-ACK field, an RV field, a PRI field, a TDRA field, an FDRA field, TCI fields, or any other field). The field may indicate the default CORESET pool index. The wireless device may receive the downlink signal based on a TCI state among the one or more first TCI states indicated/activated by the first activation command (e.g., that indicates the first CORESET pool index), for example, if the field indicates the first CORESET pool index. The wireless device may receive the transport block based on a TCI state among the one or more second TCI states indicated/activated by the second activation command (e.g., that indicates the second CORESET pool index), for example, if the field indicates the second CORESET pool index.

The quantity of the one or more first TCI states may be equal to quantity of the one or more second TCI states. The base station may configure (e.g., via the first activation command and the second activation command) equal quantities of the one or more first TCI and the one or more second TCI states.

Examples described herein may reduce misaligned beams at the wireless device and the base station. Reduced misaligned beams may result in improved data reception/decoding performance at a receiving device. The improved reception/decoding performance may result in reduced retransmission(s), reduced latency of a successful communication, and/or reduced power consumption at the base station and/or the wireless device.

Figure 26:
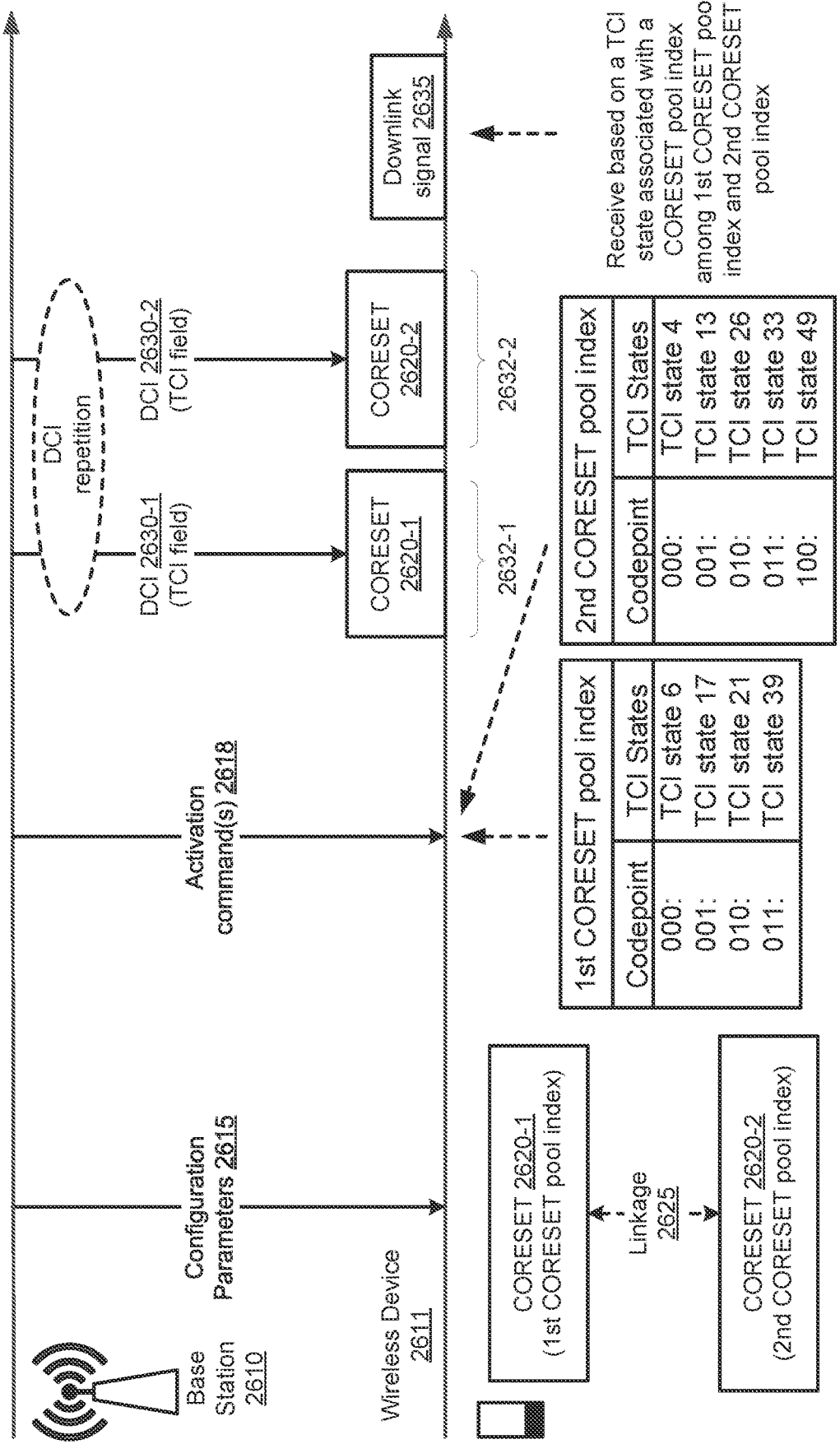
FIG. 26 shows an example of channel repetition for transmission and/or reception.

FIG. 26 shows an example of channel repetition for transmission and/or reception. The channel repetition may correspond to control channel repetition. The control channel repetition may be used for sending, by a base station 2610, repetitions of control information (e.g., DCI). The control information may schedule a transmission (e.g., a downlink transmission) to the wireless device 2611. The base station 2610 and/or the wireless device 2611 may determine a beam (e.g., TCI state) to be used for the transmission based on TCI state(s) that are indicated/activated by an activation command that indicates a default CORESET pool index. While FIG. 26 relates to the specific example of downlink control channel repetition (e.g., for transmission of DCI), the base station 2610 and/or the wireless device 2611 may similarly transmit (and/or receive) repetitions of any message (e.g., control messages and/or data, for example, via PUCCH, PUCCH, PDSCH) via channel repetition, and in accordance with the procedures described herein.

The wireless device 2611 may receive one or more messages. The wireless device 2611 may receive the one or more messages from the base station 2611. The one or more messages may comprise one or more configuration parameters 2615. The one or more configuration parameters 2615 may be RRC configuration parameter(s) and/or RRC reconfiguration parameter(s).

The one or more configuration parameters 2615 may be for a cell. At least one configuration parameter of the one or more configuration parameters 2615 may be for a cell. The cell may be a primary cell (PCell). The cell may be a secondary cell (SCell). The cell may be a secondary cell configured with PUCCH (e.g., PUCCH SCell). The cell may be an unlicensed cell (e.g., operating in an unlicensed band). The cell may be a licensed cell (e.g., operating in a licensed band). The cell may operate in a first frequency range (e.g., FR1). The FR1 may, for example, comprise frequency bands below 6 GHz. The cell may operate in a second frequency range (e.g., FR2). The FR2 may, for example, comprise frequency bands from 24 GHz to 52.6 GHz. The cell may operate in any frequency range (e.g., comprising any frequency band(s)).

The wireless device 2611 may perform uplink transmissions (e.g., PUSCH, PUCCH, SRS) via the cell in/during a first time period and in/using a first frequency. The wireless device 2611 may perform downlink receptions (e.g., PDCCH, PDSCH) via the cell in/during a second time period and in/using a second frequency. The cell may operate in a time-division duplex (TDD) mode. The first frequency and the second frequency may be the same, for example, in the TDD mode. The first time and the second time may be different, for example, in the TDD mode. The cell may operate in a frequency-division duplex (FDD) mode. The first frequency and the second frequency may be different, for example, in the FDD mode. The first time and the second time may be the same, for example, in the FDD mode.

The wireless device 2611 may be in an RRC connected mode, an RRC idle mode, and/or an RRC inactive mode. The cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be in one of an active state and an inactive state. The wireless device 2611 may monitor a downlink channel/signal (e.g., PDCCH, DCI, CSI-RS, PDSCH) on/for/via the downlink BWP, for example, in the active state of a downlink BWP of the one or more downlink BWPs. The wireless device 2611 may receive a PDSCH transmission on/via/for the downlink BWP, for example, in the active state of a downlink BWP of the one or more downlink BWPs. The wireless device 2611 may not monitor a downlink channel/signal (e.g., PDCCH, DCI, CSI-RS, PDSCH) on/via/for the downlink BWP, for example, in the inactive state of a downlink BWP of the one or more downlink BWPs. The wireless device 2611 may stop monitoring (or receiving) a downlink channel/signal (e.g., PDCCH, DCI, CSI-RS, PDSCH) on/via/for the downlink BWP, for example, in the inactive state of a downlink BWP of the one or more downlink BWPs. The wireless device 2611 may not receive a PDSCH transmission on/via/for the downlink BWP, for example, in the inactive state of a downlink BWP of the one or more downlink BWPs. The wireless device 2611 may stop receiving a PDSCH transmission on/via/for the downlink BWP, for example, in the inactive state of a downlink BWP of the one or more downlink BWPs.

The wireless device 2611 may send/transmit an uplink signal/channel (e.g., PUCCH, preamble, PUSCH, PRACH, SRS, etc.) on/via the uplink BWP, for example, in the active state of an uplink BWP of the one or more uplink BWPs. The wireless device 2611 may not send/transmit an uplink signal/channel (e.g., PUCCH, preamble, PUSCH, PRACH, SRS, etc.) on/via the uplink BWP, for example, in the inactive state of an uplink BWP of the one or more uplink BWPs.

The wireless device 2611 may activate the downlink BWP of the one or more downlink BWPs of the cell. The activating the downlink BWP may comprise that the wireless device 2611 sets (or switches to) the downlink BWP as an active downlink BWP of the cell. The activating the downlink BWP may comprise that the wireless device sets the downlink BWP in the active state. The activating the downlink BWP may comprise switching the downlink BWP from the inactive state to the active state.

The wireless device 2611 may activate the uplink BWP of the one or more uplink BWPs of the cell. The activating the uplink BWP may comprise that the wireless device sets (or switches to) the uplink BWP as an active uplink BWP of the cell. The activating the uplink BWP may comprise that the wireless device 2611 sets the uplink BWP in the active state. The activating the uplink BWP may comprise switching the uplink BWP from the inactive state to the active state.

The one or more configuration parameters 2615 may be for the (active) downlink BWP of the cell. At least one configuration parameter of the one or more configuration parameters 2615 may be for the downlink BWP of the cell. The one or more configuration parameters 2615 may be for the (active) uplink BWP of the cell. At least one configuration parameter of the one or more configuration parameters 2615 may be for the uplink BWP of the cell.

The one or more configuration parameters 2615 may indicate a plurality of CORESETs (e.g., CORESET 2620-1 and CORESET 2620-2). The one or more configuration parameters 2615 may indicate the plurality of CORESETs for the (active) downlink BWP of the cell. The (active) downlink BWP of the cell may comprise the plurality of CORESETs. The plurality of CORESETs may comprise a first CORESET (e.g., CORESET 2620-1). The plurality of CORESETs may comprise a second CORESET (e.g., CORESET 2620-2).

The one or more configuration parameters 2615 may indicate a plurality of CORESET indicators/indexes (e.g., provided by a higher layer parameter ControlResourceSetId) for the plurality of CORESETs. Each CORESET of the plurality of CORESETs may be identified/indicated by a respective CORESET indicator/index of the plurality of CORESET indicators/indexes. The first CORESET of the plurality of CORESETs may be identified by a first CORESET index of the plurality of CORESET indexes. The second CORESET of the plurality of CORESETs may be identified/indicated by a second CORESET index of the plurality of CORESET indexes. A CORESET index may be a CORESET identifier/indicator.

The first CORESET and the second CORESET may be the same. The first CORESET index and the second CORE- SET index may be the same. The plurality of CORESETs may comprise one or more CORESETs. The first CORESET and the second CORESET may be different. The first CORESET index and the second CORESET index may be different.

The one or more configuration parameters 2615 may indicate a plurality of search space sets, e.g., for the downlink BWP of the cell (e.g., by a higher layer parameter SearchSpace). The one or more configuration parameters 2615 may indicate a plurality of search space sets, e.g., for the cell (e.g., by a higher layer parameter SearchSpace).

The one or more configuration parameters 2615 may indicate search space set indexes/identifiers (e.g., provided by a higher layer parameter searchSpaceId) for the plurality of search space sets. Each search space set of the plurality of search space sets may be identified/indicated by a respective search space set index of the search space set indexes. A first search space set of the plurality of search space sets may be identified/indicated by a first search space set index of the search space set indexes. A second search space set of the plurality of search space sets may be identified/indicated by a second search space set index of the search space set indexes.

The one or more configuration parameters 2615 may indicate PDCCH monitoring periodicities (e.g., parameter monitoringSlotPeriodicityAndOffset) for the plurality of search space sets. The one or more configuration parameters 2615 may indicate a respective PDCCH monitoring periodicity of the PDCCH monitoring periodicities (e.g., monitoringSlotPeriodicityAndOffset) for each search space set of the plurality of search space sets. The one or more configuration parameters 2615 may indicate a first PDCCH monitoring periodicity (e.g., 2 slots, or any other first quantity of slots) of the PDCCH monitoring periodicities for a first search space set of the plurality of search space sets. The one or more configuration parameters 2615 may indicate a second PDCCH monitoring periodicity (e.g., 10 slots, or any other second quantity of slots) of the PDCCH monitoring periodicities for a second search space set of the plurality of search space sets.

The one or more configuration parameters 2615 may indicate PDCCH candidates (e.g., parameter nrofCandidates) for the plurality of search space sets. The one or more configuration parameters 2615 may indicate respective PDCCH candidate(s) of the PDCCH candidates for each search space set of the plurality of search space sets. The one or more configuration parameters 2615 may indicate first PDCCH candidate(s) (e.g., AL=1, AL=4, or any other AL) of the PDCCH candidates for a first search space set of the plurality of search space sets. The one or more configuration parameters 2615 may indicate second PDCCH candidate(s) (e.g., AL=8. AL=16, or any other AL) of the PDCCH candidates for a second search space set of the plurality of search space sets.

A search space set of the plurality of search space sets may be associated with (or linked to) a CORESET of the plurality of CORESETs. The one or more configuration parameters 2615 may indicate the CORESET (or a CORESET index of the CORESET) for the search space set (e.g., provided by a higher layer parameter controlResourceSetId in the higher layer parameter SearchSpace). The association (or the linkage) may be one-to-one. The association being one-to-one may comprise the search space set associated with (or linked to) the CORESET not being associated (or linked to) a second CORESET that is different from the CORESET. The plurality of CORESETs may comprise the second CORESET.

The wireless device 2611 may monitor, for a downlink control signal/channel (e.g., DCI, PDCCH, RS, GC-PDCCH, DMRS, etc.), PDCCH in the CORESET. The monitoring, for the downlink control signal/channel, the PDCCH in the CORESET may comprise monitoring, for the downlink control signal, PDCCH candidate(s) in PDCCH monitoring occasion(s) for/of the search space set associated with (or linked to) the CORESET. The wireless device 2611 may monitor, for DCI, PDCCH candidate(s) in PDCCH monitoring occasion(s) for/of the search space set in the CORESET associated with (or linked to) the search space set, for example, based on the search space set being associated with (or linked to) the CORESET. The wireless device 2611 may monitor, for DCI, PDCCH for the search space set in the CORESET associated with (or linked to) the search space set, for example, based on the search space set being associated with (or linked to) the CORESET.

The wireless device 2611 may monitor, for DCI, downlink control channels in the CORESET. The monitoring, for the DCI, the downlink control channels in the CORESET may comprise monitoring, for the DCI, one or more PDCCH candidates in one or more PDCCH monitoring occasions for/of one or more search space sets associated with the CORESET. The plurality of search space sets may comprise the one or more search space sets. The plurality of PDCCH candidates may comprise the one or more PDCCH candidates. The one or more configuration parameters 2615 may indicate, for the one or more search space sets, the one or more PDCCH candidates. The wireless device 2611 may determine the one or more PDCCH monitoring occasions of the one or more search space sets based on one or more search space set configuration parameters (e.g., IE SearchSpace) of the one or more configuration parameters 2615. The one or more search space set configuration parameters may indicate one or more PDCCH monitoring periodicities (e.g., monitoringSlotPeriodicityAndOffset) for the one or more search space sets. The one or more search space set configuration parameters may indicate a respective PDCCH monitoring periodicity of the one or more PDCCH monitoring periodicities for each search space set of the one or more search space sets. The wireless device 2611 may determine the one or more PDCCH monitoring occasions, for example, based on the one or more PDCCH monitoring periodicities. The one or more search space set configuration parameters may indicate PDCCH monitoring symbols (e.g., monitoringSymbolsWithinSlot) for the one or more search space sets. The one or more search space set configuration parameters may indicate respective PDCCH monitoring symbol(s) of the PDCCH monitoring symbols (e.g., monitoringSymbolsWithinSlot) for each search space set of the one or more search space sets. The wireless device 2611 may determine the one or more PDCCH monitoring occasions, for example, based on the PDCCH monitoring symbols.

The one or more configuration parameters 2615 may indicate the plurality of CORESET indexes for the plurality of search space sets (e.g., provided by a higher layer parameter controlResourceSetId in the higher layer parameter SearchSpace). Each search space set of the plurality of search space sets may be associated with (or linked to) a respective CORESET, of the plurality of CORESETs, identified by a respective CORESET index of the plurality of CORESET indexes. The one or more configuration parameters 2615 may indicate the first CORESET index of the first CORESET for the first search space set. The one or more configuration parameters 2615 may indicate the first CORESET index of the first CORESET in a first CORESET index field (e.g., provided by a higher layer parameter controlResourceSetId in the higher layer parameter SearchSpace) of the first search space set. The first search space set may be associated with (or linked to) the first CORESET, for example, based on the one or more configuration parameters 2615 indicating the first CORESET index of the first CORESET for the first search space set. The one or more configuration parameters 2615 may indicate the first CORESET index of the first CORESET for the second search space set. The one or more configuration parameters 2615 may indicate the first CORESET index of the first CORESET in a second CORESET index field (e.g., provided by a higher layer parameter controlResourceSetId in the higher layer parameter SearchSpace) of the second search space set. The second search space set may be associated with (or linked to) the first CORESET, for example, based on the one or more configuration parameters indicating the first CORESET index of the first CORESET for the second search space set. The one or more configuration parameters 2615 may indicate the second CORESET index of the second CORESET for the first search space set. The first search space set may be associated with (or linked to) the second CORESET, for example, based on the one or more configuration parameters indicating the second CORESET index of the second CORESET for the first search space set. The one or more configuration parameters 2615 may indicate the second CORESET index of the second CORESET for the second search space set. The second search space set may be associated with (or linked to) the second CORESET, for example, based on the one or more configuration parameters indicating the second CORESET index of the second CORESET for the second search space set.

One or more first search space sets, of the plurality of search space sets, may be associated with (or linked to) the first CORESET. The one or more configuration parameters 2615 may indicate the first CORESET (or the first CORESET index of the first CORESET) for the one or more first search space sets. The one or more configuration parameters 2615 may indicate, for the first CORESET, the one or more first search space sets. One or more second search space sets of the plurality of search space sets may be associated with (or linked to) the second CORESET. The one or more configuration parameters 2615 may indicate the second CORESET (or the second CORESET index of the second CORESET) for the one or more second search space sets. The one or more configuration parameters 2615 may indicate, for the second CORESET, the one or more second search space sets.

The wireless device 2611 may monitor, for DCI, the PDCCH candidates in the plurality of CORESETs. The wireless device 2611 may monitor, for the DCI, the PDCCH candidates in PDCCH monitoring occasions for/of the plurality of search space sets associated with the plurality of CORESETs. The wireless device 2611 may monitor, for DCI, one or more first PDCCH candidates in the first CORESET. The wireless device 2611 may monitor, for the DCI, the one or more first PDCCH candidates in one or more first PDCCH monitoring occasions. The one or more first PDCCH monitoring occasions may be for/of the one or more first search space sets associated with the first CORESET. The one or more configuration parameters 2615 may indicate, for the one or more first search space sets, the one or more first PDCCH candidates. The PDCCH candidates may comprise the one or more first PDCCH candidates. The wireless device may monitor, for DCI, one or more second PDCCH candidates in the second CORESET. The wireless device may monitor, for the DCI, the one or more second PDCCH candidates in one or more second PDCCH monitoring occasions. The one or more second PDCCH monitoring occasions may be for/of the one or more second search space sets associated with the second CORESET. The one or more configuration parameters 2615 may indicate, for the one or more second search space sets, the one or more second PDCCH candidates. The PDCCH candidates may comprise the one or more second PDCCH candidates.

The one or more configuration parameters 2615 may indicate a control channel repetition (e.g., PDCCH repetition/aggregation). The one or more configuration parameters 2615 may comprise a control channel repetition enabling parameter that enables (or activates, indicates, configures) the control channel repetition. The control channel repetition may comprise a repetition of a downlink control signal/channel (e.g., PDCCH, DCI).

The one or more configuration parameters 2615 may indicate a number/quantity of repetitions for the control channel repetition. The one or more configuration parameters 2615 may indicate the quantity of repetitions of the control channel repetition for the plurality of CORESETs. The one or more configuration parameters 2615 may indicate the quantity of repetitions of the control channel repetition for each CORESET of the plurality of CORESETs. The one or more configuration parameters 2615 may indicate, for the control channel repetition, a respective quantity of repetitions for each CORESET of the plurality of CORESETs.

The one or more configuration parameters 2615 may indicate the quantity of repetitions of the control channel repetition for the plurality of search space sets of the plurality of CORESETs. The one or more configuration parameters 2615 may indicate the quantity of repetitions of the control channel repetition for respective search space set(s) of each CORESET of the plurality of CORESETs. The one or more configuration parameters 2615 may indicate the quantity of repetitions of the control channel repetition for at least one search space set of the plurality of search space sets. The one or more configuration parameters 2615 may indicate, for the control channel repetition, a respective quantity of repetitions for each search space set of the plurality of search space sets.

The one or more configuration parameters 2615 may indicate the quantity of repetitions of the control channel repetition for the PDCCH candidates. The one or more configuration parameters 2615 may indicate the quantity of repetitions of the control channel repetition for respective PDCCH candidate(s) of each search space set of the plurality of search space sets. The one or more configuration parameters 2615 may indicate the quantity of repetitions of the control channel repetition for at least one PDCCH candidate of the PDCCH candidates. The one or more configuration parameters 2615 may indicate, for the control channel repetition, a respective quantity of repetitions for each PDCCH candidate of the PDCCH candidates.

The one or more configuration parameters 2615 may indicate the plurality of CORESETs for the control channel repetition. The one or more configuration parameters 2615 may link/map/associate the plurality of CORESETs for the control channel repetition. The one or more configuration parameters 2615 may indicate, for the control channel repetition, the first CORESET and the second CORESET. The one or more configuration parameters 2615 may link/map/associate, for the control channel repetition, the first CORESET and the second CORESET (e.g., linkage 2625). The first CORESET may be mapped/linked to (or associated with) the second CORESET for the control channel repetition. The wireless device 2611 may monitor, for the control channel repetition (e.g., DCI repetition), PDCCH in the first CORESET and the second CORESET.

The one or more configuration parameters 2615 may indicate the plurality of search space sets for the control channel repetition. The one or more configuration parameters 2615 may link/map/associate the plurality of search space sets for the control channel repetition. A first search space set of the plurality of search space sets (or of the first CORESET) may be mapped/linked to (or associated with) a second search space set of the plurality of search space sets (or of the second CORESET) for the control channel repetition. The one or more first search space sets of (or associated with, or linked to) the first CORESET may comprise the first search space set. The one or more second search space sets of (or associated with or linked to) the second CORESET may comprise the second search space set. The one or more configuration parameters 2615 may indicate, for the control channel repetition, the first search space set and the second search space set. The one or more configuration parameters 2615 may link/map/associate, for the control channel repetition, the first search space set and the second search space set. The wireless device 2611 may monitor, for the control channel repetition (e.g., DCI repetition), PDCCH in the first search space set and the second search space set. The wireless device 2611 may monitor, for the control channel repetition (e.g., DCI repetition), PDCCH candidates in/of/for the first search space set and in/of/for the second search space set.

The one or more configuration parameters 2615 may indicate the PDCCH candidates for the control channel repetition. The one or more configuration parameters 2615 may link/map/associate the PDCCH candidates for the control channel repetition. A first PDCCH candidate of the PDCCH candidates may be mapped/linked to (or associated with), for the control channel repetition, a second PDCCH candidate of the PDCCH candidates. The one or more first PDCCH candidates of the first CORESET (or of/associated with the one or more first search space sets of the first CORESET) may comprise the first PDCCH candidate. A first search space set of the one or more first search space sets of the first CORESET may be associated with the first PDCCH candidate. The one or more configuration parameters 2615 may indicate, for the first search space set, the first PDCCH candidate. The wireless device 2611 may monitor, for DCI, the first PDCCH candidate of/for the first search space set in the first CORESET. First PDCCH candidate(s) of the first search space set may comprise the first PDCCH candidate. The one or more first PDCCH candidates may comprise the first PDCCH candidate(s) of the first search space set. The one or more second PDCCH candidates of the second CORESET (or of/associated with the one or more second search space sets of the second CORESET) may comprise the second PDCCH candidate. A second search space set of the one or more second search space sets of the second CORESET may be associated with the second PDCCH candidate. The one or more configuration parameters 2615 may indicate, for the second search space set, the second PDCCH candidate. The wireless device 2611 may monitor, for DCI, the second PDCCH candidate of/for the second search space set in the second CORESET. Second PDCCH candidate(s) of the second search space set may comprise the second PDCCH candidate. The one or more second PDCCH candidates may comprise the second PDCCH candidate(s) of the second search space set. The wireless device 2611 may monitor, for the control channel repetition (e.g., DCI repetition), the first PDCCH candidate and the second PDCCH candidate. The wireless device 2611 may monitor the first PDCCH candidate in at least one first PDCCH monitoring occasion. The one or more first PDCCH monitoring occasions may comprise the at least one first PDCCH monitoring occasion. The wireless device 2611 may monitor the second PDCCH candidate in at least one second PDCCH monitoring occasion. The one or more second PDCCH monitoring occasions may comprise the at least one second PDCCH monitoring occasion.

The one or more configuration parameters 2615 may indicate, for the control channel repetition, the first PDCCH candidate and the second PDCCH candidate. The one or more configuration parameters 2615 may link/map/associate, for the control channel repetition, the first PDCCH candidate and the second PDCCH candidate.

The wireless device 2611 may determine, for the control channel repetition, the first PDCCH candidate and the second PDCCH candidate. The wireless device 2611 may determine, for the control channel repetition, the first PDCCH candidate and the second PDCCH candidate, for example, based on a first PDCCH candidate indicator/index of the first PDCCH candidate and a second PDCCH candidate indicator/index of the second PDCCH candidate being the same. The one or more configuration parameters 2615 may indicate, for the first PDCCH candidate, the first PDCCH candidate indicator/index. The one or more configuration parameters 2615 may indicate, for the second PDCCH candidate, the second PDCCH candidate indicator/index. The wireless device 2611 may determine, for the control channel repetition, the first PDCCH candidate and the second PDCCH candidate, for example, based on a first CCE starting indicator/index of the first PDCCH candidate and a second CCE starting indicator/index of the second PDCCH candidate being the same. The one or more configuration parameters 2615 may indicate, for the first PDCCH candidate, the first CCE starting indicator/index. The one or more configuration parameters 2615 may indicate, for the second PDCCH candidate, the second CCE starting indicator/index.

The wireless device 2611 may receive a message indicating a quantity/number of repetitions for the control channel repetition. For example, the wireless device 2611 may receive DCI indicating a quantity of repetitions for the control channel repetition. The DCI may comprise a field (e.g., DCI subframe/slot repetition number field) indicating the quantity of repetitions.

The base station 2610 may send/transmit a plurality of DCI messages/PDCCH transmissions (e.g., DCI 2630-1 and DCI 2630-2) for the repetition of a downlink control signal/channel (e.g., a PDCCH transmission, a DCI message via a PDCCH). The plurality of DCI messages/PDCCH transmissions may comprise the repetitions of the downlink control signal/channel. The wireless device 2611 may monitor, for the plurality of DCI messages/PDCCH transmissions (or for the repetition of the downlink control signal/channel), the PDCCH candidates in the plurality of CORESETs.

The quantity/number of repetitions may be a quantity/number of repetitions of the downlink control signal/channel A quantity/number of the plurality of DCI messages/PDCCH transmissions may be equal to the quantity/number of repetitions. The quantity/number of repetitions may be equal to 2 as shown in FIG. 26. The quantity/number of repetitions may be equal to any other value. The plurality of DCI messages/PDCCH transmissions may comprise a first downlink control signal/channel (e.g., DCI 2630-1) and a second downlink control signal/channel (e.g., DCI 2630-2).

The wireless device 2611 may be served by/communicate with (e.g., receive signals from and/or transmit signals to) a plurality of TRPs (e.g., TRP 1 and TRP 2). Each downlink control signal/channel of the plurality of DCI messages/PDCCH transmissions may be sent/transmitted by a respective TRP of the plurality of TRPs. For example, in FIG. 26, a first TRP (e.g., TRP 1), of the plurality of TRPs, may send/transmit the first downlink control signal/channel (e.g., DCI 2630-1) and a second TRP (e.g., TRP 2) of the plurality of TRPs may transmit the second downlink control signal/channel (e.g., DCI 2630-2).

Each downlink control signal/channel of the plurality of DCI messages/PDCCH transmissions may be the same (or may have the same content). For example, each downlink control signal/channel may comprise the same DCI fields, the same DCI size, the same payload, same value for the DCI fields, etc. Each downlink control signal/channel of the plurality of DCI messages/PDCCH transmissions may be same as the downlink control signal/channel Each downlink control signal/channel of the plurality of DCI messages/PDCCH transmissions may be a repetition of the downlink control signal/channel. The plurality of DCI messages/PDCCH transmissions may be repetitions of the downlink control signal/channel. The base station 2610 may repeat transmission of the downlink control signal/channel by transmitting the plurality of DCI messages/PDCCH transmissions. For example, in FIG. 26, DCI 2630-1 and DCI 2630-2 may be the same (or equal). The contents of the DCI 2630-1 and DCI 2630-2 may be the same. The payload of the DCI 2630-1 and DCI 2630-2 may be the same. The DCI fields (or the values of the DCI fields) of the DCI 2630-1 and DCI 2630-2 may be the same.

The first downlink control signal/channel (e.g., DCI 2630-1) and the second downlink control signal/channel (e.g., DCI 2630-2) may be the same (e.g., may comprise same content, same DCI fields, the same DCI size, the same payload, same value for the DCI fields, etc.). The first downlink control signal/channel and the second downlink control signal/channel may be the same as the downlink control signal/channel. The first downlink control signal/channel may be the downlink control signal/channel. The second downlink control signal/channel may be the downlink control signal/channel. The first downlink control signal/channel and the second downlink control signal/channel may be repetitions of the downlink control signal/channel.

The base station 2610 may send/transmit, for the repetition of the downlink control signal/channel, the plurality of DCI messages/PDCCH transmissions via/in the plurality of CORESETs. The base station 2610 may send/transmit each downlink control signal/channel, of the plurality of DCI messages/PDCCH transmissions, via a respective CORESET of the plurality of CORESETs. The transmitting, for the repetition of the downlink control signal/channel, the plurality of DCI messages/PDCCH transmissions via/in the plurality of CORESETs may comprise transmitting (repetition of) the downlink control signal/channel via/in the plurality of CORESETs. The transmitting, for the repetition of the downlink control signal/channel, the plurality of DCI messages/PDCCH transmissions via/in the plurality of CORESETs may comprise repeating transmission of the downlink control signal/channel via/in the plurality of CORESETs.

The base station 2610 may send/transmit the first downlink control signal/channel (e.g., DCI 2630-1) via the first CORESET (e.g., CORESET 2620-1). The base station 2610 may send/transmit the second downlink control signal/channel (e.g., DCI 2630-2) via the second CORESET (e.g., CORESET 2620-1). The base station 2610 may send/transmit, for the repetition of the downlink control signal/channel, the plurality of DCI messages/PDCCH transmissions via/in the first CORESET and the second CORESET. The base station 2610 may send/transmit each downlink control signal/channel of the plurality of DCI messages/PDCCH transmissions via a respective CORESET of the first CORESET and the second CORESET. The transmitting, for the repetition of the downlink control signal/channel, the plurality of DCI messages/PDCCH transmissions via/in the first CORESET and the second CORESET may comprise transmitting the downlink control signal/channel via/in the first CORESET and the second CORESET. The transmitting, for the repetition of the downlink control signal/channel, the plurality of DCI messages/PDCCH transmissions via/in the first CORESET and the second CORESET may comprise repeating transmission of the downlink control signal/channel via/in the first CORESET and the second CORESET.

The base station 2610 may send/transmit, for the repetition of the downlink control signal/channel, the plurality of DCI messages/PDCCH transmissions via/in the plurality of search space sets associated with the plurality of CORESETs. The base station 2610 may send/transmit, for the repetition of the downlink control signal/channel, each downlink control signal/channel of the plurality of DCI messages/PDCCH transmissions via/in a respective search space set of the plurality of search space sets. The base station 2610 may transmit the first downlink control signal/channel (e.g., DCI 2630-1) via the one or more first search space sets associated with the first CORESET (e.g., CORESET 2620-1). The base station 2610 may transmit the second downlink control signal/channel (e.g., DCI 2630-2) via the one or more second search space sets associated with the second CORESET (e.g., CORESET 2620-2). The base station 2610 may transmit the first downlink control signal/channel via the first search space set associated with the first CORESET. The base station may transmit the second downlink control signal/channel via the second search space set associated with the second CORESET.

The base station 2610 may send/transmit, for the repetition of the downlink control signal/channel, each downlink control signal/channel of the plurality of DCI messages/PDCCH transmissions via/in a respective search space set of the plurality of search space sets. The base station 2610 may send/transmit, for the repetition of the downlink control signal/channel, the plurality of DCI messages/PDCCH transmissions, for example, via/in the one or more first search space sets associated with the first CORESET and via/in the one or more second search space sets associated with the second CORESET. The base station 2610 may send/transmit, for the repetition of the downlink control signal/channel, the plurality of DCI messages/PDCCH transmissions, for example, via/in the first search space set associated with the first CORESET and via/in the second search space set associated with the second CORESET.

The base station 2610 may send/transmit, for the repetition of the downlink control signal/channel, the plurality of DCI messages/PDCCH transmissions via/in the PDCCH candidates of (or associated with) the plurality of search space sets. The base station 2610 may send/transmit, for the repetition of the downlink control signal/channel, each downlink control signal/channel of the plurality of DCI messages/PDCCH transmissions via/in a respective PDCCH candidate of the PDCCH candidates. The base station 2610 may transmit the first downlink control signal/channel (e.g., DCI 2630-1) via/in the first PDCCH candidate(s) of the first search space set associated with the first CORESET (e.g., CORESET 2620-1). The base station 2610 may transmit the second downlink control signal/channel (e.g., DCI 2630-2) via the second PDCCH candidate(s) of the second search space set associated with the second CORESET (e.g., CORESET 2620-2). The base station 2610 may transmit the first downlink control signal/channel via/in the one or more first PDCCH candidates of (or associated with) the first CORESET. The base station 2610 may transmit the second downlink control signal/channel via the one or more second PDCCH candidates of (or associated with) the second CORESET. The base station 2610 may transmit the first downlink control signal/channel via/in the first PDCCH candidate of (or associated with) the first search space set. The base station 2610 may transmit the second downlink control signal/channel via the second PDCCH candidate of (or associated with) the second search space set.

The base station 2610 may send/transmit, for repetition of the downlink control signal/channel, each downlink control signal/channel of the plurality of DCI messages/PDCCH transmissions via/in a respective PDCCH candidate of the PDCCH candidates. The base station 2610 may transmit, for the repetition of the downlink control signal/channel, for plurality of DCI messages/PDCCH transmissions, for example, via/in the first PDCCH candidate associated with the first CORESET (or associated with the first search space set of the first CORESET) and via/in the second PDCCH candidate associated with the second CORESET (or associated with the second search space set of the second CORESET).

The base station 2610 may send/transmit the first downlink control signal/channel via the first CORESET. The base station may transmit the first downlink control signal/channel via the one or more first search space sets associated with the first CORESET. The base station 2610 may transmit the first downlink control signal/channel via the first search space set associated with the first CORESET. The base station 2610 may transmit the first downlink control signal/channel via the first PDCCH candidate associated with the first CORESET. The base station 2610 may transmit the second downlink control signal/channel via the second CORESET. The base station 2610 may transmit the second downlink control signal/channel via the one or more second search space sets associated with the second CORESET. The base station 2610 may transmit the second downlink control signal/channel via the second search space set associated with the second CORESET. The base station 2610 may transmit the second downlink control signal/channel via the second PDCCH candidate associated with the second CORESET.

The wireless device 2611 may monitor, for the plurality of DCI messages/PDCCH transmissions (or for the repetitions of the downlink control signal/channel), the plurality of CORESETs. The wireless device 2611 may monitor, for each downlink control signal/channel of the plurality of DCI messages/PDCCH transmissions, a respective CORESET of the plurality of CORESETs. The monitoring, for the plurality of DCI messages/PDCCH transmissions (or for the repetitions of the downlink control signal/channel), the plurality of CORESETs may comprise monitoring, for (repetitions of) the downlink control signal/channel, the plurality of CORESETs. The monitoring, for the plurality of DCI messages/PDCCH transmissions (or the repetitions of the downlink control signal/channel), the plurality of CORESETs may comprise monitoring, for repetition of the downlink control signal/channel, the plurality of CORESETs.

The wireless device 2611 may monitor, for the first downlink control signal/channel, the first CORESET. The wireless device 2611 may monitor, for the second downlink control signal/channel, the second CORESET. The wireless device 2611 may monitor, for the plurality of DCI messages/PDCCH transmissions (or for the repetition of the downlink control signal/channel), the first CORESET and the second CORESET. The wireless device 2611 may monitor, for each downlink control signal/channel of the plurality of DCI messages/PDCCH transmissions, a respective CORESET of the first CORESET and the second CORESET. The monitoring, for the plurality of DCI messages/PDCCH transmissions (or for the repetition of the downlink control signal/channel), the first CORESET and the second CORESET may comprise monitoring, for the downlink control signal/channel, the first CORESET and the second CORESET. The monitoring, for the plurality of DCI messages/PDCCH transmissions (or for the repetition of the downlink control signal/channel), the first CORESET and the second CORESET may comprise monitoring, for repetition (or repeated transmissions) of the downlink control signal/channel, the first CORESET and the second CORESET.

The wireless device 2611 may monitor, for the plurality of DCI messages/PDCCH transmissions (or the repetitions of the downlink control signal/channel), the plurality of search space sets associated with the plurality of CORESETs. The wireless device 2611 may monitor, for each downlink control signal/channel of the plurality of DCI messages/PDCCH transmissions, a respective search space set of the plurality of search space sets for the repetition of the downlink control signal/channel. The wireless device 2611 may monitor, for the first downlink control signal/channel (e.g., DCI 2630-1), the first CORESET (e.g., CORESET 2620-1). The wireless device 2611 may monitor, for the first downlink control signal/channel, the one or more first search space sets associated with the first CORESET. The wireless device 2611 may monitor, for the second downlink control signal/channel (e.g., DCI 2630-2), the second CORESET (e.g., CORESET 2620-2). The wireless device 2611 may monitor, for the second downlink control signal/channel, the one or more second search space sets associated with the second CORESET. The wireless device 2611 may monitor, for the first downlink control signal/channel, the first search space set associated with the first CORESET. The wireless device 2611 may monitor, for the second downlink control signal/channel, the second search space set associated with the second CORESET.

The wireless device 2611 may monitor, for each downlink control signal/channel of the plurality of DCI messages/PDCCH transmissions (or for the repetitions of the downlink control signal/channel), a respective search space set of the plurality of search space sets. The wireless device 2611 may monitor, for the plurality of DCI messages/PDCCH transmissions (or for the repetitions of the downlink control signal/channel), the one or more first search space sets associated with the first CORESET and the one or more second search space sets associated with the second CORESET. The wireless device 2611 may monitor, for the plurality of DCI messages/PDCCH transmissions (or for the repetitions of the downlink control signal/channel), the first search space set associated with the first CORESET and the second search space set associated with the second CORESET.

Monitoring for the plurality of DCI messages/PDCCH transmissions may comprise/be monitoring for repetitions of the downlink control signal/channel. The monitoring for the plurality of DCI messages/PDCCH transmissions may comprise/be monitoring for repetitions of the downlink control signal/channel, for example, based on each downlink control signal/channel of the plurality of DCI messages/PDCCH transmissions being the same.

The wireless device 2611 may monitor, for the plurality of DCI messages/PDCCH transmissions (or for the repetitions of the downlink control signal/channel), the PDCCH candidates of (or associated with) the plurality of search space sets. The wireless device 2611 may monitor, for each downlink control signal/channel of the plurality of DCI messages/PDCCH transmissions, a respective PDCCH candidate of the PDCCH candidates for the repetition of the downlink control signal/channel. The wireless device 2611 may monitor, for the first downlink control signal/channel (e.g., DCI 2630-1), the first PDCCH candidate(s) of the first search space set associated with the first CORESET (e.g., CORESET 2620-1). The wireless device 2611 may monitor, for the second downlink control signal/channel (e.g., DCI 2630-2), the second PDCCH candidate(s) of the second search space set associated with the second CORESET (e.g., CORESET 2620-2). The wireless device 2611 may monitor, for the first downlink control signal/channel, the one or more first PDCCH candidates of (or associated with) the first CORESET. The wireless device 2611 may monitor, for the second downlink control signal/channel, the one or more second PDCCH candidates of (or associated with) the second CORESET. The wireless device 2611 may monitor, for the first downlink control signal/channel, the first PDCCH candidate of (or associated with) the first search space set. The wireless device 2611 may monitor, for the second downlink control signal/channel, the second PDCCH candidate of (or associated with) the second search space set.

The wireless device 2611 may monitor, for each downlink control signal/channel of the plurality of DCI messages/PDCCH transmissions (or for repetitions of the downlink control signal/channel), a respective PDCCH candidate of the PDCCH candidates. The wireless device 2611 may monitor, for the plurality of DCI messages/PDCCH transmissions (or for the repetitions of the downlink control signal/channel), the first PDCCH candidate associated with the first CORESET (or associated with the first search space set of the first CORESET) and the second PDCCH candidate associated with the second CORESET (or associated with the second search space set of the second CORESET).

The wireless device 2611 may monitor, for the first downlink control signal/channel (e.g., DCI 2630-1), the first CORESET (e.g., CORESET 2620-1). The wireless device 2611 may monitor, for the first downlink control signal/channel, the one or more first search space sets associated with the first CORESET. The wireless device 2611 may monitor, for the first downlink control signal/channel, the first search space set associated with the first CORESET. The wireless device 2611 may monitor, for the first downlink control signal/channel, the first PDCCH candidate associated with the first CORESET. The wireless device 2611 may monitor, for the second downlink control signal/channel (e.g., DCI 2630-2), the second CORESET (e.g., CORESET 2620-2). The wireless device 2611 may monitor, for the second downlink control signal/channel, the one or more second search space sets associated with the second CORESET. The wireless device 2611 may monitor, for the second downlink control signal/channel, the second search space set associated with the second CORESET. The wireless device 2611 may monitor, for the second downlink control signal/channel, the second PDCCH candidate associated with the second CORESET.

The wireless device 2611 may determine a plurality of downlink control signal/channel transmission/repetition occasions (e.g., PDCCH transmission/repetition/monitoring occasions) for the control channel repetition. The wireless device 2611 may determine the plurality of downlink control signal/channel transmission/repetition occasions for the repetition of the downlink control signal/channel.

The base station 2610 may determine the plurality of downlink control signal/channel transmission/repetition occasions (e.g., PDCCH transmission/repetition/monitoring occasions) for the control channel repetition. The base station 2610 may determine the plurality of downlink control signal/channel transmission/repetition occasions for the repetition of the downlink control signal/channel.

The base station 2610 may send/transmit, via the plurality of CORESETs, the plurality of DCI messages/PDCCH transmissions (or the repetitions of the downlink control signal/channel or the downlink control signal/channel) across/over/on/in the plurality of downlink control signal/channel transmission/repetition occasions (e.g., PDCCH transmission/repetition/monitoring occasion 2632-1 and PDCCH transmission/repetition/monitoring occasion 2632-2). The base station 2610 may transmit, via the plurality of CORESETs, the downlink control signal/channel across/over/on/in the plurality of downlink control signal/channel transmission/repetition occasions. The base station 2610 may transmit, via each CORESET of the plurality of CORESETs, the downlink control signal/channel across/over/on/in respective downlink control signal/channel transmission/repetition occasion(s) of the plurality of downlink control signal/channel transmission/repetition occasions. The base station 2610 may transmit, via the first CORESET, the downlink control signal/channel across/over/on/in one or more first downlink control signal/channel transmission/repetition occasions of the plurality of downlink control signal/channel transmission/repetition occasions. The base station 2610 may transmit, via the second CORESET, the downlink control signal/channel across/over/on/in one or more second downlink control signal/channel transmission/repetition occasions of the plurality of downlink control signal/channel transmission/repetition occasions. The base station 2610 may repeat transmission of the downlink control signal/channel across/over/on/in the plurality of downlink control signal/channel transmission/repetition occasions. The plurality of downlink control signal/channel transmission/repetition occasions may comprise a first downlink control signal/channel transmission/repetition occasion (e.g., PDCCH transmission/repetition/monitoring occasion 2632-1) and a second downlink control signal/channel transmission/repetition occasion (e.g., PDCCH transmission/repetition/monitoring occasion 2632-2). The base station 2610 may transmit, via the first CORESET, the first downlink control signal/channel (e.g., a repetition of the downlink control signal/channel) in the first downlink control signal/channel transmission/repetition occasion. The base station 2610 may transmit, via the second CORESET, the second downlink control signal/channel (e.g., a repetition of the downlink control signal/channel) in the second downlink control signal/channel transmission/repetition occasion. The one or more first downlink control signal/channel transmission/repetition occasions may comprise the first downlink control signal/channel transmission/repetition occasion. The one or more second downlink control signal/channel transmission/repetition occasions may comprise the second downlink control signal/channel transmission/repetition occasion.

The base station may alternate between CORESETs, of the plurality of CORESETs, for sending/transmitting the plurality of DCI messages/PDCCH transmissions across/over/on/in the plurality of downlink control signal/channel transmission/repetition occasions. For example, the plurality of downlink control signal/channel transmission/repetition occasions may comprise a first downlink control signal/channel transmission/repetition occasion (e.g., PDCCH transmission/repetition/monitoring occasion 2632-1), a second downlink control signal/channel transmission/repetition occasion (e.g., PDCCH transmission/repetition/monitoring occasion 2632-2), and a third downlink control signal/channel transmission/repetition occasion (e.g., PDCCH transmission/repetition/monitoring occasion 3, not shown in FIG. 26). The base station 2610 may transmit, via the first CORESET, the first downlink control signal/channel (e.g., a repetition of the downlink control signal/channel) in the first downlink control signal/channel transmission/repetition occasion. The base station 2610 may transmit, via the second CORESET, the second downlink control signal/channel (e.g., a repetition of the downlink control signal/channel) in the second downlink control signal/channel transmission/repetition occasion. The base station 2610 may transmit, via the first CORESET, a third downlink control signal/channel (e.g., a repetition of the downlink control signal/channel) in the third downlink control signal/channel transmission/repetition occasion. The one or more first downlink control signal/channel transmission/repetition occasions may comprise the first downlink control signal/channel transmission/repetition occasion and the third downlink control signal/channel transmission/repetition occasion. The one or more second downlink control signal/channel transmission/repetition occasions may comprise the second downlink control signal/channel transmission/repetition occasion.

The plurality of downlink control signal/channel transmission/repetition occasions may comprise/be the at least one first PDCCH monitoring occasion and the at least one second PDCCH monitoring occasion. The sending/transmitting, via the plurality of CORESETs, the plurality of DCI messages/PDCCH transmissions (or the repetitions of the downlink control signal/channel) across/over/on/in the plurality of downlink control signal/channel transmission/repetition occasions may comprise sending/transmitting, via the plurality of search space sets associated with the plurality of CORESETs, the plurality of DCI messages/PDCCH transmissions (or the repetitions of the downlink control signal/channel) across/over/on/in the plurality of downlink control signal/channel transmission/repetition occasions. The base station 2610 may send/transmit, via each search space set of the plurality of search space sets, the downlink control signal/channel across/over/on/in respective downlink control signal/channel transmission/repetition occasion(s) of the plurality of downlink control signal/channel transmission/repetition occasions. The base station 2610 may send/transmit, via the first search space set, the first downlink control signal/channel in the first downlink control signal/channel transmission/repetition occasion. The base station 2610 may send/transmit, via the second search space set, the second downlink control signal/channel in the second downlink control signal/channel transmission/repetition occasion.

The sending/transmitting, via the plurality of CORESETs, the plurality of DCI messages/PDCCH transmissions (or the repetitions of the downlink control signal/channel) across/over/on/in the plurality of downlink control signal/channel transmission/repetition occasions may comprise sending/transmitting, via the PDCCH candidates associated with the plurality of CORESETs, the plurality of DCI messages/PDCCH transmissions (or the repetitions of the downlink control signal/channel) across/over/on/in the plurality of downlink control signal/channel transmission/repetition occasions. The base station 2610 may transmit, via each PDCCH candidate of the PDCCH candidates, the downlink control signal/channel across/over/on/in respective downlink control signal/channel transmission/repetition occasion(s) of the plurality of downlink control signal/channel transmission/repetition occasions. The base station 2610 may transmit, via the first PDCCH candidate, the first downlink control signal/channel in the first downlink control signal/channel transmission/repetition occasion. The base station 2610 may transmit, via the second PDCCH candidate, the second downlink control signal/channel in the second downlink control signal/channel transmission/repetition occasion.

The wireless device 2611 may monitor, for the plurality of DCI messages/PDCCH transmissions (or the repetition of the downlink control signal/channel), the plurality of CORESETs, across/over/on/in the plurality of downlink control signal/channel transmission/repetition occasions (e.g., PDCCH transmission/repetition/monitoring occasion 2632-1 and PDCCH transmission/repetition/monitoring occasion 2632-2). The wireless device 2611 may monitor, for the downlink control signal/channel, the plurality of CORESETs across/over/on/in the plurality of downlink control signal/channel transmission/repetition occasions. The wireless device 2611 may monitor, for the downlink control signal/channel, each CORESET of the plurality of CORESETs across/over/on/in respective downlink control signal/channel transmission/repetition occasion(s) of the plurality of downlink control signal/channel transmission/repetition occasions. The wireless device 2611 may monitor, for the downlink control signal/channel, the first CORESET across/over/on/in the one or more first downlink control signal/channel transmission/repetition occasions of the plurality of downlink control signal/channel transmission/repetition occasions. The wireless device 2611 may monitor, for the downlink control signal/channel, the second CORESET across/over/on/in the one or more second downlink control signal/channel transmission/repetition occasions of the plurality of downlink control signal/channel transmission/repetition occasions. The wireless device 2611 may monitor, for repetition of the downlink control signal/channel, the plurality of CORESETs across/over/on/in the plurality of downlink control signal/channel transmission/repetition occasions. The plurality of downlink control signal/channel transmission/repetition occasions may comprise a first downlink control signal/channel transmission/repetition occasion (e.g., PDCCH transmission/repetition/monitoring occasion 2632-1) and a second downlink control signal/channel transmission/repetition occasion (e.g., PDCCH transmission/repetition/monitoring occasion 2632-2). The wireless device 2611 may monitor, for the first downlink control signal/channel (or repetition of the downlink control signal/channel), the first CORESET in the first downlink control signal/channel transmission/repetition occasion. The wireless device 2611 may monitor, for the second downlink control signal/channel (or repetition of the downlink control signal/channel), the second CORESET in the second downlink control signal/channel transmission/repetition occasion.

The monitoring, for the plurality of DCI messages/PDCCH transmissions (or the repetitions of the downlink control signal/channel), the plurality of CORESETs across/over/on/in the plurality of downlink control signal/channel transmission/repetition occasions may comprise monitoring, for the plurality of DCI messages/PDCCH transmissions (or the repetitions of the downlink control signal/channel), the plurality of search space sets associated with the plurality of CORESETs, across/over/on/in the plurality of downlink control signal/channel transmission/repetition occasions. The wireless device 2611 may monitor, for the downlink control signal/channel, each search space set of the plurality of search space sets across/over/on/in respective downlink control signal/channel transmission/repetition occasion(s) of the plurality of downlink control signal/channel transmission/repetition occasions. The wireless device 2611 may monitor, for the first downlink control signal/channel, the first search space set in the first downlink control signal/channel transmission/repetition occasion. The wireless device 2611 may monitor, for the second downlink control signal/channel, the second search space set in the second downlink control signal/channel transmission/repetition occasion.

The monitoring, for the plurality of DCI messages/PDCCH transmissions (or the repetitions of the downlink control signal/channel), the plurality of CORESETs across/over/on/in the plurality of downlink control signal/channel transmission/repetition occasions may comprise monitoring, for the plurality of DCI messages/PDCCH transmissions (or the repetitions of the downlink control signal/channel), the PDCCH candidates associated with the plurality of CORESETs across/over/on/in the plurality of downlink control signal/channel transmission/repetition occasions. The wireless device 2611 may monitor, for the downlink control signal/channel, each PDCCH candidate of the PDCCH candidates across/over/on/in respective downlink control signal/channel transmission/repetition occasion(s) of the plurality of downlink control signal/channel transmission/repetition occasions. The wireless device 2611 may monitor, for the first downlink control signal/channel, the first PDCCH candidate in the first downlink control signal/channel transmission/repetition occasion. The wireless device 2611 may monitor, for the second downlink control signal/channel, the second PDCCH candidate in the second downlink control signal/channel transmission/repetition occasion.

The plurality of downlink control signal/channel transmission/repetition occasions may be (or be associated with) a plurality of time slots. Each downlink control signal/channel transmission/repetition occasion of the plurality of downlink control signal/channel transmission/repetition occasions may be a respective time slot of the plurality of time slots. The plurality of time slots may comprise the plurality of downlink control signal/channel transmission/repetition occasions. Each downlink control signal/channel transmission/repetition occasion of the plurality of downlink control signal/channel transmission/repetition occasions may be/occur, for example, in a respective time slot of the plurality of time slots. The first downlink control signal/channel transmission/repetition occasion may be (or be associated with) a first time slot (e.g., slot 1). The wireless device 2611 may monitor, for the downlink control signal/channel (e.g., the first downlink control signal/channel), the first CORESET in the first time slot. The first time slot may comprise the first downlink control signal/channel transmission/repetition occasion. The second downlink control signal/channel transmission/repetition occasion may be a second time slot (e.g., slot 2). The wireless device 2611 may monitor, for the downlink control signal/channel (e.g., the second downlink control signal/channel), the second CORESET in the second time slot. The second time slot may comprise the second downlink control signal/channel transmission/repetition occasion. The plurality of time slots may comprise the first time slot and the second time slot.

The plurality of downlink control channel transmission/repetition occasions may be (or be associated with) a plurality of PDCCH monitoring occasions. Each downlink control signal/channel transmission/repetition occasion of the plurality of downlink control channel transmission/repetition occasions may be, for example, a respective PDCCH monitoring occasion of the plurality of PDCCH monitoring occasions. The first downlink control signal/channel transmission/repetition occasion may be (or be associated with) a first PDCCH monitoring occasion. The wireless device 2611 may monitor, for the downlink control signal/channel (or the first downlink control signal/channel), the first CORESET in the first PDCCH monitoring occasion. The second downlink control signal/channel transmission/repetition occasion may be a second PDCCH monitoring occasion. The wireless device 2611 may monitor, for the downlink control signal/channel (or the second downlink control signal/channel), the second CORESET in the second PDCCH monitoring occasion. The plurality of PDCCH monitoring occasions may comprise the first PDCCH monitoring occasion and the second PDCCH monitoring occasion.

The repetition of the downlink control signal/channel (or transmission of the plurality of DCI messages/PDCCH transmissions) may, for example, be/occur in time units (e.g. TDM-ed). The time units, for example, may or may not be consecutive. A number/quantity of the time units may be equal to the number/quantity of repetitions. The time units, for example, may be time slots. The time units may, for example, be mini-slots. The time units may, for example, be time symbols (e.g., OFDM symbols). The time units may, for example, be sub-frames. The time units, for example, may be monitoring occasions (e.g., PDCCH monitoring occasions) in time. A number/quantity of the plurality of downlink control signal/channel transmission occasions may be equal to the number of repetitions. The plurality of downlink control signal/channel transmission occasions may be/occur in the time units. For example, a first downlink control signal/channel transmission occasion of the plurality of downlink control signal/channel transmission occasions may be/occur in a first time unit of the time units. A second downlink control signal/channel transmission occasion of the plurality of downlink control signal/channel transmission occasions may be/occur in a second time unit of the time units, and so on.

The repetition of the downlink control signal/channel (or transmission of the plurality of DCI messages/PDCCH transmissions) may, for example, be/occur in frequency units (FDM-ed). A number/quantity of the frequency units may be equal to the number of repetitions. The frequency units, for example, may be frequency bands. The frequency units, for example, may be physical resource blocks (PRBs). The frequency units may, for example, be resource-element groups (REGs). The frequency units may, for example, be REG bundles. The frequency units may, for example, be control elements (CEs). The frequency units may, for example, be BWPs. The frequency units may, for example, be cells. A number/quantity of the plurality of downlink control signal/channel transmission occasions may be equal to the number of repetitions. The plurality of downlink control signal/channel transmission occasions may be/occur in the frequency units. For example, a first downlink control signal/channel transmission occasion of the plurality of downlink control signal/channel transmission occasions may be/occur in a first frequency unit of the frequency units. A second downlink control signal/channel transmission occasion of the plurality of downlink control signal/channel transmission occasions may be/occur in a second frequency unit of the frequency units, and so on.

The base station 2610 may send/transmit the plurality of DCI messages/PDCCH transmissions across/over/in the time units. The base station 2610 may send/transmit the plurality of DCI messages/PDCCH transmissions across/over/in the frequency units. The base station 2610 may repeat transmission of the downlink control signal/channel across/over/in the plurality of uplink signal/channel transmission occasions. The base station 2610 may send/transmit the downlink control signal/channel with the quantity/number of repetitions. The base station 2610 may send/transmit the quantity of repetitions of the downlink control signal/channel. The plurality of downlink control signal/channel transmission occasions may comprise a first downlink control signal/channel transmission occasion (first TX occasion) and a second downlink control signal/channel transmission occasion (second TX occasion). The first downlink control signal/channel transmission occasion may be/occur in a first time unit of the time units (e.g., first time slot, first symbol, first subframe, first PDCCH monitoring occasion). The second downlink control signal/channel transmission occasion may be/occur in a second time unit of the time units (e.g., second time slot, second symbol, second subframe, second PDCCH monitoring occasion). The first downlink control signal/channel transmission occasion may be/occur in a first frequency unit of the frequency units (e.g., first PRB, first cell, first frequency, first BWP, first subband, first REG bundle, first CE). The second downlink control signal/channel transmission occasion may be/occur in a second frequency unit of the frequency units (e.g., second PRB, second cell, second frequency, second BWP, second subband, second REG bundle, second CE).

The one or more configuration parameters may indicate a repetition scheme (e.g., by a higher layer parameter RepetitionSchemeConfig, FDM-Scheme, TDM-Scheme, SDM-Scheme, CDM-Scheme) for the control channel repetition. The repetition scheme, for example, may be a time domain repetition scheme, a frequency domain repetition scheme, or a spatial/code domain repetition scheme. The wireless device 2611 may monitor, for the plurality of DCI messages/PDCCH transmissions, the plurality of CORESETs across/over/in the plurality of downlink control signal/channel transmission occasions based on the one or more configuration parameters indicating the repetition scheme.

The repetition scheme may be a time domain repetition scheme (e.g., TDM scheme, intra-slot repetition, inter-slot repetition, TDMSchemeA, TDMSchemeB, etc.). The plurality of downlink control signal/channel transmission occasions (e.g., first TX occasion and second TX occasion) may not overlap in time, for example, in the time domain repetition scheme. The plurality of downlink control signal/channel transmission occasions may or may not overlap in frequency, for example, in the time domain repetition scheme. A downlink control signal/channel transmission occasion (e.g., each downlink control signal/channel transmission occasion) of the plurality of downlink control signal/channel transmission occasions may have a non-overlapping time domain resource allocation with respect to other signal/channel transmission occasion(s) of the plurality of downlink control signal/channel transmission occasions. For example, a first downlink control signal/channel transmission occasion of the plurality of downlink control signal/channel transmission occasions may not overlap, in time, with a second downlink control signal/channel transmission occasion of the plurality of downlink control signal/channel transmission occasions. The first downlink control signal/channel transmission occasion and the second downlink control signal/channel transmission occasion may be different. The first downlink control signal/channel transmission occasion (first TX occasion) and the second downlink control signal/channel transmission occasion (second TX occasion) may not overlap in time, for example, in the time domain repetition scheme. The plurality of downlink control signal/channel transmission occasions may occur in different time units. For example, the first time unit and the second time unit, and the third time unit may not overlap in time. The first time unit, the second time unit, and the third time unit may be different. FIG. 26 is an example of a time domain repetition scheme. The communication shown in FIG. 26 may be applied to any other type of repetition (e.g., frequency domain repetition, spatial/code domain repetition, etc.).

The repetition scheme may comprise a frequency domain repetition scheme (e.g., FDM scheme, FDMSchemeA, FDMSchemeB, etc). The plurality of downlink control signal/channel transmission occasions may or may not overlap in time, for example, in the frequency domain repetition scheme. The plurality of downlink control signal/channel transmission occasions may not overlap in frequency, for example, in the frequency domain repetition scheme. Each downlink control signal/channel transmission occasion of the plurality of downlink control signal/channel transmission occasions may have a non-overlapping frequency domain resource allocation with respect to other signal/channel transmission occasion(s) of the plurality of downlink control signal/channel transmission occasions. For example, a first downlink control signal/channel transmission occasion of the plurality of downlink control signal/channel transmission occasions may not overlap, in frequency, with a second downlink control signal/channel transmission occasion of the plurality of downlink control signal/channel transmission occasions. The first downlink control signal/channel transmission occasion and the second downlink control signal/channel transmission occasion may be different. The first downlink control signal/channel transmission occasion (first TX occasion) and the second downlink control signal/channel transmission occasion (second TX occasion) may not overlap in frequency, for example, in the frequency domain repetition scheme. The first downlink control signal/channel transmission occasion (first TX occasion) and the second downlink control signal/channel transmission occasion (second TX occasion) may overlap in time. The plurality of downlink control signal/channel transmission occasions may occur in different frequency units (e.g., frequencies, REGs, CEs, PRBs, frequency bands, bandwidth parts, cells). For example, a first frequency unit of the first downlink control signal/channel transmission occasion and a second frequency unit of the second downlink control signal/channel transmission occasion may not overlap in frequency. The first frequency unit and the second frequency unit may be different.

The repetition scheme may be a spatial/code domain repetition scheme (e.g., SDM scheme, CDM scheme, SDMScheme, CDMScheme, etc.). The plurality of downlink control signal/channel transmission occasions may overlap in time, for example, in the spatial/code domain repetition scheme. The plurality of downlink control signal/channel transmission occasions may overlap in frequency, for example, in the spatial/code domain repetition scheme. The plurality of downlink control signal/channel transmission occasions may be a single downlink control signal/channel transmission occasion, for example, in the spatial/code domain repetition scheme. Each downlink control signal/channel transmission occasion of the plurality of downlink control signal/channel transmission occasions may have an overlapping frequency domain resource allocation with respect to other downlink control signal/channel transmission occasion(s) of the plurality of downlink control signal/channel transmission occasions. Each downlink control signal/channel transmission occasion of the plurality of downlink control signal/channel transmission occasions may have an overlapping time domain resource allocation with respect to other downlink control signal/channel transmission occasion(s) of the plurality of downlink control signal/channel transmission occasions. Each downlink control signal/channel transmission occasion of the plurality of downlink control signal/channel transmission occasions may be the same. For example, a first downlink control signal/channel transmission occasion (e.g., first TX occasion) of the plurality of downlink control signal/channel transmission occasions may overlap, in time and/or frequency, with a second downlink control signal/channel transmission occasion (e.g., second TX occasion) of the plurality of downlink control signal/channel transmission occasions. The first downlink control signal/channel transmission occasion and the second downlink control signal/channel transmission occasion may be same. For example, in the spatial/code domain repetition scheme, the first downlink control signal/channel transmission occasion and the second downlink control signal/channel transmission occasion may overlap in frequency. The first downlink control signal/channel transmission occasion and the second downlink control signal/channel transmission occasion may overlap in time. The plurality of downlink control signal/channel transmission occasions may occur in same frequency units (e.g., frequencies, PRBs, frequency bands, bandwidth parts, subbands, cells, REGs, REG bundles, CEs). For example, a first frequency unit of the first downlink control signal/channel transmission occasion and a second frequency unit of the second downlink control signal/channel transmission occasion may overlap in frequency. The first frequency unit and the second frequency unit may be the same. The plurality of downlink control signal/channel transmission occasions may occur in the same time units (e.g., symbols, mini-slots, slots, sub-frames, PDCCH monitoring occasions etc). For example, a first time unit of the first downlink control signal/channel transmission occasion and a second time unit of the second downlink control signal/channel transmission occasion may overlap in time. The first time unit and the second time unit may be the same.

A downlink control signal/channel transmission occasion, of the plurality of downlink control signal/channel transmission occasions, may have non-overlapping time domain resource allocation with respect to another downlink control signal/channel transmission occasion of the plurality of downlink control signal/channel transmission occasions, for example, in the time domain repetition scheme. A downlink control signal/channel transmission occasion of the plurality of downlink control signal/channel transmission occasions may have non-overlapping frequency domain resource allocation with respect to another downlink control signal/channel transmission occasion of the plurality of downlink control signal/channel transmission occasions, for example, in the frequency domain repetition scheme. A downlink control signal/channel transmission occasion of the plurality of downlink control signal/channel transmission occasions may have overlapping time and frequency domain resource allocations with respect to another downlink control signal/channel transmission occasion of the plurality of downlink control signal/channel transmission occasions, for example, in the spatial/code domain repetition scheme.

The plurality of DCI messages/PDCCH transmissions may be associated with (or linked to) the plurality of downlink control signal/channel transmission occasions. Each downlink control signal/channel of the plurality of DCI messages/PDCCH transmissions may be associated with a respective downlink control signal/channel transmission occasion of the plurality of downlink control signal/channel transmission occasions. The base station 2610 may send/transmit each downlink control signal/channel of the plurality of DCI messages/PDCCH transmissions in/via a respective downlink control signal/channel transmission occasion of the plurality of downlink control signal/channel transmission occasions. The wireless device 2611 may monitor, for each downlink control signal/channel of the plurality of DCI messages/PDCCH transmissions, in/via a respective downlink control signal/channel transmission occasion of the plurality of downlink control signal/channel transmission occasions. The first downlink control signal/channel (e.g., DCI 2630-1) may be associated with the first downlink control signal/channel transmission/repetition occasion (e.g., PDCCH transmission/repetition/monitoring occasion 2632-1), for example, based on the first downlink control signal/channel being transmitted/sent by the base station 2610 or monitored by the wireless device 2611 in/via the first downlink control signal/channel transmission/repetition/monitoring occasion, as shown in FIG. 26. The second downlink control signal/channel (e.g., DCI 2630-2) may be associated with the second downlink control signal/channel transmission/repetition occasion (e.g., PDCCH transmission/repetition/monitoring occasion 2632-2), for example, based on the second downlink control signal/channel being transmitted/sent by the base station 2610 or monitored by the wireless device 2611 in/via the second downlink control signal/channel transmission/repetition occasion.

The wireless device 2611 may receive/detect at least one downlink control signal/channel among the plurality of DCI messages/PDCCH transmissions (or among the repetitions of the downlink control signal/channel). The wireless device 2611 may detect/receive DCI 2630-1. The wireless device 2611 may or may not receive/detect DCI 2630-2. The at least one downlink control signal/channel may comprise DCI 2630-1. The wireless device 2611 may receive DCI 2630-1 in the first downlink control signal/channel transmission occasion of (or associated with) the first CORESET (e.g., CORESET 2620-1). The wireless device 2611 may or may not receive/detect DCI 2630-2 in the second downlink control signal/channel transmission occasion of (or associated with) the second CORESET (e.g., CORESET 2620-2). The wireless device 2611 may detect/receive DCI 2630-2. The wireless device may or may not receive/detect DCI 2630-1. The at least one downlink control signal/channel may comprise DCI 2630-2. The wireless device 2611 may or may not receive DCI 2630-1 in the first downlink control signal/channel transmission occasion of (or associated with) the first CORESET. The wireless device 2611 may receive/detect DCI 2630-2 in the second downlink control signal/channel transmission occasion of (or associated with) the second CORESET. The wireless device 2611 may detect/receive DCI 2630-1 and DCI 2630-2. The at least one downlink control signal/channel may comprise both DCI 1 and DCI 2. The wireless device 2611 may receive DCI 2630-1 in the first downlink control signal/channel transmission occasion of (or associated with) the first CORESET. The wireless device 2611 may receive/detect DCI 2630-2 in the second downlink control signal/channel transmission occasion of (or associated with) the second CORESET. Each downlink control signal/channel of the at least one downlink control signal/channel and the downlink control signal/channel may be the same.

The wireless device 2611 may receive the downlink control signal/channel in at least one downlink control signal/channel transmission/repetition occasion of the plurality of downlink control signal/channel transmission/repetition occasions. The wireless device 2611 may receive each downlink control signal/channel of the at least one downlink control signal/channel in a respective downlink control signal/channel transmission/repetition occasion of the at least one downlink control signal/channel transmission/repetition occasion. The at least one downlink control signal/channel transmission/repetition occasion may be the first downlink control signal/channel transmission occasion. For example, the wireless device 2611 may detect/receive DCI 2630-1 and not detect/receive DCI 2630-2. The at least one downlink control signal/channel transmission/repetition occasion may be the first downlink control signal/channel transmission occasion and/or the second downlink control signal/channel transmission occasion. For example, the wireless device 2611 may detect/receive DCI 2630-1 and detect/receive DCI 2630-2.

The wireless device 2611 may receive/detect the downlink control signal/channel, for example, based on the receiving/detecting the at least one downlink control signal/channel among the plurality of DCI messages/PDCCH transmissions. The receiving/detecting the at least one downlink control signal/channel may be/comprise receiving/detecting the downlink control signal/channel, for example, based on each downlink control signal/channel, of the at least one downlink control signal/channel, and the downlink control signal/channel being the same.

The at least one downlink control signal/channel (or the downlink control signal/channel) may indicate the quantity/number of repetitions. The at least one downlink control signal/channel may comprise the DCI indicating the number of repetitions.

The wireless device 2611 may receive the at least one downlink control signal/channel (or the downlink control signal/channel) via at least one CORESET of the plurality of CORESETs. The wireless device 2611 may receive each downlink control signal/channel, of the at least one downlink control signal/channel, via a respective CORESET of the at least one CORESET. The at least one CORESET may be the first CORESET (e.g., CORESET 2620-1), for example, based on the detecting/receiving DCI 2630-1 and not detecting/receiving DCI 2630-2. The at least one CORESET may be the first CORESET and the second CORESET (e.g., CORESET 2620-2), for example, based on the detecting/receiving DCI 2630-1 and detecting/receiving DCI 2620-2. The at least one CORESET may be the second CORESET, for example, based on detecting/receiving DCI 2630-2 and not detecting/receiving DCI 2630-1.

The wireless device 2611 may receive the at least one downlink control signal/channel at the same time (or substantially the same time). The wireless device 2611 may receive each downlink control signal/channel of the at least one downlink control signal/channel at the same time (or substantially the same time). The wireless device 2611 may receive each downlink control signal/channel of the at least one downlink control signal/channel at the same time (or substantially the same time), for example, based on the repetitions of the downlink control signal/channel being transmitted (e.g., by the base station 2610) using a frequency domain repetition scheme or a spatial/code domain repetition scheme.

The wireless device 2611 may receive the at least one downlink control signal/channel at different times. The wireless device 2611 may receive each downlink control signal/channel of the at least one downlink control signal/channel at a respective time. The wireless device 2611 may receive each downlink control signal/channel of the at least one downlink control signal/channel at different times, for example, based on the repetitions of the downlink control signal/channel being transmitted (e.g., by the base station 2610) using a time domain repetition scheme.

The wireless device 2611 may determine a reference/default downlink control signal/channel transmission/repetition occasion (or a reference time slot) of the plurality of downlink control channel transmission/repetition occasions (of a plurality of time slots). The wireless device 2611 may determine, for the control channel repetition, the reference/default downlink control signal/channel transmission/repetition occasion. The wireless device 2611 may determine the reference/default downlink control signal/channel transmission/repetition occasion, for example, based on the one or more configuration parameters 2615 indicating a time domain repetition. The wireless device 2611 may determine the reference/default downlink control signal/channel transmission/repetition occasion, for example, based on the one or more configuration parameters 2615 indicating a frequency domain repetition. The determining the reference downlink control signal/channel transmission/repetition occasion (or the reference time slot) may be based on one or more criteria. The reference downlink control signal/channel transmission/repetition occasion (or the reference time slot) may be a last (or latest or ending) downlink control signal/channel transmission/repetition occasion (or time slot) among the plurality of downlink control signal/channel transmission/repetition occasions (or the plurality of time slots). The reference downlink control signal/channel transmission/repetition occasion (or the reference time slot) may be a first (or earliest or starting) downlink control signal/channel transmission/repetition occasion (or time slot) among the plurality of downlink control signal/channel transmission/repetition occasions (or the plurality of time slots). The reference downlink control signal/channel transmission occasion (or the reference time slot) may be a last (or latest or ending) downlink control signal/channel transmission occasion among the plurality of downlink control signal/channel transmission occasions.

The wireless device 2611 may determine the reference downlink control signal/channel transmission occasion (or the reference time slot) based on the quantity/number of repetitions and a starting downlink control signal/channel transmission occasion (or a starting time slot) of the plurality of downlink control signal/channel transmission occasions. The one or more configuration parameters 2615 may indicate the starting downlink control signal/channel transmission occasion. The at least one downlink control signal/channel may indicate the starting downlink control signal/channel transmission occasion. The reference downlink control signal/channel transmission occasion may be the second downlink control signal/channel transmission occasion, for example, if the starting downlink control signal/channel transmission occasion is the first downlink control signal/channel transmission occasion and the quantity of repetitions is equal to two. The reference downlink control signal/channel transmission occasion may be a third downlink control signal/channel transmission occasion of the plurality of downlink control signal/channel transmission occasions, for example, if the starting downlink control signal/channel transmission occasion is the first downlink control signal/channel transmission occasion and the quantity of repetitions is equal to three. The reference downlink control signal/channel transmission occasion may be the third downlink control signal/channel transmission occasion, for example, if the starting downlink control signal/channel transmission occasion is the second downlink control signal/channel transmission occasion and the quantity of repetitions is equal to two.

The wireless device 2611 may monitor, for the downlink control signal/channel, the first CORESET in the first downlink control signal/channel transmission occasion at a first time unit (e.g., first time slot, first time symbol, first subframe, etc.). The wireless device 2611 may monitor, for the downlink control signal/channel, the second CORESET in the second downlink control signal/channel transmission occasion at a second time unit.

The last downlink control signal/channel transmission occasion, for example, may have the latest starting time among starting times of the plurality of downlink control signal/channel transmission occasions. The second time unit may start later in time than the first time unit. A first/starting symbol of the second time unit may occur after (or later) in time than a first/starting symbol of the second time unit. The second downlink control signal/channel transmission occasion may be the reference downlink control signal/channel transmission occasion based on the second time unit starting later in time than the first time unit.

The last downlink control signal/channel transmission occasion, for example, may have the latest ending time among ending times of the plurality of downlink control signal/channel transmission occasions. The second time unit may end later in time than the first time unit. A last symbol of the second time unit may occur after (or later) in time than a last symbol of the first time unit. The second downlink control signal/channel transmission occasion may be the reference downlink control signal/channel transmission occasion based on the second time unit ending later in time than the first time unit.

The last downlink control signal/channel transmission occasion may be associated with a last downlink control signal/channel (e.g., DCI 2630-2 in FIG. 26) among the plurality of DCI messages/PDCCH transmissions. The base station 2610 may send/transmit the last downlink control signal/channel in/via the last downlink control signal/channel transmission occasion. The wireless device 2611 may monitor, for the last downlink control signal/channel, in/via the last downlink control signal/channel transmission occasion. The last downlink control signal/channel may be the reference downlink control signal/channel. The base station 2610 may send/transmit a last repetition of the downlink control signal/channel in the last downlink control signal/channel transmission occasion. The wireless device 2611 may monitor, for the last repetition of the downlink control signal/channel, in the last downlink control signal/channel transmission occasion. The last repetition of the downlink control signal/channel may be the last downlink control signal/channel. For example, as shown in FIG. 26, the last downlink control signal/channel transmission occasion may be the second downlink control signal/channel transmission occasion. The reference downlink control signal/channel transmission occasion may be the second (or the last) downlink control signal/channel transmission occasion.

The reference downlink control signal/channel transmission occasion (or the reference time slot) may be the earliest (or a first, or a starting) downlink control signal/channel transmission occasion among the plurality of downlink control signal/channel transmission occasions. The earliest (or the first, or the starting) downlink control signal/channel transmission occasion, for example, may have the earliest starting time among starting times of the plurality of downlink control signal/channel transmission occasions. The first time unit may start earlier in time than the second time unit. A first/starting symbol of the first time unit may occur before (or earlier) in time than a first/starting symbol of the second time unit. The first downlink control signal/channel transmission occasion may be the reference downlink control signal/channel transmission occasion based on the first time unit starting earlier than the second time unit.

The earliest (or the first, or the starting) downlink control signal/channel transmission occasion, for example, may have the earliest ending time among ending times of the plurality of downlink control signal/channel transmission occasions. For example, the first time unit may end earlier in time than the second time unit. A last symbol of the first time unit may occur before (or earlier) in time than a last symbol of the second time unit. The first downlink control signal/channel transmission occasion may be the reference downlink control signal/channel transmission occasion based on the first time unit ending earlier than the second time unit.

The earliest (or the first, or the starting) downlink control signal/channel transmission occasion may be associated with a first/starting downlink control signal/channel (e.g., DCI 2630-1) among the plurality of DCI messages/PDCCH transmissions. The base station 2610 may send/transmit the first/starting downlink control signal/channel in/via the earliest downlink control signal/channel transmission occasion. The wireless device 2611 may monitor, for the first/starting downlink control signal/channel, in/via the earliest downlink control signal/channel transmission occasion. The first/starting downlink control signal/channel (e.g., DCI 2630-1) may be the reference downlink control signal/channel. The base station 2610 may send/transmit a first/starting repetition (e.g., DCI 2630-1) of the downlink control signal/channel in the earliest downlink control signal/channel transmission occasion. The wireless device may monitor, for the first/starting repetition of the downlink control signal/channel, in the earliest downlink control signal/channel transmission occasion. The first/starting repetition of the downlink control signal/channel may be the first/starting downlink control signal/channel. For example, as shown in FIG. 26, the earliest (or the first, or the starting) downlink control signal/channel transmission occasion may be the first downlink control signal/channel transmission occasion. The reference downlink control signal/channel transmission occasion may be the first (or the earliest/first/starting) downlink control signal/channel transmission occasion.

The reference downlink control signal/channel transmission occasion (or the reference time slot) may be associated with a CORESET of the plurality of CORESETs. The wireless device 2611 may monitor, for the downlink control signal/channel, the CORESET in the reference downlink control signal/channel transmission occasion. The wireless device 2611 may monitor, for DCI (or the downlink control signal/channel), the CORESET in the reference downlink control signal/channel transmission occasion. The one or more configuration parameters may indicate the reference downlink control signal/channel transmission occasion for the CORESET. The wireless device 2611 may determine the reference downlink control signal/channel transmission occasion based on the receiving the one or more configuration parameters 2615.

The CORESET may be identified/indicated by a CORESET indicator/index of the plurality of CORESET indicators/indexes. The CORESET index may be lowest (or highest) among the plurality of CORESET indexes. The CORESET may be identified/indicated by a CORESET index that is lowest (or highest) among the plurality of CORESET indexes of the one or more CORESETs.

The wireless device 2611 may determine/select/detect/indicate the CORESET with a CORESET index that is lowest (or highest) among the plurality of CORESET indexes of the plurality of CORESETs. The wireless device 2611 may monitor, for DCI, the CORESET, for example, in a downlink control signal/channel transmission occasion of the plurality of downlink control signal/channel transmission occasions. The downlink control signal/channel transmission occasion may be the reference downlink control signal/channel transmission occasion. The wireless device 2611 may monitor, for DCI, the CORESET, for example, in one or more downlink control signal/channel transmission occasions of the plurality of downlink control signal/channel transmission occasions. A last/latest (or earliest/first/starting) downlink control signal/channel transmission occasion, of the one or more downlink control signal/channel transmission occasions, may be the reference downlink control signal/channel transmission occasion. The wireless device 2611 may determine the reference downlink control signal/channel transmission occasion based on the CORESET.

The reference downlink control signal/channel transmission occasion may be associated with a reference downlink control signal/channel among the plurality of DCI messages/PDCCH transmissions. The base station 2610 may send/transmit the reference downlink control signal/channel in/via the reference downlink control signal/channel transmission occasion. The wireless device 2611 may monitor, for the reference downlink control signal/channel, in/via the reference downlink control signal/channel transmission occasion. The wireless device 2611 may monitor, for the reference downlink control signal/channel, the CORESET in the reference downlink control signal/channel transmission occasion.

The reference downlink control signal/channel transmission occasion may be associated with (or may comprise) a starting PRB. The starting PRB of the reference downlink control signal/channel transmission occasion may occur/be lowest (or highest) in frequency among starting PRBs of the plurality of downlink control signal/channel transmission occasions. The wireless device 2611 may determine the reference downlink control signal/channel transmission occasion, for example, based on the starting PRB of the reference downlink control signal/channel transmission occasion occurring/being lowest (or highest) among the starting PRBs.

A starting PRB of the second downlink control signal/channel transmission occasion may occur/be lower (or higher) in frequency than a starting PRB of the first downlink control signal/channel transmission occasion. The second downlink control signal/channel transmission occasion may be (e.g., may be selected/determined by the wireless device 2611 as) the reference downlink control signal/channel transmission occasion, for example, based on the starting PRB of the second downlink control signal/channel transmission occasion occurring/being lower (or higher) than the starting PRB of the first downlink control signal/channel transmission occasion. A starting PRB of the first downlink control signal/channel transmission occasion may occur/be lower (or higher) in frequency than a starting PRB of the second downlink control signal/channel transmission occasion. The first downlink control signal/channel transmission occasion may be (e.g., may be selected/determined by the wireless device 2611 as) the reference downlink control signal/channel transmission occasion, for example, based on the starting PRB of the first downlink control signal/channel transmission occasion occurring/being lower (or higher) than the starting PRB of the second downlink control signal/channel transmission occasion.

The reference downlink control signal/channel transmission occasion may be associated with (or may comprise) an ending PRB. The ending PRB of the reference downlink control signal/channel transmission occasion may occur/be lowest (or highest) in frequency among ending PRBs of the plurality of downlink control signal/channel transmission occasions. The wireless device 2611 may determine the reference downlink control signal/channel transmission occasion, for example, based on the ending PRB of the reference downlink control signal/channel transmission occasion occurring/being lowest (or highest) among the ending PRBs.

An ending PRB of the second downlink control signal/channel transmission occasion may occur/be lower (or higher) in frequency than an ending PRB of the first downlink control signal/channel transmission occasion. The second downlink control signal/channel transmission occasion may be (e.g., may be selected/determined by the wireless device 2611 as) the reference downlink control signal/channel transmission occasion, for example, based on the ending PRB of the second downlink control signal/channel transmission occasion occurring/being lower (or higher) than the ending PRB of the first downlink control signal/channel transmission occasion. An ending PRB of the first downlink control signal/channel transmission occasion may occur/be lower (or higher) in frequency than an ending PRB of the second downlink control signal/channel transmission occasion. The first downlink control signal/channel transmission occasion may be (e.g., may be selected/determined by the wireless device 2611 as) the reference downlink control signal/channel transmission occasion, for example, based on the ending PRB of the first downlink control signal/channel transmission occasion occurring/being lower (or higher) than the ending PRB of the second downlink control signal/channel transmission occasion.

The wireless device 2611 may monitor, for the downlink control signal/channel, a search space set of the plurality of search space sets in the reference downlink control signal/channel transmission occasion (e.g., PDCCH monitoring occasion). The reference downlink control signal/channel transmission occasion (or the reference time slot) may be associated with the search space set. The wireless device 2611 may monitor, for DCI (or the downlink control signal/channel), the search space set in the reference downlink control signal/channel transmission occasion. The one or more configuration parameters may indicate the reference downlink control signal/channel transmission occasion for the search space set. The wireless device 2611 may determine the reference downlink control signal/channel transmission occasion based on the receiving the one or more configuration parameters.

The search space set may be identified/indicated by a search space set indicator/index of the search space set indicators/indexes. The search space set index may be lowest (or highest) among the search space set indexes. The search space set may be identified/indicated by a search space set index that is lowest (or highest) among the search space set indexes.

The wireless device 2611 may determine/select/detect/indicate the search space set with a search space set index that is lowest (or highest) among the search space set indexes of the plurality of search space sets. The wireless device 2611 may monitor, for DCI, the search space set, for example, in a downlink control signal/channel transmission occasion. The downlink control signal/channel transmission occasion may be the reference downlink control signal/channel transmission occasion. The wireless device may monitor, for DCI, the search space set, for example, in one or more downlink control signal/channel transmission occasions. A last/latest (or earliest/first/starting) downlink control signal/channel transmission occasion, of the one or more downlink control signal/channel transmission occasions, may be the reference downlink control signal/channel transmission occasion. The wireless device 2611 may determine the reference downlink control signal/channel transmission occasion based on the search space set.

The wireless device 2611 may monitor, for the downlink control signal/channel, a PDCCH candidate of the PDCCH candidates in the reference downlink control signal/channel transmission occasion (e.g., PDCCH monitoring occasion). The reference downlink control signal/channel transmission occasion (or the reference time slot) may be associated with the PDCCH candidate. The wireless device 2611 may monitor, for DCI (or the downlink control signal/channel), the PDCCH candidate in the reference downlink control signal/channel transmission occasion. The one or more configuration parameters 2615 may indicate the reference downlink control signal/channel transmission occasion for the PDCCH candidate. The wireless device 2611 may determine the reference downlink control signal/channel transmission occasion based on the receiving the one or more configuration parameters 2615.

The PDCCH candidate may be identified/indicated by a PDCCH candidate indicator/index of the PDCCH candidate indicators/indexes. The PDCCH candidate index may be lowest (or highest) among the PDCCH candidate indexes. The PDCCH candidate may be identified/indicated by a PDCCH candidate index that is lowest (or highest) among the PDCCH candidate indexes.

The wireless device 2611 may determine/select the PDCCH candidate with a PDCCH candidate index that is lowest (or highest) among the PDCCH candidate indexes of the PDCCH candidates. The wireless device may monitor, for DCI (e.g., DCI 2630-1 or DCI 2630-2), the PDCCH candidate in a downlink control signal/channel transmission occasion. The downlink control signal/channel transmission occasion may be the reference downlink control signal/channel transmission occasion. The wireless device 2611 may monitor, for DCI, the PDCCH candidate in one or more downlink control signal/channel transmission occasions. A last/latest (or earliest/first/starting) downlink control signal/channel transmission occasion, of the one or more downlink control signal/channel transmission occasions, may be the reference downlink control signal/channel transmission occasion. The wireless device 2611 may determine the reference downlink control signal/channel transmission occasion based on the PDCCH candidate.

The reference downlink control signal/channel transmission occasion may be associated with a reference downlink control signal/channel among the plurality of DCI messages/PDCCH transmissions. The base station 2610 may send/transmit the reference downlink control signal/channel in/via the reference downlink control signal/channel transmission occasion. The wireless device 2611 may monitor, for the reference downlink control signal/channel, in/via the reference downlink control signal/channel transmission occasion. The wireless device 2611 may monitor, for the reference downlink control signal/channel, the search space in the reference downlink control signal/channel transmission occasion.

The one or more configuration parameters 2615 may indicate one or more CORESET pool indictors/indexes (e.g., provided by a higher layer parameter CoresetPoolIndex) for the plurality of CORESETs. Each CORESET of the plurality of CORESETs may comprise (or be configured/indicated by the one or more configuration parameters 2615) by a respective CORESET pool indicator/index of the one or more CORESET pool indicators/indexes (e.g., 0, 1). The one or more configuration parameters 2615 may indicate, for each CORESET of the plurality of CORESETs, a respective CORESET pool index of the one or more CORESET pool indexes. The one or more configuration parameters 2615 may indicate, for the first CORESET (e.g., CORESET 2620-1), a first CORESET pool indicator/index. The one or more configuration parameters 2615 may indicate, for the second CORESET (e.g., CORESET 2620-2), a second CORESET pool indicator/index. The one or more CORESET pool indexes may comprise the first CORESET pool index and the second CORESET pool index.

A first CORESET pool may comprise one or more first CORESETs. The one or more first CORESETs may each have a CORESET pool index that is equal to the first CORESET pool index (e.g., CoresetPoolIndex=0). The one or more first CORESETs may comprise the first CORESET. The plurality of CORESETs may comprise the one or more first CORESETs. The one or more configuration parameters 2615 may indicate the first CORESET pool index for each CORESET of the one or more first CORESETs in the first CORESET pool.

A second CORESET pool may comprise one or more second CORESETs. The one or more second CORESETs may each have a CORESET pool index that is equal to the second CORESET pool index (e.g., CoresetPoolIndex=1). The one or more second CORESETs may comprise the second CORESET. The plurality of CORESETs may comprise the one or more second CORESETs. The one or more configuration parameters 2615 may indicate the second CORESET pool index for each CORESET of the one or more second CORESETs in the second CORESET pool.

The one or more configuration parameters 2615 may or may not indicate a CORESET pool index for a CORESET of the plurality of CORESETs. The wireless device 2611 may determine a default value for the CORESET pool index of the CORESET, for example, based on the one or more configuration parameters 2615 not indicating the CORESET pool index for the CORESET. The default value may be equal to zero (CoresetPoolIndex=0), or any other value. The default value may be equal to the first CORESET pool index (e.g., zero). The first CORESET pool may comprise the CORESET based on the default value for the CORESET pool index of the CORESET being equal to the first CORESET pool index. In an example, the default value may be equal to one (CoresetPoolIndex=1). The second CORESET pool may comprise the CORESET based on the default value for the CORESET pool index of the CORESET being equal to the second CORESET pool index.

The first CORESET pool index of the first CORESET and the second CORESET pool index of the second CORESET may be the same. The wireless device 2611 may group the first CORESET and the second CORESET in a same CORESET pool (e.g., corresponding to CoresetPoolIndex=0 or CoresetPoolIndex=1), for example, based on the first CORESET pool index of the first CORESET and the second CORESET pool index of the second CORESET being the same. The first CORESET pool comprising the first CORESET and the second CORESET pool comprising the second CORESET may be the same, for example, based on the first CORESET pool index of the first CORESET and the second CORESET pool index of the second CORESET being the same.

The first CORESET pool index of the first CORESET and the second CORESET pool index of the second CORESET may be different. The wireless device 2611 may group the first CORESET and the second CORESET in different CORESET pools, for example, based on the first CORESET pool index of the first CORESET and the second CORESET pool index of the second CORESET being different. The wireless device 2611 may group the first CORESET in a first CORESET pool (e.g., corresponding to CoresetPoolIndex=0). The wireless device 2611 may group the second CORESET in a second CORESET pool (e.g., corresponding to CoresetPoolIndex=1), that is different from the first CORESET pool, for example, based on the first CORESET pool index and the second CORESET pool index being different. The first CORESET pool and the second CORESET pool may be different, for example, based on the first CORESET pool index of the first CORESET and the second CORESET pool index of the second CORESET being different.

A plurality of TRPs may serve (e.g., communicate with, transmit signals to and/or receive signals from) the wireless device 2611. The plurality of TRPs may comprise a first TRP and a second TRP. The first TRP may send/transmit a downlink signal/channel (e.g., PDSCH transmission, PDCCH transmission, DCI, SS/PBCH block, CSI-RS) via a first CORESET. The first CORESET may have a first CORESET pool indicator/index that is equal to a first value (e.g., zero, or any other value). A first CORESET pool may comprise the first CORESET. The first TRP may not transmit a downlink signal/channel (e.g., PDSCH transmission, PDCCH transmission, DCI, SS/PBCH block, CSI-RS) via a second CORESET with a second CORESET pool index (e.g., one) that is different from the first value (e.g., zero). A second CORESET pool, different from the first CORESET pool, may comprise the second CORESET. The second TRP may send/transmit a downlink signal/channel (e.g., PDSCH transmission, PDCCH transmission, DCI, SS/PBCH block, CSI-RS) via a second CORESET with a second CORESET pool index that is equal to a second value (e.g., one, or any other value different from the first value). A second CORESET pool may comprise the second CORESET. The second TRP may not transmit a downlink signal/channel (e.g., PDSCH transmission, PDCCH transmission, DCI, SS/PBCH block, CSI-RS) via a first CORESET with a first CORESET pool index (e.g., zero) that is different from the second value (e.g., one). A first CORESET pool, different from the second CORESET pool, may comprise the first CORESET. The plurality of CORESETs may comprise the first CORESET and the second CORESET. The one or more CORESET pool indexes may comprise the first CORESET pool index and the second CORESET pool index.

A plurality of TRPs may serve (e.g., communicate with, transmit to or receive from) the wireless device 2611. The plurality of TRPs may comprise a first TRP and a second TRP. The first TRP may send/transmit a downlink signal/channel (e.g., PDSCH transmission, PDCCH transmission, DCI, SS/PBCH block, CSI-RS) via a first CORESET in a first CORESET pool. The first TRP may not send/transmit a downlink signal/channel (e.g., PDSCH, PDCCH, DCI, SS/PBCH block, CSI-RS) via a second CORESET in a second CORESET pool that is different from the first CORESET pool. The second TRP may send/transmit a downlink signal/channel (e.g., PDSCH transmission, PDCCH transmission, DCI, SS/PBCH block, CSI-RS) via a second CORESET in a second CORESET pool. The second TRP may not send/transmit a downlink signal/channel (e.g., PDSCH, PDCCH, DCI, SS/PBCH block, CSI-RS) via a first CORESET in a first CORESET pool that is different from the second CORESET pool. The plurality of CORESETs may comprise the first CORESET and the second CORESET.

The one or more configuration parameters 2615 may indicate at least two CORESET pool indicators/indexes (e.g., 0 and 1) for a higher layer parameter (e.g., CoresetPoolIndex). The one or more configuration parameters 2615 may comprise/indicate the higher layer parameter CoresetPoolIndex with (or set to) the at least two CORESET pool indexes. The at least two CORESET pool indexes may comprise a first CORESET pool index (e.g., 0, or any other first value), for one or more first CORESETs of the plurality of CORESETs. The at least two CORESET pool indexes may comprise a second CORESET pool index (e.g., 1, or any other second value), different from the first CORESET pool index, for one or more second CORESETs of the plurality of CORESETs. The one or more first CORESETs may comprise/indicate one or more third CORESETs, of the plurality of CORESETs, without a value for a higher layer parameter CoresetPoolIndex. The one or more configuration parameters 2615 may not comprise/indicate the higher layer parameter CoresetPoolIndex for the one or more third CORESETs.

The one or more configuration parameters 2615 may indicate a plurality of TCI states (e.g., provided by a higher layer parameter tci-StatesPDCCH-ToAddList). The plurality of TCI states may be for (decoding) PDSCH transmission(s) of/for the cell (or for the active downlink BWP of the cell). The one or more configuration parameters 2615 may indicate the plurality of TCI states for decoding PDSCH transmission(s) of/for the downlink BWP of the cell.

The plurality of TCI states may be for transmission of an uplink signal (e.g., UCI, PUSCH transmission, transport block, SR, CSI, HARQ-ACK) of/for/on/via an uplink resource (e.g., PUSCH resource, PUCCH resource, SRS resource) of the cell. The one or more configuration parameters 2615 may indicate the plurality of TCI states for transmission of the uplink signal of/for/on/via the uplink resource of the (active) uplink BWP of the cell.

The one or more configuration parameters 2615 may indicate a plurality of TCI state indicators/indexes (e.g., provided by a higher layer parameter TCI-StateId) for the plurality of TCI states. Each TCI state of the plurality of TCI states may be identified/indicated by a respective TCI state indicator/index of the plurality of TCI state indicators/indexes. A first TCI state of the plurality of TCI states may be identified by a first TCI state index of the plurality of TCI state indexes. A second TCI state of the plurality of TCI states may be identified by a second TCI state index of the plurality of TCI state indexes. A TCI state index may be a TCI state identifier.

The wireless device 2611 may receive one or more activation commands 2618 (e.g., MAC-CEs, DCI messages). The one or more activation commands 2618 may comprise a first activation command (e.g., MAC-CE, DCI message, TCI states activation/deactivation for wireless device-specific PDSCH MAC CE, TCI states activation/deactivation for wireless device-specific PUSCH MAC CE, etc.). The first activation command may activate (e.g., select, indicate, or update) at least one first TCI state of the plurality of TCI states. For example, the at least one first TCI state may TCI state 6, TCI state 17, TCI state 21, and TCI state 39 as shown in FIG. 26.

The first activation command may comprise one or more fields. The one or more fields may indicate/comprise at least one first TCI state index of/indicating/identifying the at least one first TCI state. The plurality of TCI state indexes may comprise the at least one first TCI state index. Each TCI state of the at least one first TCI state may be identified/indicated by a respective TCI state index of the at least one first TCI state index. The one or more fields may be set to a value (e.g., 1, or any other value) indicating activation of the at least one first TCI state. The wireless device 2611 may activate the at least one first TCI state, for example, based on the one or more fields that indicate the at least one first TCI state being set to the value. The wireless device 2611 may activate the at least one first TCI state, for example, based on the receiving the first activation command activating (or selecting, indicating, updating) the at least one first TCI state.

The wireless device 2611 may map the at least one first TCI state to one or more first TCI codepoints (e.g., 000, 001, 010, and 011 as shown in FIG. 26). The mapping the at least one first TCI state to the one or more first TCI codepoints may comprise grouping the at least one first TCI state into/in the one or more first TCI codepoints. Each TCI codepoint of the one or more first TCI codepoints may comprise/indicate a respective TCI state of the at least one first TCI state. For example, as shown in FIG. 26, TCI state 6 may be mapped to TCI codepoint 000, TCI state 17 may be mapped to TCI codepoint 001, TCI state 21 may be mapped to TCI codepoint 010, and TCI state 39 may be mapped to the TCI codepoint 011. Each TCI codepoint of the one or more first TCI codepoints may be equal to a value of a TCI field in DCI. The DCI may schedule a transport block (e.g., PDSCH transmission, PUSCH transmission). The TCI field in the DCI may indicate (or be equal to) a TCI codepoint of the one or more first TCI codepoints. The TCI codepoint (e.g., TCI codepoint 001) may comprise/indicate a TCI state (e.g., TCI state 17) of the at least one first TCI state. The wireless device 2611 may receive/transmit the transport block based on the TCI state.

The first activation command may comprise a field (e.g., CORESET pool index) indicating a first CORESET pool indicator/index (e.g., 0, or any other first value). A value of the field may be equal to the first CORESET pool index.

The at least one first TCI state may be associated with the first CORESET pool index, for example, based on the first activation command indicating the first CORESET pool index. The at least one first TCI state activated/updated/indicated by the first activation command may be associated with the first CORESET pool index, for example, based on the first activation command indicating the first CORESET pool index.

The at least one first TCI state being associated with the first CORESET pool index may comprise, for example, each TCI state of the at least one first TCI state being associated with the first CORESET pool index. For example, as shown in FIG. 26, TCI state 6, TCI state 17, TCI state 21, and TCI state 39 may be associated with the first CORESET pool index.

The wireless device 2611 may receive, via a CORESET with a CORESET pool index, DCI scheduling a downlink signal 2635 (e.g., transport block, PDSCH transmission). The one or more configuration parameters may indicate, for the CORESET, the CORESET pool index. The DCI may comprise a TCI field. The wireless device may receive the downlink signal based on a first TCI state among the at least one first TCI state. The TCI field may indicate the first TCI state. A value of the TCI field may indicate (or be equal to) a first TCI codepoint of the one or more first TCI codepoints. The first TCI codepoint may indicate/comprise the first TCI state. The CORESET pool index of the CORESET may be equal to the first CORESET pool index indicated by the first activation command.

The wireless device 2611 may receive the downlink signal 2635 based on the first TCI state among the at least one first TCI state. The wireless device 2611 may receive the downlink signal 2635 based on the first TCI state among the at least one first TCI state, for example, based on (e.g., in response to) the downlink signal 2635 being scheduled by the DCI received via/in the CORESET with the CORESET pool index that is equal to the first CORESET pool index. The wireless device 2611 may receive the downlink signal 2635 based on the first TCI state among the at least one first TCI state, for example, based on (e.g., in response to) receiving, via/in the CORESET with the CORESET pool index that is equal to the first CORESET pool index, the DCI scheduling the downlink signal 2635. The wireless device 2611 may receive the downlink signal 2635 based on the first TCI state among the at least one first TCI state, for example, based on (e.g., in response to) the at least one first TCI state being associated with the first CORESET pool index. The wireless device 2611 may receive the downlink signal 2635 based on the first TCI state among the at least one first TCI state, for example, based on (e.g., in response to) the at least one first TCI state being associated with the first CORESET pool index that is equal to the CORESET pool index of the CORESET. The first activation command activating the at least one first TCI state may indicate the first CORESET pool index. The active downlink BWP of the cell may comprise the CORESET. An active downlink BWP of a second cell different from the cell may comprise the CORESET.

The at least one first TCI state being associated with the first CORESET pool index may comprise receiving a downlink signal (e.g., a transport block, a PDSCH transmission) based on a first TCI state among the at least one first TCI state. The at least one first TCI state being associated with the first CORESET pool index may comprise receiving DCI scheduling the downlink signal 2635 via a CORESET with a CORESET pool index that is equal to the first CORESET pool index. The at least one first TCI state being associated with the first CORESET pool index may comprise receiving the downlink signal 2635 (e.g., scheduled by DCI that is received via/in a CORESET with a CORESET pool index that is equal to the first CORESET pool index), for example, based on a first TCI state among the at least one first TCI state. The DCI may indicate the first TCI state. The DCI may comprise a TCI field indicating a first TCI codepoint. The first TCI codepoint may comprise/indicate the first TCI state. A value of the TCI field may be equal to the first TCI codepoint. The one or more first TCI codepoints may comprise the first TCI codepoint. The one or more configuration parameters 2615 may indicate, for the CORESET, the CORESET pool index. The active downlink BWP of the cell may comprise the CORESET. An active downlink BWP of a second cell different from the cell may comprise the CORESET.

The one or more activation commands 2618 may comprise a second activation command (e.g., MAC-CE, DCI, TCI states activation/deactivation for wireless device-specific PDSCH MAC CE, TCI states activation/deactivation for wireless device-specific PUSCH MAC CE, etc.). The second activation command may activate (or select, indicate, update) at least one second TCI state of the plurality of TCI states. For example, as shown in FIG. 26, the at least one second TCI state may comprise TCI state 4, TCI state 13, TCI state 26, TCI state 33, and TCI state 49.

The second activation command may comprise one or more fields. The one or more fields may indicate/comprise at least one second TCI state indicator/index of/indicating/identifying the at least one second TCI state. The plurality of TCI state indexes may comprise the at least one second TCI state index. Each TCI state of the at least one second TCI state may be identified/indicated by a respective TCI state index of the at least one second TCI state index. The one or more fields may be set to a value (e.g., 1, or any other value) indicating activation of the at least one second TCI state. The wireless device 2611 may activate the at least one second TCI state, for example, based on the one or more fields that indicate the at least one second TCI state being set to the value. The wireless device 2611 may activate the at least one second TCI state, for example, based on the receiving the second activation command activating (or selecting, indicating, updating) the at least one second TCI state.

The wireless device 2611 may map the at least one second TCI state to one or more second TCI codepoints (e.g., 000, 001, 010, 011, and 100 as shown in FIG. 26). The mapping the at least one second TCI state to the one or more second TCI codepoints may comprise grouping the at least one second TCI state into/in the one or more second TCI codepoints. Each TCI codepoint of the one or more second TCI codepoints may comprise/indicate a respective TCI state of the at least one second TCI state. For example, TCI state 4 may be mapped to TCI codepoint 000, TCI state 13 may be mapped to TCI codepoint 001, TCI state 26 may be mapped to TCI codepoint 010, TCI state 33 may be mapped to the TCI codepoint 011, and TCI state 49 may be mapped to the TCI codepoint 100. Each TCI codepoint of the one or more second TCI codepoints may be equal to a value of a TCI field in DCI. The DCI may schedule a transport block (e.g., a PDSCH transmission, a PUSCH transmission). The TCI field in the DCI may indicate (or be equal to) a TCI codepoint of the one or more second TCI codepoints. The TCI codepoint (e.g., TCI codepoint 001) may comprise/indicate a TCI state (e.g., TCI state 13) of the at least one second TCI state. The wireless device 2611 may receive/transmit the transport block based on the TCI state.

The second activation command may comprise a field (e.g., CORESET pool index) indicating a second CORESET pool indicator/index (e.g., 1, or any other second value). A value of the field may be equal to the second CORESET pool indicator/index.

The at least one second TCI state may be associated with the second CORESET pool index, for example, based on the second activation command indicating the second CORESET pool index. The at least one second TCI state activated (or updated, indicated) by the second activation command may be associated with the second CORESET pool index, for example, based on the second activation command indicating the second CORESET pool index.

The at least one second TCI state being associated with the second CORESET pool index may comprise, for example, each TCI state of the at least one second TCI state being associated with the second CORESET pool index. For example, as shown in FIG. 26, TCI state 4, TCI state 13, TCI state 26, TCI state 33, and TCI state 49 may be associated with the second CORESET pool index.

The wireless device 2611 may receive, via a CORESET with a CORESET pool index, DCI scheduling a downlink signal 2635 (e.g., a transport block, a PDSCH transmission). The one or more configuration parameters 2615 may indicate, for the CORESET, the CORESET pool index. The DCI may comprise a TCI field. The wireless device 2611 may receive the downlink signal 2635 based on a second TCI state among the at least one second TCI state. The TCI field may indicate the second TCI state. A value of the TCI field may indicate (or be equal to) a second TCI codepoint of the one or more second TCI codepoints. The second TCI codepoint may indicate/comprise the second TCI state. The CORESET pool index of the CORESET may be equal to the second CORESET pool index indicated by the second activation command.

The wireless device 2611 may receive the downlink signal 2635 based on the second TCI state among the at least one second TCI state. The wireless device 2611 may receive the downlink signal 2635 based on the second TCI state among the at least one second TCI state, for example, based on (e.g., in response to) the downlink signal 2635 being scheduled by the DCI received via/in the CORESET with the CORESET pool index that is equal to the second CORESET pool index. The wireless device 2611 may receive the downlink signal 2635 based on the second TCI state among the at least one second TCI state, for example, based on (e.g., in response to) receiving, via/in the CORESET with the CORESET pool index that is equal to the second CORESET pool index, the DCI scheduling the downlink signal 2635. The wireless device 2611 may receive the downlink signal 2635 based on the second TCI state among the at least one second TCI state, for example, based on (e.g., in response to) the at least one second TCI state being associated with the second CORESET pool index. The wireless device 2611 may receive the downlink signal 2635 based on the second TCI state among the at least one second TCI state, for example, based on (e.g., in response to) the at least one second TCI state being associated with the second CORESET pool index that is equal to the CORESET pool index of the CORESET. The second activation command activating the at least one second TCI state may indicate the second CORESET pool index. The active downlink BWP of the cell may comprise the CORESET. An active downlink BWP of a second cell different from the cell may comprise the CORESET.

The at least one second TCI state being associated with the second CORESET pool index may comprise, for example, receiving a downlink signal (e.g., a transport block, a PDSCH transmission) based on a second TCI state among the at least one second TCI state. The at least one second TCI state being associated with the second CORESET pool index may comprise receiving DCI scheduling the downlink signal 2635 via a CORESET with a CORESET pool index that is equal to the second CORESET pool index. The at least one second TCI state being associated with the second CORESET pool index may comprise, for example, receiving the downlink signal 2635 (e.g., scheduled by DCI that is received via/in a CORESET with a CORESET pool index that is equal to the second CORESET pool index), for example, based on a second TCI state among the at least one second TCI state. The DCI may indicate the second TCI state. The DCI may comprise a TCI field indicating a second TCI codepoint. The second TCI codepoint may comprise/indicate the second TCI state. A value of the TCI field may be equal to the second TCI codepoint. The one or more second TCI codepoints may comprise the second TCI codepoint. The one or more configuration parameters 2615 may indicate, for the CORESET, the CORESET pool index. The active downlink BWP of the cell may comprise the CORESET. An active downlink BWP of a second cell different from the cell may comprise the CORESET.

The wireless device 2611 may receive a downlink signal (e.g., a transport block, a PDSCH transmission, CSI-RS)

based on a TCI state (or an antenna port quasi co-location property/assumption). The TCI state may indicate a reference signal (e.g., CSI-RS, SS/PBCH block, DM-RS, TRS, etc.). The one or more configuration parameters 2615 may indicate, the reference signal, for the TCI state. The TCI state may comprise a reference signal indicator/index (e.g., provided by a higher layer parameter referenceSignal, ssb-index, csi-RS-Index, NZP-CSI-RS-ResourceId) identifying (or indicating or of) the reference signal. The one or more configuration parameters 2615 may indicate the reference signal indicator/index for the reference signal. The TCI state may indicate a quasi co-location type (e.g., QCL TypeA, QCL TypeB, QCL TypeC, QCL TypeD, etc.). The one or more configuration parameters 2615 may indicate, the quasi co-location type, for the TCI state.

The receiving the downlink signal 2635 based on the TCI state may comprise at least one DM-RS antenna port of the downlink signal 2635 being quasi co-located (QCL-ed) with the reference signal indicated by (or in) the TCI state. The at least one DM-RS antenna port of the downlink signal 2635 may be QCL-ed with the reference signal with respect to at least one of: Doppler shift, Doppler spread, average delay, delay spread, and spatial receiving (RX) parameters. The at least one DM-RS antenna port of the downlink signal 2635 may be QCL-ed with the reference signal with respect to at least one of: Doppler shift, Doppler spread, average delay, delay spread, spatial RX parameters when applicable. The at least one DM-RS antenna port of the downlink signal 2635 may be QCL-ed with the reference signal with respect to Doppler shift, Doppler spread, average delay, delay spread, and spatial RX parameters when applicable. The at least one DM-RS antenna port of the downlink signal 2635 may be QCL-ed with the reference signal with respect to the quasi co-location type indicated by (or in) the TCI state. The least one DM-RS antenna port of the downlink signal 2635 being QCL-ed with the reference signal indicated by (or in) the TCI state may comprise that the wireless device 2611 may use a same beam, for receiving the downlink signal 2635, as used for transmitting or receiving the reference signal.

The receiving the downlink signal 2635 based on the TCI state may comprise applying the TCI state (or the antenna port quasi co-location property/assumption) for a reception (or to receive) the downlink signal 2635. The wireless device 2611 may measure the downlink signal 2635 (e.g., aperiodic CSI-RS) based on the TCI state. The wireless device 2611 may measure/determine a radio link quality (e.g., L1-RSRP, L-RSRP, SINR, SNR, BLER) of the downlink signal 2635 based on the TCI state. The wireless device 2611 may measure a radio link quality (e.g., L1-RSRP, L-RSRP, SINR, SNR, BLER) of the reference signal to determine the radio link quality of the downlink signal 2635. The wireless device 2611 may send/transmit an uplink report indicating the radio link quality of the downlink signal 2635. The uplink report may be a CSI report. The uplink report may be an aperiodic CSI report.

The at least one downlink control signal/channel (or the downlink control signal/channel) (e.g., DCI 2630-1 and/or 2630-2) may schedule/trigger reception of a downlink signal (or schedule a downlink signal). Each downlink control signal/channel of the at least one downlink control signal/channel may schedule/trigger reception of the downlink signal (e.g., downlink signal 2635). The at least one downlink control signal/channel scheduling/triggering the reception of the downlink signal 2635 may comprise the downlink control signal/channel scheduling/triggering the reception of the downlink signal 2635.

The downlink signal 2635 may be a transport block. The downlink signal 2635 may be via a PDSCH. The downlink signal 2635 may be a PDSCH transmission. The downlink signal may be a CSI-RS. The CSI-RS may be at least one of an aperiodic CSI-RS, a semi-persistent CSI-RS, and/or a periodic CSI-RS.

The at least one downlink control signal/channel (or the downlink control signal/channel) may comprise a TCI field (e.g., TCI field in DCI 2630-1 and DCI 2630-2 as shown in FIG. 26). Each downlink control signal/channel of the at least one downlink control signal/channel may comprise the TCI field. The at least one downlink control signal/channel comprising the TCI field may comprise the downlink control signal/channel comprising the TCI field.

The wireless device 2611 may receive the downlink signal 2635 based on a TCI state. At least one TCI state may comprise the TCI state. The wireless device 2611 may receive the downlink signal 2635 based on the TCI state of/among at least one TCI state. The plurality of TCI states may comprise the at least one TCI state. The at least one TCI state may be associated with a CORESET pool index (e.g., 0, 1, or any other value). The at least one TCI state being associated with the CORESET pool index may comprise, for example, each TCI state of the at least one TCI state being associated with the CORESET pool index. The one or more CORESET pool indexes may comprise the CORESET pool index. The wireless device 2611 may receive the downlink signal 2635 based on the TCI state of/among the at least one TCI state that is associated with the CORESET pool index. The wireless device 2611 may receive an activation command (e.g., MAC-CE, DCI, TCI states activation/deactivation for wireless device-specific PDSCH MAC CE) activating (or selecting, indicating, updating) the at least one TCI state. The activation command may comprise a field (e.g., CORESET pool index) indicating the CORESET pool index. The at least one TCI state may be associated with the CORESET pool index, for example, based on the activation command (e.g., that activates (or updates, indicates) the at least one TCI state) indicating the CORESET pool index. The wireless device 2611 may map the at least one TCI state to one or more TCI codepoints, for example, based on the receiving the activation command. The TCI field in the at least one downlink control signal/channel (or the downlink control signal/channel) may indicate the TCI state. The TCI field in the at least one downlink control signal/channel (or the downlink control signal/channel) may indicate a TCI codepoint of the one or more TCI codepoints. A value of the TCI field may be equal to the TCI codepoint. The TCI codepoint may indicate/comprise the TCI state.

The wireless device 2611 may receive the downlink signal 2635 based on the TCI state of/among the at least one TCI state that is associated with the CORESET pool index. The wireless device 2611 may receive the downlink signal 2635 based on the TCI state of/among the at least one TCI state that is associated with the CORESET pool index, for example, based on (e.g., in response to) the first CORESET pool index of the first CORESET and the second CORESET pool index of the second CORESET being different. The wireless device 2611 may determine, for reception of the downlink signal 2635, the TCI state associated with the CORESET pool index, for example, based on the first CORESET pool index of the first CORESET and the second CORESET pool index of the second CORESET being different. The wireless device 2611 may determine, for reception of the downlink signal 2635, the CORESET pool index, for example, based on the first CORESET pool index and the second CORESET pool index being different. The wireless device 2611 may receive the downlink signal 2635 based on the CORESET pool index. The receiving the downlink signal 2635 based on the CORESET pool index may comprise receiving the downlink signal based on the TCI state associated with the CORESET pool index.

The at least one TCI state may be one of the at least one first TCI state and the at least one second TCI state. For example, the at least one TCI state may be the at least one first TCI state, or may be the at least one second TCI state. The TCI state may be one of: a first TCI state of/among the at least one first TCI state and a second TCI state of/among the at least one second TCI state. The CORESET pool index may be one of: the first CORESET pool index and the second CORESET pool index. The activation command may be one of: the first activation command and the second activation command. The one or more TCI codepoints may be one of: the one or more first TCI codepoints and the one or more second TCI codepoints.

The at least one TCI state may be among the at least one first TCI state and the at least one second TCI state. The TCI state may be among a first TCI state of/among the at least one first TCI state and a second TCI state of/among the at least one second TCI state. The CORESET pool index may be among the first CORESET pool index and the second CORESET pool index. The activation command may be among the first activation command and the second activation command. The one or more TCI codepoints may be among the one or more first TCI codepoints and the one or more second TCI codepoints.

The CORESET pool index may be (equal to) the first CORESET pool index (e.g., 0, or any other first value). The at least one TCI state (associated with the CORESET pool index) may be the at least one first TCI state (associated with the first CORESET pool index), for example, based on the CORESET pool index being (equal to) the first CORESET pool index. The activation command activating/updating/indicating the at least one TCI state may be the first activation command activating/updating/indicating the at least one first TCI state, for example, based on the CORESET pool index being (equal to) the first CORESET pool index. The one or more TCI codepoints (mapped to the at least one TCI state) may be the one or more first TCI codepoints (mapped to the at least one first TCI state), for example, based on the CORESET pool index being (equal to) the first CORESET pool index. The TCI state used to receive the downlink signal 2635 may be a first TCI state of/among the at least one first TCI state, for example, based on the CORESET pool index being (equal to) the first CORESET pool index. The TCI codepoint indicated by the TCI field in the at least one downlink control signal/channel (or the downlink control signal/channel) may be a first TCI codepoint of/among the one or more first TCI codepoints, for example, based on the CORESET pool index being (equal to) the first CORESET pool index. The at least one downlink control signal/channel (or the downlink control signal/channel) may comprise a TCI field indicating the first TCI codepoint. The first TCI codepoint may comprise/indicate the first TCI state. For example, the first TCI state may be TCI state 6 if the first TCI codepoint is 000; the first TCI state may be TCI state 17 if the first TCI codepoint is 001; the first TCI state is TCI state 21 if the first TCI codepoint is 010; and the first TCI state may be TCI state 39 if the first TCI codepoint is 011. The wireless device 2611 may receive the downlink signal 2635 based on the first TCI state of/among the at least one first TCI state that is associated with the first CORESET pool index. The wireless device 2611 may receive the downlink signal 2635 based on the first TCI state (e.g., of/among the at least one first TCI state that is associated with the first CORESET pool index), for example, based on (e.g., in response to) the first CORESET pool index of the first CORESET and the second CORESET pool index of the second CORESET being different. The wireless device 2611 may or may not receive, via the first CORESET, the downlink control signal/channel scheduling the downlink signal 2635.

The CORESET pool index may be (equal to) the second CORESET pool index (e.g., 1, or any other second value). The at least one TCI state (associated with the CORESET pool index) may be the at least one second TCI state (associated with the second CORESET pool index), for example, based on the CORESET pool index being (equal to) the second CORESET pool index. The activation command activating/updating/indicating the at least one TCI state may be the second activation command activating/updating/indicating the at least one second TCI state, for example, based on the CORESET pool index being (equal to) the second CORESET pool index. The one or more TCI codepoints (mapped to the at least one TCI state) may be the one or more second TCI codepoints (mapped to the at least one second TCI state), for example, based on the CORESET pool index being (equal to) the second CORESET pool index. The TCI state used to receive the downlink signal 2635 may be a second TCI state of/among the at least one second TCI state, for example, based on the CORESET pool index being (equal to) the second CORESET pool index. The TCI codepoint indicated by the TCI field in the at least one downlink control signal/channel (or the downlink control signal/channel) may be a second TCI codepoint of/among the one or more second TCI codepoints, for example, based on the CORESET pool index being (equal to) the second CORESET pool index. The at least one downlink control signal/channel (or the downlink control signal/channel) may comprise a TCI field indicating the second TCI codepoint. The second TCI codepoint may comprise/indicate the second TCI state. For example, the second TCI state may be TCI state 4 if the second TCI codepoint is 000; the second TCI state may be TCI state 13 if the second TCI codepoint is 001; the second TCI state may be TCI state 26 if the second TCI codepoint is 010; the second TCI state is TCI state 33 if the second TCI codepoint is 011; and the second TCI state may be TCI state 49 if the second TCI codepoint is 100. The wireless device 2611 may receive the downlink signal 2635 based on the second TCI state of/among the at least one second TCI state that is associated with the second CORESET pool index. The wireless device 2611 may receive the downlink signal 2635 based on the second TCI state of/among the at least one second TCI state that is associated with the second CORESET pool index, for example, based on (e.g., in response to) the first CORESET pool index of the first CORESET and the second CORESET pool index of the second CORESET being different. The wireless device 2611 may or may not receive, via the second CORESET, the downlink control signal/channel scheduling the downlink signal 2635.

The CORESET pool index may be equal to a value. The value may be a default value. The value may be fixed/preconfigured/predefined/default. The value may be equal to 0 (or any other value). The one or more configuration parameters 2615 may, for example, indicate the value. The CORESET pool index may be (equal to) the first CORESET pool index (e.g., CoresetPoolIndex=0), for example, when the value is equal to a first value (e.g., 0). The CORESET pool index may be (equal to) the second CORESET pool index (e.g., CoresetPoolIndex=1), for example, if the value is equal to a second value (e.g., 1). The CORESET pool index may be (equal to) 0 (e.g., CoresetPoolIndex=0), for example, if the value is equal to 0. The CORESET pool index may be (equal to) 1 (e.g., CoresetPoolIndex=1), for example, if the value is equal to 1.

The CORESET pool index may be equal to a default CORESET pool index (e.g., 0, or any other value). The default CORESET pool index may be fixed (e.g., preconfigured, predefined, default). The default CORESET pool index may be equal to 0 (or any other value). The one or more configuration parameters 2615 may indicate the default CORESET pool index.

The wireless device 2611 may receive the downlink signal 2635 based on the TCI state of/among the at least one TCI state that is associated with the CORESET pool index equal to the value. The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is equal to the value. The wireless device 2611 may receive the downlink signal 2635 based on the CORESET pool index, for example, based on the CORESET pool index being equal to the value.

The wireless device 2611 may determine, for reception of the downlink signal 2635, the TCI state associated with the CORESET pool index that is equal to the value. The wireless device 2611 may determine, for reception of the downlink signal 2635, the TCI state associated with the CORESET pool index, for example, based on the TCI state being associated with the CORESET pool index that is equal to the value. The wireless device 2611 may determine, for reception of the downlink signal 2635, the CORESET pool index, for example, based on the CORESET pool index being equal to the value.

The wireless device 2611 may receive the downlink signal 2635 based on the TCI state of/among the at least one TCI state that is associated with the CORESET pool index equal to the default CORESET pool index. The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is equal to the default CORESET pool index. The wireless device 2611 may receive the downlink signal 2635 based on the CORESET pool index, for example, based on the CORESET pool index being equal to the default CORESET pool index.

The wireless device 2611 may determine, for reception of the downlink signal 2635, the TCI state associated with the CORESET pool index that is equal to the default CORESET pool index. The wireless device 2611 may determine, for reception of the downlink signal, the TCI state associated with the CORESET pool index, for example, based on the TCI state being associated with the CORESET pool index that is equal to the default CORESET pool index. The wireless device 2611 may determine, for reception of the downlink signal 2635, the CORESET pool index, for example, based on the CORESET pool index being equal to the default CORESET pool index.

The wireless device 2611 may determine/select a CORESET pool index among the one or more CORESET pool indexes. The wireless device 2611 may determine/select the CORESET pool index, for example, among the one or more CORESET pool indexes of the plurality of CORESETs.

The wireless device 2611 may determine/select the CORESET pool index among the one or more CORESET pool indexes, for example, based on the one or more configuration parameters 2615 indicating the control channel repetition. The wireless device 2611 may determine/select the CORESET pool index among the one or more CORESET pool indexes, for example, based on the repetition scheme being the time domain repetition scheme (e.g., TDM). The wireless device 2611 may determine/select the CORESET pool index among the one or more CORESET pool indexes, for example, based on the repetition scheme being the frequency domain repetition scheme (e.g., FDM). The wireless device 2611 may determine/select the CORESET pool index among the one or more CORESET pool indexes, for example, based on the first CORESET pool index and the second CORESET pool index being different. The one or more CORESET pool indexes may comprise the first CORESET pool index and the second CORESET pool index.

The wireless device may determine/select the CORESET pool index that is equal to a value. The value may be equal to 0, 1, or any other preconfigured/predefined/preset/default value. The one or more configuration parameters 2415 may indicate the value. The first CORESET pool index of the first CORESET may be equal to the value (e.g., 0). The second CORESET pool index of the second CORESET may be equal to a second value (e.g., 1) that is different from the value (e.g., 0). The wireless device 2411 may determine/select the first CORESET pool index as the (determined/selected) CORESET pool index based on the first CORESET pool index of the first CORESET being equal to the value. The first CORESET pool index of the first CORESET may be equal to a first value (e.g., 0) that is different from the value (e.g., 1). The second CORESET pool index of the second CORESET may be equal to the value (e.g., 1). The wireless device 2411 may determine/select the second CORESET pool index as the (determined/selected) CORESET pool index based on the second CORESET pool index of the second CORESET being equal to the value.

The wireless device 2411 may determine/select the CORESET pool index that is lowest/highest among the one or more CORESET pool indexes. The first CORESET pool index may be lower/higher than the second CORESET pool index. The (determined/selected) CORESET pool index may be the first CORESET pool index, for example, based on the first CORESET pool index being lower/higher than the second CORESET pool index. The second CORESET pool index may be lower/higher than the first CORESET pool index. The (determined/selected) CORESET pool index may be the second CORESET pool index, for example, based on the second CORESET pool index being lower/higher than the first CORESET pool index. The CORESET pool index may be (equal to) the first CORESET pool index (e.g., CoresetPoolIndex=0), for example, if the (determined/selected) CORESET pool index is equal to a first value (e.g., 0). The CORESET pool index of the CORESET may be (equal to) the second CORESET pool index (e.g., CoresetPoolIndex=1), for example, if the (determined/selected) CORESET pool index is equal to a second value (e.g., 1). The CORESET pool index may be (equal to) 0, for example, if the (determined/selected) CORESET pool index is equal to zero. The CORESET pool index may be (equal to) 1, for example, if the (determined/selected) CORESET pool index is equal to one.

The wireless device 2611 may receive the downlink signal 2635 based on the TCI state of/among the at least one TCI state that is associated with the CORESET pool index equal to the (determined/selected) CORESET pool index. The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is equal to the (determined/selected) CORESET pool index. The wireless device 2611 may receive the downlink signal 2635 based on the CORESET pool index, for example, based on the CORESET pool index being equal to the (determined/selected) CORESET pool index.

The wireless device 2611 may determine, for reception of the downlink signal 2635, the TCI state associated with the CORESET pool index that is equal to the (determined/selected) CORESET pool index. The wireless device 2611 may determine, for reception of the downlink signal 2635, the TCI state associated with the CORESET pool index, for example, based on the TCI state being associated with the CORESET pool index that is equal to the (determined/selected) CORESET pool index. The wireless device 2611 may determine, for reception of the downlink signal 2635, the CORESET pool index, for example, based on the CORESET pool index being equal to the (determined/selected) CORESET pool index.

The wireless device 2611 may determine a reference/default CORESET among the plurality of CORESETs. The one or more configuration parameters 2615 may indicate a reference CORESET pool index (e.g., 0, 1) for the reference/default CORESET. The one or more CORESET pool indexes of the plurality of CORESETs may comprise the reference CORESET pool index. The CORESET pool index may be (equal to) the reference CORESET pool index of the reference/default CORESET.

The wireless device 2611 may receive the downlink signal 2635 based on the TCI state of/among the at least one TCI state that is associated with the CORESET pool index equal to (or same as) the reference CORESET pool index. The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is equal to (or same as) the reference CORESET pool index. The wireless device 2611 may receive the downlink signal 2635 based on the CORESET pool index, for example, based on the CORESET pool index being equal to (or same as) the reference CORESET pool index.

The wireless device 2611 may determine, for reception of the downlink signal 2635, the TCI state associated with the CORESET pool index that is equal to (or same as) the reference CORESET pool index. The wireless device 2611 may determine, for reception of the downlink signal 2635, the TCI state associated with the CORESET pool index, for example, based on the TCI state being associated with the CORESET pool index that is equal to (or same as) the reference CORESET pool index. The wireless device 2611 may determine, for reception of the downlink signal 2635, the CORESET pool index, for example, based on the CORESET pool index being equal to (or same as) the reference CORESET pool index.

The wireless device 2611 may determine/select the reference/default CORESET among the plurality of CORESETs. The wireless device 2611 may determine the reference/default CORESET, for example, based on the receiving/detecting the at least one downlink control signal/channel. The wireless device 2611 may determine the reference/default CORESET, for example, based on the receiving/detecting the downlink control signal/channel. The wireless device 2611 may determine the reference/default CORESET, for example, based on the one or more configuration parameters 2615 indicating the control channel repetition. The wireless device 2611 may determine the reference/default CORESET, for example, based on the one or more configuration parameters 2615 indicating the control channel repetition. The wireless device 2611 may determine the reference/default CORESET, for example, based on the repetition scheme being the time domain repetition scheme (e.g., TDM). The wireless device 2611 may determine the reference/default CORESET, for example, based on the repetition scheme being the frequency domain repetition scheme (e.g., FDM). The wireless device 2611 may determine the reference/default CORESET, for example, based on the first CORESET pool index and the second CORESET pool index being different.

The wireless device 2611 may receive/detect the at least one downlink control signal/channel during/in/via the at least one CORESET of the plurality CORESETs. The at least one CORESET may or may not comprise the reference/default CORESET. The wireless device 2611 may or may not receive the downlink control signal/channel in/via the reference/default CORESET. The at least one CORESET may be the first CORESET (e.g., CORESET 2620-1). The reference/default CORESET may be, for example, the second CORESET (e.g., CORESET 2620-2). For example, the at least one CORESET may be the second CORESET. The reference/default CORESET may be, for example, the first CORESET (e.g., CORESET 2620-1).

The determining the reference/default CORESET, among the plurality of CORESETs, may comprise determining a reference downlink control signal/channel among the plurality of DCI messages/PDCCH transmissions. The determining the reference downlink control signal/channel among the plurality of DCI messages/PDCCH transmissions may be based on the plurality of DCI messages/PDCCH transmissions being associated with the plurality of CORESETs. 26 The first downlink control signal/channel (e.g., DCI 2620-1) may be the reference downlink control signal/channel, for example, if the first CORESET (e.g., CORESET 2620-1) is the reference/default CORESET. The second downlink control signal/channel (e.g., DCI 2620-2) may be the reference downlink control signal/channel, for example, if the second CORESET (e.g., CORESET 2620-2) is the reference/default CORESET.

The wireless device 2611 may determine the reference/default CORESET, for example, based on the quantity/number of repetitions and a starting downlink control signal/channel transmission occasion (or a starting time slot) of the plurality of downlink control signal/channel transmission occasions. The one or more configuration parameters 2615 may indicate the starting downlink control signal/channel transmission occasion. The at least one downlink control signal/channel may indicate the starting downlink control signal/channel transmission occasion. The reference/default CORESET may be the second CORESET comprising the second downlink control signal/channel transmission occasion, for example, if the starting downlink control signal/channel transmission occasion is the first downlink control signal/channel transmission occasion and the quantity of repetitions is equal to two. The reference/default CORESET may be the first CORESET comprising a third downlink control signal/channel transmission occasion, of the plurality of downlink control signal/channel transmission occasions, for example, if the starting downlink control signal/channel transmission occasion is the first downlink control signal/channel transmission occasion and the quantity of repetitions is equal to three. The reference/default CORE- SET may be the first CORESET comprising the third downlink control signal/channel transmission occasion, for example, if the starting downlink control signal/channel transmission occasion is the second downlink control signal/channel transmission occasion and the quantity of repetitions is equal to two.

The reference/default CORESET may be associated with (or may comprise) a last (or latest or ending) downlink control signal/channel transmission occasion of the plurality of downlink control signal/channel transmission occasions. The wireless device 2611 may monitor, for the downlink control signal/channel, the reference/default CORESET in the last (or latest or ending) downlink control signal/channel transmission occasion. The wireless device 2611 may determine the reference/default CORESET, for example, based on the reference/default CORESET being associated with (or comprising) the last (or latest or ending) downlink control signal/channel transmission occasion. The wireless device 2611 may determine a CORESET that is associated with (or comprising) the last (or latest or ending) downlink control signal/channel transmission occasion as being the reference/default CORESET.

The wireless device 2611 may monitor, for the downlink control signal/channel, the first CORESET in the first downlink control signal/channel transmission occasion at/during/in a first time unit (e.g., first time slot, first time symbol, first subframe, etc.). The wireless device 2611 may monitor, for the downlink control signal/channel, the second CORESET in the second downlink control signal/channel transmission occasion at/during/in a second time unit (e.g., second time slot, second time symbol, second subframe, etc.).

The last downlink control signal/channel transmission occasion may have the latest starting time among starting times of the plurality of downlink control signal/channel transmission occasions. The second time unit may start later in time than the first time unit. A first/starting symbol of the second time unit may occur after (or later) in time than a first/starting symbol of the second time unit. The second CORESET may be the reference/default CORESET based on the second time unit starting later in time than the first time unit.

The last downlink control signal/channel transmission occasion may have the latest ending time among ending times of the plurality of downlink control signal/channel transmission occasions. The second time unit may end later in time than the first time unit. A last symbol of the second time unit may occur after (or later) in time than a last symbol of the first time unit. The second CORESET may be the reference/default CORESET based on the second time unit ending later in time than the first time unit.

The last downlink control signal/channel transmission occasion may be associated with a last downlink control signal/channel among the plurality of DCI messages/PDCCH transmissions. The base station 2610 may send/transmit the last downlink control signal/channel in/via the last downlink control signal/channel transmission occasion. The wireless device 2611 may monitor, for the last downlink control signal/channel, the reference/default CORESET in the last downlink control signal/channel transmission occasion. The last downlink control signal/channel may be the reference downlink control signal/channel. The base station 2610 may send/transmit a last repetition of the downlink control signal/channel in the last downlink control signal/channel transmission occasion. The wireless device 2611 may monitor, for the last repetition of the downlink control signal/channel, the last downlink control signal/channel transmission occasion. The last repetition of the downlink control signal/channel may be the last downlink control signal/channel.

With reference to FIG. 26, the last downlink control signal/channel transmission occasion may be the second downlink control signal/channel transmission occasion (e.g., PDCCH transmission/repetition/monitoring occasion 2632-2). The reference/default CORESET may be the second CORESET (e.g., CORESET 2620-2). The reference/default CORESET may be the second CORESET, for example, based on the second CORESET being associated with the last downlink control signal/channel transmission occasion.

The reference/default CORESET may be associated with (or may comprise) a last/ending/latest symbol. The last/ending/latest symbol of the reference/default CORESET may occur/be latest among last/ending/latest symbols of the plurality of CORESETs. The wireless device 2611 may determine the reference/default CORESET, for example, based on the reference/default CORESET being associated with (or comprising) the last/ending/latest symbol. The wireless device 2611 may determine a CORESET that is associated with (or comprising) the last/ending/latest symbol as being the reference/default CORESET.

A last/ending/latest symbol of the second CORESET may occur later in time (or after) than a last/ending/latest symbol of the first CORESET. The second CORESET may be determined to be the reference/default CORESET, for example, based on the last/ending/latest symbol of the second CORESET occurring later in time (or after) than the last/ending/latest symbol of the first CORESET.

The reference/default CORESET may be associated with (or comprise) the earliest (or a first or a starting) downlink control signal/channel transmission occasion among the plurality of downlink control signal/channel transmission occasions. The wireless device 2611 may monitor, for the downlink control signal/channel, the reference/default CORESET in the earliest (or the first or the starting) downlink control signal/channel transmission occasion. The wireless device 2611 may determine the reference/default CORESET, for example, based on the reference/default CORESET being associated with (or comprising) the earliest (or the first or the starting) downlink control signal/channel transmission occasion. The wireless device 2611 may determine a CORESET that is associated with (or comprising) the earliest (or the first or the starting) downlink control signal/channel transmission occasion as being the reference/default CORESET.

The earliest (or the first or the starting) downlink control signal/channel transmission occasion may have the earliest starting time among starting times of the plurality of downlink control signal/channel transmission occasions. The first time unit may start earlier in time than the second time unit. A first/starting symbol of the first time unit may occur before (or earlier) in time than a first/starting symbol of the second time unit. The first CORESET may be the reference/default CORESET based on the first time unit starting earlier than the second time unit.

The earliest (or the first or the starting) downlink control signal/channel transmission occasion may have the earliest ending time among ending times of the plurality of downlink control signal/channel transmission occasions. The first time unit may end earlier in time than the second time unit. A last symbol of the first time unit may occur before (or earlier) in time than a last symbol of the second time unit. The first CORESET may be the reference/default CORESET based on the first time unit ending earlier than the second time unit.

The earliest (or the first or the starting) downlink control signal/channel transmission occasion may be associated with a first/starting downlink control signal/channel among the plurality of DCI messages/PDCCH transmissions. The base station 2610 may send/transmit the first/starting downlink control signal/channel in/via the earliest downlink control signal/channel transmission occasion. The wireless device 2611 may monitor, for the first/starting downlink control signal/channel, in/via the earliest downlink control signal/channel transmission occasion. The first/starting downlink control signal/channel may be the reference downlink control signal/channel. The base station 2610 may send/transmit a first/starting repetition of the downlink control signal/channel in the earliest downlink control signal/channel transmission occasion. The wireless device 2611 may monitor, for the first/starting repetition of the downlink control signal/channel, in the earliest downlink control signal/channel transmission occasion. The first/starting repetition of the downlink control signal/channel may be the first/starting downlink control signal/channel.

With reference to FIG. 26, the earliest (or the first or the starting) downlink control signal/channel transmission occasion may be the first downlink control signal/channel transmission occasion (e.g., PDCCH transmission/repetition/monitoring occasion 2632-1). The reference/default CORESET may be the first CORESET (e.g., CORESET 2620-1). The reference/default CORESET may be the first CORESET, for example, based on the first CORESET being associated with earliest (or the first or the starting) downlink control signal/channel transmission occasion.

The reference/default CORESET may be associated with (or may comprise) a first/starting/earliest symbol. The first/starting/earliest symbol of the reference/default CORESET may occur/be earliest among first/starting/earliest symbols of the plurality of CORESETs. The wireless device 2611 may determine the reference/default CORESET, for example, based on the reference/default CORESET being associated with (or comprising) the first/starting/earliest symbol.

A first/starting/earliest of the first CORESET may occur earlier in time (or before) than a first/starting/earliest symbol of the second CORESET. The first CORESET may be the reference/default CORESET, for example, based on the first/starting/earliest symbol of the first CORESET occurring earlier in time (or before) than the first/starting/earliest symbol of the second CORESET.

The reference/default CORESET may be identified/indicated by a CORESET index of the plurality of CORESET indexes. The CORESET index may be lowest (or highest) among the plurality of CORESET indexes. The reference/default CORESET may be identified/indicated by a CORESET index that is lowest (or highest) among the plurality of CORESET indexes. The wireless device 2611 may determine/select the reference/default CORESET with a CORESET index that is lowest (or highest) among the plurality of CORESET indexes of the plurality of CORESETs. The wireless device 2611 may determine the reference/default CORESET, for example, based on the reference/default CORESET being identified/indicated by the CORESET index that is lowest (or highest) among the plurality of CORESET indexes of the plurality of CORESETs.

The wireless device 2611 may determine the reference/default CORESET, for example, based on the reference/default CORESET being associated with a reference downlink control signal/channel transmission occasion of the plurality of downlink control signal/channel transmission occasions. The wireless device 2611 may monitor, for the downlink control signal/channel, the reference/default CORESET in the reference downlink control signal/channel transmission occasion (e.g., last/ending/latest or first/starting/earliest downlink control signal/channel transmission occasion of the plurality of downlink control signal/channel transmission occasions).

The reference downlink control signal/channel transmission occasion may be associated with a reference downlink control signal/channel among the plurality of DCI messages/PDCCH transmissions. The base station 2610 may send/transmit the reference downlink control signal/channel in/via the reference downlink control signal/channel transmission occasion. The wireless device 2611 may monitor, for the reference downlink control signal/channel, the reference downlink control signal/channel transmission occasion. The wireless device 2611 may monitor, for the reference downlink control signal/channel, the CORESET in the reference downlink control signal/channel transmission occasion.

The reference/default CORESET may be associated with a search space set of the plurality of search space sets. The one or more configuration parameters 2615 may indicate the reference/default CORESET for the search space set. The wireless device 2611 may determine the reference/default CORESET, for example, based on the reference/default CORESET being associated with the search space set.

The search space set may be identified/indicated by a search space set indicator/index of the search space set indicators/indexes. The search space set index may be lowest (or highest) among the search space set indexes of the plurality of search space sets. The search space set may be identified/indicated by a search space set index that is lowest (or highest) among the search space set indexes. The first search space set index of the first search space set of the first CORESET may be lower (or higher) than the second search space set index of the second search space set of the second CORESET. The first CORESET may be the reference/default CORESET, for example, based on the first search space set index of the first search space set of the first CORESET being lower (or higher) than the second search space set index of the second search space set of the second CORESET. The second CORESET may be the reference/default CORESET, for example, based on the second search space set index of the second search space set of the second CORESET being lower (or higher) than the first search space set index of the first search space set of the first CORESET.

The reference/default CORESET may be associated with a PDCCH candidate of the plurality of PDCCH candidates. The one or more configuration parameters 2615 may indicate the reference/default CORESET for the PDCCH candidate. The wireless device 2611 may determine the reference/default CORESET, for example, based on the reference/default CORESET being associated with the PDCCH candidate.

The PDCCH candidate may be identified/indicated by a PDCCH candidate indicator/index of PDCCH candidate indicators/indexes of the PDCCH candidates. The one or more configuration parameters 2615 may indicate, for the PDCCH candidates, the PDCCH candidate indexes. In an example, the PDCCH candidate index may be lowest (or highest) among the PDCCH candidate indexes of the PDCCH candidates. The PDCCH candidate may be identified/indicated by a PDCCH candidate index that is lowest (or highest) among the PDCCH candidate indexes. The first PDCCH candidate index of the first PDCCH candidate associated with the first CORESET may be lower (or higher)

than the second PDCCH candidate index of the second PDCCH candidate associated with the second CORESET. The first CORESET may be the reference/default CORESET, for example, based on the first PDCCH candidate index of the first PDCCH candidate being lower (or higher) than the second PDCCH candidate index of the second PDCCH candidate. The second CORESET may be the reference/default CORESET, for example, based on the second PDCCH candidate index of the second PDCCH candidate being lower (or higher) than the first PDCCH candidate index of the first PDCCH candidate of the first CORESET.

A CCE starting indicator/index of the PDCCH candidate may be lowest (or highest) among CCE starting indicators/indexes of the PDCCH candidates. The one or more configuration parameters 2615 may indicate, for the PDCCH candidates, the CCE starting indexes. The first CCE starting index of the first PDCCH candidate associated with the first CORESET may be lower (or higher) than the second CCE starting index of the second PDCCH candidate associated with the second CORESET. The first CORESET may be the reference/default CORESET, for example, based on the first CCE starting index of the first PDCCH candidate being lower (or higher) than the second CCE starting index of the second PDCCH candidate. The second CORESET may be the reference/default CORESET, for example, based on the second CCE starting index of the second PDCCH candidate being lower (or higher) than the first CCE starting index of the first PDCCH candidate of the first CORESET.

The reference/default CORESET may be associated with (or may comprise) a starting PRB. The starting PRB of the reference/default CORESET may occur/be lowest (or highest) in frequency among starting PRBs of the plurality of CORESETs. The wireless device 2611 may determine the reference/default CORESET, for example, based on the starting PRB of the reference/default CORESET occurring/being lowest (or highest) among the starting PRBs.

A starting PRB of the second CORESET may occur/be lower (or higher) in frequency than a starting PRB of the first CORESET. The second CORESET may be the reference/default CORESET, for example, based on the starting PRB of the second CORESET occurring/being lower (or higher) than the starting PRB of the first CORESET. A starting PRB of the first CORESET may occur/be lower (or higher) in frequency than a starting PRB of the second CORESET. The first CORESET may be the reference/default CORESET based on the starting PRB of the first CORESET occurring/being lower (or higher) than the starting PRB of the second CORESET.

The reference/default CORESET may be associated with (or may comprise) an ending PRB. The ending PRB of the reference/default CORESET may occur/be lowest (or highest) in frequency among ending PRBs of the plurality of CORESETs. The wireless device 2611 may determine the reference/default CORESET, for example, based on the ending PRB of the reference/default CORESET occurring/being lowest (or highest) among the ending PRBs.

An ending PRB of the second CORESET may occur/be lower (or higher) in frequency than an ending PRB of the first CORESET. The second CORESET may be the reference/default CORESET, for example, based on the ending PRB of the second CORESET occurring/being lower (or higher) than the ending PRB of the first CORESET. An ending PRB of the first CORESET may occur/be lower (or higher) in frequency than an ending PRB of the second CORESET. The first CORESET may be the reference/default CORESET, for example, based on the ending PRB of the first CORESET occurring/being lower (or higher) than the ending PRB of the second CORESET.

The wireless device 2611 may determine the reference/default CORESET based on receiving, via the at least one CORESET of the plurality of CORESETs, the at least one downlink control signal/channel (or the downlink control signal/channel). The wireless device 2611 may determine the reference/default CORESET based on the repetition scheme being a first repetition scheme. The first repetition scheme, for example, may be a frequency domain repetition scheme (e.g., FDM), a time domain repetition scheme (e.g., TDM), or a spatial/code domain repetition domain repetition scheme (e.g., SFN, SDM). The wireless device 2611 may determine the reference/default CORESET based on the repetition scheme not being a second repetition scheme. The second repetition scheme, for example, may be a spatial/code domain repetition domain repetition scheme (e.g., SFN, SDM) a time domain repetition scheme (e.g., TDM), or a frequency domain repetition scheme (e.g., FDM).

The downlink control signal/channel may be correspond to a DCI format. The DCI format may be a DCI format 1-1, a DCI format 0-1, or a DCI format 1-2. The DCI format may be a DCI format 1-x, where x=0, 1, 2, 3, . . . . The DCI format may be a DCI format 0-x, where x=0, 1, 2, 3, . . . .

The at least one downlink control signal/channel (or the downlink control signal/channel) may indicate the CORESET pool index. Each downlink control signal/channel of the at least one downlink control signal/channel may indicate the CORESET pool index. The at least one downlink control signal/channel indicating the CORESET pool index may comprise the downlink control signal/channel indicating the CORESET pool index. The wireless device 2611 may determine, for reception of the downlink signal 2635, the CORESET based on the indicated CORESET pool index.

The at least one downlink control signal/channel (or the downlink control signal/channel) may comprise a TCI field (or a TCI codepoint field) indicating the CORESET pool index. Each downlink control signal/channel of the at least one downlink control signal/channel may comprise the TCI field indicating the CORESET pool index. The at least one downlink control signal/channel comprising the TCI field may comprise the downlink control signal/channel comprising the TCI field.

A value of the TCI field may indicate (or be equal to) the CORESET pool index. The value of the TCI field indicating the CORESET pool index may comprise the value of one or more bits in/of the TCI field indicating the coreset pool index. The one or more bits may be, for example, one or more first bits (e.g., starting, earliest, or least significant bit(s) LSB(s)) or one or more last bits (e.g., ending, latest, most significant bit(s) (MSB(s)) of the TCI field. The CORESET pool index indicated by the TCI field may be (equal to) the first CORESET pool index (e.g., CoresetPoolIndex=0), for example, based on the value of the TCI field being equal to a first value (e.g., 0). The first value of the TCI field may indicate the first CORESET pool index. The first value may be equal to the first CORESET pool index. The CORESET pool index indicated by the TCI field may be (equal to) the second CORESET pool index (e.g., CoresetPoolIndex=1), for example, if the value of the TCI field is equal to a second value (e.g., 1). The second value of the TCI field may indicate the second CORESET pool index. The second value may be equal to the second CORESET pool index.

The wireless device 2611 may receive the downlink signal 2635 based on the TCI state of/among the at least one TCI state that is associated with the CORESET pool index equal to the value of the TCI field. The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is equal to the value of the TCI field. The wireless device 2611 may receive the downlink signal 2635 based on the CORESET pool index, for example, based on the CORESET pool index being equal to the value of the TCI field.

The wireless device 2611 may determine, for reception of the downlink signal 2635, the TCI state associated with the CORESET pool index that is equal to the value of the TCI field. The wireless device 2611 may determine, for reception of the downlink signal 2635, the TCI state associated with the CORESET pool index, for example, based on the TCI state being associated with the CORESET pool index that is equal to the value of the TCI field. The wireless device 2611 may determine, for reception of the downlink signal 2635, the CORESET pool index, for example, based on the CORESET pool index being equal to the value of the TCI field.

The wireless device 2611 may receive the downlink signal 2635 based on the TCI state of/among the at least one TCI state that is associated with the CORESET pool index indicated by the TCI field. The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is indicated by the TCI field. The wireless device 2611 may receive the downlink signal 2635 based on the CORESET pool index, for example, based on the TCI field indicating the CORESET pool index.

The wireless device 2611 may determine, for reception of the downlink signal 2635, the TCI state associated with the CORESET pool index that is indicated by the TCI field. The wireless device 2611 may determine, for reception of the downlink signal 2635, the TCI state associated with the CORESET pool index, for example, based on the TCI state being associated with the CORESET pool index that is indicated by the TCI field. The wireless device 2611 may determine, for reception of the downlink signal 2635, the CORESET pool index, for example, based on the TCI field indicating the CORESET pool index.

The downlink control signal/channel may comprise one or more fields indicating the CORESET pool index. Each downlink control signal/channel of the at least one downlink control signal/channel may comprise the one or more fields indicating the CORESET pool index.

The one or more fields may be set to one or more predefined/preconfigured/default values. Each field of the one or more fields may be set to a respective predefined/preconfigured/default value of the one or more predefined/preconfigured/default values. The one or more fields of the downlink control signal/channel may indicate the CORESET pool index, for example, based on the one or more fields being set to the one or more predefined/preconfigured/default values. The base station 2410 may, for example, set the one or more predefined/preconfigured values for the one or more fields. The one or more fields may comprise one or more of a TCI field, a time domain resource allocation (TDRA) field, a frequency domain resource allocation (FDRA) field, a resource allocation field, a redundancy version (RV) field, a HARQ process field, a PUCCH resource indicator field, etc.

The CORESET pool index indicated by the one or more fields may be (equal to) the first CORESET pool index (e.g., CoresetPoolIndex=0), for example, if the one or more predefined/preconfigured/default values is equal (or is set) to one or more first predefined/preconfigured/default values. The one or more first predefined/preconfigured/default values may indicate the first CORESET pool index. The CORESET pool index indicated by the one or more fields may be (equal to) the second CORESET pool index (e.g., CoresetPoolIndex=1), for example, if the one or more predefined/preconfigured/default values is equal (or is set) to one or more second predefined/preconfigured/default values. The one or more second predefined/preconfigured/default values may indicate the second CORESET pool index.

The CORESET pool index of the CORESET may be (equal to) the first CORESET pool index (e.g., CoresetPoolIndex=0), for example, if the CORESET pool index indicated by the one or more predefined/preconfigured/default values is equal to a first value (e.g., 0). The CORESET pool index of the CORESET may be (equal to) the second CORESET pool index (e.g., CoresetPoolIndex=1), for example, if the CORESET pool index indicated by the one or more predefined/preconfigured/default values is equal to a second value (e.g., 1).

The CORESET pool index may be (equal to) 0, for example, if the CORESET pool index indicated by the one or more predefined/preconfigured/default values is equal to 0. The CORESET pool index may be (equal to) 1, for example, if the CORESET pool index indicated by the one or more predefined/preconfigured/default values is equal to one.

The wireless device 2611 may receive the downlink signal 2635 based on the TCI state of/among the at least one TCI state that is associated with the CORESET pool index indicated by the one or more predefined/preconfigured/default values. The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is indicated by the one or more predefined/preconfigured/default values. The wireless device 2611 may receive the downlink signal 2635 based on the CORESET pool index, for example, based on the one or more predefined/preconfigured/default values indicating the CORESET pool index.

The wireless device 2611 may determine, for reception of the downlink signal 2635, the TCI state associated with the CORESET pool index that is indicated by the one or more predefined/preconfigured/default values. The wireless device 2611 may determine, for reception of the downlink signal 2635, the TCI state associated with the CORESET pool index, for example, based on the TCI state being associated with the CORESET pool index that is indicated by the one or more predefined/preconfigured/default values. The wireless device 2611 may determine, for reception of the downlink signal 2635, the CORESET pool index, for example, based on the one or more predefined/preconfigured/default values indicating the CORESET pool index.

The wireless device 2611 may receive the downlink signal 2635 based on the TCI state of/among the at least one TCI state that is associated with the CORESET pool index indicated by the at least one downlink control signal/channel (or the downlink control signal/channel). The wireless device 2611 may receive the downlink signal 2635 based on the TCI state of/among the at least one TCI state that is associated with the CORESET pool index, for example, based on (e.g., in response to) the at least one TCI state being associated with the CORESET pool index that is indicated by the at least one downlink control signal/channel (or the downlink control signal/channel). The wireless device 2611 may receive the downlink signal 2635 based on the CORESET pool index, for example, based on the at least one downlink control signal/channel (or the downlink control signal/channel) indicating the CORESET pool index.

The wireless device 2611 may determine, for reception of the downlink signal 2635, the TCI state associated with the CORESET pool index that is indicated by the at least one downlink control signal/channel (or the downlink control signal/channel). The wireless device 2611 may determine, for reception of the downlink signal 2635, the TCI state associated with the CORESET pool index, for example, based on the TCI state being associated with the CORESET pool index that is indicated by the at least one downlink control signal/channel (or the downlink control signal/channel). The wireless device 2611 may determine, for reception of the downlink signal 2635, the CORESET pool index, for example, based on the at least one downlink control signal/channel (or the downlink control signal/channel) indicating the CORESET pool index.

The one or more first TCI codepoints may comprise the TCI codepoint indicated by the at least one downlink control signal/channel (or the downlink control signal/channel). The one or more second TCI codepoints may comprise the TCI codepoint indicated by the at least one downlink control signal/channel (or the downlink control signal/channel). For example, with respect to FIG. 26, the TCI codepoint may be TCI codepoint 000. The one or more first TCI states may comprise the TCI codepoint 000. The one or more second TCI states may comprise the TCI codepoint 000. The TCI codepoint may be TCI codepoint 001. The one or more first TCI states may comprise the TCI codepoint 001. The one or more second TCI states may comprise the TCI codepoint 001. The TCI codepoint may be TCI codepoint 010. The one or more first TCI states may comprise the TCI codepoint 010. The one or more second TCI states may comprise the TCI codepoint 010. The TCI codepoint may be TCI codepoint 011. The one or more first TCI states may comprise the TCI codepoint 011. The one or more second TCI states may comprise the TCI codepoint 011. The TCI codepoint may not be TCI codepoint 100. The one or more first TCI states may not comprise the TCI codepoint 100. The one or more second TCI states may comprise the TCI codepoint 100.

The wireless device 2611 may receive the downlink signal 2635 based on the TCI state of/among the at least one TCI state that is associated with the CORESET pool index, for example, based on (e.g., in response to) the one or more first TCI codepoints comprising the TCI codepoint and the one or more second TCI codepoints comprising the TCI codepoint. The wireless device 2611 may determine, for reception of the downlink signal 2635, the TCI state associated with the CORESET pool index, for example, based on the one or more first TCI codepoints comprising the TCI codepoint and the one or more second TCI codepoints comprising the TCI codepoint. The wireless device 2611 may determine, for reception of the downlink signal 2635, the CORESET pool index, for example, based on the one or more first TCI codepoints comprising the TCI codepoint and the one or more second TCI codepoints comprising the TCI codepoint.

The one or more first TCI codepoints may not comprise the TCI codepoint indicated by the at least one downlink control signal/channel (or the downlink control signal/channel). The one or more second TCI codepoints may comprise the TCI codepoint indicated by the at least one downlink control signal/channel (or the downlink control signal/channel). For example, with respect to FIG. 26, the TCI codepoint may be TCI codepoint 100. The one or more first TCI states may not comprise the TCI codepoint 100. The one or more second TCI states may comprise the TCI codepoint 100. The at least one TCI state may be the at least one second TCI state, for example, based on the one or more first TCI codepoints not comprising the TCI codepoint and the one or more second TCI codepoints comprising the TCI codepoint. The at least one second TCI state may comprise the TCI state used to receive the downlink signal. The at least one second TCI state may comprise the TCI state (e.g., TCI state 49 indicated by the TCI codepoint 100) used to receive the downlink signal, for example, based the one or more first TCI codepoints not comprising the TCI codepoint and the one or more second TCI codepoints comprising the TCI codepoint. The CORESET pool index associated with the TCI state may be the second CORESET pool index, for example, based on the one or more first TCI codepoints not comprising the TCI codepoint and the one or more second TCI codepoints comprising the TCI codepoint.

The one or more first TCI codepoints may comprise the TCI codepoint indicated by the at least one downlink control signal/channel (or the downlink control signal/channel). The one or more second TCI codepoints may not comprise the TCI codepoint indicated by the at least one downlink control signal/channel (or the downlink control signal/channel). The at least one TCI state may be the at least one first TCI state, for example, based on the one or more first TCI codepoints comprising the TCI codepoint and the one or more second TCI codepoints not comprising the TCI codepoint. The at least one first TCI state may comprise the TCI state used to receive the downlink signal 2635. The at least one first TCI state may comprise the TCI state used to receive the downlink signal 2635, for example, based the one or more first TCI codepoints comprising the TCI codepoint and the one or more second TCI codepoints not comprising the TCI codepoint. The CORESET pool index associated with the TCI state may be the first CORESET pool index, for example, based on the one or more first TCI codepoints comprising the TCI codepoint and the one or more second TCI codepoints not comprising the TCI codepoint.

The one or more configuration parameters 2615 may not indicate a control channel repetition. The wireless device 2611 may receive/detect, in/via a CORESET, DCI scheduling/triggering reception of a downlink signal (e.g., the downlink signal 2635, a transport block, a PDSCH transmission, a CSI-RS, an aperiodic CSI-RS, etc.). The plurality of CORESETs may comprise the CORESET. The one or more configuration parameters 2615 may indicate, for the CORESET, a CORESET pool index (e.g., 0, 1, or any other value). The one or more CORESET pool indexes may comprise the CORESET pool index. The one or more configuration parameters 2615 may not indicate, for the CORESET, a control channel repetition.

The CORESET pool index of the CORESET may be equal to the first CORESET pool index (e.g., 0, or any other first value). The wireless device 2611 may receive the downlink signal based on a first TCI state among/of the one or more first TCI states. The first activation command may activate/indicate/update the one or more first TCI states. The first activation command may indicate the first CORESET pool index. The one or more first TCI states may be associated with the first CORESET pool index. The wireless device 2611 may receive the downlink signal based on the first TCI state among/of the one or more first TCI states, for example, based on (e.g., in response to) the receiving the DCI scheduling the downlink signal via the CORESET with the CORESET pool index that is equal to the first CORESET pool index. The wireless device 2611 may receive the downlink signal based on the first TCI state among/of the one or more first TCI states, for example, in response to the one or more first TCI states being associated with the first CORESET pool index that is same as the CORESET pool index of the CORESET that the wireless device receives the DCI scheduling the downlink signal 2635. The wireless device 2611 may receive the downlink signal based on the first TCI state among/of the one or more first TCI states, for example, based on (e.g., in response to) the one or more configuration parameters 2615 not indicating the control channel repetition. The wireless device 2611 may receive the downlink signal based on the first TCI state among/of the one or more first TCI states, for example, based on (e.g., in response) to the one or more configuration parameters 2615 not indicating the control channel repetition for the CORESET. The DCI may comprise a TCI field indicating the first TCI state. A value of the TCI field may be equal to a first TCI codepoint comprising/indicating the first TCI state. The one or more first TCI codepoints may comprise the first TCI codepoint.

The CORESET pool index of the CORESET may be equal to the second CORESET pool index (e.g., 1, or any other second value). The wireless device 2611 may receive the downlink signal based on a second TCI state among/of the one or more second TCI states. The second activation command may activate/indicate/update the one or more second TCI states. The second activation command may indicate the second CORESET pool index. The one or more second TCI states may be associated with the second CORESET pool index. The wireless device 2611 may receive the downlink signal based on the second TCI state among/of the one or more second TCI states, for example, based on (e.g., in response to) the receiving the DCI scheduling the downlink signal via the CORESET with the CORESET pool index that is equal to the second CORESET pool index. The wireless device 2611 may receive the downlink signal based on the second TCI state among/of the one or more second TCI states, for example, based on (e.g., in response to) the one or more second TCI states being associated with the second CORESET pool index that is same as the CORESET pool index of the CORESET that the wireless device 2611 receives the DCI scheduling the downlink signal. The wireless device 2611 may receive the downlink signal based on the second TCI state among/of the one or more second TCI states, for example, based on (e.g., in response to) the one or more configuration parameters 2615 not indicating the control channel repetition. The wireless device 2611 may receive the downlink signal based on the second TCI state among/of the one or more second TCI states, for example, based on (e.g., in response to) the one or more configuration parameters 2615 not indicating the control channel repetition for the CORESET. The DCI may comprise a TCI field indicating the second TCI state. A value of the TCI field may be equal to a second TCI codepoint comprising/indicating the second TCI state. The one or more second TCI codepoints may comprise the second TCI codepoint.

Figure 27A:
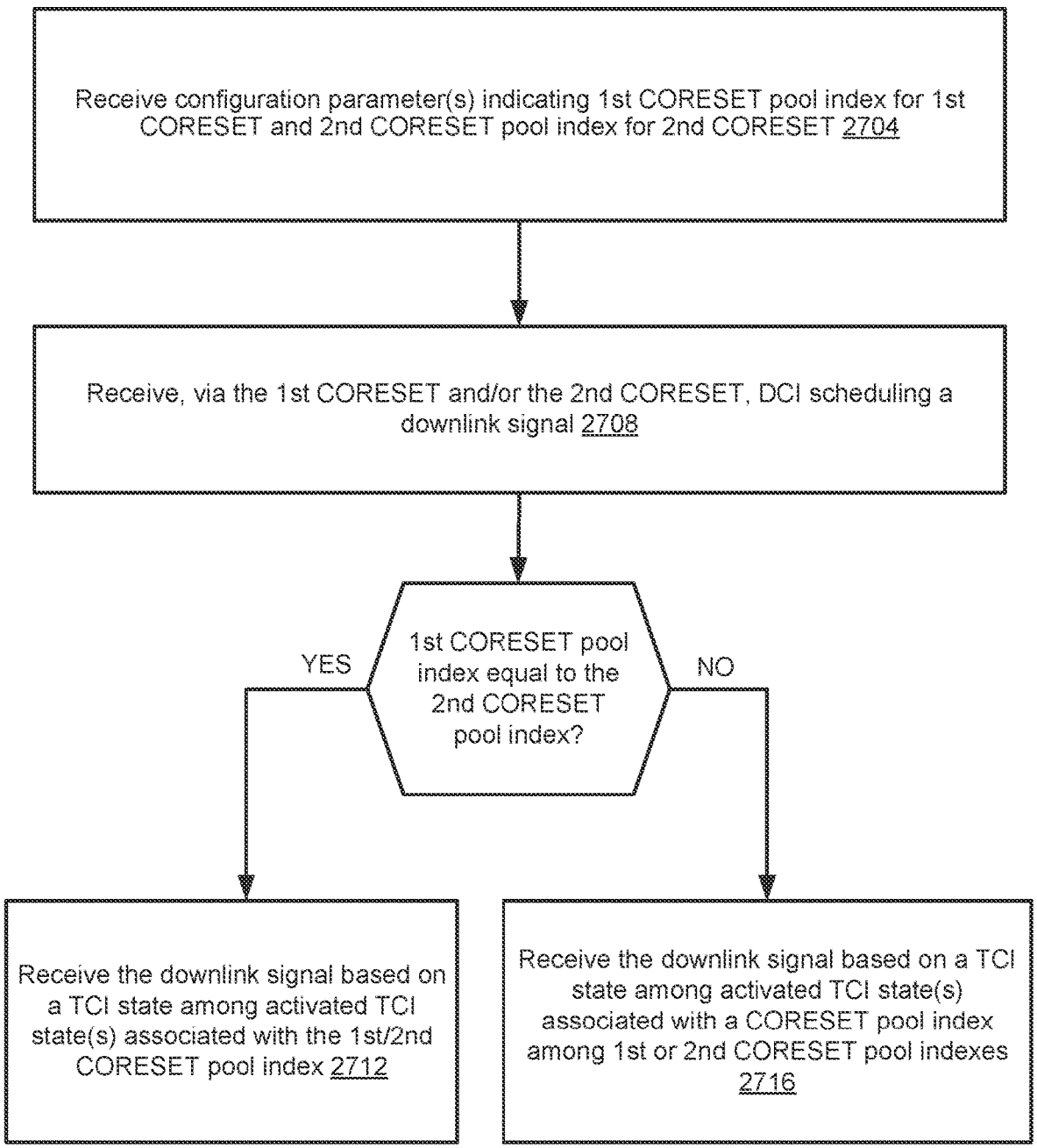
FIGS. 27A and 27B show example methods of channel repetition for transmission and/or reception.

FIG. 27A shows an example method of channel repetition for transmission and/or reception. The example method 2700 of FIG. 27A relates to control channel repetition for reception of control information (e.g., DCI) from a base station (e.g., the base station 2610). The example method 2700 may be performed at a wireless device (e.g., the wireless device 2611). At step 2704, the wireless device may receive configuration parameters. The configuration parameters may indicate a first CORESET pool index/indicator for a first CORESET and a second CORESET pool index/indicator for a second CORESET. The first CORESET and the second CORESET may be linked for repetition. The configuration parameters may indicate control channel repetition for transmission of DCI via the first CORESET and the second CORESET. The first CORESET pool index and the second CORESET pool index may be same or may be different.

At step 2708, the wireless device may receive, via the first CORESET and/or the second CORESET, DCI. The DCI may be sent by a base station and may be repeated in the first CORESET and the second CORESET. The repetitions may be sent, by the base station, via different TRPs. The DCI may schedule a downlink signal (e.g., a transport block, a PDSCH transmission).

At step 2712, the wireless device may receive the downlink signal based on a TCI state among activated TCI state(s) associated with the first CORESET pool index (or the second CORESET pool index), for example, if the first CORESET pool index and the second CORESET pool index are the same (e.g., equal). At step 2716, the wireless device may receive the downlink signal based on a CORESET pool index, among the first CORESET pool index and the second CORESET pool index, for example, if the first CORESET pool index and the second CORESET pool index are different. The wireless device may receive the downlink signal based on a TCI state among activated TCI state(s) associated with the CORESET pool index. The CORESET pool index may be preconfigured (e.g., via/indicated in the configuration parameters). The CORESET pool index may correspond to a CORESET pool index of a reference/default CORESET. The TCI state may be indicated in the DCI.

Figure 27B:
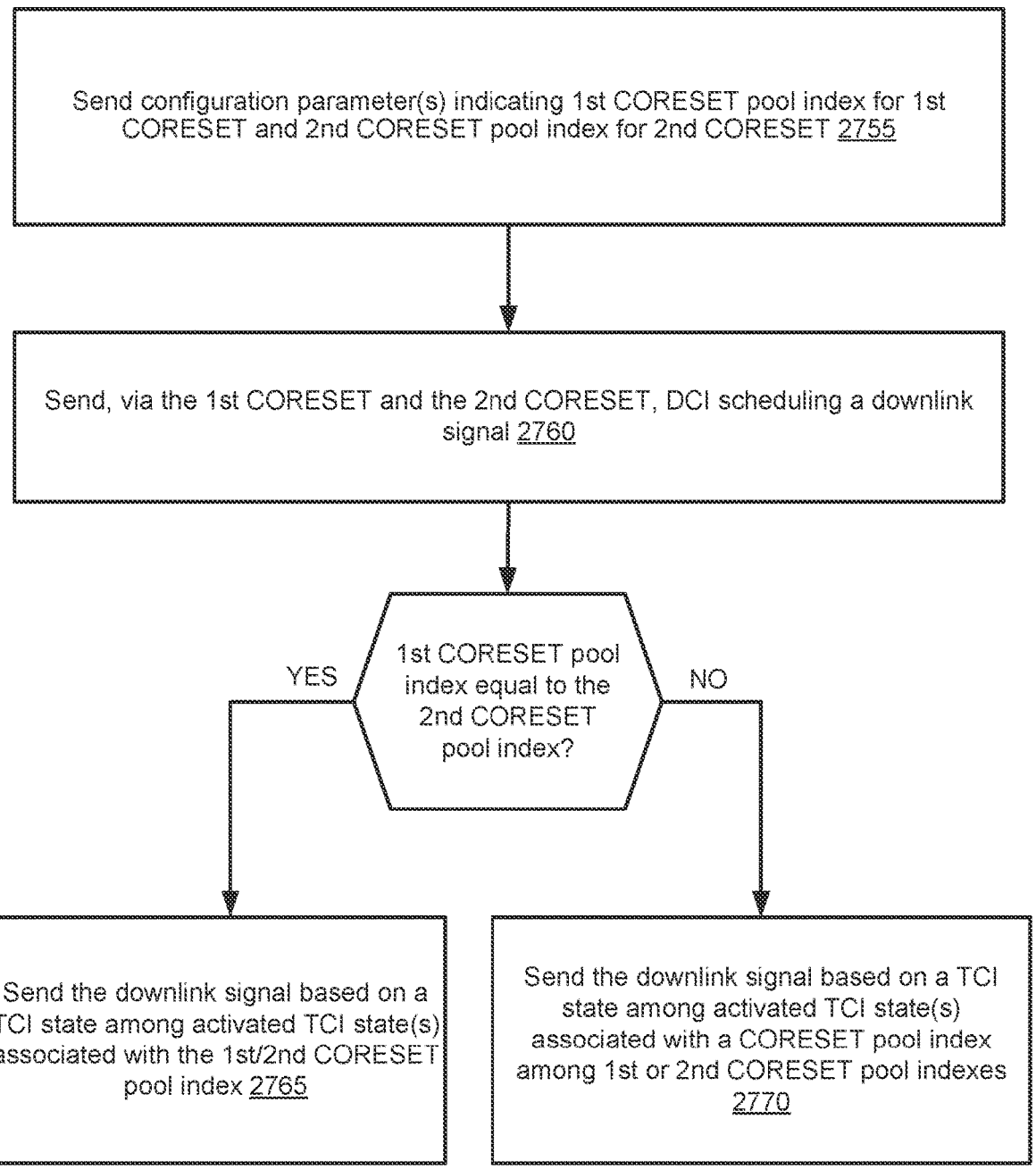

FIG. 27B shows an example method of channel repetition. The example method 2750 relates to control channel transmission for transmission of control information (e.g., DCI) from a base station (e.g., the base station 2610). At step 2755, the base station may send configuration parameters. The configuration parameters may indicate a first CORESET pool index/indicator for a first CORESET and a second CORESET pool index/indicator for a second CORESET. The first CORESET and the second CORESET may be linked for repetition. The configuration parameters may indicate control channel repetition for transmission of DCI via the first CORESET and the second CORESET. The first CORESET pool index and the second CORESET pool index may be same or may be different.

At step 2760, the base station may send, via the first CORESET and the second CORESET, DCI. The DCI may be repeated in the first CORESET and the second CORESET. The DCI may schedule a downlink signal (e.g., a transport block, a PDSCH transmission).

At step 2765, the base station may send the downlink signal based on a TCI state among activated TCI state(s) associated with the first CORESET pool index (or the second CORESET pool index), for example, if the first CORESET pool index and the second CORESET pool index are the same (e.g., equal). At step 2770, the base station may send the downlink signal based on a CORESET pool index, among the first CORESET pool index and the second CORESET pool index, for example, if the first CORESET pool index and the second CORESET pool index are different. The base station may send the downlink signal based on a TCI state among activated TCI state(s) associated with the CORESET pool index. The CORESET pool index may be preconfigured (e.g., via/indicated in the configuration parameters). The CORESET pool index may correspond to a CORESET pool index of a reference/default CORESET. The TCI state may be indicated in the DCI.

A wireless device may receive (e.g., from a base station) one or more messages comprising one or more configuration parameters for/of a cell. The one or more configuration parameters may indicate a plurality of CORESETs. The plurality of CORESETs may comprise a first CORESET. The plurality of CORESETs may comprise a second CORESET. The first CORESET and the second CORESET may be mapped/linked/associated for control channel repetition (e.g., PDCCH repetition, DCI repetition, PDCCH/DCI aggregation, and the like). The one or more configuration parameters may indicate, for the control channel repetition, a mapping/linkage/association between the first CORESET and the second CORESET. The one or more configuration parameters may indicate, for the first CORESET, a first CORESET pool index (e.g., 0, or any other first value). The one or more configuration parameters may indicate, for the second CORESET, a second CORESET pool index (e.g., 1, or any other second value).

The wireless device may receive a first activation command (e.g., DCI message, MAC-CE) activating/updating/indicating one or more first TCI states. The first activation command may activate/update/indicate, for PDSCH receptions/decoding, the one or more first TCI states. The first activation command may comprise a field (e.g., CORESET Pool ID) indicating the first CORESET pool index (e.g., 0). The one or more first TCI states may be associated with the first CORESET pool index. Each TCI state of the one or more first TCI states may be associated with the first CORESET pool index.

The wireless device may receive a second activation command (e.g., DCI, MAC-CE) activating/updating/indicating one or more second TCI states. The second activation command may activate/update/indicate, for PDSCH receptions/decoding, the one or more second TCI states. The second activation command may comprise a field (e.g., CORESET Pool ID) indicating the second CORESET pool index (e.g., 1). The one or more second TCI states may be associated with the second CORESET pool index. Each TCI state of the one or more second TCI states may be associated with the second CORESET pool index.

The first CORESET and the second CORESET being mapped/linked/associated for the control channel repetition may comprise a first search space set of the first CORESET and a second search space set of the second CORESET being mapped/linked/associated for the control channel repetition. The first CORESET and the second CORESET being mapped/linked/associated for the control channel repetition may comprise at least one first search space set of the first CORESET and at least one second search space set of the second CORESET being mapped/linked/associated for the control channel repetition. The first CORESET and the second CORESET being mapped/linked/associated for the control channel repetition may comprise a first PDCCH candidate of (or associated with) the first CORESET and a second PDCCH candidate of (or associated with) the second CORESET being mapped/linked/associated for the control channel repetition.

The wireless device may monitor, for a plurality of DCI messages/PDCCH transmissions (e.g., repetition of a downlink control signal/channel), the first CORESET and the second CORESET. Each downlink control signal/channel of the plurality of DCI messages/PDCCH transmissions may be same as the downlink control signal/channel Each downlink control signal/channel of the plurality of DCI messages/ PDCCH transmissions may be same as the downlink control signal/channel, for example, based on the plurality of DCI messages/PDCCH transmissions being transmitted by the base station for repetition of the downlink control signal/channel Each downlink control signal/channel of the plurality of DCI messages/PDCCH transmissions may be same as the downlink control signal/channel, for example, based on monitoring, for the plurality of DCI messages/PDCCH transmissions, the first CORESET and the second CORESET for repetition of the downlink control signal/channel. The wireless device may monitor, for the plurality of DCI messages/PDCCH transmissions (e.g., the repetition of the downlink control signal/channel), the first CORESET and the second CORESET in a plurality of downlink control signal/channel transmission occasions.

The wireless device may receive/detect at least one downlink control signal/channel among/of the plurality of DCI messages/PDCCH transmissions. The receiving/detecting the at least one downlink control signal/channel among/of the plurality of DCI messages/PDCCH transmissions may comprise/be receiving/detecting the downlink control signal/channel. The wireless device may receive, via at least one of the first CORESET and the second CORESET, the at least one downlink control signal/channel (or the downlink control signal/channel). For example, the at least one downlink control signal/channel (or the downlink control signal/channel) may indicate schedule/trigger a reception of a downlink signal (e.g., PDSCH, CSI-RS, TB).

The wireless device may receive the downlink signal based on a TCI state. The TCI state may be associated with a CORESET pool index. The wireless device may receive the downlink signal based on the TCI state associated with the CORESET pool index. The at least one downlink control signal/channel (or the downlink control signal/channel) may indicate the TCI state.

The first CORESET pool index and the second CORESET pool index may comprise the CORESET pool index. The first CORESET pool index and the second CORESET pool index may be the same (or equal). The first CORESET pool index may be equal to 0 and the second CORESET pool index may be equal to 0. The first CORESET pool index may be equal to 1 and the second CORESET pool index may be equal to 1. The first CORESET pool index and the second CORESET pool index may be equal to a value. The CORESET pool index that may be equal to the value. The CORESET pool index may be equal to the first CORESET pool index. The CORESET pool index may be equal to the second CORESET pool index. The one or more first TCI states activated by the first activation command and the one or more second TCI states activated by the second activation command may be the same, for example, based on the first CORESET pool index and the second CORESET pool index being the same (or equal). The one or more first TCI states (or the one or more second TCI states) may comprise the TCI state used to receive the downlink signal. The at least one downlink control signal/channel (or the downlink control signal/channel) may comprise a TCI field indicating the TCI state.

The first CORESET pool index and the second CORESET pool index may be different. The first CORESET pool index may be equal to 0 and the second CORESET pool index may be equal to 1. The first CORESET pool index may be equal to 1 and the second CORESET pool index may be equal to 0.

The wireless device may determine/select the CORESET pool index among the first CORESET pool index and the second CORESET pool index. The wireless device may determine/select the CORESET pool index among the first CORESET pool index and the second CORESET pool index, for example, based on the first CORESET pool index and the second CORESET pool index being different. The wireless device may determine the CORESET pool index that is equal to a value.

The value may be equal to 0. The CORESET pool index may be the first CORESET pool index, for example, based on the value being equal to 0. The TCI state may be associated with the first CORESET pool index. The one or more first TCI states activated by the first activation command may comprise the TCI state. The first activation command may indicate the CORESET pool index, for example, based on the first CORESET pool index and the CORESET pool index being the same.

The value may be equal to 1. The CORESET pool index may be the second CORESET pool index, for example, based on the value being equal to 1. The TCI state may be associated with the second CORESET pool index. The one or more second TCI states activated by the second activation command may comprise the TCI state. The second activation command may indicate the CORESET pool index, for example, based on the second CORESET pool index and the CORESET pool index being the same.

The wireless device may receive the downlink signal based on the TCI state associated with the CORESET pool index equal to the value. The wireless device may receive the downlink signal based on the TCI state associated with the CORESET pool index, for example, based on (e.g., in response to) the TCI state being associated with the CORESET pool index that is equal to the value. The wireless device may receive the downlink signal based on the CORESET pool index, for example, based on the CORESET pool index being equal to the value. The wireless device may receive the downlink signal based on the TCI state associated with the CORESET pool index, for example, based on (e.g., in response to) the first CORESET pool index and the second CORESET pool index being different.

The wireless device may determine, for reception of the downlink signal, the TCI state associated with the CORESET pool index that is equal to the value. The wireless device may determine, for reception of the downlink signal, the TCI state associated with the CORESET pool index, for example, based on the TCI state being associated with the CORESET pool index that is equal to the value. The wireless device may determine, for reception of the downlink signal, the CORESET pool index, for example, based on the CORESET pool index being equal to the value.

The wireless device may receive the downlink signal based on the TCI state among the one or more first TCI states associated with the first CORESET pool index, for example, if the CORESET pool index is the first CORESET pool index. The wireless device may receive the downlink signal based on the TCI state among the one or more second TCI states associated with the second CORESET pool index, for example, if the CORESET pool index is the second CORESET pool index.

The value may be fixed/predefined/preconfigured/default. The value may be equal to zero (or any other value). The value may be indicated by the one or more configuration parameters. The value may be equal to a lowest CORESET pool index among the first CORESET pool index and the second CORESET pool index. The first CORESET pool index may be equal to zero. The second CORESET pool index may be equal to one. The value (or the lowest CORESET pool index) may be equal to the first CORESET pool index that is equal to zero. The CORESET pool index may be the first coreset pool index. The first CORESET pool index may be equal to one. The second CORESET pool index may be equal to zero. The value (or the lowest CORESET pool index) may be equal to the second CORESET pool index that is equal to zero. The CORESET pool index may be the second CORESET pool index.

The value may be equal to a highest CORESET pool index among the first CORESET pool index and the second CORESET pool index. The first CORESET pool index may be equal to one. The second CORESET pool index may be equal to zero. The value (or the highest CORESET pool index) may be equal to the first CORESET pool index that is equal to one. The CORESET pool index may be the first CORESET pool index. The first CORESET pool index may be equal to zero. The second CORESET pool index may be equal to one. The value (or the highest CORESET pool index) may be equal to the second CORESET pool index that is equal to one. The CORESET pool index may be the second CORESET pool index.

The wireless device may determine a reference/default CORESET among the plurality of CORESETs (or among the first CORESET and the second CORESET). The wireless device may determine the reference/default CORESET, for example, based on the first CORESET pool index and the second CORESET pool index being different. The wireless device may determine the reference/default CORESET, for example, based on one or more criteria discussed in FIG. 26. The one or more configuration parameters may indicate a reference CORESET pool index (e.g., 0, 1) for reference/default CORESET. The first CORESET pool index and the second CORESET pool index may comprise the reference CORESET pool index. The reference CORESET pool index of the reference/default CORESET may be equal to the value. The reference CORESET pool index of the reference/default CORESET may be equal to the value of the CORESET pool index. The reference CORESET pool index of the reference/default CORESET may be equal to the CORESET pool index.

The at least one downlink control signal/channel (or the downlink control signal/channel) may indicate the value. The at least one downlink control signal/channel (or the downlink control signal/channel) may indicate the value of the CORESET pool index. The at least one downlink control signal/channel (or the downlink control signal/channel) may comprise a TCI field indicating the value. A value of the TCI field may be equal to the value. The value of the TCI field may indicate (or be equal to) the CORESET pool index. A first value (e.g., 0) of the TCI field may indicate (or be equal to) the first CORESET pool index. The CORESET pool index may be equal to the first CORESET pool index. The CORESET pool index may be equal to the first CORESET pool index, for example, based on the first value indicating (or being equal to) the first CORESET pool index. A second value (e.g., 1) of the TCI field may indicate (or be equal to) the second CORESET pool index. The CORESET pool index may be equal to the second CORESET pool index. The CORESET pool index may be equal to the second CORESET pool index, for example, based on the second value indicating (or being equal to) second first CORESET pool index.

The at least one downlink control signal/channel (or the downlink control signal/channel) may comprise one or more fields (e.g., RV, TCI, HARQ-ACK, TRP index, CORESET pool index, antenna panel index, etc.) indicating the value. A value of the one or more fields may be equal to (or indicate) the value. The value of the one or more fields may indicate (or be equal to) the CORESET pool index. A first value (e.g., 0) of the one or more fields may indicate (or be equal to) the first CORESET pool index. The CORESET pool index may be equal to the first CORESET pool index. The CORESET pool index may be equal to the first CORESET pool index, for example, based on the first value indicating (or being equal to) the first CORESET pool index. A second value (e.g., 1) of the one or more fields may indicate (or be equal to) the second CORESET pool index. The CORESET pool index may be equal to the second CORESET pool index. The CORESET pool index may be equal to the second CORESET pool index, for example, based on the second value indicating (or being equal to) second first CORESET pool index. The first CORESET pool index of the first CORESET and the second CORESET pool index of the second CORESET may comprise the CORESET pool index.

A number/quantity of the at least one first TCI state indicated/activated/updated by the first activation command may be equal to a first value. A number/quantity of the at least one second TCI state indicated/activated/updated by the second activation command may be equal to a second value.

A number/quantity of the one or more first TCI codepoints may be equal to a first value. A number/quantity of the one or more second TCI codepoints may be equal to a second value. The first value and the second value may be the same (or equal). The first value and the second value may be the same (or equal), for example, based on the first CORESET pool index and the second CORESET pool index being different. The first value and the second value may be the same (or equal), for example, based on the one or more configuration parameters indicating the control channel repetition. The first value and the second value may be the same (or equal), for example, based on the one or more configuration parameters indicating, for the control channel repetition, the mapping/linkage/association between the first CORESET and the second CORESET. The first value and the second value may be the same (or equal), for example, based on the first CORESET pool index of the first CORESET and the second CORESET pool index of the second CORESET mapped/linked to (or associated with) the first CORESET for the control channel repetition being different.

A wireless device may perform a method comprising multiple operations. The wireless device may receive, via at least one of a first control resource set (CORESET) or a second CORESET, repetitions of downlink control information (DCI) scheduling a downlink signal. A time offset between the DCI and the downlink signal may be less than a threshold. Based on a first CORESET pool index of the first CORESET and a second CORESET pool index of the second CORESET being different, the wireless device may determine a default CORESET pool index among the first CORESET pool index and the second CORESET pool index. The wireless device may receive the downlink signal using a CORESET associated with a lowest CORESET index among one or more CORESETs. Each of the one or more CORESETs may be associated with the default CORESET pool index. The wireless device may also perform one or more additional operations. The receiving the downlink signal using the CORESET associated with the lowest CORESET index among the one or more CORESETs may comprise receiving the downlink signal based on a transmission configuration indicator (TCI) state of the CORESET associated with the lowest CORESET index among the one or more CORESETs. The receiving the downlink signal using the CORESET associated with the lowest CORESET index among the one or more CORESETs may comprise receiving the downlink signal based on at least one demodulation reference signal (DMRS) port of the downlink signal being quasi co-located with a reference signal of the CORESET associated with the lowest CORESET index among the one or more CORESETs. The determining the default CORESET pool index may comprise one of: determining a lowest CORESET pool index among the first CORESET pool index and the second CORESET pool index; or determining a highest CORESET pool index among the first CORESET pool index and the second CORESET pool index. The determining the default CORESET pool index may comprise determining a CORESET pool index, among the first CORESET pool index and the second CORESET pool index, that is equal to a preconfigured value. The determining the default CORESET pool index may comprise determining the default CORESET pool index based on an indicator in the DCI. The determining the default CORESET pool index may comprise determining a CORESET pool index of a CORESET, among the first CORESET and the second CORESET, via which a last repetition of the DCI is received. The time offset between the DCI and the downlink signal being less than the threshold may comprise a time offset between a last repetition of the DCI and the downlink signal being less than the threshold. The wireless device may receive one or more configuration parameters indicating: the first CORESET pool index for the first CORESET; and the second CORESET pool index for the second CORESET, wherein the second CORESET may be linked to the first CORESET for the repetitions of the DCI. The one or more configuration parameters may indicate, for each CORESET of the one or more CORESET, the default CORESET pool index. The downlink signal may comprise at least one of: a transport block; a physical downlink shared channel (PDSCH) transmission; or a channel state information (CSI) reference signal (RS). An active downlink bandwidth part (BWP) of a cell may comprise the first CORESET and the second CORESET. The receiving the downlink signal using the CORESET may be based on the time offset between the DCI and the downlink signal being less than the threshold. The DCI may comprise a transmission configuration indicator (TCI) field indicating the default CORESET pool index, wherein: the default CORESET pool index may be the first CORESET pool index based on the TCI field indicating a first value; or the default CORESET pool index may be the second CORESET pool index based on the TCI field indicating a second value. The DCI may comprise one or more fields indicating the default CORESET pool index, wherein: the default CORESET pool index is the first CORESET pool index based on the one or more fields indicating one or more first predefined values; or the default CORESET pool index is the second CORESET pool index based on the one or more fields indicating one or more second predefined values. The first CORESET and the second CORESET may be linked for downlink control channel repetition. The first CORESET and the second CORESET being linked for downlink control channel repetition may comprise a first search space set associated with the first CORESET being linked to a second search space set associated with the second CORESET. The one or more configuration parameters may indicate a linkage between the first search space set and the second search space set. The wireless device may monitor the first search space set of the first CORESET in a first monitoring occasion. The wireless device may monitor the second search space set of the second CORESET in a second monitoring occasion. The wireless device may determine a selected CORESET among the first CORESET and the second CORESET. The default CORESET pool index may correspond to the selected CORESET. The wireless device may monitor, for the repetition of the DCI, downlink control channels in the selected CORESET in a last monitoring occasion among the first monitoring occasion and the second monitoring occasion. The selected CORESET may be the first CORESET based on the first monitoring occasion being later than the second monitoring occasion. The selected CORESET may be the second CORESET based on the second monitoring occasion being later than the first monitoring occasion. The selected CORESET may have a lowest CORESET index among a first CORESET index of the first CORESET and a second CORESET index of the second CORESET. The default CORESET pool index may be: the first CORESET pool index based on the selected CORESET being the first CORESET; or the second CORESET pool index based on the selected CORESET being the second CORESET. The CORESET may be the same as the first CORESET or may be different from the first CORESET. The CORESET may be the same as the second CORESET or may be different from the second CORESET. The wireless device may receive one or more configuration parameters indicating: a third CORESET pool index for a third CORESET; and the third CORESET pool index for a fourth CORESET that is linked to the third CORESET for downlink control channel repetition. The wireless device may receive, via at least one of the third CORESET and the fourth CORESET, repetitions of second DCI scheduling a second downlink signal. A time offset between the second DCI and the second downlink signal may be less than the threshold. The wireless device may receive the second downlink signal based on a second TCI state of a default CORESET associated with a lowest CORESET index among one or more second CORESETs. Each of the one or more second CORESETs may be associated with the third CORESET pool index. The wireless device may receive one or more configuration parameters indicating a fourth CORESET pool index for a fourth CORESET that is not linked to another CORESET for downlink control channel repetition. The wireless device may receive, via the fourth CORESET, third DCI scheduling a third downlink signal. A time offset between the third DCI and the third downlink signal may be less than the threshold. The wireless device may receive the third downlink signal based on a third TCI state of a second default CORESET associated with a lowest CORESET index among one or more third CORESETs. Each of the one or more third CORESETs with the fourth CORESET pool index. The wireless device may monitor one or more CORESETs in a last time slot. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive one or more configuration parameters indicating: a first control resource set (CORESET) pool index for a first CORESET; and a second CORESET pool index for a second CORESET. The wireless device may receive, via at least one of the first CORESET or the second CORESET, repetitions of downlink control information (DCI) scheduling a downlink signal. A time offset between the DCI and the downlink signal may be less than a threshold. Based on the first CORESET pool index and the second CORESET pool index being different, the wireless device may receive the downlink signal using a CORESET associated with a lowest CORESET index among one or more CORESETs. Each of the one or more CORESETs may be associated with a default CORESET pool index that may be selected from the first CORESET pool index and the second CORESET pool index. The wireless device may also perform one or more additional operations. The default CORESET pool index may be equal to a preconfigured value. The DCI may indicate the default CORESET pool index. The default CORESET pool index may be associated with a CORESET, among the first CORESET and the second CORESET, via which a last repetition of the DCI is received. The receiving the downlink signal using the CORESET associated with the lowest CORESET index among the one or more CORESETs may comprise receiving the downlink signal based on a transmission configuration indicator (TCI) state of the CORESET associated with the lowest CORESET index among the one or more CORESETs. The receiving the downlink signal using the CORESET associated with the lowest CORESET index among the one or more CORESETs may comprise receiving the downlink signal based on at least one demodulation reference signal (DMRS) port of the downlink signal being quasi co-located with a reference signal of the CORESET associated with the lowest CORESET index among the one or more CORESETs. The downlink signal may comprise at least one of: a transport block; a physical downlink shared channel (PDSCH) transmission; or a channel state information (CSI) reference signal (RS). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A base station may perform a method comprising multiple operations. The base station may send, via a first control resource set (CORESET) and a second CORESET, repetitions of downlink control information (DCI) scheduling a downlink signal. A time offset between the DCI and the downlink signal may be less than a threshold. Based on a first CORESET pool index of the first CORESET and a second CORESET pool index of the second CORESET being different, the base station may determine a default CORESET pool index among the first CORESET pool index and the second CORESET pool index. The base station may send the downlink signal using on a CORESET associated with a lowest CORESET index among one or more CORESETs. Each of the one or more CORESETs may be associated with the default CORESET pool index. The base station may also perform one or more additional operations. The determining the default CORESET pool index may comprise determining a CORESET pool index, among the first CORESET pool index and the second CORESET pool index, that is equal to a preconfigured value. The determining the default CORESET pool index may comprise determining a CORESET pool index of a CORESET, among the first CORESET and the second CORESET, via which a last repetition of the DCI is sent. The time offset between the DCI and the downlink signal being less than the threshold may comprise a time offset between a last repetition of the DCI and the downlink signal being less than the threshold. The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a wireless device configured to receive the downlink signal. A computer-readable medium may store instructions that, when executed, cause performance of the described method, additional operations and/or include the additional elements.

A wireless device may perform a method comprising multiple operations. The wireless device may receive, via at least one of a first control resource set (CORESET) and a second CORESET, repetitions of downlink control information (DCI) scheduling a downlink signal and comprising a transmission configuration indicator (TCI) field. The wireless device may, based on a first CORESET pool index of the first CORESET and a second CORESET pool index of the second CORESET being different, determine a default CORESET pool index among the first CORESET pool index and the second CORESET pool index. The wireless device may receive the downlink signal based on a TCI state, among one or more TCI states activated for the default CORESET pool index, indicated by the TCI field. The wireless device may also perform one or more additional operations. The determining the default CORESET pool index may comprise one of: determining a lowest CORESET pool index among the first CORESET pool index and the second CORESET pool index; or determining a highest CORESET pool index among the first CORESET pool index and the second CORESET pool index. The determining the default CORESET pool index may comprise determining a CORESET pool index, among the first CORESET pool index and the second CORESET pool index, that is equal to a preconfigured value. The determining the default CORESET pool index may comprise determining the default CORESET pool index based on an indicator in the DCI. The determining the default CORESET pool index may comprise determining a CORESET pool index of a CORESET, among the first CORESET and the second CORESET, via which a last repetition of the DCI is received. The wireless device may receive one or more configuration parameters indicating: the first CORESET pool index for the first CORESET; and the second CORESET pool index for the second CORESET. The second CORESET may be linked to the first CORESET for the repetitions of the DCI. The receiving the downlink signal based on the TCI state may comprises receiving the downlink signal based on at least one demodulation reference signal (DMRS) port of the downlink signal being quasi co-located with a reference signal associated with the TCI state. The downlink signal may comprise at least one of: a transport block; a physical downlink shared channel (PDSCH) transmission; or a channel state information (CSI) reference signal (RS). An active downlink bandwidth part (BWP) of a cell may comprise the first CORESET and the second CORESET. The wireless device may receive a medium access control-control element (MAC CE). The MAC CE may indicate: activation of the one or more TCI states among a plurality of TCI states; and the default CORESET pool index. The first CORESET and the second CORESET may be linked for downlink control channel repetition. The first CORESET and the second CORESET being linked for the downlink control channel repetition may comprise a first search space set associated with the first CORESET being linked to a second search space set associated with the second CORESET. The one or more configuration parameters may indicate a linkage between the first search space set and the second search space set. The DCI may comprise one or more fields indicating the default CORESET pool index. The determining the default CORESET pool index may comprises determining that the default CORESET pool index is the first CORESET pool index based on the one or more fields indicating one or more first predefined values. The determining the default CORESET pool index may comprise determining that the default CORESET pool index is the second CORESET pool index based on the one or more fields indicating one or more second predefined values. The DCI may comprise a transmission configuration indicator (TCI) field indicating the default CORESET pool index. The default CORESET pool index may be the first CORESET pool index based on the TCI field indicating a first value. The default CORESET pool index may be the second CORESET pool index based on the TCI field indicating a second value. The wireless device may monitor a first search space set of the first CORESET in a first monitoring occasion. The wireless device may monitor a second search space set of the second CORESET in a second monitoring occasion. The wireless device may determine a selected CORESET among the first CORESET and the second CORESET. The default CORESET pool index may correspond to the selected CORESET. The wireless device may monitor, for the repetition of the DCI, downlink control channels in the selected CORESET in a last monitoring occasion among the first monitoring occasion and the second monitoring occasion. The selected CORESET may be the first CORESET based on the first monitoring occasion being later than the second monitoring occasion. The selected CORESET may be the second CORESET based on the second monitoring occasion being later than the first monitoring occasion. The selected CORESET may have a lowest CORESET index among a first CORESET index of the first CORESET and a second CORESET index of the second CORESET. The default CORESET pool index may be the first CORESET pool index based on the selected CORESET being the first CORESET. The default CORESET pool index may be the second CORESET pool index based on the selected CORESET being the second CORESET. The wireless device may receive one or more configuration parameters indicating a plurality of TCI states. The wireless device may receive a first medium access control-control element (MAC CE) that indicates activation of one or more first TCI states, among the plurality of TCI states, for the first CORESET pool index. The wireless device may receive a second MAC CE that indicates activation of one or more second TCI states, among the plurality of TCI states, for the second CORESET pool index. The one or more first TCI states may comprise the TCI state based on the CORESET pool index being the first CORESET pool index. The one or more second TCI states may comprise the TCI state based on the CORESET pool index being the second CORESET pool index. The wireless device may receive one or more configuration parameters indicating: a third CORESET pool index for a third CORESET; and the third CORESET pool index for a fourth CORESET that is linked to the third CORESET for downlink control channel repetition. The wireless device may receive, via at least one of the third CORESET and the fourth CORESET, repetitions of second DCI scheduling a second downlink signal. The wireless device may receive the second downlink signal based on a second TCI state, among one or more second TCI states activated for the third CORESET pool index, indicated by the second TCI. The wireless device may receive one or more configuration parameters indicating a fourth CORESET pool index for a fourth CORESET that is not linked to another CORESET for downlink control channel repetition. The wireless device may receive, via the fourth CORESET, third DCI scheduling a third downlink signal. The wireless device may receive the third downlink signal based on a third TCI state, among one or more third TCI states activated for the fourth CORESET pool index, indicated by the third TCI. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive, one or more configuration parameters indicating: a first control resource set (CORESET) pool index for a first CORESET; and a second CORESET pool index for a second CORESET. The wireless device may receive, via at least one of the first CORESET and the second CORESET, repetitions of downlink control information (DCI) scheduling a downlink signal and comprising a transmission configuration indicator (TCI) field. The wireless device may, based on the first CORESET pool index and the second CORESET pool index being different, receive the downlink signal based on a TCI state indicated by the TCI field and associated with a default CORESET pool index among the first CORESET pool index and the second CORESET pool index. The wireless device may also perform one or more additional operations. The TCI state may be among one or more TCI states activated for the default CORESET pool index. The default CORESET pool index may be equal to a preconfigured value. The DCI may indicate the default CORESET pool index. The default CORESET pool index may be associated with a CORESET, among the first CORESET and the second CORESET, via which a last repetition of the DCI is received. The receiving the downlink signal based on the TCI state may comprise receiving the downlink signal based on at least one demodulation reference signal (DMRS) port of the downlink signal being quasi co-located with a reference signal associated with the TCI state. The downlink signal may comprise at least one of: a transport block; a physical downlink shared channel (PDSCH) transmission; or a channel state information (CSI) reference signal (RS). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to send the DCI. A computer-readable medium may store instructions that, when executed, cause performance of the described method, additional operations and/or include the additional elements.

A base station may perform a method comprising multiple operations. The base station may send, via a first control resource set (CORESET) and a second CORESET, repetitions of downlink control information (DCI) scheduling a downlink signal and comprising a transmission configuration indicator (TCI) field. The base station may, based on a first CORESET pool index of the first CORESET and a second CORESET pool index of the second CORESET being different, determine a default CORESET pool index among the first CORESET pool index and the second CORESET pool index. The base station may send the downlink signal based on a TCI state, among one or more TCI states activated for the default CORESET pool index, indicated by the TCI field. The base station may also perform one or more additional operations. The determining the default CORESET pool index may comprise determining a CORESET pool index, among the first CORESET pool index and the second CORESET pool index, that is equal to a preconfigured value. The determining the default CORESET pool index may comprise determining a CORESET pool index of a CORESET, among the first CORESET and the second CORESET, via which a last repetition of the DCI is sent. The downlink signal may comprise at least one of: a transport block; a physical downlink shared channel (PDSCH) transmission; or a channel state information (CSI) reference signal (RS). The base station may send one or more configuration parameters indicating: the first CORESET pool index for the first CORESET; and the second CORESET pool index for the second CORESET, wherein the second CORESET is linked to the first CORESET for the repetitions of the DCI. The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a wireless device configured to receive the downlink signal. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device via at least one of a first control resource set (CORESET) or a second CORESET, repetitions of downlink control information (DCI) scheduling a downlink signal, wherein a time offset between the DCI and the downlink signal is less than a threshold;
based on a first CORESET pool index of the first CORESET and a second CORESET pool index of the second CORESET being different, determining a default CORESET pool index by determining, among the first CORESET pool index and the second CORESET pool index, a lowest CORESET pool index or a highest CORESET pool index; and receiving the downlink signal using a CORESET associated with a lowest CORESET index among one or more CORESETs associated with the default CORESET pool index.

2. The method of claim 1, wherein the receiving the downlink signal using the CORESET associated with the lowest CORESET index among the one or more CORESETs comprises receiving the downlink signal based on a transmission configuration indicator (TCI) state of the CORESET associated with the lowest CORESET index among the one or more CORESETs.

3. The method of claim 1, wherein the receiving the downlink signal using the CORESET associated with the lowest CORESET index among the one or more CORESETs comprises receiving the downlink signal based on at least one demodulation reference signal (DMRS) port of the downlink signal being quasi co-located with a reference signal of the CORESET associated with the lowest CORESET index among the one or more CORESETs.

4. The method of claim 1, wherein the time offset between the DCI and the downlink signal being less than the threshold comprises a time offset between a last repetition of the DCI and the downlink signal being less than the threshold.

5. The method of claim 1, further comprising receiving one or more configuration parameters indicating:
 the first CORESET pool index for the first CORESET; and
 the second CORESET pool index for the second CORESET, wherein the second CORESET is linked to the first CORESET for the repetitions of the DCI.

6. The method of claim 1, wherein the downlink signal comprises at least one of:
 a transport block;
 a physical downlink shared channel (PDSCH) transmission; or
 a channel state information (CSI) reference signal (RS).

7. A method comprising:
 receiving, by a wireless device, one or more configuration parameters indicating:
  a first control resource set (CORESET) pool index for a first CORESET; and
  a second CORESET pool index for a second CORESET;
 receiving, via at least one of the first CORESET or the second CORESET, repetitions of downlink control information (DCI) scheduling a downlink signal, wherein a time offset between the DCI and the downlink signal is less than a threshold; and
 based on the first CORESET pool index and the second CORESET pool index being different, receiving the downlink signal using a CORESET associated with a lowest CORESET index among one or more CORESETs associated with a default CORESET pool index that is a lowest CORESET pool index or a highest CORESET pool index among the first CORESET pool index and the second CORESET pool index.

8. The method of claim 7, wherein the receiving the downlink signal using the CORESET associated with the lowest CORESET index among the one or more CORESETs comprises receiving the downlink signal based on a transmission configuration indicator (TCI) state of the CORESET associated with the lowest CORESET index among the one or more CORESETs.

9. The method of claim 7, wherein the receiving the downlink signal using the CORESET associated with the lowest CORESET index among the one or more CORESETs comprises receiving the downlink signal based on at least one demodulation reference signal (DMRS) port of the downlink signal being quasi co-located with a reference signal of the CORESET associated with the lowest CORESET index among the one or more CORESETs.

10. A method comprising:
 sending, by a base station via a first control resource set (CORESET) and a second CORESET, repetitions of downlink control information (DCI) scheduling a downlink signal, wherein a time offset between the DCI and the downlink signal is less than a threshold;
 based on a first CORESET pool index of the first CORESET and a second CORESET pool index of the second CORESET being different, determining a default CORESET pool index by determining, among the first CORESET pool index and the second CORESET pool index, a lowest CORESET pool index or a highest CORESET pool index; and
 sending the downlink signal using a CORESET associated with a lowest CORESET index among one or more CORESETs associated with the default CORESET pool index.

11. The method of claim 10, wherein the time offset between the DCI and the downlink signal being less than the threshold comprises a time offset between a last repetition of the DCI and the downlink signal being less than the threshold.

12. The method of claim 10, wherein the sending the downlink signal using the CORESET associated with the lowest CORESET index among the one or more CORESETs comprises sending the downlink signal based on a transmission configuration indicator (TCI) state of the CORESET associated with the lowest CORESET index among the one or more CORESETs.

13. The method of claim 10, further comprising sending one or more configuration parameters indicating:
 the first CORESET pool index for the first CORESET; and
 the second CORESET pool index for the second CORESET, wherein the second CORESET is linked to the first CORESET for the repetitions of the DCI.

14. The method of claim 10, wherein the downlink signal comprises at least one of:
 a transport block;
 a physical downlink shared channel (PDSCH) transmission; or
 a channel state information (CSI) reference signal (RS).

* * * * *